United States Patent [19]

Marsalka et al.

[11] 3,774,156

[45] Nov. 20, 1973

[54] MAGNETIC TAPE DATA SYSTEM

[75] Inventors: Joseph P. Marsalka, Columbus; Charles F. Spademan, Worthington, both of Ohio

[73] Assignee: MI2, Inc., Columbus, Ohio

[22] Filed: Mar. 11, 1971

[21] Appl. No.: 123,187

[52] U.S. Cl. .............................................. 340/172.5
[51] Int. Cl. ......... G06f 3/00, G06f 5/04, G06f 5/06
[58] Field of Search .................................. 340/172.5

[56] References Cited

UNITED STATES PATENTS

| | | | |
|---|---|---|---|
| 3,516,069 | 6/1970 | Bray et al. | 340/172.5 |
| 3,559,187 | 1/1971 | Figueroa et al. | 340/172.5 |
| 3,533,076 | 10/1970 | Perkins et al. | 340/172.5 |
| 3,526,878 | 9/1970 | Bennett et al. | 340/172.5 |
| 3,537,074 | 10/1970 | Stokes et al. | 340/172.5 |
| 3,516,074 | 6/1970 | Enomoto et al. | 340/172.5 |
| 3,380,030 | 4/1968 | McMahon | 340/172.5 |
| 3,061,192 | 10/1962 | Terzian | 340/172.5 |
| 2,907,005 | 9/1959 | Chien et al. | 340/172.5 |
| 3,012,230 | 12/1961 | Galas et al. | 340/172.5 |
| 3,032,746 | 5/1962 | Kautz | 340/172.5 |
| 2,905,930 | 9/1959 | Golden | 340/172.5 |
| 3,153,776 | 10/1964 | Schwartz | 340/172.5 |

*Primary Examiner*—Gareth D. Shaw
*Attorney*—Le Blanc & Shur

[57] ABSTRACT

There is disclosed a data handling system including input-output means, intermediate memory means and principal memory means, together with data transfer and processing control logic. Input and output parallel to serial and serial to parallel and code conversion capability are provided. Input-output temporary storage capability is provided by a shift register. The intermediate memory is a random access memory or the like having a storage capacity substantially exceeding that of the input-output shift register. The principal memory is a magnetic tape system, preferably employing a magnetic tape cassette as a memory medium. The system is useable in various ways, for example as a data terminal capable of local keyboard and/or remotely controlled data storage and transmission. Data input and output may be in parallel or serial form and a variety of data rates and data code word may be acoommodated without system modification.

Broadly stated, for operation in the record mode, the system accumulates a block of data provided by a data source (for example a line of print) in the intermediate memory through the input-output means, and thereafter transfers the entire data block to the principal memory at a high speed. For playback, an entire block of data is transferred at high speed from the principal memory into the intermediate memory and is thereafter provided through the input-output means to suitable data utilization devices at a data rate compatible with such devices.

Among the features provided by the system are error checking and correction on a character-by-character and data block basis, data block identification (search) based on selectable identifying code characteristics and compatibility with a variety of keyboard controlled devices or other data input and output devices, and automatic and manual data gathering and processing machinery.

103 Claims, 38 Drawing Figures

MAGNETIC TAPE DATA SYSTEM

INTRODUCTION

This invention relates to a keyboard controlled data storage and retrieval system. The invention is useful in a variety of commercial and technical data handling applications, but finds particular utility as a terminal for two-way data transmission or for message transmission in a system such as "TWX" or "TELEX," and will be described in this environment. However, with appropriate augmentation, the system may be used in a variety of other ways, for example, as an automatic typewriting and composing system, an audiodictation transcriber, in process control or as a means of data gathering, storage and control, or, in conjunction with a small-scale arithmetic processor such as a cash register, calculator, etc., as a minimum-scale computer capable of direct interface with larger, more versatile data processing machines, or even as all of these combined. These features are provided in a system which is simple and inexpensive in relation to other keyboard controlled terminals, yet possesses capabilities not available even in the more expensive and complex systems.

BACKGROUND

During the past decade, rapid technological developments in data transmission, data storage and processing have resulted in availability of important new services for business and industry. Improved data transmission and terminal equipment and computer time-sharing techniques have given commerical and technical users, both large and small, direct access to powerful remotely located computers through established data transmission network, such as telephone or teletypewriter systems. Services currently available include space reservat'on systems for hotels, airlines, etc., inventory control systems for businesses, centralized accounting systems for banks, retail establishments, etc., and programmed learning machines having a centralized information storage and control computer and a large number of remote user-operated learning stations.

Direct access to remote computers also facilitates a variety of computer-aided technological activities such as virtually instantaneous problem-solving through a desk-top computer input-output device for electrical circuit or mechanical design, process and production simulation, etc. In the medical field, remote data processing systems are being developed to permit remote measurement and interpretation of electrocardiograms, monitoring of hospital patients to advice instantly of any significant change in patient condition, and even computer diagnosis of routine ailments. The range of services which can be provided by direct access to remote computers is a diverse as man's imagination; seriously being contemplated are financial transaction systems whereby payment for purchases and services, and even payment of wages is solely by computer transfer of debts and credits — a virtually "cashless" and "checkless" economy!

Essential, however, to full utilization of the potential of centralized data processing facilities is the availability of efficient and versatile means for obtaining access to and controlling the computer. Further, the terminal equipment must be relatively inexpensive so that cost is not prohibitive even to the smallest legitimate user.

Equally important, the terminal equipment must be reliable and durable, the former to minimize the changes of externally caused computer errors, and the latter to minimize the need for costly "house calls" to service remote equipment. Unfortunately, currently available equipment is not completely satisfactory in some, or even all of the foregoing respects.

For example, because of the proliferation of available services and competition among suppliers, a large number of different techniques and systems for data handling and transmission have been developed. This is not objectionable in itself; but many of the systems employ special and unique information formats with consequent incompatibility between competing systems. This is a disadvantage both to the supplier and to the user of data handling equipment. To maximize his market potential the supplier must provide equipment compatible with more than a single information transmission and processing format. Currently available terminal equipment is not readily adaptable for use with different information formats, so a supplier must stock a number of different models, or use varying interfaces, either of which is costly in terms of inventory maintenance, etc.

From the customer's standpoint, concurrent access to more than one data handling network, e.g., through the teletype network, and over the telephone lines, now requires costly and inconvenient duplication of equipment.

Another problem involves effective utilization of the communication channel. As will be appreciated, the data transmission rate depends not only on the channel capacity of the communication link, but also upon the electrical and/or mechanical characteristics of the transmitting and receiving equipment. Where information is to be transferred directly from one computer to another, for example, the information generating and handling capacity of the terminal equipment will ordinarily not be a limiting factor. Rather, the frequency characteristics of the communication channel will determine the rate at which information can be transferred.

On the other hand, where information is being generated manually on a keyboard and/or received by an electro-mechanical printer, these devices, rather than the communication channel may be the limiting factor. Maximizing the information handling speed of the terminal equipment, therefore, may be an important consideration, not only to assure rapid transfer of information, but also because the rates charged for use of a communication channel such as a telephone line are ordinarily based on time consumed, rather than directly on the quantity of information transmitted.

It has therefore been recognized, for some time, that improved efficiency and economy can often be obtained by locally recording the information generated prior to transmission and thereafter remotely recording the transmitted information prior to its being printed out or otherwise utilized.

One well-known system of the latter type employs a keyboard control device to produce a punched paper tape record of the information to be transmitted. Such an arrangement has definite advantages in comparison with direct transmission of keyboard generated information, and this system enjoys some degree of commercial success. However, a punched tape system is subject to several disadvantages, including information handling capacity which is limited by the mechanical nature of the system, difficulty of error correction, high cost of the paper tape (which is, of course, not reusable), and inconvenience of permanent tape storage, should this be desired.

For the foregoing reasons, consideration has been given to use of a magnetic tape rather than a punched paper tape as the memory medium, and several such systems have been proposed. One magnetic tape memory system provides a keyboard controlled input in which depression of the character key results in generation of a multi-bit code word uniquely identifying each character. The code words are stored as generated in parallel on the tape, i.e., all of the bits for each code word are simultaneously recorded in parallel tracks on the magnetic tape.

This arrangement too has several disadvantages. First, the character code format employed requires six information bits for uniquely identifying each character and thus six parallel tape tracks are required. In addition, however, the six bit character code must be augmented for remote transmission to include at least one "start" and one "stop" bit, and preferably also to include an error checking bit, e.g., a parity bit. Thus, a minimum of nine bits must be transmitted for each character.

Various coding schemes exist, including, for example, one employing seven information bits, one parity bit, one "start" bit and two "stop" bits for a total of eleven bits per character. In view of this, it is necessary either to suppress all but the information bits for storage, and to generate (or regenerate) these bits when information is to be transmitted, or else to provide a sufficient number of parallel tape tracks for recording the entire code word. Neither approach is particularly satisfactory since the former may involve added system complication, and the latter would require provision of a wider and more expensive tape, and a larger, more complicated, and more expensive tape mechanism.

For the foregoing reasons, it has been proposed as an alternative to record multi-bit character code information serially on a single track, recording medium such as a tape — or even on a magnetic belt, such as used in standard audio dictation equipment, rather than in parallel. This approach eliminates many of the disadvantages of parallel recording such as the need for wide tape, multiple head recording apparatus, etc., but creates several new difficulties and complications not encountered in a parallel recording system.

One such problem involves the inherent inertial properties of the tape transport mechanism itself. As will be appreciated, with information often being generated intermittently by the keyboard operator on a character-by-character basis, rather than at a continuous rate it would not be efficient to run the memory tape constantly whether a character is actually being generated or not. Thus, in both parallel and serial systems, it has been recognized that the tape transport mechanism should be arranged to start in response to the generation of a character by manipulation of the keyboard. One previously proposed serial system has employed a buffer register having sufficient bit capacity for one character both as a means for effecting parallel to serial conversion, and also as a medium for transfer of the multi-bit character code to the tape.

However, when the character contained in the buffer (or otherwise provided in serial form) is ready to be recorded, the tape transport mechanism must be allowed to reach its intended operating speed before the character is recorded. This is necessary for several reasons. For example, if a sequence of bits is recorded while tape speed is changing, the duration of each information bit and the bit spacing, will vary, rendering subsequent readout more difficult.

Further, even though utilization of tape space is relatively efficient in a start-stop system compared to a system having a continuously running tape, a large portion of the tape is still empty, since nothing is being recorded during the "start-up" and "slow-down" time between characters.

One apparent alternative, has been development of a tape transport not subject to a substantial "start" and "stop" delay. Various approaches have been considered, mainly involving mechanisms for moving the tape in discrete steps rather than continuously during the recording. Such arrangements proved more satisfactory for parallel than for serial recording, however, because if the tape is subject to slippage, the stepping mechanism and the tape may easily become out of synchronism whereby a stepping cycle may end partway through the sequence of bits constituting a character rather than between characters.

To alleviate the latter problem, attempts have been made to develop stepping mechanism producing short rapid steps with the step time long in comparison to the rest time between steps. However, for a system employing information transmission at 132 bits/second (one of the currently employed formats) it was estimated that a stepping mechanism producing approximately 200 steps per second would be necessary, and no equipment meeting this and other necessary requirements appears to be available at reasonably low cost.

A related, but converse problem in serial systems involves compatability between the operating speed of the keyboard (and the output printer) and the tape transport mechanism to permit maximum bit storage density on the tape, and maximum playback speed. As will be appreciated, for a given printer mechanism, a minimum cycle time exists for each operation. If information is provided to the printer at a rate faster than the cycle time, characters may be missed, or the printer may even jam. Similarly, the memory system will also have a minimum cycle time, and attempted operation of the keyboard at a faster rate may result in failure to record all of the typed characters.

As a practical matter, these difficulties can be alleviated by providing a control loop for the actuating mechanism of the input-output printer and the memory to maintain the proper operating rate in relation to each other. However, certain currently available printers are capable of operating at speeds substantially in excess of the speed capabilities of the memory systems with which they have been coupled. Thus, when recording, the efficiency of a fast typist may be substantially limited, and correspondingly, the time required to print out a message will be unnecessarily prolonged.

Another important consideration in serial recording systems is control of the operating speed of the tape transport mechanism. During playback, the tape transport mechanism may be run continuously, and the recorded information transmitted continuously to the remote receiver. However, the serial information transfer format makes it essential that accurate synchronization between the incoming information and the receiver be maintained. Where the only information transmitted is a sequence of information and start and stop bits, proper operation depends to a large degree on maintaining a closely controlled operating speed for the tape transport. This is not a serious problem in itself, since tape transports are available which provide a high degree of speed control. However, this is a factor in the cost of transport, and thus ultimately in the overall cost of the system.

Moreover, where it is desired to make the terminal system compatible with more than one information transmission format, it may be necessary to record information at one speed and to play it back at a different speed.

Since the playback signal-to-noise ratio increases with increasing tape speed, it is ordinarily desired to run the tape at the highest possible speed during playback. However, if it is desired to receive information from a communication channel at a high speed, for example, approximately 100 characters per second, and to print it out subsequently at a lower speed, e.g., 10 characters per second, the tape must be run considerably more slowly during playback than during record. Both the resulting complexity of multi-speed tape transport mechanism, and the substantial degradation in system signal-to-noise ratio are notable disadvantages.

Another disadvantage of heretofore available serial recording systems is the difficulty of incorporating certain information processing functions such as error correction or message address or identifier searching. In such systems, and also in current parallel systems, error correction is accomplished by backspacing the tape and individually erasing the bits corresponding to the unwanted character. The resulting complexity of the tape transport mechanism, and of the required logic circuitry is a substantial disadvantage, particularly in serial systems, where each character comprises several bits in sequence, since one of the supposed advantages of tape systems compared to punched paper tape systems, is that error correction can be simplified.

Message identifier or address search involves providing a particular combination of characters identifying a desired message, and causing the machine to search the tape character-by-character until the desired combination has been located. In a serial system, since the information is available for processing only on a sequential bit-by-bit basis (or in the case of parallel recording systems, on a sequential character-by-character basis) the search process, which ordinarily starts at the beginning of the tape, may be quite time consuming, particularly if the message to be located happens to be at the other end of the tape.

Further, when the desired message has been located, it is necessary to stop the tape rapidly so that the initial portion of the message is not overrun. One proposed serial recording system has suggested accomplishing this by stopping the tape when the desired identifier code has been located, and then running the tape back to the beginning of the desired message. (The same arrangement is employed for error correction.) This has obvious disadvantages with regard to the required complexity of the tape transport mechanism nd the control logic, as well as with regard to the time required for the back-up portion of the operation.

BRIEF DESCRIPTION OF THE INVENTION

The present invention seeks to avoid the foregoing disadvantages of the serial and parallel recording formats in a serial system which provides flexibility in accommodating a wide variety of data processing and transmission applications at low cost without sacrifice of reliability or accuracy.

Broadly, the system of this invention includes an input-output printer, one or more magnetic tape memories, and appropriate input-output, data processing, and control logic. A particularly important feature of this invention is the provision of an intermediate memory system for temporarily storing information read from the tape before further processing, and for storing incoming information before it is recorded. The intermediate memory is of sufficient capacity to accommodate an entire line of characters, the number depending on the information format employed. Information is stored in the tape memory in serial form, with a fixed number of bits per character, independent of the information transmission and utilization format being employed. To accommodate different formats, simple input and output code converters are employed. The system is arranged to accommodate a single "plug-in" code converter for the desired code format if the system is to be used only with a single operating code. Alternatively, a plurality of input-output code converters may be provided and selectably operated to allow use of the system in conjunction with any one of several data transmission media or data processing systems.

Likewise, to accommodate different clock or synchronizing rates characteristic of different information formats, the master timing control unit of the system is arranged to provide signals at all needed frequencies, with the particular frequencies for a given format being selected along with the code converter.

It may be seen, therefore that the present invention may be used for the transmission of numerical data and other messages in a variety of code formats — for numerical data or ordinary messages as may be transmitted over a "TWX" or "TELEX" system, with direct compatibility. All signalling functions such as automatic answer, etc. may easily be provided.

The present invention may also serve a variety of other data processing and handling functions. For example, with suitable data processing and control logic, the system may be used as an automatic typewriting and composing system. With two tape memories, a document may be repetitively typed from the first tape with a list of individualized portions of the letter, such as the address and other special information for the sequence of letters to be prepared, inserted at the proper places from the second tape.

Similarly, the two-tape system may be used to facilitate correction and revision, by playing the information stored on one tape onto the other tape until a correction is to be made (with the process being monitored through the operation of the input-output printer) and then inserting any corrections or other changes manually onto the second tape, after which the remainder of the first tape is played onto the second tape to provide a complete revised version of the message.

Additional manually operated inputs such as a cash register, adding machine, or the like, may also be employed to provide automatic generation and storage of computer-usable information concerning commercial transactions of many types. The recorded information may thereafter be played back and transmitted to a master computer for such purposes as bookkeeping, inventory control, billing, etc.

Apart from the overall features of the system as mentioned above, the particular construction employed in accordance with this invention results in serveral substantial advantages in comparison with heretofore available equipment.

For example, in accordance with this invention, the intermediate line memory and associated logic are so arranged that when recording, the intermediate memory will accept a full typed line before any information is transferred to the tape memory. When the system senses the completion of a line, the entire line of information then in the intermediate memory is transferred to the tape during the time that the typewriter itself is being prepared for the next line, so no time is lost by the recording operation.

Correspondingly, when playing back, an entire line of information is transferred from the tape to the line memory and is thereafter transferred out to the printer, cathode ray tube display, or other utilization device at a rate compatible with the latter. When the entire stored line has been transferred out, another line of information is transferred from the tape into the intermediate memory, again while the output unit is being prepared to handle the next line.

By transferring information to and from the tape only on a line-by-line basis, the tape runs continuously for the entire line. Maximum information storage density is thus achieved by eliminating lengthy pauses between characters corresponding to the "start" and "stop" time for the tape transport mechanism.

Further, since the electromechanical characteristics of the tape transport mechanism do not affect the operation of the printer, and vice versa, the printer and the tape mechanism may each be operated at their respective optimum speeds. As noted above, this could be important during playback in achieving rapid printout, and in assuring the desired signal to noise ratio for the tape. Also, when recording, it eliminates the possibility that the typing speed of an accomplished typist will be hindered by a slow machine.

Use of the intermediate line memory also permits substantially complete independence between the respective bit rates of incoming and outgoing data and flexibility of changing the information transmission format within the system simply and conveniently. Thus, information may be provided over a remote communication channel at a high speed substantially in excess of that suitable for operation of the input-output printer at either end. Further, since information transmission and reception are controlled by a master timing source, the intermediate memory may receive information from a low-speed or a high-speed source, and the information is recorded on the magnetic tape at a rate independent of the rate at which it was received. Likewise, information is transferred from the tape to the intermediate memory at an optimum speed, and is transferred to a utilization device at a rate suitable for that device. In this way, the system may readily accommodate a wide variety of input and output data utilization devices with little or no system modification.

An advantage related to the foregoing is that because the characteristics of the tape transport mechanism do not affect and are not affected by the characteristics of inout and output equipment connected to the system, a simple tape transport mechanism may be employed, the only requirements being that the same is durable and reliable and that it is capable of operating in the forward and reverse directions. The playback process is controlled by a timing track on the tape which is used to synchronize the intermediate memory. The timing track is recorded simultaneously with the message information whereby the recording and playback processes are essentially independent of tape speed. This allows further simplification of the tape drive and the information transfer control logic.

In fact, because the demands on the tape transport mechanism are so limited, it has been found possible to employ a simple and inexpensive transport mechanism with standard one-eighth-inch magnetic tape cassettes as the memory unit, with a substantial reduction in the cost and complexity.

Another important advantage derived from utilization of the intermediate line memory is a considerably simplified and more rapid procedure for address search and error correction. Since information is transferred to and from memory on a line-by-line rather than a character-by-character or bit-by-bit basis, the search operation which involves identification of a particular character combination at the beginning of a message can proceed on a line-by-line basis. In other words, the system is constructed to search each line in sequence for the desired character combination at the place in the line where such character combination would appear. The result is a substantial increase in the speed with which a search may be accomplished and a simplification of the required control logic.

Correspondingly, with respect to error correction, information handling on a line-by-line basis permits faster and simpler access to information required to be corrected.

Since the data storage and retrieval and data processing functions of this system are both simple and flexible, a variety of additional uses of the system apart from those previously mentioned may easily be accommodated. For example, the present invention may easily be used for process control or periodic remote sampling of a series of information gathering devices such as transducers, etc. By use of the keyboard input device, a suitable control program may be prepared and stored in the tape memory. At the time of use, the stored information is transferred from the tape to the intermediate memory for further processing.

Operating in conjunction with a suitable switching system, a series of remote control points may be actuated, or a sequence of transducers sampled, and outputs recorded in the intermediate memory, and thereafter transferred to the tape for subsequent utilization as desired. Because the system is so flexible in accommodating a variety of information transmission formats, many information gathering and disseminating functions of this type may be handled with the same equipment without limiting its use as a data terminal for keyboard and like-generated information, etc.

OBJECTS OF THE INVENTION

Accordingly, it is an object of this invention to provide an improved magnetic tape data storage and processing system for use as a terminal in a remote data or message communication network. It is a related object of this invention to provide such a system which is readily adaptable for use as an automatic typing and composing system, an audio dictation transcriber and as a central processor for telemetering of remote control systems.

A further object of this invention is to provide a magnetic tape data terminal system having one or more keyboard controlled input-output devices such as a typewriter, a cash register, and adding machine, etc.

Another object of this invention is to provide a keyboard controlled magnetic tape data terminal which is simpler and less expensive than currently available devices, yet reliable and durable and capable of providing a wide range of functions.

An additional object of this invention is to provide a magnetic tape data terminal system which is compatible with a wide range of code formats and input-output devices operating either serially or in parallel. A related object to this invention is to provide a data terminal system as described above which is compatible with code formats and input-output devices having a wide range of operating speeds and information handling capacities.

Yet another object of this invention is to provide a magnetic tape data terminal system in which information is transferred to and from the tape memory one line at a time.

A further object of this invention is to provide a magnetic tape terminal system in which data is recorded serially on one tape track and in which synchronizing information for control of data playback from the first track is recorded on a second track.

It is another object of this invention to provide a data terminal system in which data is transferred to and from the tape to an intermediate memory having the capacity for storing an entire line of data. A related object is to provide such a system in which information is recorded on the tape only after an entire line of information has been received in the intermediate memory, and in which the tape operates continuously while the entire line of stored information is transferred to tape. Another related object is to provide sucy a system in which an entire line of information is played back from the tape into the intermediate memory before utilization.

An additional object of this invention is to provide a magnetic tape terminal system in which information is stored in the system on a bit-by-bit basis in serial form with a fixed number of bits being stored per character independent of the code format. A related object of the invention is to provide such a system in which the number of bits stored includes all of the information bits and error checking bits of the largest code format with which the system is to be compatible.

A further object of this invention is to provide a magnetic tape data terminal system in which transfer of information is controlled by a master timing source operating through a multiple output counting circuit and program control means for producing required sequences of timing pulses at various required frequencies. A related object is to provide such a system in which the rate at which information is transferred into and out of the system is independent of the rate at which information is transferred into and out of the tape memory.

Another object of this invention is to provide a magnetic tape data terminal system having error correction and message identification searching capability. A related object is to provide a system in which such error correction and identification searching is accomplished on a line-by-line basis.

It is also an object of this invention to provide a magnetic tape data terminal system employing a magnetic tape cassette as the memory medium.

A further object of this invention is to provide a magnetic tape data terminal system having a magnetic tape cassette memory and an intermediate memory capable of storing an entire line of information, and in which information is transferred between the magnetic tape memory and the intermediate memory during normal pauses between adjacent characters being received or transmitted. A related object is to provide such a system in which information transfer between the tape memory and the intermediate memory is sufficiently rapid that it occasions no delay in the input and/or output code formats.

Another object of this invention is to provide a magnetic tape data terminal system compatible with a variety of information transmission code formats in which one or more non-information-bearing bits is suppressed during storage, and generated or regenerated at the time of information transmission.

It is also an object of this invention to provide a magnetic tape data terminal system including an input-output printer and a coupling unit for connecting the system to a communication channel, an input-output unit connected to the coupling unit and the printer, an intermediate memory for storing an entire line of information, a tape memory unit, and a logic subsystem for controlling the information storage and retrieval and processing functions.

Another object of this invention is to provide a magnetic tape data terminal system having provision for performing an error-checking operationg and outgoing and/or incoming characters and for providing an indication whenever an error is detected. It is a related object of this invention to provide a magnetic tape data terminal system in which the above-mentioned input-output unit includes input-output logic providing selective gating, code conversion, parity checking and parity bit generation, a shift register and control means for the shift register, and a logic unit for transferring information between the shift register and the intermediate memory.

A further object of this invention is to provide a magnetic tape data terminal system as described above in which the control logic subsystem comprises an intermediate memory control and erase logic unit, a special character identification and address search logic unit, a mode control logic unit, a tape control logic unit, a master timing source, and character transfer control logic including a master sequence control unit, and a special three character transfer control unit for effecting transfer of three characters between the shift register and the intermediate memory.

The exact nature of this invention, together with other objects and advantages thereof, will be apparent from consideration of the following detailed description and the accompanying drawings, in which:

Figure 5:
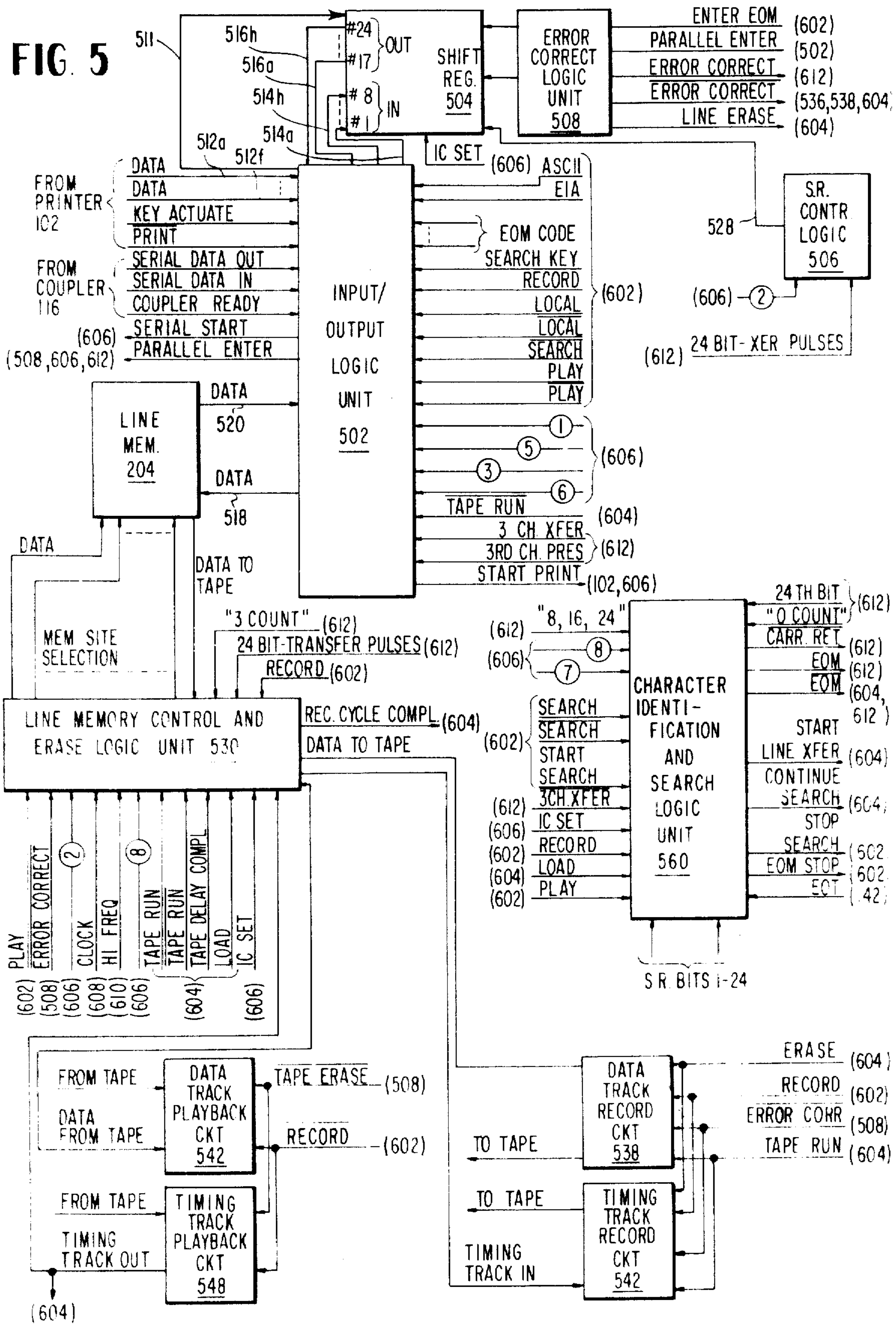
FIGS. 5 and 6 are a detailed block diagram showing the construction and interconnection of the system illustrated generally in FIG. 2.
Figure 6:
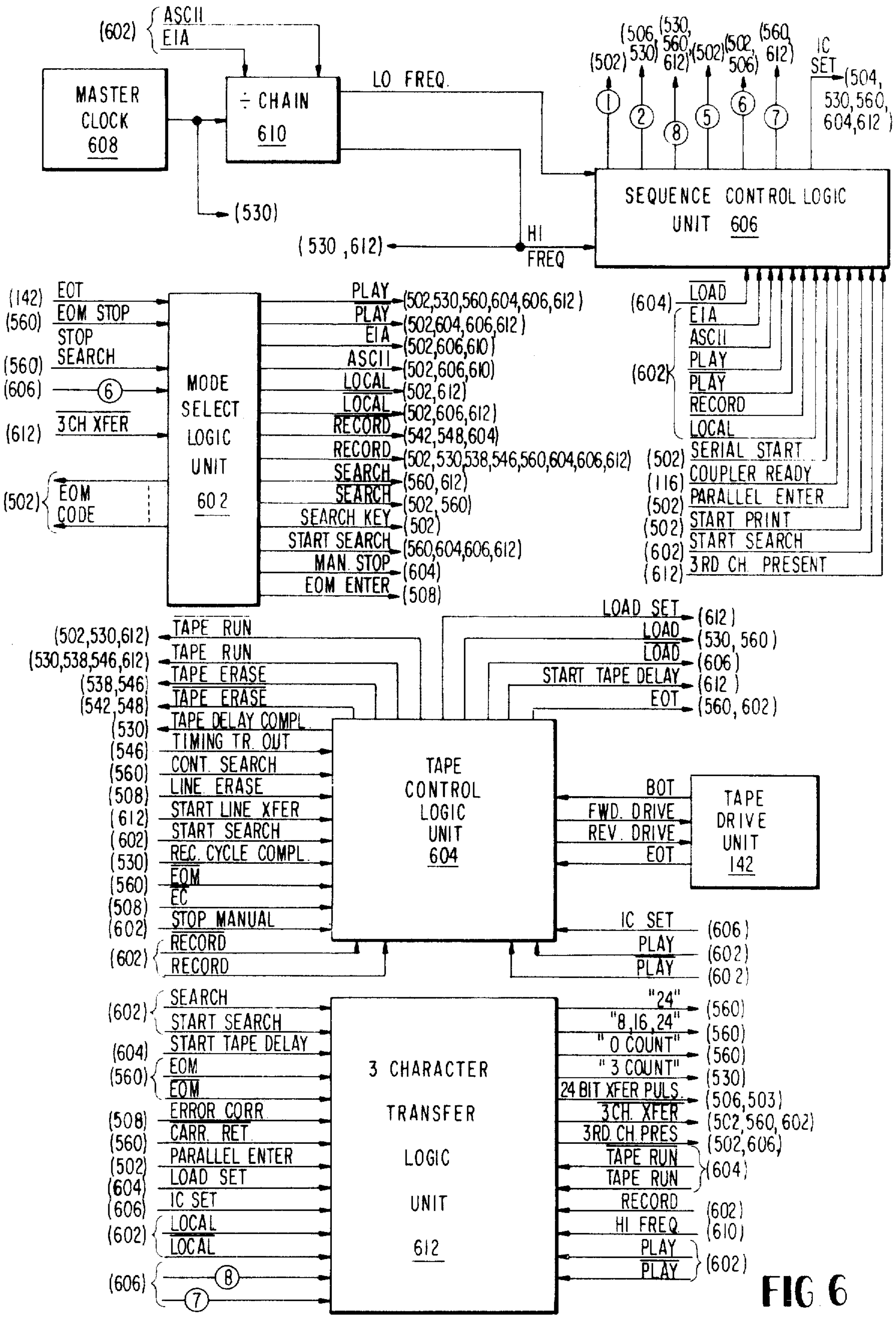

For convenient reference and correlation between the detailed description and the drawings, a reference numerical scheme has been adopted wherein the first digit or digits represent the FIGURE number on which the reference numeral first appears. Thus, an item bearing the reference numeral 604 first appears on and is described in connection with FIG. 6, and items bearing the reference numerals 1208 and 1294 first appear on and are described in connection with FIG. 12. Reference numerals applying to portions of the system illustrated in the comprehensive drawings of FIGS. 1 and 2 (bearing reference numerals such as 102, 212, etc.) are carried through in the remaining drawings to the extent feasible. Likewise, reference numerals pertaining to portions of the system shown in the detailed block diagram of FIGS. 5 and 6 are carried through to the detailed circuit drawings of FIGS. 8, 9, 11, 12, 14, 15, 17, 18, 20, 21, 23–25, 27, 28, and 30

OVERALL SYSTEM ORGANIZATION

Figure 1:
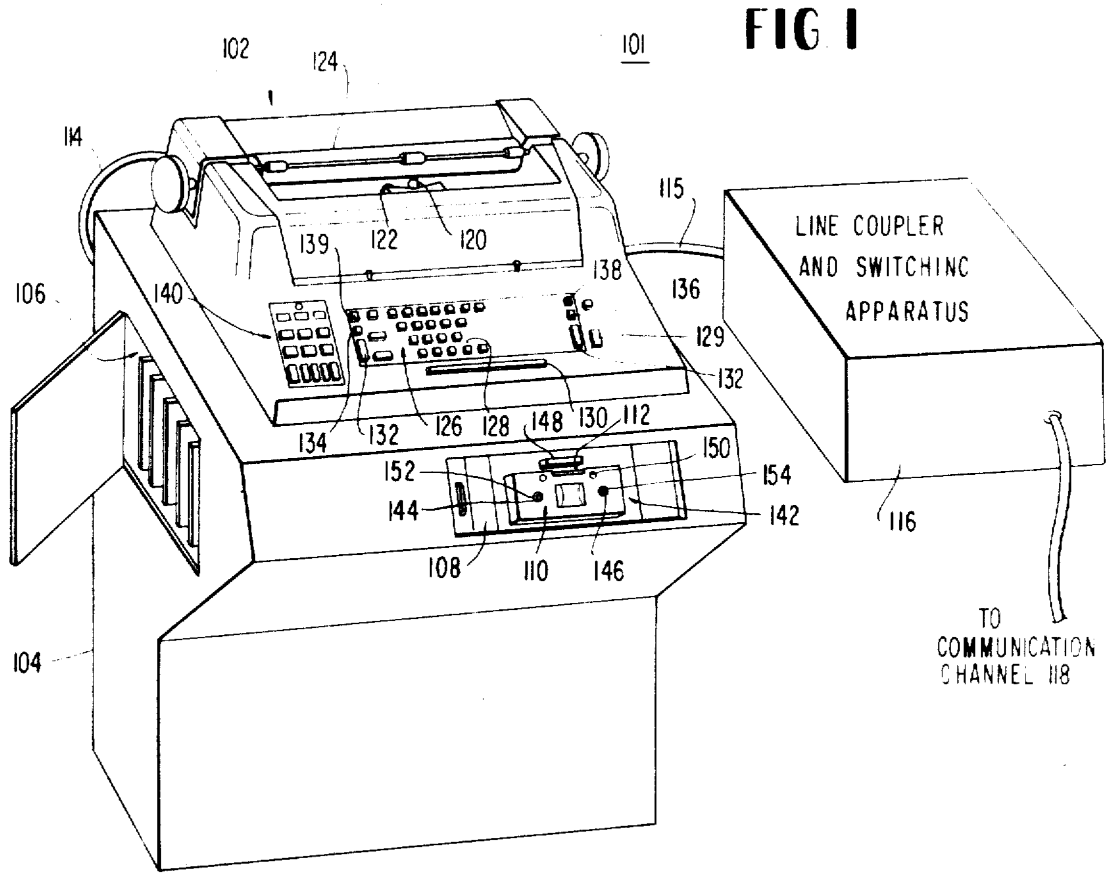
FIG. 1 is an overall pictorial view of a magnetic tape data terminal system constructed in accordance with the principles of the present invention.

Turning now to the drawings, FIG. 1 shows an overall pictorial view of the present invention used as a keyboard controlled input-output data terminal. The system, generally denoted 101, includes an input/output printer 102 shown mounted on a supporting pedestal 104 which houses an electronic data storage and processing unit 106 and a memory unit 108, preferably including a magnetic tape cassette 110 containing a data quality magnetic tape 112 as the memory medium. Printer 102 is connected to data storage and processing unit 106 by a multi-wire cable 114; a second cable 115 connects unit 106 to a communication line coupler and switching apparatus 116 constructed in any conventional or desired manner for interfacing with a communication channel 118. The latter may be a telephone or telegraph line when terminal 101 is used for remote communication, or more simply is a two-wire line of appropriate design when terminal 101 is to be connected to a central data processor in another part of the same or a closely adjacent building.

Printer 102 may be of any desired construction capable of meeting the following requirements:

a. In response to depression of any of a plurality of keys on an input keyboard, printer 102 should operate to produce typed copy on a sheet of paper. Simultaneously, the printer should provide parallel electrical output signals on a set of output terminals, with the output signal patterns defining a set of multi-bit code words corresponding uniquely to each typed character and to the various typewriter operations such as paper feed, space, carriage return, etc.

b. Likewise, in response to various combinations of signals externally provided in parallel to a set of input terminals, printer 102 should operate to provide a typed output on a sheet of paper, with the particular typed message depending on the sequence of code words provided.

Several input-output printers meeting the above-stated requirements are avaiable. One satisfactory type is an IBM Selectric typewriter such as shown in Palmer U.S. Pat. application Ser. No. 2,919,002, modified as described in Decker et. al. U.S. Pat. No. 3,082,854. A particularly preferred printer unit, however, is the "Design 101" Input/Output Writer manufactured by Design Elements, Inc., of Columbus, Ohio, described and claimed in assignee's copending United State Patent applications, Ser. No. 079,202 filed Oct. 6, 1970 entitled Input-Output Typewriter Apparatus; Ser. No. 98627, filed Dec. 16, 1970, entitled Solenoid Drive Circuit, and Ser. No. 101502, filed Dec. 16, 1970, entitled Improved Solenoid Drive Circuit.

Briefly, as illustrated in FIG. 1, preferred printer 102 includes a so-called single element print head 120 mounted on a carrier 122 arranged to move longitudinally along a fixed paper support platen 124. A conventional keyboard 126 containing a plurality of alphanumeric keys 128, an ON-OFF switch 129 and a plurality of standard typewriter print format control keys such as Spacebar 130, Shift keys 132, a Shift-lock key 134, a Print Head Carrier Return key 136, a Back-space key 138, a Tabulator key 139, etc., permits control of the various typewriter functions.

In addition to the foregoing, printer 102 includes at least one auxiliary control keyboard 140 containing actuating keys for the special data storage, retrieval and processing functions hereinafter described.

Data storage and processing unit 106, memory unit 108, and, if feasible, even coupler unit 116 are preferably mounted in supporting pedestal 104, with printer 102 suitably positioned for comfortable access by an operator. Alternatively, a separate console may be provided, in which case, printer 102 would be located in customary fashion on a desk, table, or the like, with the console positioned nearby for convenient access.

As illustrated in FIG. 1, memory unit 108 comprises a tape transport 142 including one or more drive motors and torque transmission apparatus (not shown) constructed in any conventional or desired manner for operating a pair of tape drive spindles 144 and 146 both clockwise and counterclockwise for forward and reverse tape movement. Memory unit 108 also includes magnetic recording and playback head 148 having two record and two playback elements. This provides for recording and playback of character and control function codes in a first track, and of timing signals in a second track. The latter are used to control the transfer of character and control function information from the first track, as hereinafter explained without dependence on the starting and stopping or speed control characteristics of the tape transport mechanism.

Magnetic tape cassette 110 is supported by a plurality of suitable guide members 150 with drive spindles 144 and 146 engaging the tape drive openings 152 and 154 in the cassette body. As noted above, an important feature of the present invention is that use of an input-output buffer and the line memory avoids dependence on the start and stop and speed control characteristics of the tape transport mechanism 128. This allows utilization of a cassette memory system and a relatively simple and inexpensive tape transport without sacrificing system reliability or accuracy. Also, as explained in detail below, the buffer-line memory arrangement simplifies and enhances certain of the data processing functions provided in accordance with this invention, as well as high-speed data reception and transmission, error correction and automatic search for a particularly identified message recorded in the tape memory.

FUNCTIONAL ORGANIZATION OF SYSTEM (FIG. 2)

Figure 2:
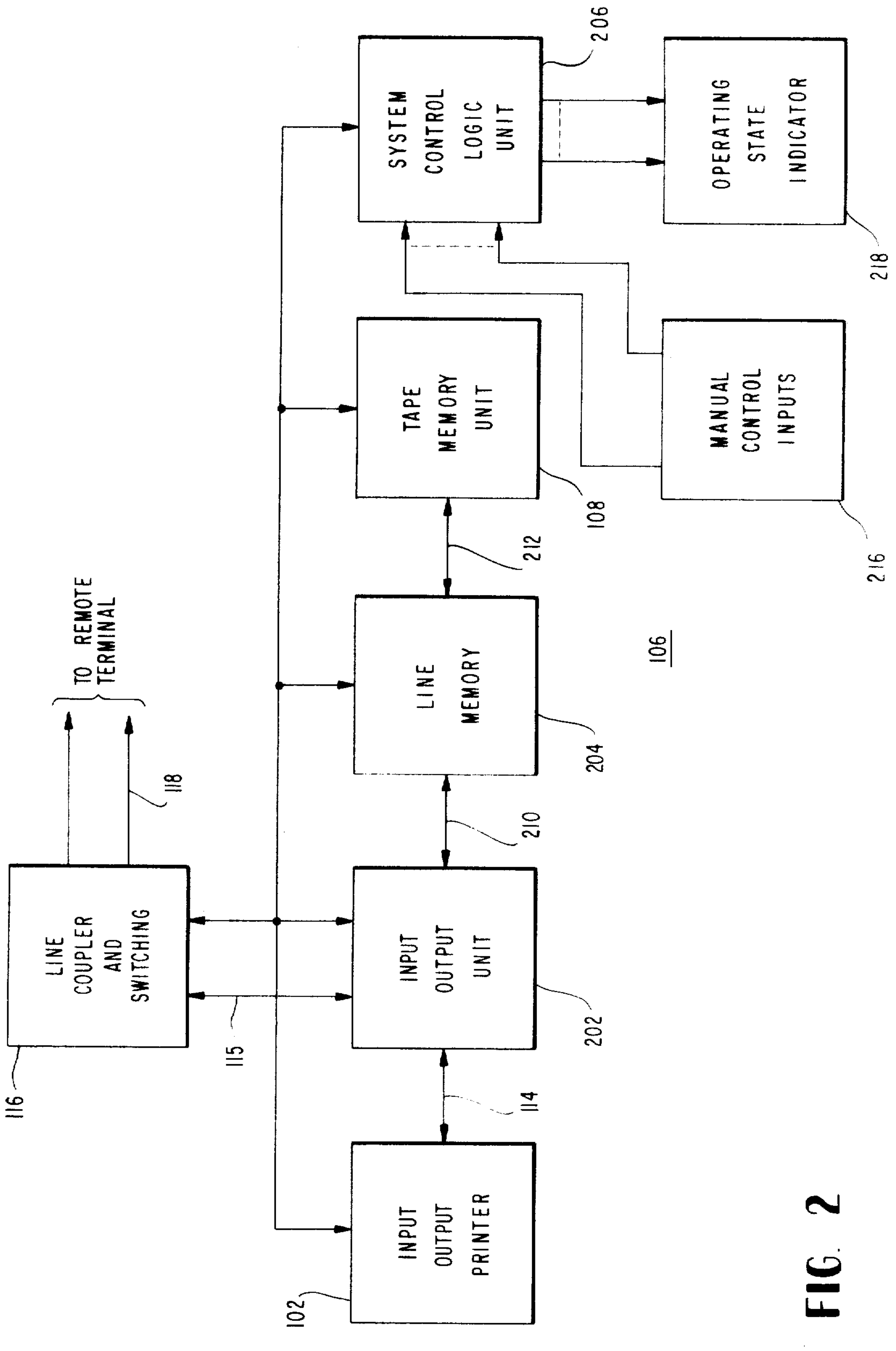
FIG. 2 is a generalized functional block diagram showing the organization of the system of FIG. 1.

Turning now to FIG. 2, there is shown functionally the organization of input-output printer 102, data storage and processing unit 106, tape memory unit 108, and line coupler and switching unit 116.

As illustrated, data storage and processing unit 106 includes an input-output unit 202 including an input-output buffer and required control logic, connected to printer 102 by cable 114, and to line coupler and switching unit 116 by cable 115. Data storage and processing unit 106 includes an intermediate line memory 204 connected by a two-way signal path 210 to input-output unit 202, and by a two-way signal path 212 to tape memory unit 108. As explained hereinafter, the capacity of line memory 204 is determined by the format of the printers with which the system may be employed.

Operational control for the entire system is provided by control logic unit 206 coupled to the system components mentioned above by a two-way signalling path 214. Manual initiation of required operations is achieved by a set of manual control inputs 216 coupled to control system logic unit 206. As hereinafter explained, manual control inputs 216 represent the print format control keys on printer keyboard 126, and the function control keys contained in auxiliary control keyboard 140.

A set of visual indicators generally denoted 218 provides operating state information under control of system control logic unit 206.

SUMMARY OF OPERATING MODES

Briefly stated, the system illustrated in FIG. 2 is capable of functioning in six distinct modes as follows:

Mode 1: Information transfer from input-output printer 102 to tape memory 108 (LOCAL-RECORD);

Mode 2: Information transfer from tape memory 108 to input-output printer 102 (LOCAL-PLAY);

Mode 3: Information transfer from a remote terminal through line coupler and switching unit 116 to tape memory 108 (REMOTE-RECORD);

Mode 4: Information transfer from tape memory unit 108 to a remote terminal coupler 116 (REMOTE-PLAY);

Mode 5: Search for a message having a unique address code (SEARCH); and

Mode 6: Error correction.

It should be noted, however, that Modes 5 and 6 are actually variants of the PLAY and RECORD Modes, respectively.

It should also be noted that according to this invention, the need for transfer of information directly from printer 102 to a remote terminal, or vice versa, is avoided, which is advantageous for several reasons. For example, the information transmission capacity of channel 118 may be very high in comparison with the operating speed of printer 102 whereby direct operation could be quite inefficient. Ultra high-speed printers are available, but such devices are highly complex and costly, and would not improve channel utilization efficiency where the originating source is a low-speed device. Moreover, although the printer itself is a relatively low-speed device, its steady operation speed usually will exceed that of the typist or other operator.

Utilization of memory unit 108 in all modes of operation is therefore preferred in terms of better utilization of all system components, and also provides the added advantage of simplified design and construction for the memory unit itself.

AUXILIARY KEYBOARD (FIG. 3)

Figure 3:
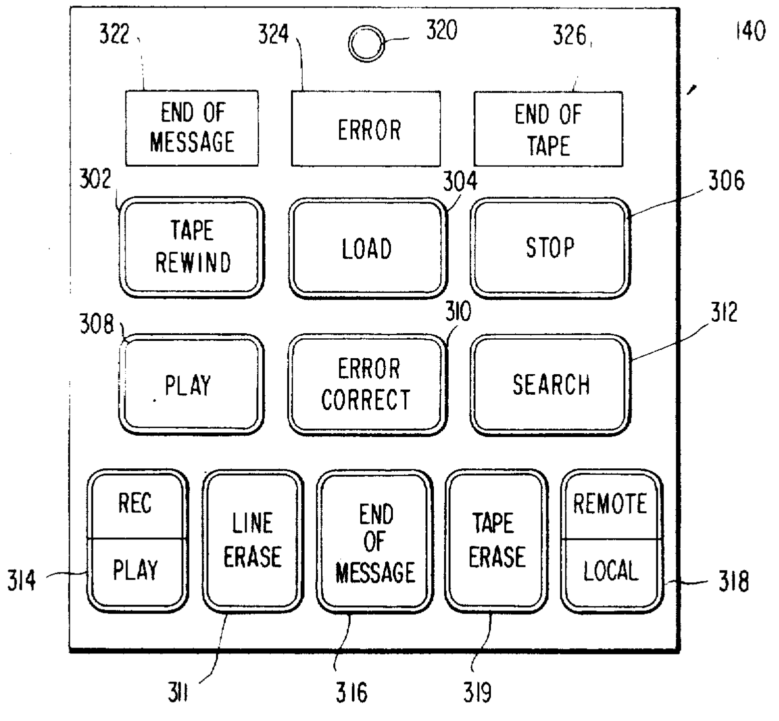
FIG. 3 is an enlarged view of the control keyboard shown in FIG. 1.

The manual controls required for selection of the desired system operating modes are contained on auxiliary keyboard 140. As illustrated in FIG. 3, auxiliary control keyboard 140 includes eleven function control keys as follows:

302 Tape Rewind
304 Tape Load ("Load")
306 Stop
308 Playback Start ("Play")
310 Error Correction
311 Line Erase
312 Address Search ("Search")
314 Record-Playback Select
316 End of Message
318 Local-Remote Select
319 Tape Erase Also, auxiliary keyboard 140 includes the following illuminated indicators:

320 Power On
322 End of Message
324 Error
326 End of Tape

Control keys 302 – 318 may also be illuminated if desired, but preferably at least Load key 304 is illuminated to indicate to the operator that the load cycle has been completed, as hereinafter explained.

The above-mentioned control keys and indicators serve the following purposes:

Record-Playback Select Key 314: This is a two-position switch for conditioning those portions of the system required for Modes 1, 3 and 6 (RECORD) or for Modes 2, 4, and 5 (PLAY). A single two-position switch is preferred to prevent inadvertent simultaneous actuation of both record and playback modes of operation.

Local-Remote Select Key 318: This key conditions those portions of the system required for Modes 1 and 2 (LOCAL) or Modes 3 and 4 (REMOTE). Thus, with key 318 in the LOCAL position, the system will operate in Mode 1 if key 314 is in the RECORD position and Mode 2 if key 314 is in the PLAY position. Correspondingly, with key 318 in the REMOTE position, the system will operate in Mode 3 with key 314 in the RECORD position, and in Mode 4 with key 314 in the PLAY position.

Playback Start Key 308: When key 314 is in the PLAY position, depression of Playback Start Key 308 activates the pre-conditioned circuits required in Modes 1 and 3, and initiates transfer of information from the magnetic tape memory 108 to line memory 204. Playback Start Key 308 is inoperative when key 314 is in the RECORD position.

Stop Key 306: This key permits the operator to halt operation in PLAY Modes 2 and 4, if necessary, and to stop the tape rewind operation if key 302 has been depressed previously. Restart of the halted operations is accomplished by again depressing Playback Start Key 308 or Tape Rewind Key 302. Key 306 does not affect system operation in RECORD Modes 1 and 3, nor is provision made for manually halting operation in these Modes (except by means of the main power key 129).

Tape Rewind Key 302: As suggested above, Tape Rewind Key 302 actuates the tape drive mechanism to rewind the tape memory to the beginning of the tape. At the same time, the record and playback circuits are deactivated to prevent transfer of information to or from the tape memory, or erasure of stored information. A suitable Beginning of Tape Sensor halts the rewind operation after the tape has been fully rewound, and returns the record and playback circuitry to its rest condition in readiness for further operator instructions.

Tape Erase Key 319: This provides an automatic operating cycle for completely erasing a tape. The cycle includes running the tape forward until the end of the tape is reached, then reversing the tape and rewinding to the beginning. During the entire operation, the record circuits are actuated to record a particular "rest" magnetic state on the entire tape, thereby clearing all previously recorded information.

Tape Load Key 304: This provides semi-automatic actuation of the tape mechanism for the purpose of locating the beginning of the first message recorded on a tape, or elsewhere on the tape if for some reason a substantial blank space has been left between two adjacent messages. This function is necessary since in the PLAY Modes, timing of certain operations depends upon the time interval between blocks of information recorded on the tape. Load Key 304 effectively bypasses the timing circuits and allows the tape to run continuously until recorded information is encountered, at which time the light in key 304 goes on, and the operator may begin a play back cycle by depressing Playback Start Key 308. Without Load Key 304, many successive depressions of Start key 308 might be necessary before information appeared and operation actually commences.

Address Search Key 312: With Select Keys 314 and 318 in the RECORD and LOCAL positions respectively (Mode 1), depression of Search Key 312 together with one or more alpha numeric keys 125 generates a search code word which is used to identify a particular message previously stored on the tape and which commences with the alpha numeric sequence in question. Preferably, there is provided the capacity for generating a three-character search address. To accomplish a search, select key 314 is set in the PLAY position. Search key 312 is depressed, and held depressed while the address of the message to be located is typed out. The Search Key is then released, and the tape plays forward one line at a time until the desired sequence has been located. At that time, the machine pauses to await manual operator instructions. Should the entire tape memory be played without location of the address being searched, the system operation will cease and the end of tape indicator will be illuminated.

Error Correct Key 310: Error Correct Key 310 operates in conjunction with main keyboard 126. When key 310 and one of keys 125 are simultaneously depressed, the contents of an input shift register is deleted one chacracter at a time. The Error Correct Key is then released. When typing recommences, the corrected character is entered into the shift register.

Line Erase Key 311: When this key is depressed together with error correct key 310 the entire line then being typed is deleted, back to the previous CARRIER RETURN, in a single, rapid operation.

End of Message Key 316: In the RECORD-LOCAL Mode, key 316 is used to record a predetermined character code at the end of a message for subsequent use in stopping the tape after playback and printout or transmission of a complete message. In the REMOTE-RECORD or in either PLAY Mode an "end of message" code causes the system to halt operation pending receipt of further manual or automatic instructions. No provision is made for printing the "end of message" code since the same would serve no important purpose on the final printed copy.

Error Indicator 324: In the preferred embodiment each character code word includes a parity bit, and circuitry is provided in data storage and processing unit 104 for determining the parity of each character. Failure of an incoming character to exhibit the proper parity is indicated by a flashing of Error Indicator 324. The parity check is performed on all incoming and outgoing information. [In the PLAY-LOCAL Mode sensing of a parity error also causes the printout of a character such as a hyphen (-) or an asterisk (*) (or other desired character) to indicate that an incorrect character has been recorded.] Other utilization of the parity error detection such as return of an error indication to the sending terminal may also be provided, if desired.

End of Message Indicator 316: In the PLAY Modes, or in the RECORD-REMOTE Mode, recognition of the "end of message" code halts operation as previously noted. At the same time, End of Message Indicator 316 is illuminated to advise the operator of the system condition. The indicator remains illuminated until manually extinguished by depression of play key 308, load key 304 or certain other operations or until the main power switch is turned off.

End of Tape Indicator 326: The End of Tape Indicator is activated by a suitable sensing mechanism which responds to the complete transfer of all the tape to the takeup reel in the cassette (except for the retaining tab at the end of the tape leader which is permanently attached to the feed reel). Another sensor may also be provided to indicate near completion of the transfer of tape to the takeup reel thereby providing an indication that the memory capacity is nearly exhausted. Operation of the Near End of Tape Sensor may be arranged to flash the End of Tape Indicator intermittently until the end of the tape is actually reached, at which time Indicator 326 may be maintained continuously illuminated. Also, upon reaching the end of tape, the keyboard on printer 102 may be caused to lock thereby preventing attempted storage of any additional information.

PRINT FORMAT KEYS (FIGURE 1)

In addition to the function control keys and indicators described above, certain of the keys on the main keyboard are actually also control keys. These are as follows:

Shift Keys 132: The shift keys operate in conventional fashion to select the upper or lower case symbol associated with each of the character keys. In the LOCAL-RECORD Mode, striking the shift key also generates a unique shift code which is recorded on the tape for later use in controlling the printout format. The shift code is generated twice, only when the shift key is depressed and again when the shift key is released. In the LOCAL-PLAY Mode, receipt of a shift code causes the character shift control mechanism in printer 102 to latch in the upper case position. Receipt of the subsequent shift code (corresponding to release of the shift key) causes the shift mechanism to unlatch.

Shift Lock Key 134: In the LOCAL-PLAY Mode, Shift Lock Key 134 operates to mechanically latch the shift mechanism of printer 102 in the upper case condition and to activate the shift code generating mechanism in the same manner as for Shift Keys 132. Subsequent depression of one of Shift Keys 132 releases the shift lock mechanism and generates the "shift return" code as previously noted.

Carrier Return Key 136: When printer 102 is operated manually, Carrier Return Key 136 actuates the line advance mechanism and the mechanism for returning print head carrier 122 to the left-hand margin position. In addition, depression of the carrier return key generates a unique code character which initiates several data processing functions in the system. In the two RECORD Modes, the carrier return code initiates transfer of all of the information then present in line memory 204 (see FIG. 2) to the tape memory, after which the line memory is prepared for receipt of a new line of the message. In the PLAY Modes, the carrier return code indicates completion of playback of an entire line of information from line memory 204 and initiates preparation of the line memory to receive a new line of information from the tape. Afterward, the tape mechanism operates to play out another line of stored information into the line memory.

Back-Space Key 138: This key serves the conventional typewriter function of spacing print head carrier 122 to the left. Also, simultaneous depression of Back-Space Key 120 and Error Correct Key 310 causes a character-by-character erasure of previously stored information in order to correct a typographical error or to make other required deletions. In the RECORD Modes (with Error Correct Key 310 not depressed) the "back-space" code word is recorded on the tape.

In the LOCAL-PLAY Mode, the "back-space" code word causes print head carrier 122 to move one space to the left each time the code word is encountered. As will be appreciated, the latter is a formatting function used to underscore or to produce some other compound character by overprinting.

Tabulator Key 139: The Tabulator ("Tab") Key serves the normal typewriter function of advancing the print head carrier 122 a number of spaces from its then current location until a Tab stop is encountered. Depression of the Tab key also generates a code word for storage. In the LOCAL-PLAY Mode, the "Tab" code advances the print head carrier from its then current position to the next preset Tab stop. One or more Tab stops are manually set; so that ultimate position of the print head carrier depends on its position at the time the "Tab" code appears, and the sequence of set Tab stops. As will be appreciated, if it is required to advance the print head carrier through two or more Tab stops, this is accomplished by recording two (or more) "Tab" codes in sequence, whereupon the Tab operation is repeated during the subsequent playback.

Power On-Off Switch 140: This is the main power control switch for the entire system and operates in turn on the printer and tape drive mechanism and also the power supply for the electronic portions of data storage and processing unit 104. Alternatively, one or more additional power switches may be provided for selectively turning on various portions of the system. This may be preferred, for example, if it is desired to use printer 102 solely as a typewriting mechanism, in which case a separate on-off switch may be provided for the remaining portions of the system.

CODE FORMATS

Before proceeding with a detailed description of the system and the operation thereof, several representative information processing and transmission formats will be considered.

As mentioned, depression of the keys on printer 102 generates multi-bit code words uniquely identifying each character and format key for recording in the tape memory. The printer described above in connection with FIG. 1 operates on the basis of a 6 bit code, thereby providing 64 different code combinations to represent the alphanumeric characters, punctuation, format codes, etc., required for operation of the printer. By way of example, Table 1 below sets forth the binary code combinations allocated to the various characters and operations in accordance with one embodiment of the system. Bits 1 thru 6 are denoted as 1, 2, 4, 8, A, and B respectively.

| | | | | | | | |
|---|---|---|---|---|---|---|---|
| A | *a* | 1 | 2 | 4 | | | B |
| B | *b* | 1 | 2 | | 8 | A | |
| C | *c* | 1 | 2 | 4 | | A | |
| D | *d* | 1 | | 4 | | A | |
| E | *e* | | | 4 | | A | |
| F | *f* | 1 | 2 | | | A | B |
| G | *g* | 1 | | | | A | B |
| H | *h* | 1 | | | 8 | A | |
| I | *i* | | 2 | 4 | | | B |
| J | *j* | | | | | A | B |
| K | *k* | | 2 | 4 | | A | |
| L | *l* | | | | 8 | A | |
| M | *m* | 1 | | | | | B |
| N | *n* | | 2 | | | A | |
| O | *o* | | | | 8 | | B |
| P | *p* | | | 4 | | A | B |
| Q | *q* | | 2 | 4 | | A | B |
| R | *r* | 1 | | 4 | | | B |
| S | *s* | 1 | | | 8 | | B |
| T | *t* | | | | | A | |
| U | *u* | 1 | 2 | | | | A |
| V | *v* | 1 | 2 | | | | B |
| W | *w* | 1 | 2 | | 8 | | B |

| | | | | | | | |
|---|---|---|---|---|---|---|---|
| X | x | 1 | | | | A | |
| Y | y | 1 | | | 8 | A | B |
| Z | z | | 2 | | 8 | | |
| ) | 0 | 1 | | | 8 | | |
| ± | 1 | 1 | | | | | |
| a | 2 | | 2 | | | | |
| # | 3 | 1 | 2 | | | | |
| $ | 4 | | | | 8 | | |
| % | 5 | | | 4 | | | |
| ¢ | 6 | | 2 | 4 | | | |
| & | 7 | 1 | | 4 | | | |
| * | 8 | 1 | 2 | 4 | | | |
| ( | 9 | 1 | 2 | | 8 | | |
| , | . | 1 | 2 | 4 | | A | B |
| . | , | | 2 | | | | B |
| : | ; | 1 | | 4 | | A | B |
| + | = | | 2 | | | A | B |
| ? | / | | | | 8 | A | B |
| '' | ' | | | 4 | | | B |
| — | - | 1 | 2 | 8 | | A | B |
| ! | ° | | | | | | B |
| SPACE | | | | | | | |
| BACKSPACE | | | 2 | 4 | 8 | | B |
| UP SHIFT | | | 2 | 4 | 8 | | |
| LO SHIFT | | | 2 | 4 | 8 | A | B |
| TAB | | 1 | | 4 | 8 | A | B |
| RETURN | | 1 | | 4 | 8 | | B |
| INDEX | | 1 | | 4 | 8 | A | |
| TYPE ON | | | | 4 | 8 | | B |
| TYPE OFF | | | | 4 | 8 | A | |
| LOCK KB | | | | 4 | 8 | | |
| UNLOCK KB | | | | 4 | 8 | A | B |
| STOP (EOM) | | 1 | 2 | 4 | 8 | | |
| STOP TRANS | | 1 | 2 | 4 | 8 | | B |
| FEED | | 1 | | 4 | 8 | | |
| REF. 1 | | | 2 | 4 | 8 | A | |
| REF. 2 | | | 2 | | 8 | A | |
| Ref. 3 | | 1 | 2 | 4 | 8 | A | |
| AUTO SEND | | | 2 | | 8 | | B |
| | | 1 | 2 | 4 | 8 | A | B |
| | | | 2 | | 8 | A | B |

If the application of the present invention is limited solely to that of an automatic typewriting and composing machine, or to some other application not requiring interfacing and compatibility with other systems, then the 6 bit code set forth in Table I or an equivalent would be entirely sufficient as the information handling format for the system. However, as noted above, a variety of different codes have been developed and are in general use at this time. Since it is one of the important features and objects of the present invention to permit compatibility with many codes and information handling format, it has been found that the 6 bit code presented above is not sufficient.

Amplifying on the foregoing, the codes currently used for information transmission between remote locations include at least one error checking bit, e.g., a parity bit, selected such that the number of "1's" (or "0's") in each code word is odd (odd parity) or even (even parity) as desired. The parity or other error checking bit may be used in several ways. For example, as described above, recognition of a code word having a parity error may be used to initiate the printout of a character such as a dash (-) or asterisk (*) which is obviously meaningless in the literal context of the message. To accomplish this, or other similar functions, however, it is necessary that provision be made for storing and processing the error checking bit together with the information bits. Thus, in the present context, provision for storage and handling of a minimum of 7 bits per character rather than 6 bits per character is necessary in any event.

Further, to facilitate synchronizing remotely located equipment, and to provide demarcation between adjacent characters, information transmission code formats also include at least one "start" and one "stop" bit per character. Thus, a minimum of 9 bits per character must be provided for, either by way of storage capacity or by suppressing the "start" and "stop" bits before storage and by generating or regenerating these bits before transmission.

While the number of "start" and "stop" bits per character varies from one code format to another, this inconsistency presents only minimal complications. Of more seriousness, however, is the fact that some information transmission formats employ a 7 bit information code rather than a 6 bit code. Consequently, to maintain compatibility between a printer of the type described in connection with FIG. 1 and a remote system employing one of the 7 bit information codes, provision must be made not only for storing information and error checking bits and for handling the "start"and "stop" bits, but also for code conversion and for handling the enlarged code.

The foregoing may be accomplished in several ways, but in accordance with this invention it has been found most practical to provide character storage capacity in the system great enough for the largest number of bits employed in any of the code formats to be accommodated, including the information and error checking bits but not the "start" and "stop" bits. The latter are handled by suppression-generation techniques as mentioned above and as described more fully hereinafter.

Figure 4A:
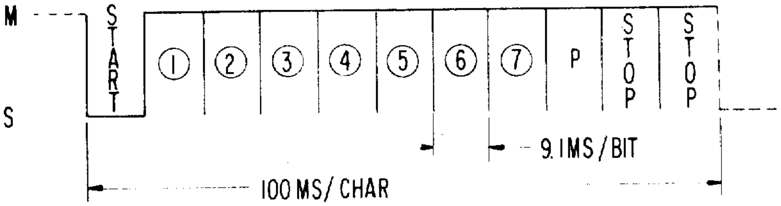
FIGS. 4A through 4C are diagrams showing code formats for three information transmission codes currently in use.
Figure 4B:
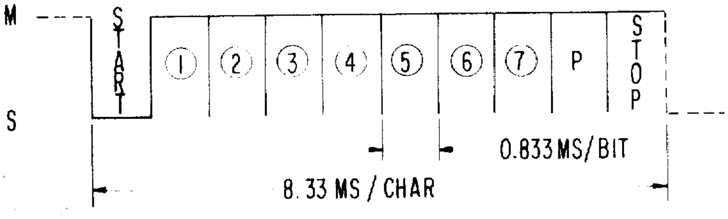
Figure 4C:
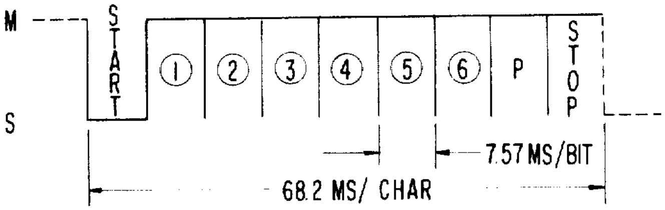

By way of specific example, FIGS. 4A through 4C show three of the more commonly employed transmission code formats. FIG. 4A shows the so-called "slow" ASCII code. This code (the American Standard Code for Information Interchange) is a binary 8 bit (level) code. Each code word comprises a "start" bit, 7 information bits, 1 parity bit, and 2 "stop" bits, each bit being 9.1 milliseconds in duration, whereby transmission of each character requires 100 milliseconds.

A code word begins with a transition from a high signal level to a low signal level (usually termed "mark" and "space," respectively). The 7 information bits and the parity bit may be any required combination of "marks" and "spaces," depending on the character to be transmitted (the standard ASCII code may be found, for example, in the book "Telecommunications and the Computer" by J. Martin, Prentice Hall 1969, pg. 111.

The parity bit is "one" or "zero," depending on the character and the desired parity. The two "stop" bits following the parity bit are customarily "marks" and, in fact, if no character is to follow immediately, the signal level remains high as indicated by the dotted line to the left of the "start" bit in FIG. 4A.

This code, commonly known as the 110 baud (bits per second) code, is used primarily in the commercial teletype network. Thus, compatibility of the terminal of the present invention with the teletype code allows direct interface of such a terminal with the teletype network, even though the printer itself may operate on an entirely different code format.

FIG. 4B shows another code format currently in use, generally known as the "high speed" (1200 baud) ASCII code. This code comprises a "start" bit, 7 information bits, 1 parity bit, and a "stop" bit. Each bit is 0.833 milliseconds in duration whereby transmission of an entire character of 10 bits requires 8.33 milliseconds. The code format for the high speed ASCII code is the same as that for the low speed ASCII code.

FIG. 4C shows another format of increasing current importance, namely, the EIA (Electronic Industries Association) code. As illustrated, the EIA code is a 9 bit code including a "start"bit (space), 6 information bits, 1 parity bit, and 1 "stop" bit. The EIA code is employed at several different transmission rates. By way of example, in one format, each bit is of 7.57 milliseconds duration, whereby transmission of an entire code word requires 68.2 milliseconds. This corresponds to a transmission rate of 132 bits per second and is a code rate frequently employed in moderate speed systems of various types. The same code format can be used for ultra high speed data transmission, for example, at 4,800 bits per second and even 9,600 bits per second.

The EIA information code format corresponds to that set forth above in Table 1.

As mentioned above, in accordance with an important feature of this invention, sufficient information storage capacity per character is provided to accommodate the maximum number of information plus error checking bits required by any of the code formats with which the system is to be compatible. Of the various code formats currently in use, the two ASCII codes require the largest number of information plus parity bits, namely, 8, and provision is therefore made in the system for storing and processing 8 information bits per character.

For the two ASCII codes, incoming information is processed to eliminate the start bit and the stop bit (or bits) before the information is stored. These bits are not required in either of the "local" operating modes and, thus, nothing is lost by this suppression. On the other hand, in Mode 4 (PLAY-REMOTE), the "start" and "stop" bits are necessary, and provision is made for generating these bits prior to transmission of each character.

For the EIA code, storage capacity for only 7 bits is required and, therefore, one additional bit, for example, the "stop" bit, may also be stored. Since the "stop" bit is always a space, provision is made for inserting a "mark" or high level as the last bit in each character code when the same is generated (in the RECORD-LOCAL Mode), and for simply ignoring the "stop" bit in the PLAY-LOCAL Mode. In the two "remote" modes, only the "start" bit need be suppressed or generated and the system otherwise operates completely unaware of the non-information containing nature of the first and last bits in each character code.

DETAILED FUNCTIONAL DESCRIPTION

(FIGURES 5 AND 6)

FIGS. 5 and 6 comprise a detailed functional block diagram of a preferred embodiment of the present invention.

Following the organizational pattern of FIG. 2, input-/output unit 282 includes input/output logic 502, three character (24 bits) shift register 504, and shift register control logic 506 and error correction logic 508. Input-/output logic 502 provides selective signal gating of signals to and from line coupler 116 or other serial device on a "bit by bit" basis and to and from printer 102 or other parallel device on a "character by character" basis, and also provides transfer of information between shift register 504 and line memory 204. In additionq input/output logic unit 502 provides code conversion, for example, from the 6 bit typewriter code to the 7 bit ASCII code, as well as parity bit generatlon and checking When the system is operating one of the "record" modes, input/output logic unit 502 receives information signals, from coupler 116 over lead 510 in serial form, and provides the same over lead 511 to the serial input of shift register 504. Parallel information, e.g. in the six-bit printer code, is received from printer 102 over leads 512a through 512f. After conversion to a seven-bit code, if necessary, and addition of a parity bit, the parallel data is provided over eight leads 514a – 514h to the parallel inputs of the shift register. The serial output of the shift register is provided to the input/output logic unit on lead 516 from which it is transferred serially to the input of line memory 204 over lead 518.

In the "playback" modes, data is coupled serially from line memory 204 to input/output logic unit 502 over lead 520 and from there to the shift register input over lead 511. The shift register output is provided in parallel over eight leads 522a through 522h. After parity check and code conversion to the six-bit printer code if necessary, the data is coupled to printer 102, over six parallel leads 524a – 524f. A serial output from shift register 504 over lead 511 is provided to coupler 116 over lead 526.

A 24 bit (three character) shift register 504 provides for parallel and serial input and output transfer of information, and also for serial transfer of information to and from the line memory 204. In addition, shift register 504 provides parallel outputs to a character identification and search control logic unit 560 which recognizes either the "carrier return" code or the "end of message" character code when the system is not in the search mode, or the three-character search address when a search operation is taking place.

Shift register 504 Is constructed in any conventional or desired fashion and operates in response to shift actuation signals from shift control logic unit 506 over lead 528 to transfer the information contained in the 24th bit position of the shift register and to shift the information contained in each of the 1st through 23rd bit positions to the next adjacent position. As will be appreciated selective gating circuitry in logic unit 501 controls the actual routing of input and output information.

As noted above, intermediate memory 204 provides temporary storage for an entire line of information before transfer to the tape memory in the "record" modes, and before transfer out of the system in the "playback" modes. Line memory 204 is an integrated circuit random access memorY. Alternatively, however, a magnetic memory matrix, or a shift register, or delay line, i.e., a nonrandomly readdressable memory may be employed. A line memory control and erase logic unit 530 actuates the line memory as hereinafter explained to provide access to the individual memory cells for entry and withdrawal of data, and for erasure when a new line of information is to be stored.

As noted above, the storage capacity of line memory 204 is determined by the number of characters comprising a line of print, which in turn, depends on the information format. The line length for the IBM "Selectric" Typewriter or the Design Elements "Design 101" printer is 130 characters while the "Teletype" line length is 80 characters. Thus, a storage capacity oF at least 130 characters or at least 1040 (8 × 130) bits is required.

Actual data transfer to and from the type memory is accomplished by means of data record circuit 538 coupled to the output of line memory 204 by lead 540, and by a data playback circuit 542 connected to the line memory input over lead 544. Correspondingly, a timing signal record circuit 546, and a timing signal playback circuit 548 provide for transfer of timing information to and from the second tape track. Playback and record circuits 538, 542, 546, and 548 provide required signal processing and gating functions, and include magnetic recording and playback heads for transferring information to and from the tape memory in a conventional manner.

Control of the information transfer operations described above is effected by the system control logic generally denoted at 206 in FIG. 2, in conjunction with the manual inputs described above in connection with FIGS. 2 and 3. In addition to error correction logic unit 508, line memory control and erase logic unit 530, and character identification and search logic unit 560 previously mentioned, the system control logic includes mode select logic unit 602, tape control logic unit 604, sequence control logic unit 606, master clock 608, and timing signal generating unit 610, the latter two units providing timing signals for operation of the remainder of the system, three-character and transfer control logic unit 612. (See FIG. 6.)

Briefly stated, mode select logic unit 602 provides selective actuating signals for the respective portions of the system the operation of which are required for the above described operating modes 1–6. Tape control logic unit 604 operates tape drive unit 142 and other portions of the system as hereinafter described to provide for transfer of information to and from the data and timing tracks on the tape. Sequence control logic unit 606, in conjunction with master clock 608 and timing signal generator 610 provides the gating signals to control transfer of information between the memory units, and into and out of the system, and serves as a program control unit to initiate required data processIng and transfer operations, as hereinafter described in detail.

Character identification and search logic unit 560 operates in conjunction with shift register 504 to identify the presence of "carrier return" and "end of message" code words, in the first character position (bits 1–8) of shift register 504 or to identify the presence of a three character message identifier address code when the system is operating in the SEARCH Mode (mode 5) previously referred to.

Three character transfer control logic uniy 612 is similar in function to sequence control logic unit 606 and provides program control for transfer of three characters (24 bits) of data between the line memory 204 and shift register 504. This operation is required at the beginning and end of playback and record cycles respectively, and during the search operation.

Error correction logic unit 508 controls deletion of information from the shift register to permit correction of typographical or other errors. For use of the present invention mainly as a data terminal a simple error correction procedure, involving capability for correctIon only of the two most recently generated characters is sufficient. For more sophisticated applications correction capability for any character or group of characters may be provided. Erasure of an entire line is also provided.

Control signals for the above described operations are coupled between the various circuit units in the manner indicated in FIGS. 5 and 6. The exact nature of the signals involved will become more meaningful after consideration of the detailed construction of the system sub-units, and description is deferred for this reason. However, by way of introduction, it should be noted that incoming signals to a unit in FIGS. 5 and 6 are designated by inwardly directed arrowheads while outputs are designated by outgoing arrowheads. The reference numerals indicated parenthetically on inputs identify the signal source while those oF an output identify the signal destination. Referring, for example, to mode select logic unit 602, the "LOCAL" signal is an output provided to input/output logic unit 502 and to sequence control logic unit 606, while the STOP SEARCH signal is an input provided from character identification and search logic unit 560.

DETAILED CIRCUIT DESCRIPTION

FIG. 7. To facilitate the following detailed description, operation will be described in terms of positive true logic (a binary "1" level is represented by an electrical signal which is positive in relation to the "0" level signal,) using various conventional logic elements as illustrated in FIGS.7(a) through (g).

Figure 7A:
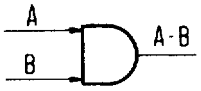
FIGS. 7A – 7G show the operating characteristics of certain circuit elements employed in the detailed description of a preferred embodiment of the invention.

FIG. 7(a) shows a conventional AND gate having two inputs A and B and providing a "1" output if and only if both inputs A and B are "1."

Figure 7B:
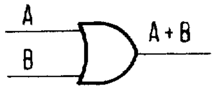

FIG. 7(b) shows a conventional OR gate having two inputs A and B and an output which is "1" if either input A or B is "1" or if both inputs are "1."

Figure 7C:
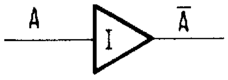

FIG. 7(c) shows an inverter having an input A and an output $\overline{A}$, the output being "1" if the input is "0" and being "0" if the input is "1."

Figure 7D:

FIG. 7(d) shows an EXCLUSIVE OR circuit having a pair of inputs A and B and output which is "1" if either input A or B is "1" and having a "0" output if inputs A and B are both "1" or both "0."

Figure 7E:
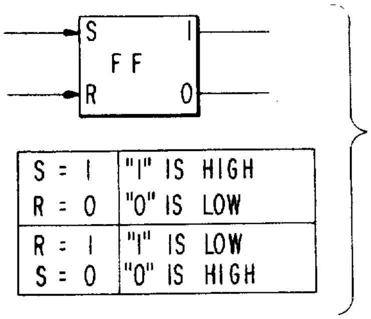
Figure 7F:
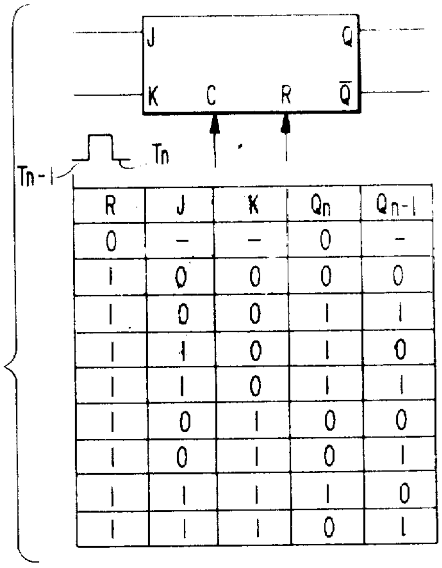

FIGS. 7(e) and 7(f) show two types of bi-stable multi-vibrators or flip-flops. FIG. 7(e) shows a set reset flip-flop having a set input designated S, a reset input designated R and a pair of complementary outputs designated "ONE" and "ZERO." In the convention to be employed, a set input of "1" produces a "1" at the "ONE" output and a "0" at the "ZERO" output. Conversely, a reset input of "1" produces a "1" at the "ZERO" output and a "0" at the "ONE" output.

FIG. 7(f) shows a J-K flip-flop having a pair of signal inputs designated J and K, clock input designated C and a reset input designated R, and two complementary outputs Q and $\overline{Q}$. Circuit operation is such that a "0" signal level at the reset input produces a "0" output at Q and a "1" output at $\overline{Q}$ irrespective of the state of the clock input or the J and K inputs,which output state remains unchanged until the reset input returns to "1" and the next "1" clock pulse arrives.

If the reset input is "1," a "1" clock input causes the outputs Q and $\overline{Q}$ to assume values depending on the values of the J and K inputs and the Q output at the time of the clock pulse, the new values appearing when the clock pulse returns to "0." The truth table indicating the relationship between the previous output state designated $Q_{n-1}$, the output state $Q_n$ after time $t_n$ (the time the clock input returns to 0) and the J and K inputs is shown in FIG. 7(f).

Figure 7G:
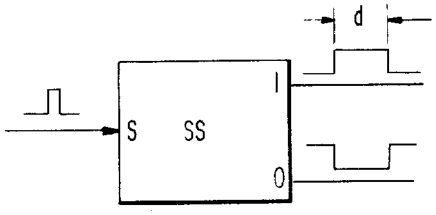

FIG. 7(g) shows a mono stable or single shot multivibrator. This unit has a set input designated S, and a pair of complementary outputs designated "One" and "Zero." Circuit operation is such that a short duration set input of "1" produces a signal level of "1" at the "one" output, and a signal level of "0" at the "zero"

output for a delay period *d*. determined by the choice of the circuit parameters. At end of the delay period, the circuit returns to its rest state with a "0" signal level at the "one" output and a signal level of "1" at the "zero" output.Even if the duration of the set input exceeds the delay time *d*, the outputs return to their respective rest conditions after the delay period *d*.

Additional logic units, such as counters, shift register units, and the random access memory will be described and/or identified as appropriate throughout the following description.

With the foregoing in mind, FIGS. 8 through 30 show the details of a preferred embodiment of the present invention. As previously noted, the system is described as a data terminal system capable of operating compatibly with the "slow" ASCII format (110 bits per second) illustrated in FIG. 4(a), and the EIA format (132 bits per second) illustrated in FIG. 4(c). However, the system can be readily adapted for compatibility with additional or other code formats as will be apparent to one skilled in the art in light of the present description. Also, while the system is described in terms of an implementation employing logic elements such as those shown in FIGS. 7(a) through 7(g), it should also be appreciated that other implementations such as NAND or NOR logic may also be employed.

Figures 8, 10:
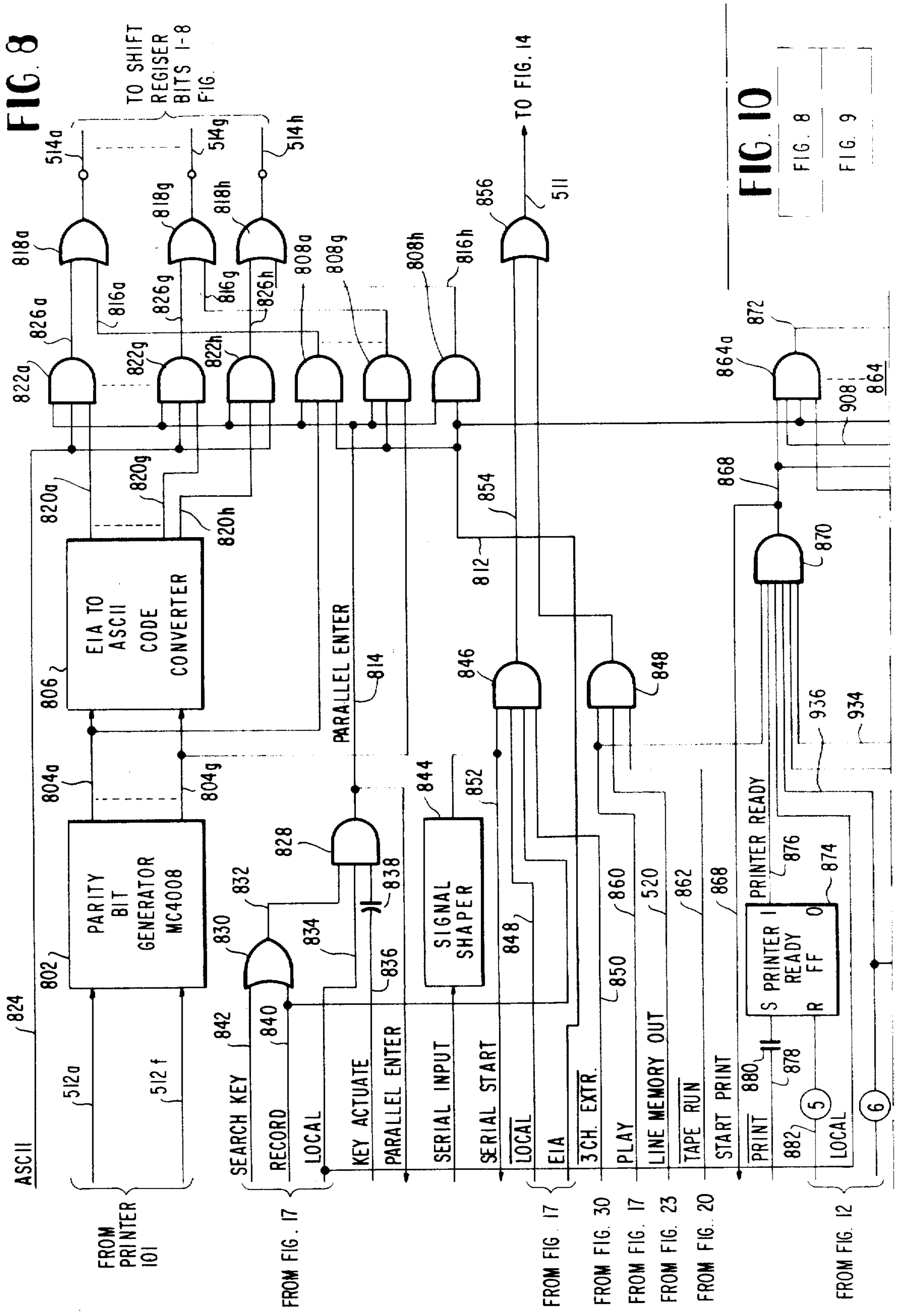
FIGS. 8 and 9, arranged as shown in FIG. 10 are a detailed circuit diagram of the system input-output logic.
Figure 9:
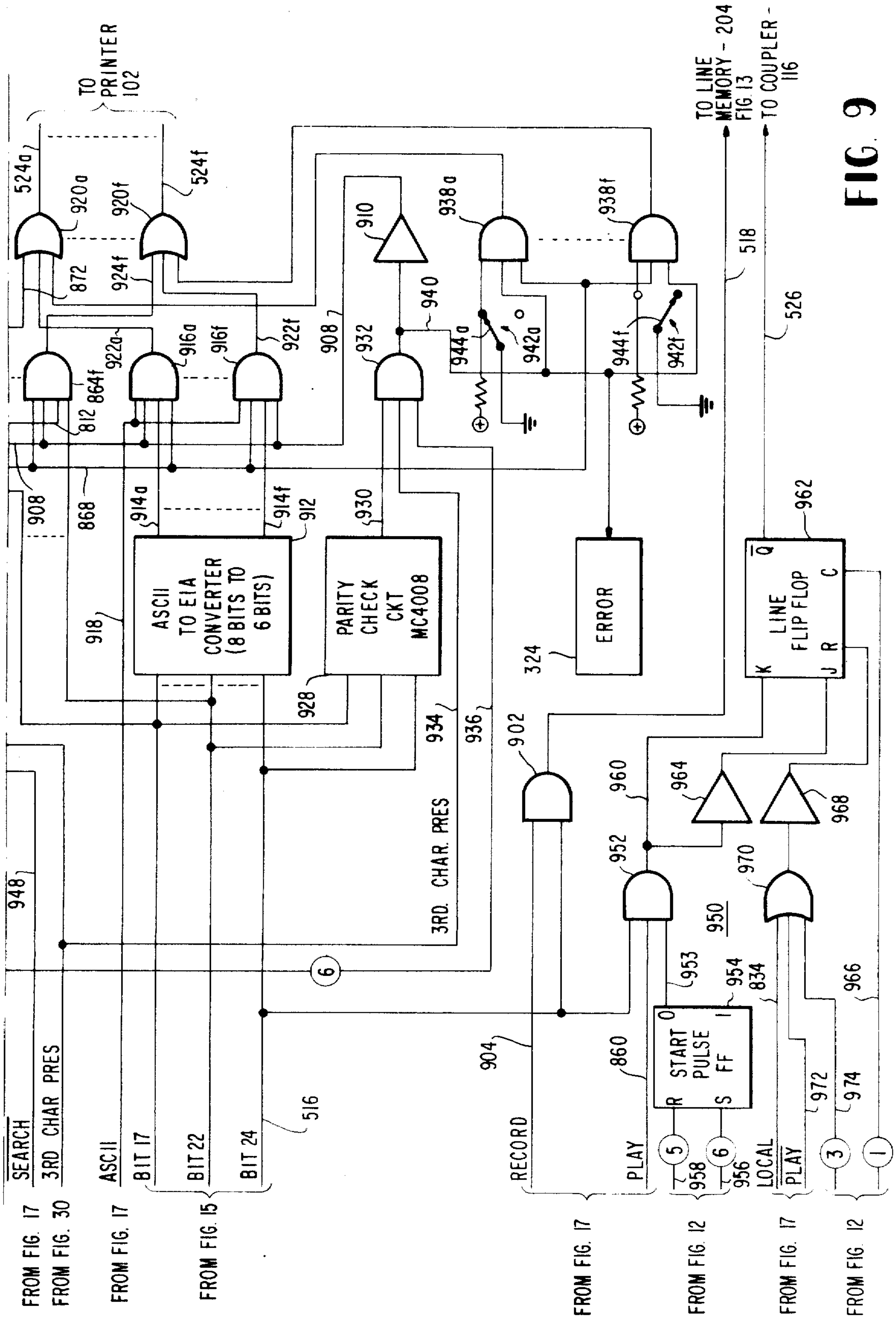

INPUT/OUTPUT LOGIC: FIGS. 8 and 9, arranged as shown in FIG. 10 illustrate the construction of input-/output logic unit 502. For purposes of illustration, the system is described as operating with a parallel input from the above mentioned Design 101 Printer and a serial input from the remote ASCII teletype or "Telex" type system. Parallel outputs are compatible with the printer EIA code while serial outputs are in ASCII.

For a parallel input from printer 102, i.e. operation in the LOCAL-RECORD Mode, six bit signals appearing on leads 512 (two of which are illustrated at **512*a* and 512*f*) are connected in parallel to respective inputs of a parity generating circuit 802**, which comprises suitable logic circuitry for generating a "1" or "0" binary output depending on whether even or odd parity is to be maintained.

The input signals on leads **512*a* through 512*f* are provided unchanged on output leads 804, with the parity bit appearing on lead 804*g*. By way of example, assuming a six bit code combination appearing on input leads 512*a* through 512*f* is 001101, the parity bit generating circuit will produce a "1" output on lead 804*g* if even parity is desired and a "0" output if odd parity is desired. Therefore, the complete parallel output code appearing on leads 804*a* through 804*g*** would be 0011010 for odd parity and 0011011 for even parity.

Parity bit generator 802 may be constructed in a variety of ways which will be apparent to one skilled in the art in light of the above stated operation requirements. For example there may be employed a commercially available integrated circuit, e.g., the Motorola eight bit parity tree, MC 4008, manufactured by Motorola Semiconductor Products, Phoenix, Arizona, or any other suitable circuit capable of responding to several parallel inputs to produce a predetermined output as a function of the number of "1's" in the input.

The seven outputs of parity bit generator 802 on leads 804(a) – 804(g) are connected in parallel to respective inputs of an EIA to ASCII code converter 806. The latter is a diode matrix, or other similar circuit capable of transforming an input characterized by one code format, e.g. the EIA code format to an output having a different code format, e.g., the ASCII code format. As will be understood, conversion units for codes other than EIA and ASCII may also be provided. These would be connected in parallel to the output of parity bit generator 802, if required.

The ASCII parallel code word produced by the outputs of code converter 806 is provided over leads 820(a) through 820(h) as respective signal inputs to a set of eight AND gates 822, two of which are shown at 822(a) and 822(h). Control inputs to AND gate 822(a) through 822(h) are provided over lead 814 by the "PARALLEL ENTER" signal as hereinafter described, and over lead 824 by the "ASCII FORMAT" output of mode select logic unit 602. Thus, for operation in the ASCII format, the "PARALLEL ENTER" signal activates AND gates 822(a) through 822(h) to provide eight parallel outputs representing the ASCII code word (including the parity bit) corresponding to the typewriter code word being entered.

For operation in the EIA format, code conversion is not necessary, and the outputs of parity bit generator 802 on leads 804 are connected as signal inputs to a set of seven AND gates two of which are illustrated at 808(a) and 808(g). An eight AND gate 808(h) is provided to accommodate the 8-bit storage format employed in the system. In the EIA format the eighth bit is the stop bit and is always a mark or "1." This is provided by the EIA format signal on lead 812, and gated by the PARALLEL ENTER signal on lead 814. The EIA FORMAT and PARALLEL ENTER signals also provide control signals for AND gates 808(a) through 808(g); no additional inputs for AND gate 808(h) are required.

The EIA format outputs of AND gates 808(a) through 808(h) are provided respectively over a set of eight leads 816, two of which are shown at 816(a) and 816(h) as inputs to a set of eight OR gates 818(a) through 818(h). The ASCII format outputs of AND gate 822(a) through 822(h) are also connected respectively over leads 826(a) through 826(h) as inputs of OR gates 818(a) through 818(h), whereby the OR gate outputs on leads 514(a) through 514(h) represent an 8 bit parallel character code word in either the ASCII or EIA format. The outputs of OR gates 818(a) through 818(h) are provided over leads 514(a) through 514(h) as the parallel inputs for bit positions 1 through 8 of shift register 504 [see FIG. 5.]

As mentioned above, data transfer through AND gates 808(a)–(h) or 822(a)–(h) is controlled by the PARALLEL START signal. The purpose of this is to assure that data is not transferred to the shift register until after completion of the printer operating cycle by which the character is generated.

The PARALLEL ENTER signal is generated by AND gate 828 which receives as inputs, the output of an OR gate 830 over lead 832, the LOCAL signal from mode select logic unit 602 over lead 834, and a KEY ACTUATE signal over lead 836 from the cycle control mechanism of printer 102, the latter being AC coupled as indicated by capacitor 838. The inputs to OR gate 830 are provided over leads 840 and 842 by the RECORD and SEARCH KEY signals from mode select logic unit 602.

The KEY ACTUATE signal is "1" when a key on printer 102 is depressed, and the RECORD, SEARCH KEY and LOCAL signals are "1" when keys 314, 312, and 318, respectively (see FIG. 3) are depressed. Due to the AC coupling of the KEY ACTUATE signal, AND gate 828 operates to produce a pulse whenever a new printer cycle begins if the system is in the RECORD-LOCAL mode or when a search address code is being entered. This actuates AND gates 808(a)–(h) or 822(a)–(h) briefly during each printer operating cycle. As will be appreciated, AND gates 808(a)–(h) are activated only for operation in the EIA format while AND gates 822(a) through (h) operate only for the ASCII format.

For serial inputs over lead 510 from coupler 116 in the REMOTE-RECORD mode, code conversion is not required since incoming information is stored in the format employed by the remote information source, and is converted to the EIA code as hereinafter described, if necessary, for playback. Further, remotely transmitted information ordinarily contains a parity bit, and therefore parity bit generation is unnecessary.

The serial data input on lead 510 is connected through a signal shaping circuit 844 including a threshold detector and a single shot multi-vibrator, or other comparable devices. The purpose of circuit 844 is to compensate for high frequency attenuation suffered by the data pulses due to transmission over communication channel 118 by regenerating each data pulse as a sharply defined straight-sided pulse for the signal processing The output of signal shaper 844 is connected as a signal input to an AND gat 846. The latter receives as control inputs, the RECORD and LOCAL signals over leads 840 and 848 respectively,from mode select logic unit 602, and the THREE CHARACTER TRANSFER signal over lead 850 from three character transfer logic unit 612 hereinafter to be described. The "RECORD" and "LOCAL" signals are at the "1" level when keys 314 and 318 (See FIG. 3) are in the "record" and "remote" positions thereby indicated that incoming data is to be accepted, while the THREE CHARACTER TRANSFER signal is "1" only while the 24 bit (three character) high speed transfer of data to or from the shift register is not in progress.This prevents data transfer from the line to the shift register during the three character transfer operation.

The output of signal shaper 844 also provides the SERIAL START signal on lead 852. As explained below, this actuates sequence control logic unit 606 in the REMOTE-RECORD mode to transfer the incoming serial information through shift register 504 and into line memory 204 for storage.

The output of AND gate 846 is provided over lead 854 as one input to an OR gate 856, the output of which is connected over lead 511 as the serial input to shift register 504. [See FIG. 5]. The second input to OR gate 856 is provided by an AND gate 858. The latter receives as an information input the output of line memory 204 over lead 520, and as control inputs, the PLAY signal over lead 860 from mode select logic unit 602, and the TAPE RUN signal over lead 862 from tape control logic unit 604. The PLAY signal is "1" when key 308 (see FIG. 3) has been depressed while the TAPE RUN signal is "1" only when the tape is not running. Thus, information is transferred through AND gate 858 from line memory 204 to the shift register during playback and when the tape is not running.

Input/output logic unit 502 also provides for selective gating of information from the shift register output to line memory 204 when the system is operating in the RECORD mode.

This is accomplished by an AND gate 902 which receives as a conditioning input,the RECORD signal from mode select unit 602 over lead 904, and as the signal input, the serial output of shift register 504 at the 24th bit position over lead 516. The AND gate output is provided over lead 518 (see FIG. 5A) as a signal input to line memory 204.

Information is transferred out of the system from shift register 504, either in parallel to printer 102 or in series to coupler 116. For parallel output, the shift register outputs at the 17th through the 22nd bit positions are coupled over leads 522(a)–522(f) as the signal inputs to a set of six AND gates 864, two of which are shown at 866, and 906. The seventh and eighth bits are ignored since these contain no information useful for the printer. However, as explained below, the seventh or parity bit is employed in a parity check operation. Three control inputs are provided for AND gates 864. The first is provided over lead 868 by the START PRINT signal generated by an AND gate 870 hereinafter described. A second input is provided by the EIA format signal from mode select logic unit 602 over lead 812 while the third input is provided over lead 908 by the output of an inverter 910. The latter is connected to a parity check circuit as hereinafter described, and is at the "1" level unless a parity error is detected.

The outputs of AND gates 864 constitute the inputs to printer 102 if the information stored in the tape is in the EIA format. If the stored information is in the ASCII format, output code conversion is required. For this, the shift register outputs on leads 522(a) through 522(h) are connected to respective inputs of an ASCII to EIA code converter 912 which transforms the 8-bit ASCII code to the EIA code including the 6 EIA information bits. As in the case of code converter 806 described above, code converter 812 may be constructed in any conventional or desired fashion; for example, a diode matrix or the like may be employed.

The 6 bit output of code converter 912 is provided in parallel over a set of leads 914, two of which are shown at 914(a) and 914(f) as signal inputs to a set of AND gates 916(a) through 916(g), the control inputs for which are the same as those provided for EIA gates 864 except that the "ASCII" format signal from mode select logic unit 602 is provided over lead 918 rather than the EIA format signal in lead 812. The outputs of AND gates 916(a) – (f) are connected respectively to the inputs of a set of OR gates 920(a) through 920(f), hereinafter described, over leads 922(a) through 922(f).

If the system is operating in an EIA format, code conversion by ASCII to EIA code converter 912 is not required, as mentioned above. Therefore, the outputs of AND gates 866, 906, etc. are connected over leads 872, 922, etc. as second inputs to OR gates 920(a) through 920(f). Thus, if there is no parity error AND gates 864 will be activated for the EIA format while AND gates 916 will be activated for the ASCII format.

The parallel outputs of the shift register for the 17th – 24th bit positions are also connected in parallel to respective inputs of a parity checking circuit 926, which produces a "1" output on lead 928 if the number of input bits having the value "1" is not correct. For example, if even parity is to be maintained, and the number of "1" bits in the input is odd, then the output on lead 930 will be "1." If the number of "1" inputs is even when the output on lead 930 will be "0."

Parity check circuit 928 may be constructed in any conventional or desired fashion to accomplish the above stated function, but as in the case of parity generating circuit 802, it is preferably the Motorola 8-bit parity tree MC4008 or its equivalent.

The output of parity check circuit 928 is connected over lead 930 as an input to an AND gate 932 which receives as control inputs over lead 934, the 3RD CHARACTER PRESENT signal from three character transfer logic unit 612, and the No. 6 output of sequence control logic unit 606 over lead 936.

As explained more fully below, this signal indicates the completion of single character (8 bit) transfer sequence, so actuating and gate 932 by this siganl assures that indication of a parity error will not be given except at a time when a correct character is present in the shift register and is ready for processing.

The output of AND gate 932 provides the input to inverter 910, previously mentioned, and also an actuating signal for error indicator 324 (see FIG. 3.)

Because of inverter 910, AND gates 864 and 916(a) through 916(f) are actuated only when a parity error is not detected, i.e. when the output of parity check circuit 928 is "0." This construction results in the printer simply skipping a character and printing a "space" when a parity error is detected since that is the "all zero" code word (see p.46.) As an alternative, however, the system may be arranged so that whenever a parity error is detected, the playback operation is halted as the resetting the playback control portion of mode select logic unit 602. As a further alternative, the erroneous character may be suppressed as described above, and there may instead be provided to the printer, a special error indicating character such as an asterisk (*) to indicate immediately that an erroneous character has been suppressed without halting playback. The suppressed character may be replaced simply by a space, which permits latter typing-in of the correct character if it can be determined from the context of the message but this does not provide as graphic an indication that an error is present.

The circuitry for accomplishing the above described character substitution comprises a group of six AND gates 938, two of which are shown at 938(a) and 938(f). The outputs of AND gate 938 are connected, together with the respective outputs of AND gates 864 and 916, previously described, as input to OR gates 920.

The outputs of the latter are provided to the actuating circuitry for printer 102 over leads 524(a) – 524(f), respectively.

The control inputs for AND gate 938 are provided over lead 868 by the START PRINT signal previously mentioned, and by the PARITY ERROR signal on lead 940. The signal inputs for AND gates 938 are provided by a set of six two-position switches 942 [two of which are shown at 942(a) – 942(f)] having respective moving contacts 944(a) – 944(f) grounded, and one fixed contact connected to the positive power supply through resistors 946(a) – (f). The latter are also connected to AND gates 938. Setting the switches in the desired position (the illustrated position corresponds to a "0" input for the respective AND gates) establishes a combination of "1's" and "9's" to represent the code of the character to be substituted for an erroneous character. Alternatively, the required code may be wired in, and switches 942 dispensed with.

Employing the foregoing circuitry, when a parity error is detected, AND gates 938 are activated, and AND gates 864 and 916 are deactivated whereby the outputs of OR gates 920(a) through 920(f) represent the "error" code rather than the erroneous character code being processed.

As previously noted, one of the control inputs for AND gates 864, 916 and 938 is the START PRINT signal. This signal is generated by AND gate 870 which receives as its inputs the PLAY, LOCAL and $\overline{\text{SEARCH}}$ signals from mode select logic unit 602 over leads 860, 834, and 948, respectively, the No. 6 output of sequence control logic unit 606 over lead 936, and the THIRD CHARACTER PRESENT SIGNAL from three character transfer logic unit 612 over lead 934. The $\overline{\text{SEARCH}}$ signal is "1" except during the SEARCH mode, and the No. 6 output of sequence control logic unit 606 is a level signal having the value "1" upon the completion of an 8-bit shift register advance sequence, and reset of the sequencing circuitry, as hereinafter described in connection with FIG. 9.

A sixth input to AND gate 870 is the PRINTER READY signal generated by the "one" output of a set-reset printer ready flip-flop 874, and provided over lead 876. Flip-flop 874 is set by the print signal from printer 102, a signal which is "1" when a printer operating cycle is not in progress. The $\overline{\text{PRINT}}$ signal is provided over lead 878 through capacitor 880, whereby flip-flop 874 is set at the end of each printer operating cycle.

The reset input for flip-flop 874 is provided over lead 882 by the No. 5 output of sequence control logic unit 606. As explained below, this signal is a pulse which appears a sufficient time after the transfer of data to the printer to assure that accurate transfer has taken place, i.e. that the printer has accurately received the character code word in question.

Employment of the $\overline{\text{SEARCH}}$ signal as an input to AND gate 870 has the effect of inhibiting generation of the START PRINT signal during a search operation. The purpose of this is to prevent operation of the printer while a search is taking place.

The simultaneous presence of "1's" at all the inputs of AND gate 870 (including the PRINTER READY, PLAY, LOCAL, and THIRD CHARACTER PRESENT signals previously described) results in generation of the START PRINT signal on lead 868.

The remaining function of input-output logic unit 502 is to control serial transfer of information from shift register 504 to coupler 116 when the system is operating in the REMOTE-PLAY mode. However, the operation of this portion of the system is largely dependent upon sequence control logic unit 606 and shift register 504. In the interest of clarity, therefore, description of the remainder of FIG. 9 is deferred until the exact nature of the sequence control logic unit and shift register 504 has been described.

PROGRAM CONTROL LOGIC (TIMING AND SEQUENCE CONTROL), FIGS. 11 AND 12

Figures 11, 13:
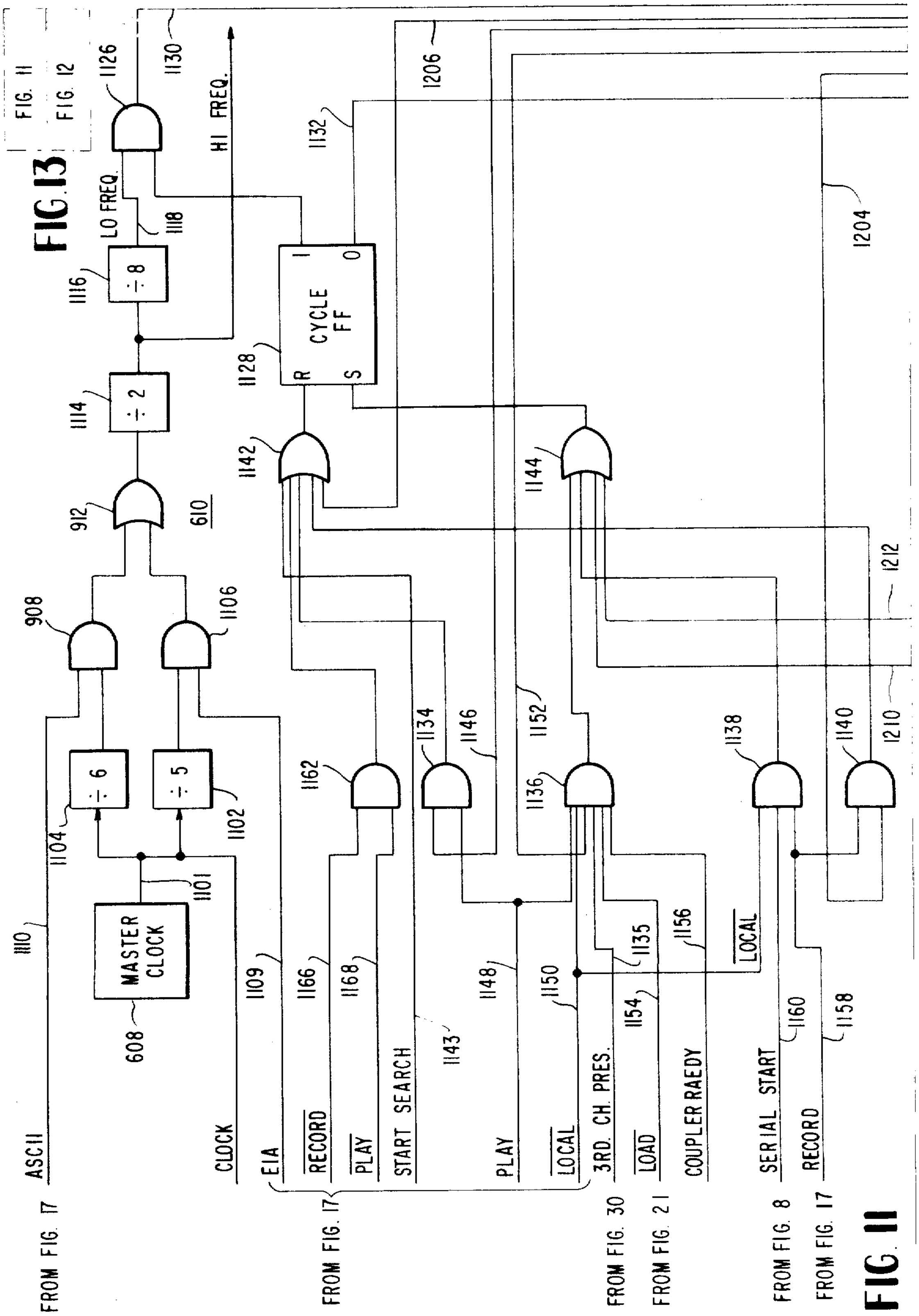
FIGS. 11 and 12, arranged as indicated by FIG. 13 show the details of the system program control logic.
Figure 12:
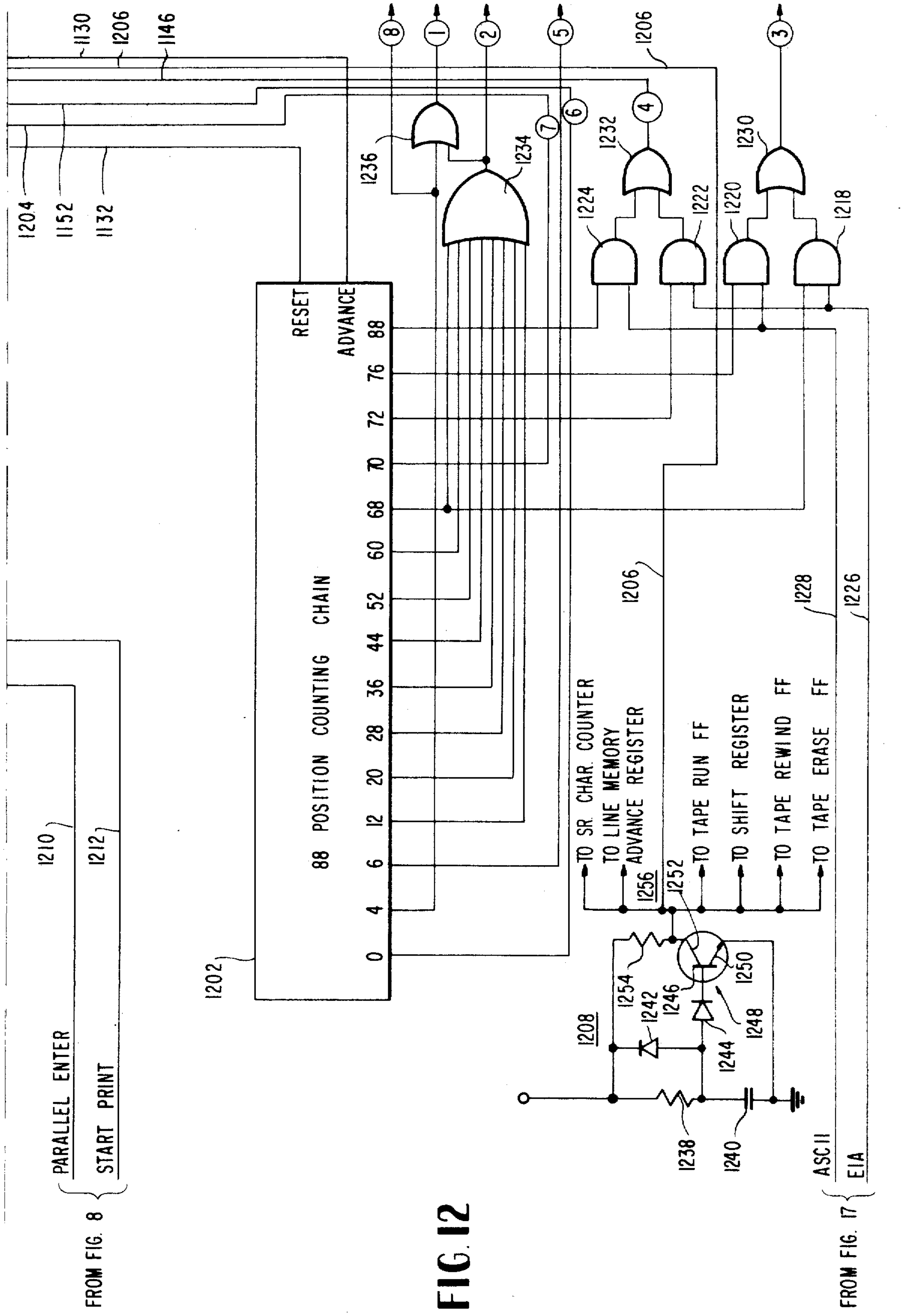

FIG. 9 shows master clock 608, the details of the circuitry comprising timing signal generator 610. FIG. 11 also shows a portion of sequence control logic unit 606, the remainder of which is shown in FIG. 12.

Master clock 608 is a high stability crystal controlled oscillator constructed in any conventional or desired fashion. Clock 608 serves as the primary timing reference for all code formats an operations, and for this reason is preferably designed to operate at a frequency which is an integral multiple of all of the other frequencies required in the system.

For compatibility with the EIA and low speed ASCII codes, operating frequencies of 132 Hz (bits per second) and 110 Hz, respectively, are required. The lowest common multiple (660 Hz) could be employed as the clock frequency, but to provide for high speed internal data processing, to facilitate synchronizing the system with serial input and output equipment, and also to simplify clock design, a substantially higher master frequency is preferred.

For example, if a clock frequency of 84480 Hz (660 × 128) is employed, operations such as line memory erasure, three character internal data transfer, error correction and address searching may be accomplished at speeds substantially in excess of the operating speeds of the input-output equipment. Use of a high clock frequency also facilitates input-output synchronization by permitting the allocation of several clock pulses (for example, four or preferably even eight clock pulses) per code word bit. This assures that data appearing just after a clock pulse is not sampled so near the end of the bit period that the signal level is substantially below its maximum value.

The output of master clock 608 at 84480 Hz is provided over lead 1101 as the input to timing signal generator 610. This produces the required lower frequency signals required elsewhere in the system. Timing signal generator 610 comprises a divide by 5 circuit 1102 and a divide by 6 circuit 1104, the inputs to which are provided in common by lead 1101. The outputs of dividers 1102 and 1104 are connected as signal inputs of respective AND gates 1106 and 1108,the control input to which are provided by the "EIA" and "ASCII" format signals from mode select logic unit 602 over leads 1109 and 1110.The outputs of AND gates 1106 and 1108 are connected as inputs to an OR gate 1112 the output of which is connected to the input of a binary divider 1114. This, in turn, is connected to the input of a divide by 8 circuit 1116. Binary divider 1114 produces a signal hereinafter designated as the "HI FREQ" output of timing signal generator 610, while divider1116 produces a signal hereinafter designated as the "LO FREQ" output.

As illustrated, the output of divide by 5 circuit 1102 is a pulse train at 16896 Hz while the output of divide by 6 circuit 1104 is a pulse train at 14060 Hz. By conditioning AND gate 1106 and 1108 by the respective EIA or ASCII input, binary divider 1114 may be arranged to receive either pulse train as its input. With AND gate 1106 activated, the output of divide by 2 circuit 1114 is a pulse train at 8448 Hz and the output of divide by 8 circuit 1116 is a pulse train 1056 Hz. With AND gate 1108 activated, the divider outputs are pulse trains 7040 Hz and 880 Hz respectively.

The output of divider circuit 1116 is connected as the timing signal input for sequence control logic unit 606 over lead 1118.

This signal serves as the basic frequency reference for sequence control logic unit 606 and is provided as an input to an AND gate 1126. A set-reset cycle flip-flop 1128 has its "ONE" output connected as the control signal for AND gate 1126. Sequence control logic unit 606 also includes a counting chain 1202 having an 88-count capacity and a reset or "0" count state. This circuit actually provides the program control signals for the rest of the system. Counting chain 1202 is described in detail below, but for the present, it should be noted that an "advance" input is provided over lead 1130 from AND gate 1126 for increasing the count, and a reset input is provided over lead 1132 by the ZERO output of cycle flip-flop 1128 returning the count to "0."

Outputs representing the 0, 4, 6, 12, 20, 28, 36, 44, 52, 60, 68, 70, 72, 76 and 88 counts are provided; these are collected as hereinafter described to provide eight different sequences of output pulses for each counter cycle. These are designated as the No. 1 through No. 8 outputs of the sequence control logic unit. (See also FIG. 6.)

With the foregoing in mind, the set and reset inputs of cycle flip-flop 1128 are provided by a logic circuit comprising four AND gates 1134,1136,1138, and 1140, and two OR gates 1142 and 1144. As illustrated in FIG. 11, the inputs to AND gate 1134 are provided over lead 1146 by the No. 4 output of counting chain 1202 and over lead 1148 by the "PLAY" output of mode select logic unit 602. The inputs toAND gate 1136 are provided by the "PLAY" and "LOCAL" outputs of mode select logic unit 602 over leads 1148 and 1150, by the No. 6 output of counting chain 1202 over lead 1152, by the "LOAD" output of tape control logic unit 604 over lead 1154, by the 3RD CH.PRES.signal from three character transfer logic unit 612, and by a COUPLER READY signal provided over lead 1156 from coupler unit 116. As explained below, the 3RD CH. PRES. signal is "1" when a character is present in bit position 17-24 of shift register 504. The LOAD signal is "1" when the load operation sequence hereinafter described is not in progress. The COUPLER READY signal is "1" when coupler 116 and/or associated switching equipment is in condition to receive data from the terminal system.

The inputs for AND gate 934 are provided by the "LOCAL" and "RECORD" outputs of mode select logic unit 602, over leads 1150 and 1158 and by the "SERIAL START" output of input-output logic unit 502 over lead 1160. The inputs to AND gate 1140 are provided by the "RECORD" output of mode select logic unit 602 over lead 1158 and by the No. 7 output of counting chain 1202 over lead 1204.

The inputs for OR gate 1142 are provided by the outputs of AND gates 1132 and 1140 and by an initial condition (I.C.) SET signal over lead 1206 from an initial state control circuit 1208 hereinafter described. The inputs to OR gate 1144 are provided by the outputs of AND gates 1136 and 1138, and by the PARALLEL ENTER and START PRINT signals from input-output logic unit 502 over leads 1210 and 1212, respectively.

Two additional inputs to OR gate 1142 are provided by the outputs of an AND gate 1162 and by the START SEARCH signal over lead 1164 from mode select logic unit 602. The inputs to AND gate 1162 are provided over leads 1166 and 1168 by the RECORD and PLAY signals so that OR gate 1142 is actuated when the system is neither in record nor playback operation. As explained hereinafter, the START SEARCH signal is a pulse of value "1" when the last of three search identification characters have been entered into the shift register, and OR gate 1142 is therefore activated at that time.

The outputs of OR gates 1142 and 1144 are respectively provided to the reset and set inputs of cycle flip-flop 1128. As previously mentioned, the "ONE" output of cycle flip-flop 1128 provides the control signal for AND gate 1126. This in turn provides the advance input signal for counting chain 1202. The "ZERO" output of cycle flip-flop 1128 provides the reset input for counting chain 927.

Counting chain 1202 is constructed in any conventional or desired fashion. For example, a pair of 4-bit binary counters such as Texas Instruments Model SN7493 or the equivalent combined with appropriate external logic circuitry may be employed to provide the required individual count outputs as noted above. The actual construction will be apparent to one skilled in the art in light, and in the interest of simplicity, the counting chain is shown as single block having outputs which are "1" when the counting chain is in the respective count states.

As previously explained the data advance control signal on lead 1118is a continuous pulse train. Thus wherever cycle flip-flop 1128 is set, counting chain 1202 is continuously advanced at the input frequency, and the outputs representing the various count states are activated in succession. When cycle flip-flop 1128 is reset, counting chain 1202 is returned to the "0" state, at which it remains until the cycle flip-flop is again set.

As mentioned above, certain of the outputs of counting chain 1202 are used directly, while others are combined to produce multiple pulse sequence as required for system operation. Specifically, the outputs representing the "0" count and the 4th, 6th, and 70th counts are provided as the No. 6, No. 8, No. 5 and No. 7 outputs respectively.

The No. 3 and No. 4 outputs also represent individual count state outputs but the particular count depends on whether the system is operating in anASCII or EIA format.

For the No. 3 output, selection is accomplished by a pair of AND gates 1218and 1220having as information inputs, the 68th and 76th count outputs of counting chain 1202 For the No. 4 output, selection is accomplished by a second pair of AND gates 1222 and 1224 having as information inputs, 72nd and 88th count outputs of the counting chain. Control inputs for AND gates 1218 and 1222 are provided over lead 1226 by the "EIA" output of mode select logic unit 602 which signal is "1" when the system is operating in EIA mode. Control inputs for AND gates 1220 and 1224 are provided over lead 1228 by the "ASCII" output of mode select logic unit 602 which signal is "1" when the system is operating in the ASCII mode.

The outputs of AND gates 1218 and 1220 are coupled as inputs to an OR gate 1230 whereby the No. 3 output represents the 68th count output of counting chain 1202 when the system is operating in an EIA mode, and the 76th count output when the system is operating in an ASCII format. Similarly, the outputs of AND gates 1222 and 1224 are connected as inputs to an OR gate 1232 whereby the No. 4 output represents the 72nd count output of counting chain 1202 for EIA operation, and the 80th count output for ASCII operation.

The No. 1 and No. 2 outputs of sequence control logic unit 606 constitute groups of count outputs of counting chain 1202. Specifically, the No. 2 output is developed by an OR gate 1234 having its inputs provided by the 12th, 20th, 28th, 36th, 44th, 52nd, 60th, and 68th count outputs of counting chain 1202. Similarly, the No. 1 output of the sequence control logic unit is developed by a second OR gate 1236 connected to the fourth count output of counting chain 1202 and to the output of OR gate 1234. Thus, it may be seen that the No. 1 output of the sequence control logic unit is a series of pulses corresponding the 4th, 12th, 20th, 28th, 36th, 44th, 52nd 60th, and 68th count states while the No. 2 output is identical to the No. 1 output except that it does not include a pulse corresponding to the 4th count.

Also illustrated in FIG. 12 is start conditioning circuit 1208 mentioned above. This serves to place certain critical logic elements in the required initial operating condition when the system is first turned on.

The circuit includes a resistor 1238 and a capacitor 1240 connected in series between the positive power supply and ground. A back-biased diode 1242 is connected across resistor 1238 with the common point between resistor, the capacitor, and the diode connected through a second diode 1244 to the base 1246 of a resistor 1248. The emitter 1250 of transistor 1248 is grounded while the collector 1252 is connected to the positive power supply through a load resistor 1254, and also as the output to provide the I.C. SET signal at a group of terminals 1256.

In operation, before the power supply is turned on, capacitor 1240 is discharged. When power is applied, the capacitor begins to charge through resistor 1238 and the base voltage of transistor 1248 begins to rise. However, until the base voltage reaches a sufficient level to cause the transistor to conduct, collector 1252 is at the power supply voltage. The resulting "1" level at output terminals 1256 is used directly or through inverters as necessary to reset the shift register character counter in three character transfer logic unit 612, the erase ready flip-flop and the line memory advance register in line memory control and erase logic unit 530, the tape run flip-flop, the tape erase and tape rewind flip-flops in tape control logic unit 604, all hereinafter to be described as well as cycle flip-flop 1128 and shift register 504 mentioned above, whenever power is applied to the system As capacitor 1240 charges, the voltage at base 1246 of transistor 1248 rises to the level required for conduction and the voltage at collector 1252 drops to zero, where it remains, as long as power supply remains on, and has no further effect on circuit operation.

When the power supply is again turned off, capacitor 1240 discharges through diode 1242 and the circuit returns to its initial or rest condition. Thus, each time power is applied, the voltage at output terminals 1256 is clamped at a high level for sufficient time to reset the various circuit elements in the required initial condition. In this way it is assured that each time the system is turned on, all circuit elements, the initial state of which is critical to proper operation, are properly set.

Shift Register and its Control Circuits, Error Correction Logic

Figures 14, 16:
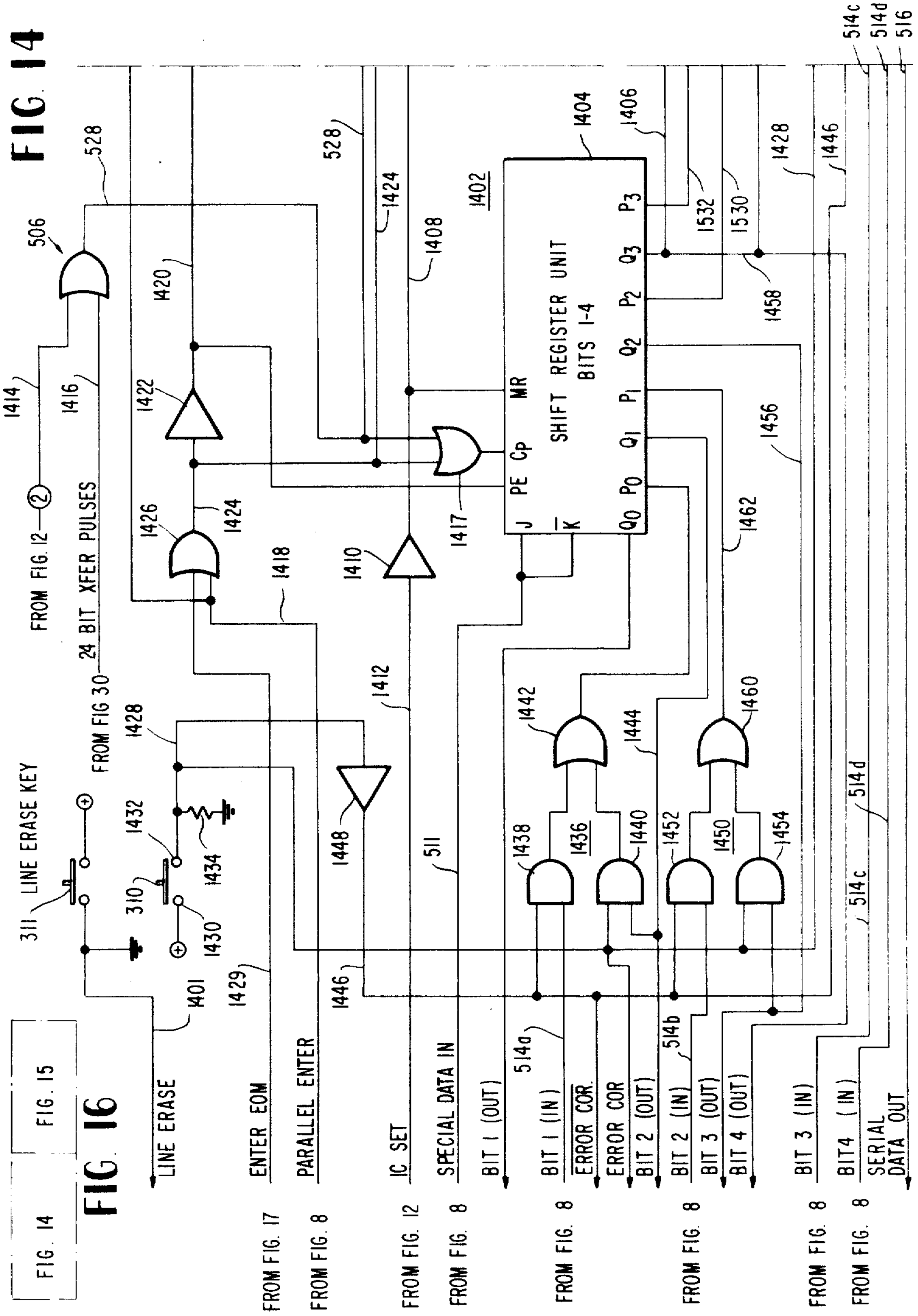
FIGS. 14 and 15, arranged as shown in FIG. 16 show the details of the input shift register, and the associated control and error correction logic.
Figure 15:
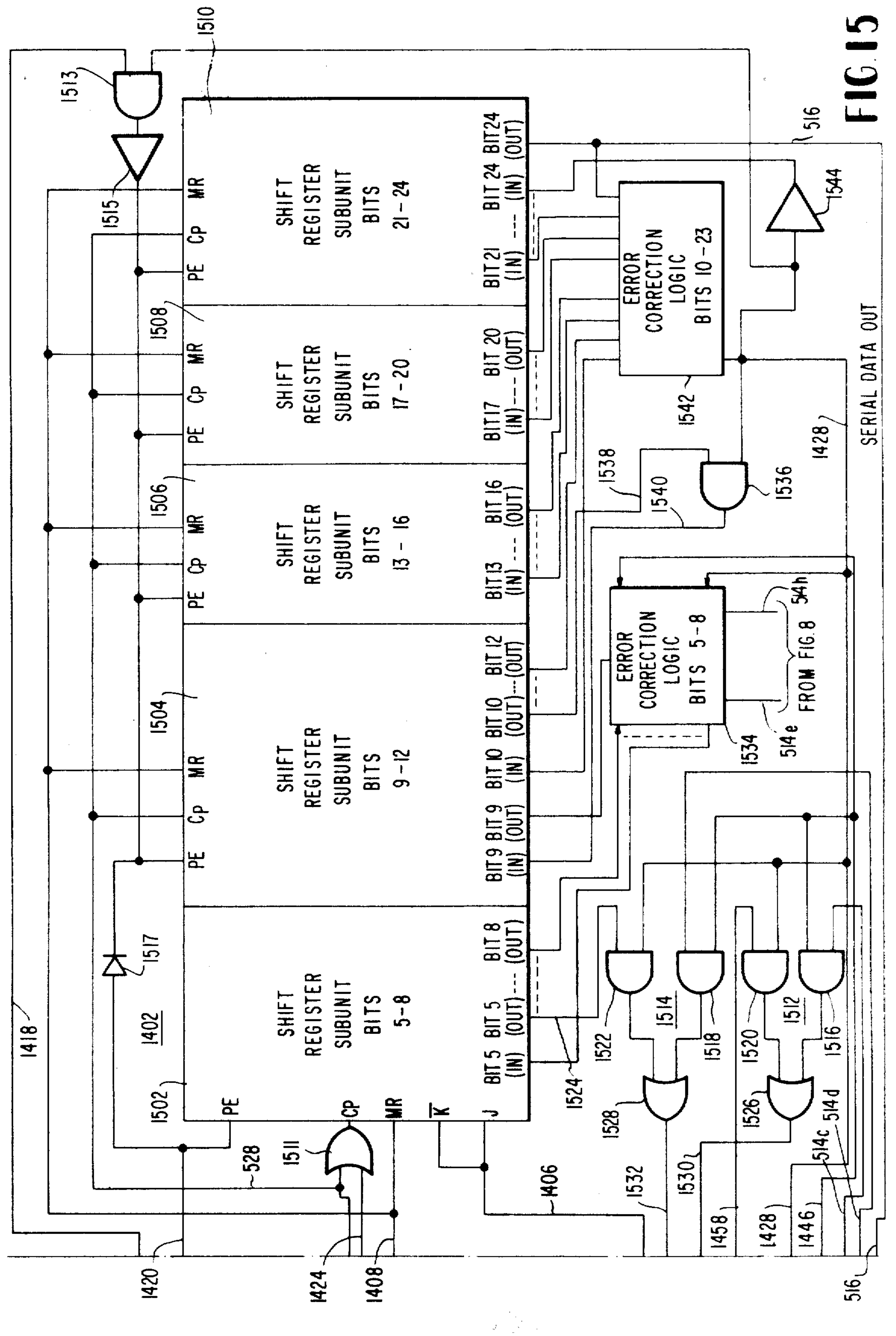

FIGS. 14 and 15, arranged as indicated in FIG. 16, show the details of the construction of shift register 504, shift register control logic unit 506 and error correction logic unit 508.

Shift register 504 is preferably constructed of commercially available integrated circuit sub-units 1402, a sufficient number of sub-units being connected in series to provide the required 24-bit capacity. In a preferred embodiment, sub-units 1402 are Model 9300 4-bit universal shift registers manufactured by Fairchild Semi-conductor Division of Fairchild Camera and Instrument Company, Mountain View, California. The 24-bit capacity is provided by connecting six such sub-units 1404, 1502, 1504, 1506, 1508 and 1510 in series. It will be appreciated, however, that any other comparable shift register circuits may be employed instead of those mentioned.

The preferred Fairchild Model 9300 4-bit register includes a pair of serial inputs denoted J and $\overline{K}$, and four parallel inputs denoted $P_0$, $P_1$, $P_2$, $P_3$. Control inputs include a parallel entry control input $\overline{P.E.}$, a shift advance input $C_P$ and a master reset input $\overline{MR}$. Four outputs are provided, one for each bit position, respectively designated $Q_0$, $Q_1$, $Q_2$, and $Q_3$.

As illustrated in FIG. 14, the J and $\overline{K}$ inputs for shift register sub-unit 1404 are connected in common to the serial data input line 511 from input-output logic unit 502. The J and $\overline{K}$ inputs for shift register sub-unit 1502 are connected in common to the fourth bit position output $Q_3$ of sub-unit 1404 over lead 1406 whereby the "downstream" output of the first stage feeds the "upstream" input of the next stage.

The J and $\overline{K}$ inputs of sub-units 1504, 1506, 1508 and 1510 [not shown] are similarly arranged with the 8th, 12th, 16th, and 20th bit position outputs of sub-units 1502, 1504, 1506 and 1508 connected respectively to the J and $\overline{K}$ inputs of sub-units 1504,1506,1508 and 1510. The 24th bit position, i.e. the $Q_3$ output of sub-unit 1510 provides the shift register serial data output on lead 516 (see FIG. 5.)

The MR inputs for all of sub-units 1402 are respectively provided in parallel. The master reset inputs are provided in common over lead 1408 by the output of an inverter 1410 which receives as its input, the I.C. SET signal from sequence control logic unit 606 over lead 1412. As previously explained, the IC SET signal is "1" briefly when power is applied to the system and thereafter returns to and remains at "0." Thus, the output of inverter 1410 remains at "0" for a short time after power is applied to the system. It then goes to "1" and remains at that level until power is again turned off.

A "0" at the master reset input forces all of outputs $Q_0$ through $Q_3$ to "0." In this way, it is assured that shift register is "empty" at the time the system is turned on.

The shift advance signals provided to the $C_P$ inputs of sub-units 1402 are provided over lead 528 from shift register control logic unit 506 (see FIG. 5.) As illustrated in FIG. 14, shift register control logic unit 506 comprises and OR gate receiving as inputs the No. 2 output of sequence control logic unit 606 over lead 1414, and the "24-BIT TRANSFER PULSES" from three-character transfer logic unit 612 over lead 1416.

As previously explained, the No. 2 output of sequence control logic unit 606 is a series of eight pulses corresponding to the 12th, 20th, 28th, 36th, 44th, 52nd, 60th and 68th count outputs of each cycle of counting chain 1202 (see FIG. 12.) These serve to transfer groups of eight pulses into the shift register from printer 102 or coupler 116, and out of the shift register into line memory 204 when recording. Correspondingly, during playback the No. 2 pulse group controls data transfer from the line memory to the shift register and out of the shift register to printer 102 or coupler 116.

The 24-BIT TRANSFER PULSES on lead 1416 serve to control high speed transfer of three eight-bit characters into the shift register from line memory 204 at the beginning of a playback cycle and of three characters (the entire contents of the shift register) out to line memory 204 at the end of a record cycle. The shift register advance signal on lead 528 is connected to a pair of OR gates 1417 and 1511, the second inputs for which are provided over lead 1424 by the output of OR gate 1426 hereinafter described. The outputs of OR gates 1417 and 1511 provide the actuating inputs $C_P$ for shift register sub-units 1404 and 1502, respectively. The signal on lead 528 is also connected to the $C_P$ inputs of shift register sub-units 1504 and 1510.

A $C_P$ input of "1" causes the signal value in each bit position to be transferred to the next bit position and to appear at the respective outputs in coincidence with the trailing edge of the advance pulse. Thus, the J – K input of sub-unit 1404 is transferred to the $Q_0$ output i.e. the 1st bit position, the $Q_0$ output is transferred to the $Q_1$ (2nd bit position) output, etc. The contents of the 4th bit position (at output $Q_3$) is transferred out over lead 1406 through the J – K input of sub-unit 1502 to the 5th bit position of the shift register and appears at the $Q_0$ output of that sub-unit.

As will be understood, the information stored in the 23rd bit position is transferred to the 24th bit position, i.e. from the $Q_2$ to the $Q_3$ output of sub-unit 1510. The information previously at the 24th bit position is lost, if not utilized.

Shift register 504 is constructed to permit simultaneous entry of new data in all bit positions by means of the parallel inputs $P_0$ through $P_3$ of each stage, as mentioned above. Data present at these inputs when the P.E. input is "0" and the $C_P$ input is "1," are prestored at the respective outputs $Q_0$ through $Q_3$ in coincidence with the return of the $C_P$ input to "0." Actuation of the parallel entry control input for sub-units 1402 and 1502 is provided over lead 1420 by the output of an inverter 1442. The input to inverter 1422 is provided over lead 1424 by the output of an OR gate 1426 which receives as inputs the PARALLEL ENTER signal from input-output logic unit 502 over lead 1418, the ERROR CORRECT signal over lead 1428, and an ENTER EOM signal from mode select logic unit 602 over lead 1429.

The ERROR CORRECT signal is generated by means of an error correction key 310 (see FIG. 3.) Error correction key 310 actuates a single-position switch having a first contact 1430 connected to the positive power supply and a second contact 1432 connected to ground through a resistor 1434. With the error correct key 310 in its rest position as shown, the signal on lead 1428 is "0," but with error correction key 310 depressed, contact 1432 is connected to the power supply and the signal on lead 1428 is "1."

It may therefore be seen that the P.E. input of shift register subunits 1404 and 1502 are actuated either in response to the PARALLEL ENTER signal indicating the presence of a character to be transferred in from printer 102, when the system error correction capability is to be utilized, or when the special EOM character is to be stored.

As indicated above parallel entry requires a "0" at the P.E. terminal and a "1" at the $C_P$ terminal. Thus, the "uncomplemented" version of the P.E. signal at the input to inverter 1422 is coupled to the $C_P$ inputs of shift register sub-units 1404 and 1502 through OR gates 1417 and 1511, previously described.

Since an input character comprises only 8 bits it will be understood that parallel entry of new data is only required for the first eight bit positions, i.e. in sub-units 1404 and 1502. The error correction function however, requires parallel entry at all bit positions. Thus the ERROR CORRECT signal on lead 1428 is used directly to actuate the P.E. inputs of shift register subunits 1504 – 1510. For this purpose lead 1428 is connected to an AND gate 1513, the other input to which is provided by the PARALLEL ENTER signal on lead 1418, AND gate 1513 thus is actuated when the error correct key and a character key are simultaneously depressed.

The output of AND gate 1513 is connected through an inverter 1515 as the P.E. input of shift register stages 1504-1510, and also through an isolating diode 1517, to the $C_P$ inputs of stages 1504–1510, together with the signal on lead 528 previously mentioned.

Briefly stated, error correction is accomplished by backward shifting i.e. transferring the 24th bit to the 23rd bit position, the 23rd bit to the 22nd bit position etc. The 24th bit position is left empty, i.e. filled with "0" and the information in the 1st bit position is discarded. An entire 8 bit transfer sequence is provided for each character to be corrected whereby an entire 8 bit character is discarded at the "upstream" end of the shift register.

The circuitry for accomplishing both error correction and parallel entry of new data at the first eight bit positions includes a first bit parallel entry circuit 1436 comprised of a pair of AND gates 1438 and 1440, the outputs of which are connected as the inputs to an OR gate 1442. The signal inputs to AND gates 1438 and 1440 are provided respectively by the parallel output of input-output logic unit 502 over leads 514(a) and by the 1st bit position output $Q_0$ of shift register subunit 1404 over lead 1444. The signal inputs of AND gates 1438 and 1440 are provided respectively over leads 1446 and 1428 by the $\overline{\text{ERROR CORRECT}}$ and ERROR CORRECT control signals, the former being generated by the output of an inverter 1448 having its input provided by the ERROR CORRECT signal on lead 1428.

Parallel entry circuits 1450,1512,and 1514, identical to circuit 1436 are also provided for bits 2 through 4 respectively of shift register subunit 1404. These include data input AND gates 1452, 1516 and 1518 having signal inputs provided over leads 514(b), 514(c) and 514(d) respectively from input-output unit 502, and control inputs provided in common over lead 1446 by the $\overline{\text{ERROR CORRECT}}$ signal. Three correction AND gates 1454, 1520, and 1522 are also provided. These receive signal inputs respectively from the $Q_2$, and $Q_3$ outputs of shift register subunit 1404 over leads 1456 and 1458 and from the $Q_0$ output of subunit 1502 over lead 1524, corresponding to the fifth shift register bit position.

Thus, whenever the error correction operation is not taking place, the $\overline{\text{ERROR CORRECT}}$ signal is "1," and AND gates 1452, 1516, and 1518 (along with AND gate 1438) are actuated.

When the ERROR CORRECT signal on lead 1428 is "1" AND gates 1454, 1520,and 1522 are actuated. As will be understood, when either the PARALLEL ENTER or "ERROR CORRECT signal is "1," the parallel entry mechanism for shift register subunit 1404 and 1502 are activated.

The signal outputs of AND gates 1452 and 1454 are connected as inputs to an OR gate 1460 which provides the input for the second bit position ($Q_1$) of subunit 1404 over lead 1462. Correspondingly, the outputs of AND gates 1516 and 1520 are provided as inputs to an OR gate 1526, and the outputs of AND gates 1518 and 1522 are provided as inputs to an OR gate 1528. These, in turn, provide the inputs for the 3rd and 4th bit positions of subunit 1404 over respective leads 1530 and 1532, respectively.

Error correction logic circuitry identical to that described above is provided for bits 5 through 8. For ease of illustration the circuitry is shown as a single unit 1534, which receives as new data inputs, the parallel signals over leads 514(e) – 514(h) from input-output unit 502, and as the error correction inputs, the outputs for the 6th, 7th and 8th bit positions in subunit 1502 and the 9th bit position in subunit 1504. Control inputs are provided over leads 1446 and 1428 respectively by the $\overline{\text{ERROR CORRECT}}$ and ERROR CORRECT signals. As will be understood, outputs of error correction logic unit 1534 are provided as inputs for bit positions 5 through 8 of shift register subunit 1502.

When the $\overline{\text{ERROR CORRECT}}$ signal is "1," the parallel inputs for bit positions 5 through 8 are provided by the signals appearing on leads 514(e) through 514(h). When the ERROR CORRECT signal is "1," the inputs for the respective 5th through 8th bit positions are provided by the outputs of the 6th through 9th bit positions respectively.

As will be recalled, the parallel input to the system is provided only at the first 8 bit positions. Accordingly, the parallel entry logic described above is not required for bit positions 9 through 24, and simplified error correction circuitry may be employed. Thus, the error correction circuit for bit 9 is comprised of an AND gate 1536 which receives the ERROR CORRECT signal as a control input over lead 1428, the 10th bit position output from shift register subunit 1504 over lead 1538 as the signal input. The output of AND gate 1536 is provided over lead 1540 as the parallel input for the 9th bit position of shift register subunit 1504.

Each of remaining bits 10 through 24 is associated with an error correction circuit identical to that for bit 9. For ease of illustration, all of these circuits are represented by a single unit 1542 having as signal inputs the shift register parallel outputs for bits 11 through 24 and providing as outputs, the shift register parallel inputs for bits 10 through 23, Since the error correction operation in effect empties the shift register in the reverse direction, the signals being inserted at bit 24, i.e. at the normal "downstream" end have no information content. Further, since the meaningless character so generated is discarded when the error correction procedure is completed, the signals being inserted at the 24th bit position may be generated in any convenient manner for example, by direct connection of the parallel input for the 24th bit positions to the ERROR CORRECT signal on lead 1428 through an inverter 1544.

From the foregoing, it will be appreciated that the parallel entry operation occurs when data is to be transferred into the system from a parallel source such as printer 102, or during error correction. In the former case, data is provided over leads 514(a) through 514(h) in response to the PARALLEL ENTER pulse (see FIG. 8.) AND gates 1438, 1452 etc. are activated since the error correct key 310 is not depressed and the $\overline{\text{ERROR CORRECT}}$ signal is "1."

The PARALLEL ENTER pulse simultaneously activates the P.E. and $C_P$ inputs, of sub-units 1404 and 1502 entering the data on leads 514(a)–514(h) in the first eight bit positions of the shift register. Since the PARALLEL ENTER pulse also starts sequence control counter 1202 (see FIG. 12) the PARALLEL ENTER pulse on lead 528 is followed by the eight shift pulses comprising the No. 2 output of sequence control logic unit 606 which transfer the data in bit positions 1 – 8 to positions 9 – 16 respectively.

For error correction, key 310 is depressed, and the P.E. inputs of all six shift register subunits are activated. Fruther, with the ERROR CORRECT key depressed, the ERROR CORRECT signal is "1," and AND gates 1440, 1518, etc. are activated. Thus, sequence of eight shift advance pulses comprising the No. 2 output of sequence control logic unit 606 transfers the contents of the shift register eight positions backward, entering th character from bit positions 9 – 16 into bit positions 1 – 8, and inserting an empty character in bit positions 17 – 24. As previously noted, the eight bit transfer sequence may be initiated by depression of one of the keys on printer 102. Thus, by striking any key, while depressing the error correct key the most recently printed character, i.e. that in bit positions 9 – 16, is erased.

SERIAL OUTPUT CIRCUIT

Referring back to FIG. 9, there will now be described the construction and operation of serial output circuit, generally denoted 950. Basically, the function of this portion of the system is to add the START and STOP bits to the shift register output prior to serial transmission to a remote receiver. Output circuit 950 comprises an AND gate 952 which receives as a signal input, the shift register serial output at the 24th bit position over lead 516. Control inputs for AND gate 952 are provided over lead 860 by the "PLAY" output of mode select logic unit 602, and by the ZERO output of a set-reset start pulse flip-flop 954. The set and reset inputs for flip-flop 954 are provided over leads 956 and 958 by the No. 6 and No. 5 outputs respectively of sequence control logic unit 606.

The output of AND gate 952 is provided over lead 960 as the K input to a J – K line flip-flop 962. The J input for flip-flop 962 is also provided by the output of AND gate 952 in complementary form through an inverter 964. The $\overline{Q}$ output of line flip-flop 962 is provided over lead 526 as the data output to coupler 116 (see FIG. 5).

The clock input for line flip-flop 962 is provided over lead 966 by the No. 1 output of sequence control logic unit 606, while the reset input is provided through an inverter 968 by the output of an OR gate 970. The latter, in turn, receives as its inputs, the LOCAL and $\overline{\text{PLAY}}$ signals from mode select logic unit 602 over leads 834 and 972, respectively, and over lead 974 from the No. 3 output of sequence control logic unit 606.

Referring to the truth table for the J – K flip-flop in FIG. 7(f), it will be seen that for the J and K inputs connected to complementary-signal sources, the Q output follows the J input and the $\overline{Q}$ output follows the K input. In other words, each successive clock pulse causes the Q and $\overline{Q}$ outputs to assume the values of the J and K inputs respectively at the time of the clock pulse.

As shown in FIG. 9, each clock pulse on lead 966 causes the output of flip-flop 962 on lead 526 to assume the value of the input on lead 960 at the time of the clock pulse. The latter is "0" if AND gate 952 is inhibited (e.g. by the absence of the PLAY signal etc.,) or it will follow the contents of the 24th bit position of the shift register if AND gate 952 is free to operate. As will be recalled from the discussion of FIGS. 11 and 12 above, information is advanced through the shift register in response to the trailing edge of each shift pulse. Since the shift register advance sequence is controlled by the No. 2 output of sequence control logic unit 606, advance pulses are provided at 12th, 20th, 28th, 36th, 44th, 52nd, 60th, and 68th counts of each cycle. New data thus appear in the 24th bit position of the shift register at the end of each of the noted count outputs.

Line flip-flop 962 also changes its output state in response to the trailing edge of its clock pulse, but the new output is determined by the input and output signal states existing at the time of the leading edge of the clock pulse. Since operation of flip-flop 962 is controlled by the output of sequence control logic unit 606, clock pulses are provided in synchronism with the shift register advance pulses plus an additional clock pulse at the 4th count of each cycle.

Ignoring the latter for a moment, it may be seen that while the shift register and the line flip-flop are activated simultaneously, the new output state of the flip-flop is determined by the state of 24th bit position of the shift register prior to the shift since the shift register state does not change until after the new output state of the flip-flop has been established. The result, of course, is that the flip-flop output is one bit behind the shift register.

As explained above in connection with FIGS. 11 and 12 a shift register advance cycle ends with the first information bit of a character code word at the 24th bit position of the shift register, the second bit of the character code word at the 23rd bit position of the shift register, etc. At count 12 of the next cycle, the first bit is shifted out and the second bit is transferred to the 24th bit position, but line flip-flop 962 is updated before the shift takes place. Thus, at count 12 of a cycle, line flip-flop 962 provides as its output the first bit of the code word in question.

As noted above, line flip-flop 962 is first sampled at the 4th count of each cycle. The purpose of this is to generate the "start" bit (always a "space" or "0") which precedes the first information bit. For this purpose, start pulse flip-flop 954 is set at the end of a shift register advance cycle by the No. 6 output of sequence control logic unit 606, corresponding to the "0" count output of counting chain 1202 (see FIG. 12.) Flip-flop 954 is reset by the No. 5 output of the sequence counter which is the 6th count output of counting chain 1202. Accordingly, the ZERO output of start pulse flip-flop 954 is "0" from the end of one shift register advance cycle until the 6th count of the next cycle. This, in turn inhibits AND gate 952, and its output is "0" irrespective of the data in the 24th bit position of the shift register.

When AND gate 952 is initiated, the K input to line flip-flop 962 on lead 960 is clamped to "0," and the flip-flop clock pulse at the 4th count of each cycle produces a "0" output on lead 526. The first output in each cycle is therefore always a space, constituting the "start" pulse of each character code word.

When flip-flop 954 is reset at the 6th count of each cycle, its "zero" output returns to "1" and AND gate 952 is reactivated. This permits line flip-flop 962 again to follow the value of the 24th bit position of the shift register. Thus, at the 12th count, the first information bit is sampled by line flip-flop 962 and the shift register is advanced to transfer the second information bit to the 24th bit position. The above described operation continues for the reset of the bits comprising each character. At the 20th count, bit 2 is sampled, and bit 3 is shifted to the 24th bit position. At the 28th count the 3rd bit is sampled and the 4th bit is shifted to the 24th bit position, etc.

At count 68, the eighth bit of the character code word is sampled and the first bit of the next character is transferred to the 24th bit position of the shift register.

For operation in the EIA format, the eighth bit is the "stop" bit, so transfer of the entire code word is completed after the 68th count pulse, and counting 1202 may therefore be reset. As explained in connection with FIGS. 11 and 12, the No. 3 output of sequence control logic unit 606 corresponds to the 68th count of the cycle, whereby line flip-flop 962 is reset concurrently with the sampling of the 8th bit of the character code word. This returns the $\overline{Q}$ output of the line flip-flop to "1" but since the 8th bit of the EIA code word is a mark or "1" in any case, there is no difference in the output as a result of the simultaneous sampling and reset of the line flip-flop. The operating cycle having been completed, counting chain 1202 is reset by flip-flop 1128 the reset being initiated by the sequence control logic unit No. 4 output (see FIG. 11.)

As previously explained, for the EIA format this corresponds to the 72nd count, i.e. 4 counts after completion of the 68 count operating cycle, and thus only four of the required eight counts defining the stop pulse interval are provided. The remaining four counts are inherently provided since even assuming that the next count sequence begins promptly upn reset, a time period corresponding to four counts elapses before line flip-flop 962 is sampled (i.e. at count 4) to establish the leading edge of the start pulse for the next character.

For ASCII format operation, however, the 8th bit is the parity bit so two stop bits must still be generated before the character transfer cycle is completed. This is accomplished by resetting line flip-flop 962 at count 76, which is the No. 3 output of sequence control logic unit 606 for the ASCII format. This corresponds to the beginning of the next bit following the parity bit — eight counts after count 68. Resetting flip-flop 962 produces a "1" at the $\overline{Q}$ output which corresponds to the mark level of the stop bits. Flip-flop 962 remains in the reset condition with a $\overline{Q}$ output of "1" until the next clock pulse, corresponding to the 4th count pulse of the next count sequence.

The time interval required to accommodate the two stop pulses, i.e. a total of 16 counts is established by resetting at the 88th count. This provides a total of 12 counts, even assuming that the next count cycle commences promptly upon reset of counter 1202 after the 88th count. The remaining four counts are inherently provided since flip-flop 962 is not sampled until the fourth count of the next cycle. If the next cycle does not commence immediately, an even greater interval is provided.

Record and Playback Circuitry

Figure 17:
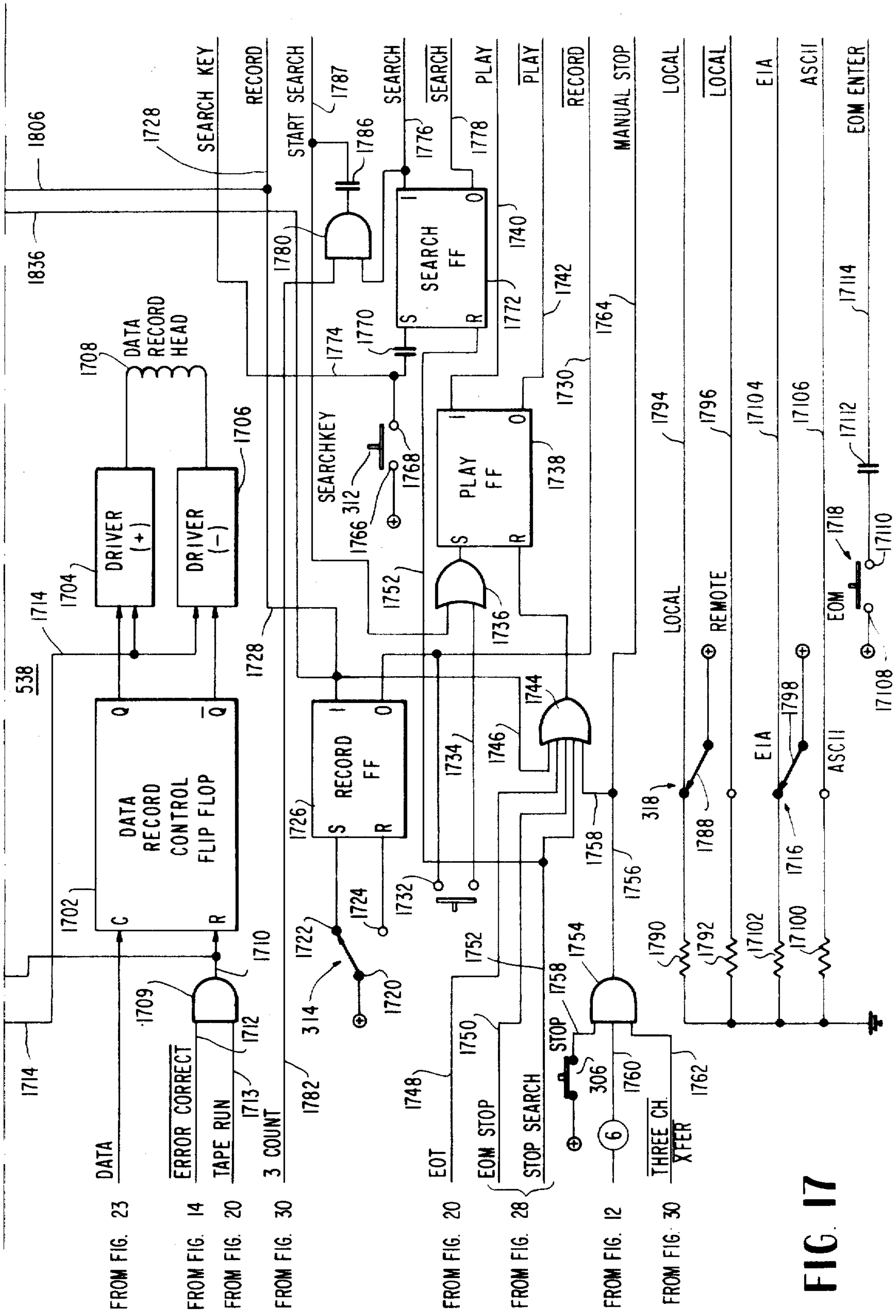
FIGS. 17 and 18, arranged as shown in FIG. 19, illustrate the details of the record and playback circuits, and the operating mode selection logic.
Figures 18, 19:
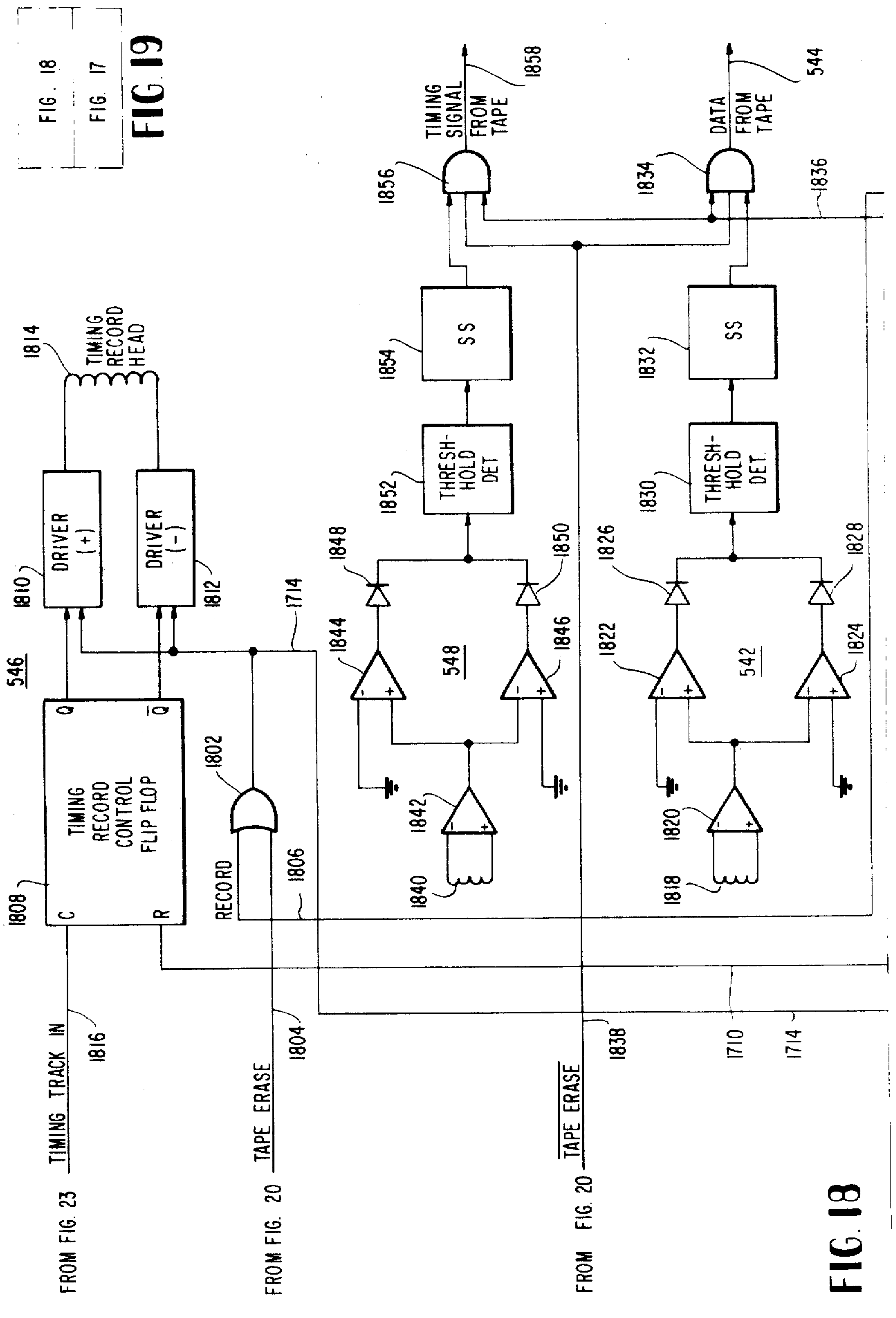

FIGS. 17 and 18 arranged as shown in FIG. 19 illustrate the construction of data and timing track record circuits 538 and 546, and data and timing track playback circuits 542 and 548.

Information in both the data and timing tracks is recorded in the non-return-to-zero format in which the magnetization state of the tape changes from full magnetization in one direction to full magnetization in the other direction to record a "1" bit, but does not change to record a "0" bit.

Data track record circuit 538 shown in FIG. 17 comprises a J – K data record control flip-flop 1702, a pair of driver circuits 1704 and 1706 coupled respectively to the Q and $\overline{Q}$ outputs of flip-flop 1702, and a recording head 1708 coupled to the outputs of driver circuits 1704 and 1706. The clock input of flip-flop 1702 is connected to data output of line memory 204 over line 540 (see FIG. 5), while the reset input is connected to the output of an AND gate 1709 over lead 1710. AND gate 1709 receives as inputs, the $\overline{\text{ERROR CORRECT}}$ signal over lead 1712, and the "TAPE RUN" output of tape control logic unit 552, hereinafter to be described, over lead 1713.

The J and K inputs of flip-flop 1102 (not shown) are connected in common to the positive power supply thereby providing constant "1" inputs. Consequently, as indicated by the truth table in FIG. 7(f), the flip-flop operation is such that each successive clock input at the "1" level reverses the flip-flop output state.

Thus, as long as the TAPE RUN signal is "1" an error correction (indicated by a "1" on lead 1712) is not taking place, each successive "1" bit of the data signal reverses the flip-flop output but a "0" does not.

When the TAPE RUN signal is "0," indicating that the tape is not running, or during error correction, flip-flop 1702 is reset, whereby the $\overline{Q}$ output is clamped to "1," and remains at this level (even after the reset signal returns to a "1" level) until the next "1" bit of the data input.

The Q and $\overline{Q}$ outputs of flip-flop 1702 respectively actuate driver circuits 1704 and 1706. The latter are solid state amplifiers of any conventional or desired construction. These provide current flow through record head 1708 in the direction shown by the arrow when the Q output of flip-flop 1702 is "1" and reverse current flow when the $\overline{Q}$ output of flip-flop 1702 is "1."

Driver circuits 1704 and 1706 are also provided with conditioning inputs over lead 1714 by the output of an OR gate 1802 which receives as its inputs, the TAPE ERASE signal over lead 1804 from tape control logic unit 604, and the "RECORD" output of mode select logic unit 602, described below, over lead 1806. Drivers 1704 and 1706 operate only if the signal on lead 1714 is "1," thereby preventing operation of the record circuits during playback with resulting loss of previously recorded information. Further, because driver 1706 is conditioned by the $\overline{Q}$ output of flip-flop 1702 whenever the tape is stopped, the tape is always magnetized in the same direction when the tape restarts, and thus the first transistion unambiguously represents a "1" being recorded (or previously recorded) on the tape.

Timing track record circuit 546 shown in FIG. 18 is constructed identically to data track record circuit 538. The circuit includes a J – K timing record control flip-flop 1808, a pair of driver circuits 1810 and 1812 connected to the Q and $\overline{Q}$ outputs respectively of flip-flop 1808 and a record head 1814 connected to the outputs of driver circuits 1810 and 1812. As in the case of driver circuits 1704 and 1706 the output of OR gate 1802 is output of OR gate 1802 is provided as a conditioning input for driver circuits 1810 and 1812 over lead 1714, and the reset input for flip-flop 1808 is provided by the output of AND gate 1709 over lead 1710. The clock input for flip-flop 1808 is provided over lead 1816 by the "TIMING PULSE" output of line memory control and erase logic unit 530 as hereinafter explained.

Timing track record circuit 546 operates in the same manner as described above for data track record circuit 538. However, because the timing pulses constitute a continuous succession of "1's" throughout the recording period, each successive timing pulse inverts the outputs of flip-flop 1808, and reverses the magnetization state of the tape.

Data track playback circuit 542 shown in FIG. 18 is constructed to convert the non-return-to-zero record format back to a binary format. The circuit comprises a playback head 1818 connected to the positive and negative inputs of a differential amplifier 1820. The output of amplifier 1820 is connected to the positive and negative inputs respectively of a second pair of differential amplifiers 1822 and 1824. The negative input of amplifier 1822 and the positive input of amplifier 1824 are both grounded. Consequently, amplifier 1822 reproduces the output of amplifier 1820 while amplifier 1824 inverts the output of amplifier 1820. As will be appreciated, each transition between magnetization states on the tape results in a pulse of current in playback head 1818, with pulses of opposite polarity representing transitions in opposite magnetic "directions" and with a zero signal level representing continuation of a previous magnetic state, i.e. no transition. Thus, each pulse, whatever the polarity represents a "1" since a recorded "0" does not change the magnetization state of the tape. Since amplifiers 1822 and 1824 produce inverted versions of the output of playback head 1818, it will be appreciated that a particular state transition produces a positive output from amplifier 1822 and a simultaneous negative output from amplifier 1824. An opposite transition produces a negative outut from amplifier 1822 and positive output from amplifier 1824.

The positive outputs of both amplifiers (or the negative outputs) thus constitute all of the "1's" recorded on the tape. These are collected by connecting the outputs of amplifiers 1822 and 1824 respectively to a pair of diodes 1826 and 1828. The diodes are poled to permit current flow for positive outputs of the respective amplifiers, thereby achieving the required collection of "1" outputs.

Diodes 1826 and 1828 are connected in common to the input of a threshold detector 1830, set to trigger at approximately one-half the level ocrresponding to response to full magnetization of the tape in either direction. The output of the threshold detector 1830 is connected to the input of a single shot multi-vibrator 1832 having a delay period of approximately one-half the duration of the transition pulses. Thus, each transition pulse of "1" being played back produces an accurately defined, straight sided pulse for transfer to line memory 204. Conversely, continued absence of transition pulses (signifying a "0" bit) maintains multi-vibrator 1832 in its rest condition, and no output pulse is provided.

The output of single shot multi-vibrator 1832 is provided as the signal input to an AND gate 1834 which receives as control inputs, the $\overline{\text{RECORD}}$ signal from mode select logic unit 602 over lead 1836, and the $\overline{\text{TAPE ERASE}}$ signal over lead 1838 from tape control logic unit 604. The output of AND gate 1834 is coupled over lead 544 as the signal input to line memory 204 (see FIG. 5.)

Timing track playback circuit 548 is identical to data track playback circuit 542. The circuit includes a playback head 1840 connected to opposite inputs of a differential amplifier 1842. The output of amplifier 1840 is connected to the respective positive and negative inputs of a further pair of differential amplifiers 1844 and 1846, the negative and positive inputs of which are grounded. The outputs of amplifiers 1844 and 1846 are connected to a pair of diodes 1848 and 1850 poled to pass current when the amplifier outputs are positive.

The diodes are connected in common to the input of a threshold detector 1852, the output of which triggers a single shot multi-vibrator 1854. The latter provides the signal input to an AND gate 1856, which receives as its control inputs the "$\overline{\text{RECORD}}$" output of mode select logic unit 602 over lead 1142 and the $\overline{\text{TAPE ERASE}}$ signal over lead 1838 from tape control logic unit 604. The output of AND gate 1856 is provided over lead 1858 as the "TIMING SIGNALS" to line memory control and erase logic unit 530 and to tape control logic unit 604.

Mode Select Logic Unit

FIG. 17 also illustrates the construction of mode select logic unit 602. The circuit includes playback-record select key 314, local-remote select key 318, playback start key 308, manual stop key 306, and search key 312, all previously described, and an ASCII/EIA format select switch 1716, and a special "end of message" key, EOM ENTER key 1718, together with the logic circuitry activated by the above mentioned control keys.

Playback-record select key 314 operates a two-position switch having a moving contact 1720 connected to the positive power supply, and fixed contacts 1722 and 1724 respectively connected to the set and reset inputs of a set reset record flip-flop 1726. The latter provides the RECORD and $\overline{\text{RECORD}}$ signals at one ONE and ZERO outputs respectively over leads 1728 and 1730.

Playback start key 308 operates a single pole normally open switch having a first contact 1732 connected to the ZERO output of record flip-flop 1726 and a second contact connected over lead 1734 to an OR gate 1736. The latter is connected to the set input of a set reset playback flip-flop 1738, the ONE and ZERO outputs of which provide the PLAY and $\overline{\text{PLAY}}$ output signals respectively over leads 1740 and 1742. The reset input for playback flip-flop 1738 is provided by an OR gate 1744 which receives as inputs, the ONE output of record flip-flop 1726 over lead 1746, the "EOT" (end of tape) signal from tape drive unit 142 over lead 1748, the EOM STOP signal over lead 1759 from line memory control and erase logic unit 530, and the STOP SEARCH signal on lead 1752 from character identification and search control logic unit 650. A fifth input is provided by an AND gate 1754 over lead 1756. AND gate 1754 is activated by stop key 306 which operates a normally open single pole switch to connect the positive power supply to the input of AND gate 1754 over lead 1758 when key 306 is depressed. Conditioning inputs for AND gate 1754 are provided over leads 1760 and 1762 by the No. 6 output of sequence control logic unit 606 and by the $\overline{\text{3 CH. XFER}}$ signal from three character transfer logic unit 612. As mentioned above, the former is "1" only when counting chain 1202 is reset. As hereafter explained, the 3 CH. XFER signal is "1" only if a three character transfer operation is not in progress. Thus, stop key 306 is inoperative to halt playback if either of the mentioned data transfer sequences is taking place. This prevents loss of information which could occur if either of these operations is interrupted.

Referring back to playback flip-flop reset OR gate 1744, flip-flop 1738 is reset by a "1" at any of the above identified OR gate inputs. Further, if record flip-flop 1726 is reset (with a "0" level at its "one" output), depression of playback start key 308 does not produce a "1" input to OR gate 1736 and playback flip-flop 1738 is not set. This constitutes an interlock preventing attempted placement of the system simultaneously in the record and playback modes.

Depression of stop key 306 also provides an output over lead 1764 as the MANUAL STOP signal, which is provided to tape control logic unit 604 for manually stopping a tape rewind operation as hereinafter described.

Search key 312 activates a single pole normally open switch having one contact 1766 connected to the positive power supply, and the other contact 1768 AC coupled through a capacitor 1770 to the set input of a set-reset search flip-flop 1772. The reset input for flip-flop 1772 is provided by the STOP SEARCH signal on lead 1752 from character identification and search control logic unit 560 previously mentioned.

Switch contact 1768 is also connected over lead 1774 to provide the SEARCH KEY signal which initiates storage in shift register 504 of the search code addresses for the search operation as hereinafter described.

The ONE and ZERO outputs of search flip-flop 1772 provide the SEARCH and $\overline{\text{SEARCH}}$ signals respectively over leads 1776 and 1778 for use elsewhere in the system. Also, the SEARCH signal is coupled to an AND gate 1780, the other input to which is provided by the 3RD COUNT signal from three character transfer logic unit 612 over lead 1782. AND gate operates when the search operation has been initiated and upon storage of the three search address codes (as indicated by a "1" on lead 1782) to produce the START SEARCH signal on lead 1784. The START SEARCH signal also provides a second input to OR gate 1736 and provides an additional mechanism for setting playback flip-flop 1738. The output of AND gate 1780 is AC coupled through a capacitor 1786 and thus the START SEARCH signal is a pulse which appears when the third search address character is entered, as explained more fully below.

Local-Remote select key 318 operates a 2-position switch having a moving contact 1788 connected to the positive power supply and fixed contact grounded through respective resistors 1790 and 1792. The fixed contacts are also connected to leads 1794 and 1796 to provide the LOCAL AND $\overline{\text{LOCAL}}$ signals for use elsewhere in the system.

Mode select logic unit 602 also includes an EIA – ASCII format select switch 1716. This is representative of a mechanism employed to provide system compatability with a variety of information code formats. Format selection switch 1716 may be positioned along with the other function control keys previously described on auxiliary keyboard 140, or may be located in the electronics console if preferred, since its use may be less frequent than the other control keys.

As illustrated, switch 1716 is constructed identically to Local — Remote select switch 318 having a moving contact 1798 connected to the positive power supply, and fixed contacts grounded through a pair of resistors 17100 and 17102. The fixed contacts are also connected to leads 17104 and 17106 which provide the EIA and ASCII format signals, respectively, for use elsewhere in the system.

Finally mode select logic unit 602 also includes EOM ENTER Key 1718. This is representative of a mechanism for generating the "end of message" character code word, and for actuating shift register 504 and sequence control logic unit 606 to store the code word.

Key 1718 is shown simply as operating a single pole normally open switch having one contact 17108 connected to the positive power supply, and the second contact 17110 connected through a capacitor 17112 to lead 17114 which provides the EOM ENTER signal for shift register sub-units 1404 and 1502 previously described.

In addition, it will be appreciated that the EOM code word itself must also be generated by EOM key 1718. This may be accomplished in any suitable way e.g. by a set of normally open contact pairs, one contact of each pair being connected to the positive power supply or ground to generate the required pattern of "1's" and "0's," and the other contact of each pair being connected to the respective parallel inputs $P_0 - P_3$ of shift register sub-units 1404 and 1502. The foregoing is omitted from the drawing, however, for simplicity of illustration.

TAPE OPERATION CONTROL

Figure 20:
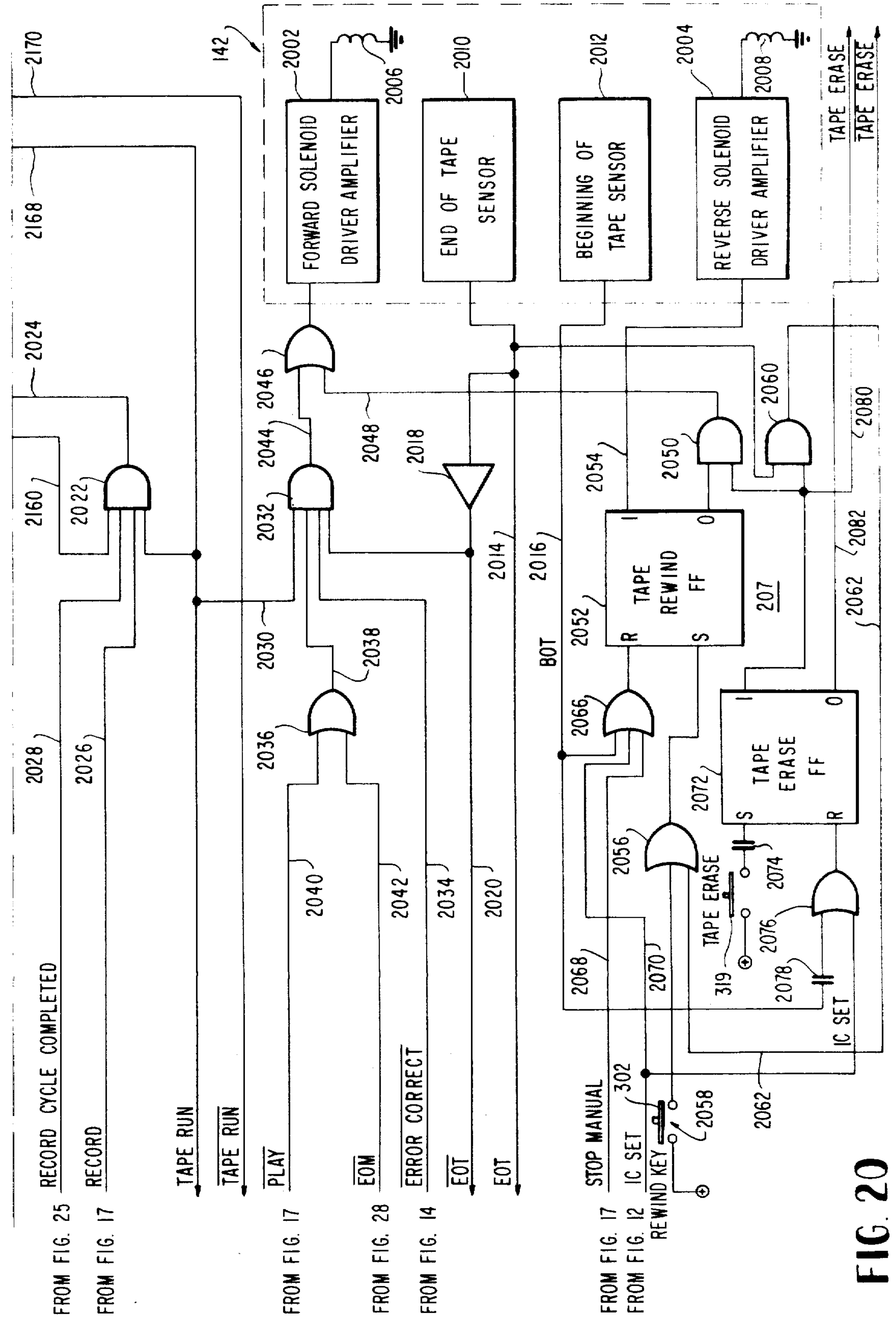
FIGS. 20 and 21, arranged as shown in FIG. 22 illustrate the details of the tape memory operation control logic.
Figures 21, 22:
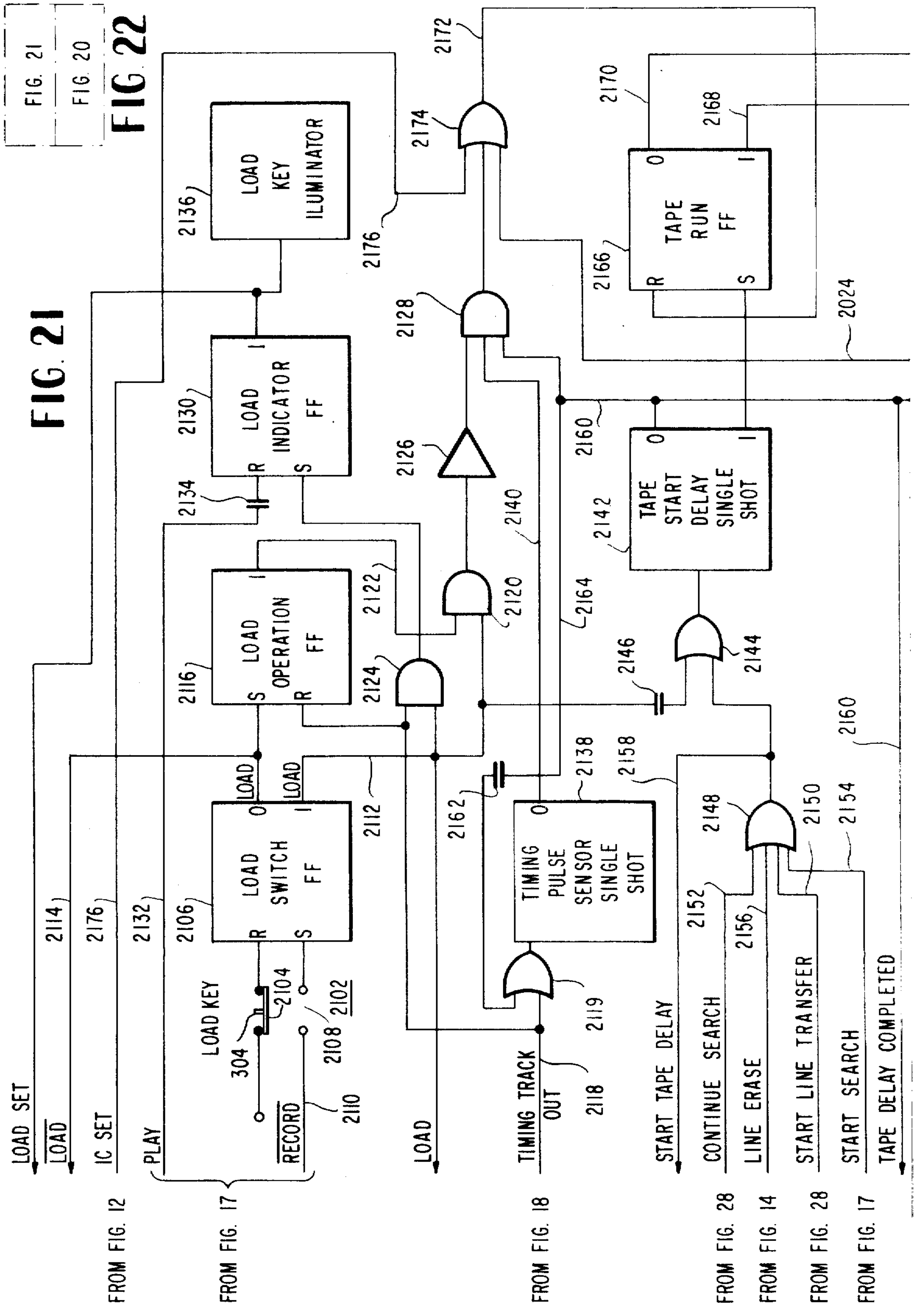

FIGS. 20 and 21 arranged as shown in FIG. 22 illustrate, in shcematic form, certain portions of the tape drive unit 142, and the details of the construction of tape control logic unit 604.

The details of the construction of tape drive unit 142 do not per se constitute part of this invention, and have therefore been omitted. It should be noted however, that the tape drive unit includes forward and reverse solenoid driver amplifiers 2002 and 2004 actuating respective forward and reverse solenoids 2006 and 2008. The latter operate clutch mechanisms (not shown) for driving the tape transport in the forward and reverse directions. As will be understood, when forward solenoid drive amplifier 2002 and solenoid 2004 are actuated, the tape is advanced and when reverse driver 2006 and solenoid 2008 are activated, the tape is rewound.

Tape drive mechanism 142 also includes end and beginning of tape sensors 2010 and 2012. These are constructed in any suitable fashion to provide respective "1" outputs over leads 2014 and 2016 as the EOT and BOT signals indicating that the tape has been transferred completely to one of the reels in the cassette. End of tape sensor 2010 is also connected to an inverter 2018 to provide the $\overline{EOT}$ signal over lead 2020.

Control signals for solenoid drivers 2002 and 2004 are provided by tape drive logic unit 604, including previously mentioned load key 304 and associated logic circuitry, and other logic circuitry for starting and stopping the tape at the required times. Load key 304 operates a double pole switch 2102 having a normally closed contact set 2104 connecting the positive power supply to the reset input of a set reset load switch flip-flop 2106. A normally open contact set 2108 connects the RECORD signal on lead 2110 to the set input of flip-flop 2106. The ONE and ZERO outputs of load switch flip-flop 2106 provide the LOAD and $\overline{LOAD}$ signals, respectively over leads 2112 and 2114 for use elsewhere in the system.

The $\overline{LOAD}$ signal on lead 2114 is also connected to the set input of set-reset load operation flip-flop 2116 the reset input to which is provided by the output of timing track playback circuit 548 over lead 2118.

The LOAD signal from load switch flip-flop 2106 is connected as an input to an AND gate 2120, the other input of which is provided over lead 2122 by the ONE output of load operation flip-flop 2116. The LOAD signal also provides an input to another AND gate 2124, the second input of which is provided by the timing track output over lead 2118. The output of AND gate 2120 is connected through an inverter 2126 as one input to an AND gate 2128. The output of AND gate 2124 is connected to the set input of a set reset load indicator flip-flop 2130, the reset input for which is provided over lead 2132 by the PLAY signal from mode select logic unit 602 through an AC coupling circuit represented by capacitor 2134. The ONE output of load indicator flip-flop 2130 activates a load key illuminator circuit 2136 connected to a light bulb or the like contained in load key 304.

Referring again to AND gate 2128, a second input is provided by the ZERO output of a single shot multivibrator 2138 having a 5 millisecond delay period. The trigger input to single shot 2138 is provided over lead 2118 by the timing track output signal connected as one input to an OR gate 2119. As hereinafter explained, timing signals are generated by the HI FREQ. signal from timing signal generator 610, i.e. at 8448 Hz for EIA operation or at 7040 Hz for ASCII. Thus, timing pulses are recorded on the tape at interval of at most 0.14 milliseconds, and the signal on lead 2118 is a pulse train at such frequency for the entire duration of any block of recorded data. As long as the timing signal is present, single shot 2138 remains on and a "0" output is provided over lead 2140 to inhibit AND gate 2128.

When the timing pulses end, indicating completion of a block of recorded data, single shot 2138 is allowed to complete its delay period, and after 5 milliseconds, it returns to its rest state with a "1" output on lead 2140. Single shot 2138 therefore serves as a sensor for timing signals and for completion of playback of a data block.

Tape control logic unit 604 also includes a further single shot multi-vibrator 2142 having a 25 millisecond delay period. The latter is chosen to provide sufficient time for the tape drive mechanism to attain its normal operating speed (e.g. 15 inches/sec.) before the record and the playback operations are actually permitted to commence.

Single shot 2142 is triggered by the output of an OR gate 2144, one input to which is provided through capacitor 2146 by the LOAD signal on lead 2112. A second input to OR gate 2144 is provided by another OR gate 2148 which in turn receives as inputs over leads 2150 and 2152, the START LINE TRANSFER and CONTINUE SEARCH signals of character identification and search logic unit 560, the START SEARCH signal over lead 2154 from mode select logic unit 602, and the LINE ERASE signal over lead 2156 from erase control logic unit 508. OR gate 2148 provides the START TAPE DELAY signal over lead 2158.

The ZERO output of tape start delay single shot 2142 on lead 2160 provides a third input to AND gate 2128, one input to a further AND gate 2022 and a second input to OR gate 2119 AC coupled by capacitor 2162 over lead 2164. The signal on lead 2160 also represents the TAPE DELAY COMPLETED signal used elsewhere in the system. The ONE output of tape start delay single shot 2142 is provided to the set input of a set/reset tape run flip-flop 2166, the ONE and ZERO outputs of which provide the TAPE RUN AND $\overline{TAPE\ RUN}$ signals respectively over leads 2168 and 2170 for use elsewhere in the system.

The reset input for tape run flip-flop 2166 is provided over lead 2172 by an OR gate 2174. The latter receives as a first input, the IC SET signal over lead 2176 from sequence control logic unit 606, and as a second input, the output of AND gate 2128. The third input is provided over lead 2024 by the output of AND gate 2022, which, in turn, receives as its inputs, the TAPE DELAY COMPLETED signal on lead 2160 as previously noted, and also, the TAPE RUN signal on lead 2168, the RECORD signal on lead 2026 from mode select logic unit 602, and the RECORD CYCLE COMPLETED signal on lead 2028 from line memory control and erase logic unit 530.

A tape operation sequence begins for any of the operations corresponding to a "1" input for OR gate 2148, or when a LOAD signal is provided to OR gate 2144. These inputs provide a "1" output of OR gate 2144 to set tape start delay single shot 2142, the ONE output of which goes to "1." This sets tape run flip-flop 2166, and provides "1" level on lead 2030 to the input of an AND gate 2032. The latter receives as its other inputs, the $\overline{EOT}$ signal from lead 2020, the $\overline{ERROR\ CORRECT}$ signal on lead 2034, and the output of an OR gate 2036 over lead 2038. OR gate 2036, in turn, receives as inputs, the $\overline{PLAY}$ signal on lead 2040 from mode select logic unit 602, and the $\overline{EOM}$ signal on lead 2042 from character identification and search logic unit 560.

Accordingly, if the system is not in playback or if the end of message character is not detected as explained below, the signal on lead 2038 will be "1." In that event, if the tape run flip-flop 2166 is set, if error correction (or line erase) is not in progress, and the end of the tape has not been reached, the output of AND gate 2032 will be "1."

The output of AND gate 2032 is connected by lead 2044 as one input to an OR gate 2046, the other input to which is provided over lead 2048 by the output of an AND gate 2050 hereinafter described. OR gate 2046 is connected to forward solenoid driver amplifier 2002, whereby operation of OR gate 2046 energizes solenoid 206, causing the tape to run. The tape continues to run until tape run flip-flop 2166 is reset either by a "1" output of AND gate 2022 during record operation, or by a "1" output of AND gate 2128 during playback.

For record operation, AND gate 2022 is conditioned by the RECORD signal (indicating the system is in a record mode), by the TAPE RUN signal from flip-flop 2166 (indicating that the tape is actually running) and by a "1" at the "ZERO" output of tape start delay single shot 2142 (indicating that the tape delay period of 25 milliseconds has been completed.) The RECORD CYCLE COMPLETED signal remains at "0" until the entire block of data in the line memory has been transferred to the tape At that time the signal on lead 2028 goes to "1" which operates AND gate 2022 and OR gate 2174 to reset flip-flop 2166. This stops the tape while another line of information is accumulated in the line memory.

For playback, AND gate 2128 is conditioned by the ZERO output of tape start delay flip-flop 2142, indicating that the tape has been running for more than 25 milliseconds. AND gate 2128 is also conditioned by the output of inverter 2126, which is "1" unless the "load" operation as hereinafter described is in progress. A third input to AND gate 2128 from timing pulse sensor single shot 2138 constitutes an inhibit signal which is "0" as long as timing pulses are detected in the timing track on the tape and the single shot is in the triggered condition.

After a block of information being played back ends, the timing pulses cease, and 5 milliseconds later, single shot 2138 returns to its rest condition. This produces a "1" at the "ZERO" output and activates AND gate 2128 to reset "tape on" flip-flop 2166. This, in turn, deactivates forward solenoid driver/amplifier 2002 and solenoid 2006 through AND gate 2032 and OR gate 2046, and stops the tape drive.

As noted above, tape start delay single shot 2022 prevents the reset of tape run flip-flop 2166 for a period of 25 milliseconds, and also triggers single shot 2138 through OR gate 2119 at the end of the 25 millisecond delay. Thus, it will be appreciated that when the system is operating in a playback mode, and the tape has been started, if the first timing pulse does not retrigger single shot 2138 within 5 milliseconds after the 25 millisecond start-up time is completed, tape run flip-flop 2166 will be reset and no data will be played back.

In normal operation, this presents no difficulties since timing pulses are recorded on the timing track 25 milliseconds after the beginning of a recording interval. Assuming that only 15 milliseconds are actually required for the tape to attain full speed, and also to come to rest, then a 40 millisecond interval will exist between data blocks, i.e. recording begins 25 milliseconds after the tape starts to run, and the tape runs 15 milliseconds after the recording of a data block has ended. Moreover, the tape is not turned off for 5 milliseconds after the data block has been played back so the tape runs for approximately 20 milliseconds beyond the end of data block and assures that the timing pulses of the next block will be encountered less than 25 milliseconds after the tape start-up. Provision of the additional 5 millisecond interval insures a margin of safety.

However, at the beginning of a tape, or if for some other reason, a substantial length of unrecorded tape exists, the start up period of 25 milliseconds can be exceeded without timing pulses being detected. Thus, particularly when preparing to play back the first data block on a tape, it is necessary to override timing circuits 2138 and 2142. This is accomplished by use of load key 304. Depression of the load key activates tape start single shot 2142 and tape run flip-flop 2166 as previously noted. Also with load switch flip-flop 2106 set by load key 304, the set input of load flip-flop 1231 goes to "0." (As will be understood, the latter signal was previously "1" whereby load flip-flop 2116 was set). The "0" input has no effect on the circuit operation and the flip-flop remains set. On the other hand, with "1" signals on leads 2112 and 2122, the output of AND gate 2120 goes to "1," and consequently the output of inverter 2126 goes to "0." This inhibits AND gate 2128, thereby preventing reset of tape run flip-flop 2166 as long as key 304 is depressed or until load flip-flop 2166 is reset by the first pulse detected in the timing track.

With load flip-flop 2116 reset, the output of AND gate 2120 goes to "0," and the output of inverter 2132 again goes to "1" reconditioning AND gate 2128. By this time, however, the initial timing pulse has triggered single shot 2138, the output of which goes to "0." This, in turn maintains AND gate 2128 inhibited as long as timing pulse continues to be detected (and for a period of 5 milliseconds thereafter).

Thus, even if a substantial initial portion of a tape does not contain information, the tape continues to run until the first body of information is encountered and continues to run until that body of information has been completely played out into the line memory.

During the above-described operation, load key 304 is maintained depressed. If the load key is released prematurely, AND gate 2120 ceases to conduct, and the output of inverter 2126 returns to "1." Therefore, if timing pulses have not yet been encountered, the tape will stop without having reached the beginning of recorded information.

As a practical matter, with tape travel at the preferred speed of 15 inches per second, it is unlikely that such a condition will result unless the operator releases load key 304 instantly. To minimize such a possibility however, the load key is provided with an internal source of illumination which is turned on by the arrival of the first timing pulse thereby indicating to the operator that the load key may be released.

The foregoing is accomplished by connecting the signal appearing on lead 2112 as one input to AND gate 2124, the other input to which is provided over lead 2118 by the timing track pulses. Thus, whenever a timing pulse appears, and load key 304 is depressed, AND gate 2118 operates and its output goes to "1." This sets load indicator flip-flop 2130 which in turn actuates the load key illuminator 2136, and advises the operator that the load key 304 may be released.

The load operation transfers an entire line of information from the tape to line register 204 as mentioned above. However, playback flip-flop 1738 is not set at this time and the three character transfer sequence hereinafter described which loads shift register 504 for playback does not occur. When flip-flop 1738 is set as explained above in connection with FIG. 17, and the PLAY signal is provided through coupling capacitor 2134 to reset the load indicator flip-flop 2130. This extinguishes illuminator 2136, but continued illumination of the load key until that time reminds the operator that the system is ready for playback.

The tape cassette rewind operation is controlled by a set-reset rewind flip-flop 2052 having its ONE output connected over lead 2054 as the input to reverse solenoid drive amplifier 2004. The set input for tape rewind flip-flop 2052 is provided by an OR gate 2056 which receives as inputs, the output of an AND gate 2060 described below on lead 2062, and a signal on lead 2064 produced by tape rewind key 302. As illustrated, the latter actuates a normally open contact pair 2058 to connect OR gate 2056 to the positive power supply. The reset input for the tape rewind flip-flop is provided by an OR gate 2066 which receives as a first input, the STOP MANUAL signal from mode select logic unit 602 over lead 2068. A second input is provided over lead 2016 by the beginning of tape sensor 2012, indicating that the tape has been completely rewound, while a third input is provided over lead 2070 by the IC SET signal from sequence control logic unit 606.

Accordingly, whenever rewind key 302 is depressed, flip-flop 2052 is set through OR gate 2056 and reverse solenoid driver amplifier 2004 and reverse solenoid 2008 are actuated causing the tape to be rewound. The rewind operation continues until tape rewind flip-flop 2052 is reset either by depression of stop key 306, or by completion of the rewind operation as indicated by the beginning of tape (BOT) signal from sensor 2012.

Tape rewind flip-flop 2052, together with previously mentioned OR gates 2056 and 2066, and AND gates 2050 and 2060 also function as part of an automatic tape erasure circuit 2071. Tape erase circuit 2071 also includes a tape erase flip-flop 2072 having its set input provided through capacitor 2074 by tape erase key 319, and its reset input provided by an OR gate 2076. Tape erase key 319 operates a normally open contact pair to couple the positive power supply through capacitor 2074 to flip-flop 2072. The inputs to reset OR gate 2076 are provided over lead 2070 by the IC SET signal, and through capacitor 2078 by the beginning of tape signal on lead 2016. The "one" output of tape erase flip-flop 2072 is provided as "one" input to AND gates 2050 and 2060, and also provides the TAPE ERASE signal on lead 2080 for use elsewhere in the system. The "zero" output of tape erase flip-flop 2072 provides the $\overline{\text{TAPE ERASE}}$ signal on lead 2082.

For automatic rewind operation, the operator depresses tape erase key 319 which sets tape erase flip-flop 2072 through capacitor 2074. Since tape rewind flip-flop 2052 is reset at this time (i.e. the tape rewind operation is now in progress) the "zero" output of tape rewind flip-flop 2052 is "1." Thus, the "1" level of the TAPE ERASE signal on lead 2080 activates AND gate 2050 and provides a "1" on lead 2048 to operate OR gate 2046. This in turn actuates forward solenoid driver amplifier 2002 and solenoid 2006 to operate the tape in forward direction.

At the same time, with the TAPE ERASE signal on lead 2080 at "1" there is provided a "1" level on lead 1804 (see FIG. 18) to operate OR gate 1802. This, in turn, actuates the driver circuits 1704 and 1706, and 1810 and 1812 in data and timing track record circuits 538 and 546. Further, AND gate 1709 is inoperative at this time since the signal on lead 1712 is "0" and thus data and timing record control flip-flops 1702 and 1808 are both reset. Drivers 1706 and 1812 are therefore operative to record the fixed "reset" magnetization state on the tape.

Tape operation continues as described above until the entire tape has been exhausted, at which time end of tape sensor 2010 provides a "1" output on lead 2014. This is provided as an input to AND gate 2060 which is conditioned by the "1" level of the TAPE ERASE signal on lead 2080, and therefore operates to provide a "1" signal on lead 2062. This, in turn, is provided through OR gate 2058 to set tape rewind flip-flop 2052 activating reverse solenoid driver amplifier 2004 and solenoid 2008 to rewind the tape.

At the same time, the "0" level of the signal at the other output of tape rewind flip-flop 2052 inhibits AND gate 2050, turning off forward solenoid driver amplifier 2002 and deactivating solenoid 2006. This prevents operation of the forward and reverse tape drivers simultaneously. Since tape erase flip-flop 2072 remains set, the TAPE ERASE signal on lead 2080 remains "1" and the operation of data and timing track record circuits 538 and 546 continues as described above. Therefore, as the tape rewinds, its entire length is erased.

When the beginning of the tape is reached, beginning of tape sensor 2012 provides a "1" output on lead 2016 which is coupled through OR gate 2066 to reset tape rewind flip-flop 2052, and through capacitor 2078 and OR gate 2076 to reset tape erase flip-flop 2072. Thus, the tape comes to rest completely rewound with tape rewind flip-flop 2052 and tape erase flip-flop 2072 both reset.

Line Memory and Its Control

Figures 23, 26:
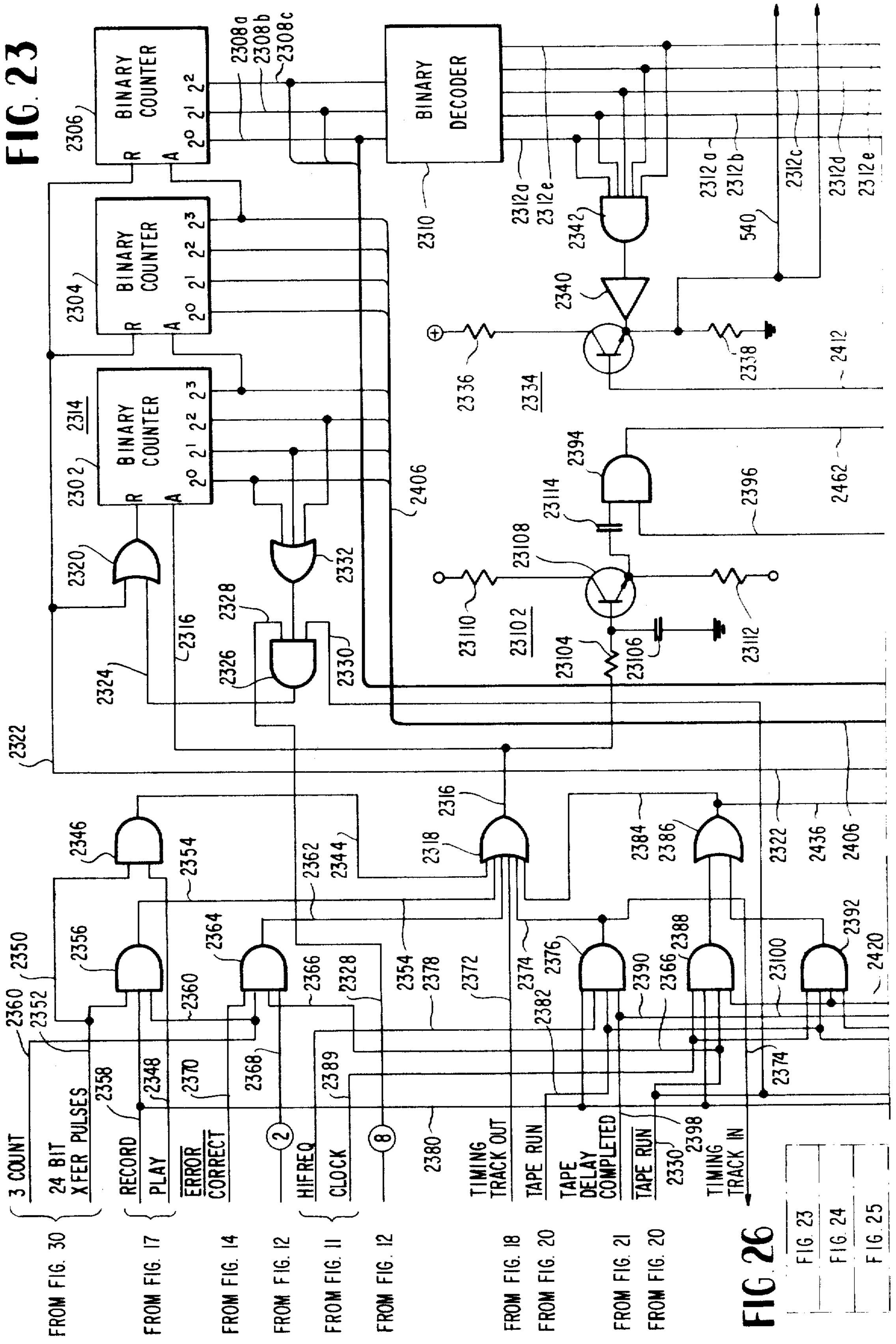
FIGS. 23 – 25, arranged as shown in FIG. 26, illustrate the construction of the line memory and associated control logic.
Figure 24:
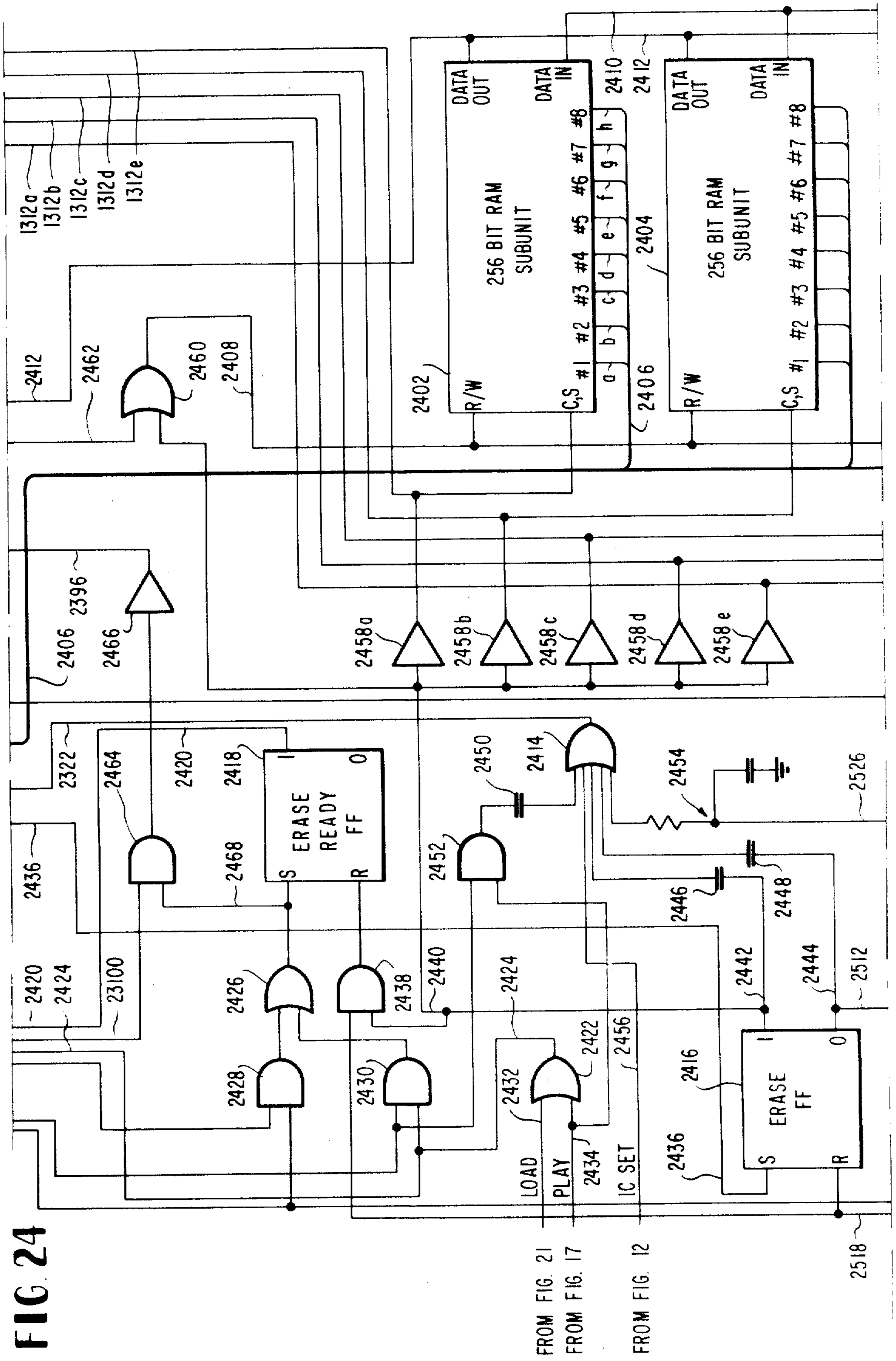
Figure 25:
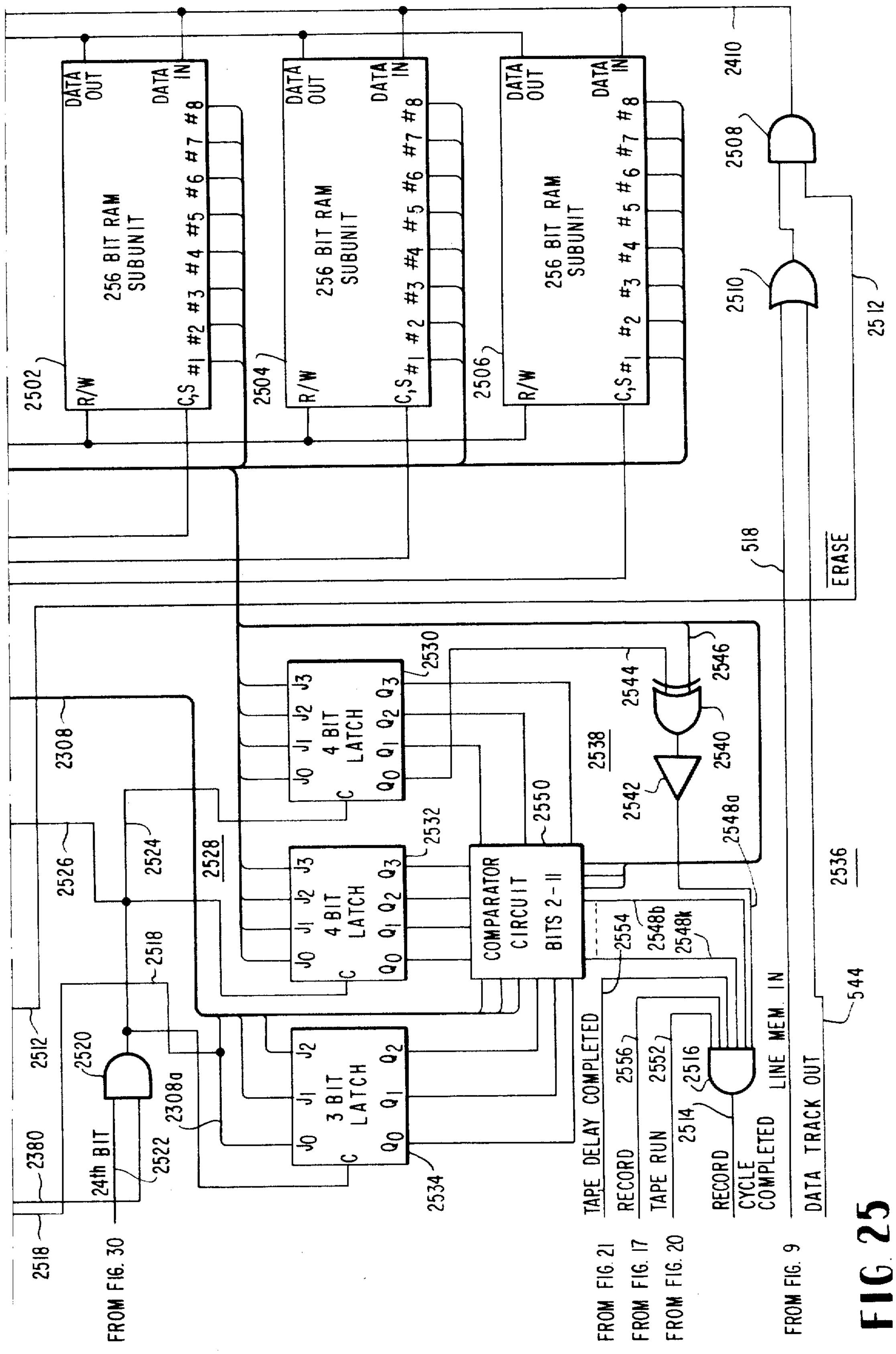

FIGS. 23–25 arranged as shown in FIG. 26 illustrate the details of construction of line memory 204 and control and erase logic unit 530.

As previously explained, the storage capacity of line memory 204 is sufficient for the number of bits constituting the maximum character content of a line of data in any format with which the system is to be compatible. Thus, for the 130 characters per line format of the Design Elements 101 input/output writer, the 8-bit per character code requires a minimum storage capacity of 1040 bits.

This required capacity can be provided in various ways, but in the preferred embodiment, there is employed an integrated circuit random access memory (RAM) comprised of a series of commercially available RAM sub-units. The specific circuit components employed are Model 1101 256 bit memory units manufactured by Intel Corporation, Mountain View, California. The required 1040 bit capacity is provided by five RAM sub-components 2402, 2404, 2502, 2504, and 2506 providing a total bit capacity of 1280 bits. It should be understood, however, that other equivalent RAM sub-units or other line memory construction may be employed as will be apparent to one skilled in the art in light of the description herein.

Broadly stated, information is fed in and retrieved from the line memory serially, on a bit-by-bit basis, by actuating each of the individual storage elements in turn through the operation of a serial address advance register. The register is advanced by groups of eight pulses from sequence control logic unit 606 as previously described, by groups of 24 pulses constituting the three-character transfer sequence, or by groups of 256 pulses constituting an erase sequence. The address register is reset at the beginning and end of an erase cycle (erasure is accomplished by writing "0's" in all of the storage elements of the line memory) during a record cycle after an entire line of data has accumulated and is ready to be transferred to the tape, and during a playback cycle when an entire line of data has been transferred from the tape and is ready for transfer out through the shift register. The logic circuitry for accomplishing these functions will now be described.

With specific reference to RAM sub-unit 2402 access for information storage and retrieval is controlled by an 8-bit binary coded address selection input, the bits of which are provided at input terminals labelled No. 1 thru No. 8. The input signals are provided by means of an 8-wire cable 2406, the individual wires of which are designated 2406(a) – 2406(h). The binary code pattern appearing on leads 2406(a) – (h) is generated by a pair of four-bit binary counters 2302 and 2304. The latter are preferably integrated circuit devices of conventional design, for example, Texas Instruments, Model SN 7493, or the equivalent. Counters 2302 and 2304 are described more fully below, but for the moment, it should be noted that the two units are connected in series to form an eight-bit counter with the outputs (labelled $2^0$, $2^1$, $2^2$ and $2^3$) defining an eight-bit binary code. Leads 2406(a) – (h) are connected to the counter outputs with lead 2406(a) – (d) connected to the $2^0$ – $2^3$ outputs respectively of counter 2302, and leads 2406(e) – (h) connected to the $2^0$ – $2^3$ outputs respectively of counter 2304.

Information is either written into or read out of the selected memory site depending on the binary value of a read/write actuating signal provided to the RAM sub-unit. The signal is coupled to the R/W input over lead 2408 by circuitry hereinafter described. If the R/W input is "1," the RAM sub-unit is actuated to "write," i.e. to store data. A "0" input conditions the RAM sub-unit to "read," i.e. for data retrieval. Data to be stored in RAM sub-unit 2402 is provided at a "DATA IN" input over lead 2410 while data retrieved from the RAM sub-unit in the read mode is provided at a "DATA OUT" terminal over lead 2412.

The remaining four RAM sub-units 2404, 2502, 2504 and 2506 are identical to RAM sub-unit 2402 and the above mentioned inputs and outputs are provided in common with the respective inputs and outputs of sub-unit 2402. Specifically, the R/Q inputs are all provided in common over lead 2408, the data inputs are all provided over lead 2410, and the data outputs are provided in common over lead 2412.

Memory site access is controlled by the binary signal pattern appearing on 8-wire cable 2406 with individual leads 2406(a) – (h) connected respectively to the No. 1 through No. 8 inputs of all of RAM sub-units 2402, 2404, and 2502 – 2506. Consequently, a particular binary code pattern appearing on leads 2406(a) – (h) simultaneously actuates one of the memory sites in each of the RAM sub-units. To prevent simultaneous read or write in all five memory sites, each of the RAM sub-units includes a sub-unit selection input "CS" which actuates the input and output circuitry of that sub-unit when the CS signal is "0." In effect this gates information into or out of only the selected sub-unit.

Considering all five sub-units together, three additional bits are required for unique memory site selection, whereby an 11-bit counter rather than the 8-bit counter provided by counter stages 2302 and 2304 are needed. Because each RAM sub-unit must be selected individually rather than by a multibit code as in the case of the individual memory sites, the three additional bits are converted from a binary code to five level code, each level being used to select one of the RAM sub-units.

The three binary selection bits are provided by a third counter sub-unit 2306, preferably identical to counter sub-units 2302 and 2304.

The $2^0$, $2^1$ and $2^2$ outputs of counter sub-unit 2306 is connected by leads 2308(a) – 2308(c) to the inputs of a binary decoder circuit 2310. Decoder circuit 2310 is an AND - OR logic circuit, or the equivalent which converts the three-bit binary input to a one-of-five output on leads 2312(a) – (e), in a conventional manner, and is shown by a single block for ease of illustration. Since a "0" level selects a particular RAM sub-unit, the outputs of decoder 2310 may be regarded as operating in negative-true logic, with four out of the five output "high" and the output corresponding to the selected sub-unit is "low."

Counter sub-units 2302–2306 constitute an 11-bit line memory site address selection register 2314 as mentioned above. By way of example, a register output of 00000000000 selects the first memory site of RAM sub-unit 2402, a register output of 00000000100 selects the first memory site of RAM sub-unit 2404 and a register output of 10000000110 selects the second memory site of RAM sub-unit 2504.

In addition to the above mentioned outputs, counter sub-units 2302–2306 each includes an advance input "A," and a reset input "R."

The "A" input for binary counter sub-unit 2302 is provided over lead 2316 by the output of a register advance OR gate 2318. The advance inputs for counter sub-units 2304 and 2306 are provided by the respective $2^3$ outputs of sub-units 2302 and 2304. Thus, successive advance pulses over lead 2316 cause binary register 2314 to store a succession of counts up to a total of 2048 ($2^{11}$), the count state being represented by the eleven combined outputs of the register sub-units as indicated above. The count state changes in response to the trailing edge of a positive going pulse.

The "R" input for binary counter sub-unit 2302 is provided by the output of an OR gate 2320, the first input to which is provided over lead 2322 by the output of a register reset OR gate 2414 hereinafter described. The second input to OR gate 2320 is provided over lead 2324 by the output of an AND gate 2326. This in turn receives as a first input over lead 2328, the No. 8 output of sequence control logic unit 606, constituting a pulse corresponding to the fourth count of each 88 count sequences (see FIG. 12.) A second input is provided over lead 2330 by the $\overline{\text{TAPE RUN}}$ signal from tape control logic unit 604.

The third input to AND gate 2328 is provided by output of an OR gate 2332, which is connected to the $2^0$, $2^1$, and $2^2$ outputs of binary counter sub-unit 2302. One or more of the inputs to OR gate 2332 is "1" except if the state of counter sub-unit 2302 is "0." Thus, if the tape is not running, and the state of binary counter sub-unit 2302 is something other than "0" at the beginning of an eight-bit cycle, the output of AND gate 2328 is "1" and counter sub-unit 2302 is reset through OR gate 2320. This assures that address register 2314 is out of synchronism, for example, as a result of extra or missing advance pulses, the condition will exist for only one character (8 bit) cycle, after which the error is not propagated on through successive count cycles.

The reset inputs for binary counter sub-units 2304 and 2306 are provided directly by the register reset signal on lead 2322 from the output of OR gate 2414. All of counter sub-units return to "0" on the leading edge of the reset pulses. This returns register 2314 to a count of 00000000000, corresponding to selection of the first memory site of RAM sub-units 2402.

As previously mentioned, the data inputs for each of the RAM sub-units are provided in common over lead 2410. This, in turn, is connected to the output of an AND gate 2508 which receives as a signal input, the output of an OR gate 2510, and as a control input, the $\overline{\text{ERASE}}$ signal over lead 2512 from the ZERO output of a set/reset erase flip-flop 2416 hereinafter described. The two inputs to OR gate 2510 are provided over leads 518 and 544 respectively from input-output logic unit 502 and data track playback circuit 542. (See FIG. 5.)

When the erase operation as hereinafter described is not being executed, AND gate 2508 is conditioned to pass the data signals appearing either on lead 518 or lead 544 through OR gate 2510. When the erase operation is in progress, the input to AND gate 2508 over lead 2512 is "0" and the AND gate is inhibited whereby the data inputs for all of the RAM sub-units is clamped to "0."

The common output from all the RAM sub-units provided over lead 2412 is connected to the base terminal of an emitter-follower transistor amplifier 2334, the latter having collector and emitter resistors 2336 and 2338 connected to the positive power supply and ground, respectively. Emitter resistor 2338 also provides the line memory outputs over leads 520 and 540 to input-output logic unit 502 and data track record circuit 538 respectively FIG. 5.)

Also connected to emitter resistor 2338 is the output of an inverter 2340, connected to the output of an AND gate 2342. The inputs of AND gate 2342 are connected by leads 2312(a) through 2312(e) to binary decoder unit 2310. As previously mentioned, the RAM sub-units are selected by providing a "0" at the CS input. Thus, a "1" output on any one of leads 2312(a) through 2312(e) indicates that associated RAM subunit is not selected. If signals on all of leads 2312(a) through 2312(e) are "1" this indicates that none of the RAM sub-units is selected. This may occur, for example, during the interval between reset of line memory address register 2314 and first advance pulse on lead 2316.

If all of the inputs to AND gate 2342 are "1" the output of the AND gate is "1" and the output of inverter 2340 is "0". This causes the emitter of transistor 2334, and consequently the line memory output leads 520 and 540 to be clamped to "0", and provides additional output gating for the RAM sub-units when the latter are operatint in the READ mode.

Address register advance OR gate 2318 receives six inputs. A first input on lead 2344 is provided by the output of an AND gate 2346, which receives as its inputs the PLAY signal over lead 2348 from mode select logic unit 550, and the "24-BIT TRANSFER PULSES" over leads 2350 and 2352 from 3-character transfer logic unit 612. AND gate 2346 provides the 24 pulses defining the 3-character transfer sequence through OR gate 2318 to advance address register 2314 when the system is operating in "playback."

A second input to OR gate 2318 is provided over lead 2354 by an AND gate 2356, which receives as inputs, the "24-BIT TRANSFER PULSES" on lead 2352, the RECORD signal on lead 2358 from mode select logic unit 602, and the 3 COUNT signal from 3-character transfer logic unit 612 over lead 2360 indicating the presence of a character in bit positions 17–24 of the shift register, as hereinafter explained. AND gate 2356 provides the 24 three character transfer sequence during record operation to advance register 2314 only, if a character is actually present in the 17th–24th bit positions of the shift register. If the 17th–24th bit positions of the shift register are empty, line memory advance is arrested while the shift register advances to fill the last eight bit positions, whereby empty characters are not stored in the line memory.

The third input to OR gate 2318 is provided over lead 2362 by the output of AND gate 2364, which receives as inputs, the COUNT signal on lead 2360, the $\overline{\text{TAPE RUN}}$ signal over lead 2366 from tape control logic unit 604, the No. 2 output of sequence control logic unit 606 over lead 2368, and the $\overline{\text{ERROR CORRECT}}$ signal over lead 2370 from error correction logic unit 508.

As explained above, the No. 2 output of sequence control logic unit 606 is an eight pulse group for controlling single character transfer from the shift register to the line memory during record operation and from the line memory to the shift register during playback. These operations occur when the tape is not running, when error correction is not in progress, and when a character is present in the 17th – 24th bit postiions of the shift register. Under these conditions, AND gate 2364 operates to advance line memory address register 2314 by eight counts for each cycle of sequence control logic unit 606.

The fourth input to OR gate 2318 is provided over lead 2372 by the TIMING TRACK OUT signal from timing track playback circuit 548 (see FIG. 5). As previously explained, the timing track output signal constitutes a series of pulses, one for each bit in a block of data recorded on the tape. Thus, the TIMING TRACK OUT signal on lead 2372 provided through OR gate 2318 controls advance of line memory address register 2314 during transfer of information from the tape to the line register during playback.

The fifth input to OR gate 2318 is the TIMING TRACK IN signal appearing on lead 2374. This signal is the converse of the TIMING TRACK OUT signal mentioned above and serves to generate the timing track to be recorded on the tape.

The TIMING TRACK IN signal is generated by an AND gate 2376 which receives as its information input, the HIGH FREQUENCY signal over lead 2378 from timing signal generator circuit 610, at 8448 Hz or 7040 Hz, depending on whether the system is operating in the EIA or ASCII format. Control inputs are provided over lead 2380 by the RECORD signal from mode select logic unit 602, over lead 2382 by the TAPE RUN signal from tape control logic unit 604.

The TAPE DELAY COMPLETED signal is provided by the output of tape start delay single shot 2142 (see FIG. 21) and is "0" during the initial 25 milliseconds after the tape begins to run. AND gate 2376 is therefore not conditioned until this signal returns to "1" indicating that the tape has reached operating speed.

Consequently, information is not recorded on the tape during the 25 millisecond start-up time.

Termination of the record sequence occurs when the TAPE RUN signal on lead 2382 returns to "0." As explained hereinafter, this occurs after the entire line of information stored in the line memory has been transferred to the tape and is indicated by the RECORD CYCLE COMPLETED signal on lead 2514 at the output of an AND gate 2516.

The remaining input to OR gate 2318 constitutes the advance pulses for address register 2314 during the erase operation, and is provided over lead 2384 by the output of an OR gate 2386 . The latter receives as a first input, the output of an AND gate 2388 which, in turn receives as an information input, the 84480 Hz CLOCK signal on lead 2390 from master clock 608. Control inputs are provided by the RECORD signal on lead 2380 from mode select logic unit 602, the $\overline{\text{TAPE RUN}}$ signal over lead 2390 from tape control logic unit 604, and the ONE output of a set reset erase ready flip-flop 2418 over lead 2420. The second input is provided by another AND gate 2392 which also receives as its information input, the 84480 Hz CLOCK signal. Control inputs for AND gate 2392 are provided by the $\overline{\text{TAPE RUN}}$ signal on lead 2382, the ONE output of erase ready flip-flop 2418 over lead 2420, and by the output of an OR gate 2422 over lead 2424.

Erase ready flip-flop 2418 is set by the output of an OR gate 2426 connected to the outputs of a pair of AND gates 2428 and 2430. AND gate 2428 receives as inputs, the RECORD and TAPE RUN signals from leads 2380 and 2382 while AND gate 2430 receives as inputs, the $\overline{\text{TAPE RUN}}$ signal from lead 2390, and the output of OR gate 2422 from lead 2424. "OR" gate 2422, in turn, receives as its inputs, the LOAD and PLAY signals from mode select logic unit 602 over leads 2432 and 2434, respectively. The erase ready flip-flop 2418 is therefore set, and the erase operation preconditioned (a) with the system in "record," when the tape starts running to transfer a block (line) of data from line memory 204, at which time the output of AND gate 2428 is "1," or (b) in "playback" or during the load operation, when the tape stops running after transfer of a line of data to the line memory, at which time the output of AND gate 2340 is "1."

The erase operation actually commences after erase ready flip-flop 2418 has been set: a) for record operation, when the tape stops running after transfer of line of data to the tape, at which time the output of AND gate 2388 is "1" for each "CLOCK" pulse, or (b) for playback or load, when the tape begins to run, at which time, the output of AND gate 2392 is "1" for each "CLOCK" pulse. In either case, a clock pulse output of OR gate 2386 sets the erase flip-flop 2416 over lead 2436, and the sequence of clock pulses passes through OR gate 2318 to advance address register 2314 through the erase cycle.

As hereinafter described, the erase operation continues until all of the memory sites in the RAM sub-units have been filled with "0's." This is indicated by a count of 00000000100 in address register 2314, i.e. at "1" at the $2^0$ output of counter sub-unit 2306, and "0's" at all other outputs. This "1" is provided over leads 2308(a) and 2518, as the reset input to erase flip-flop 2416, and as one input to an AND gate 2438. The latter receives as a second input the ONE output of erase flip-flop 2416 over lead 2440. The output of an AND gate 2438 provides the reset input to erase ready flip-flop 2418.

Address register reset OR gate 2414 controls the return of address register 2314 to the reset condition, before and after the erase operation, during the playback and record operations, and when power is applied to the system. For these operations OR gate 2414 receives five different inputs. For reset before and after the erase operation, inputs are provided to OR gate 2414 by the ONE and ZERO outputs of erase flip-flop 2416 over leads 2442 and 2444, AC coupled as indicated by capacitor 2446 and 2448. The reset signals are therefore provided when erase flip-flop 2416 is set, indicating the beginning of an erase cycle, and when erase flip-flop 2416 is reset; indicating completion of an erase cycle.

Address register 2314 is also reset after a line of information is transferred to the line memory. This is accomplished by a signal on lead 2450 AC coupled to the output of an AND gate 2452. The latter receives as its inputs, the PLAY signal over lead 2434 from mode select logic unit 602 and the $\overline{\text{TAPE RUN}}$ signal over lead 2390 from tape control logic unit 604.

For address register reset during record, a fifth input to OR gate 2414 is provided by an AND gate 2520 through an RC delay circuit 2454 The inputs to AND gate 2520 are provided over lead 2522 by the "24TH COUNT" output of three-character transfer logic unit 612 as hereinafter described, and over leads 2358 and 2524 by the RECORD signal from mode select logic unit 602. The output of AND gate 2520 is provided over leads 2526 and 2512 to delay circuit 2454.

As hereinafter explained, the output of AND gate 2520 also initiates temporary storage of the number of bits actually contained in line register 204 at the time a line is ready to be transferred to the tape. Delay circuit 2454 is employed to allow completion of the former operation before the address register 2314 is reset. Also the IC SET signal from sequence control logic unit 606 is provided as an input to OR gate 2414 over lead 2456 to reset the line memory address register to zero whenever power is provided to the system.

Erase flip-flop 2416 controls several additional erase functions besides reset of the line memory address register before and after erase. These are actuation of the WRITE mode for the RAM sub-units, selection of all RAM units for simultaneous erase and clamping of the RAM sub-unit data inputs to "0" whereby "0's" are written into all of the memory sites of the five RAM sub-units.

The simultaneous selection of all RAM sub-units is accomplished by connecting the ONE output of erase flip-flop 2416 over lead 2440 in common through a set of five inverters 2458(a) through 2458(e), to the "CS" inputs of the respective RAM sub-units. When erase flip-flop 2416 is set, the signal on lead 2440 is "1," and the outputs of inverters 2458(a) through (e) are "0." This selects all of the RAM sub-units for operation irrespective of the state of binary decoder 2310, the outputs of which are forced to "0" by inverters 2458(a) - (c).

As previously explained, during the erase operation, line memory address register 2314 is advanced at the clock frequency of 84480 Hz. Register 2314 is cycled through 256 counts, i.e. the bit capacity of each of the RAM sub-units. All of sub-units are erased simultaneously under control of inverters 2458(a) - (e). Other methods of accomplishing the erase function are also possible, but the above described method is particularly preferred because of the extreme speed with which the erase operation can be accomplished. For example, operating at 84480 Hz, the entire 1280 bit capacity of line memory 204 is erased in approximately three milliseconds. This permits the erase operation and any other required operations to take place during the tape start-up delay in playback or load operation and during the tape stop period in record without delaying in any way the subsequent operations.

Locking of the RAM sub-units in the WRITE mode is accomplished by providing the ONE output of erase flip-flop 2416 over lead 2440 as an input to an OR gate 2460, the output of the latter being connected to read-write select lead 2408 previously described.

The read-write operation of the RAM sub-units for modes of operation other than erasure is controlled by a second input to OR gate 2460 over lead 2462. The latter is connected to the output of an AND gate 2394 receiving as a first input over lead 2396, the output of another AND gate 2464 through an inverter 2466. The latter, in turn, receives as its inputs, the TAPE DELAY COMPLETED signal over leads 2398 and 23100 from tape control logic unit 604, and the output of OR gate 2426 over lead 2468. AND gate 2464 and inverter 2466 provide an inhibit signal for AND gate 2394, i.e., a "0" input whenever erase ready flip-flop 2418 is set and the tape start-up delay period is not in progress.

The other input for AND gate 2394 is provided by a pulse delay circuit 23102, including an RC input coupling circuit and emitter follower transistor amplifier. The line memory address register advance signal on lead 2316 at the output of OR gate 2318 is coupled through an RC input circuit comprising a series resistor 23104 and a shunt capacitor 23106. The common connection between resistor 23104 and capacitor 23106 is connected to the base terminal of an emitter follower transistor 23108 having its collector terminal connected to the positive power supply through a resistor 23110 and its emitter connected to the negative power supply through a resistor 23112. The emitter terminal of transistor 23108 is A.C. coupled through a capacitor 23114 as the signal input to AND gate 2394.

The pulse outputs of OR gate 2318 are slightly delayed by the RC coupling circuit and emitter follower transistor 23108 and are then differentiated by capacitor 23114 to produce a series of narrow pulses slightly delayed from the leading edge of the line memory address register advance pulses produced by OR gate 2318, but before the trailing edge of the associated pulse. The positive pulses activate AND gate 2394 if the output of inverter 2466 is "1" thereby producing a series of narrow positive pulses on read-write select lead 2408. These pulses which actually initiate the write operation, also preceed the trailing edge of the advance pulse whereby the write operation is completed before address register 2314 is advanced on the trailing edge of the advance pulse. It will be appreciated, of course, that a "1" signal on lead 2440 from erase flip-flop 2416 overrides the read-write pulse signal provided over lead 2462 whereby the R/W inputs to all the RAM sub-units are clamped at the "1" level for the entire duration of the erase operation.

The remaining function of the circuitry illustrated in FIGS. 23–25 is to control the duration of the portion of the record cycle in which the line of information is transferred from line memory 204 to the tape. As will be recalled, the corresponding portion of the playback operation, namely the transfer of an entire line of information from the tape to the line memory is controlled by the presence of timing pulses in a second or timing track previously recorded on the tape. For the record operation, however, the information transfer interval is controlled by counting the total number of bits stored in the line memory at the beginning of an information transfer sequence. This is indicated by the count contained in line memory address register 2314. The count is stored temporarily, and the address register is reset. As it counts up from zero during information storage on the tape, the current count is compared with that previously stored. When the two counts agree, all of the previously stored information has been transferred to the tape, and the transfer operation may be terminated.

Storage of the count contained in line memory address register 2314 is accomplished by means of an 11-bit latch memory circuit 2528 comprising two four-bit latch sub-units 2530 and 2532 and a three-bit latch unit 2534. Latch circuits 2530–34 are preferably commercially available integrated circuit devices such as four-bit latch circuit type SN7475 manufactured by Texas Instruments, Inc.

Latch circuits 2530 through 2534 have clock inputs "C", information inputs J, and information outputs Q. In response to a clock input of "1," information appearing at the J inputs is stored and appears at the respective Q outputs upon termination of the clock signal.

Four-bit latch circuit 2530 has its four signal inputs, denoted $J_0$, $J_1$, $J_2$, and $J_3$ respectively, connected by means of eight-wire cable 2406 to the $2^0$, $2^1$, $2^2$, and $2^3$ outputs respectively of binary counter sub-unit 2302 Similarly, four-bit latch circuit 2532 has its four inputs $J_0$, $J_1$, $J_2$ and $J_3$ connected over eight-wire cable 2406 to the $2^0$, $2^1$, $2^2$, and $2^3$ outputs, respectively, of binary counter sub-unit 2304. Finally, 3-bit latch circuit 2534, which is constructed identically to latch circuits 2528 and 2530 except for non-employment of the fourth latch circuit capability, has its first three inputs $J_0$, $J_1$, and $J_2$ connected respectively over three-wire cable 2308 to the $2^0$, $2^1$, and $2^3$ outputs, respectively, of binary counter sub-unit 2306.

The clock inputs for latch circuits 2528–2532 are provided in common over lead 2524 by the output of AND gate 2520 as previously described. Thus, when the clock inputs of the latch circuits are actuated, the signals at the respective J inputs, corresponding to the 11-bit address of the then selected memory site in line memory 204, are stored in the 11-bit positions of the latch memory. These are used as the reference inputs to an 11-bit comparator circuit 2536 hereinafter described. The signal on lead 2524 is also provided through delay cicuit 2454 and OR gate 2414 to reset counter sub-units 2302, 2304 and 2306 to "0" shortly after latch memory 2528 has been set.

As soon as the address of the last memory site employed in storing information in the line memory has been recorded, the line memory address register is reset and begins to advance again under control of AND gate 2376 and OR gate 2318. At this time, information is transferred on a bit-by-bit basis from the line memory to the tape. As register 2314 advances, the count represented by the 11-bit binary output is compared with the count stored in the 11-bit position of latch memory 2528 by means of 11-bit comparator circuit 2536

The latter comprises a first bit position comparator circuit 2538 comprising an EXCLUSIVE OR circuit 2540, the output of which is connected to an inverter 2542. EXCLUSIVE OR circuit 2540 receives as a first input over lead 2544, the $Q_0$ output of four-bit latch circuit 2530. The other input is provided by 8-wire cable 2406 and lead 2546 from the $2^0$ output of binary counter sub-unit 2302 in line memory address register 2314.

As will be appreciated, the circuit described compares the $2^0$ bit of the address of the last memory site containing data — as stored in latch circuit 2530—with the value of the $2^0$ bit of the address of the memory site being recorded on the tape. As described in connection with FIG. 7(d) above, the EXCLUSIVE OR circuit 2540 provides a "1" output if and only if the two inputs on leads 2544 and 2546 are different. Therefore, if both inputs are either "1" or "0", the input to inverter 2542 is "0" and the inverter output on lead 2548 (a) is "1".

This indicates coincidence between the reference value of the $2^0$ bit and the current value.

The comparator circuits for the remaining ten bits of the eleven-bit address are identical to comparator circuit 2538 just described, and for convenience of illustration, are shown as a single block 2550. Inputs for comparator circuits 2550 are provided by the $Q_1$, $Q_2$, and $Q_3$ outputs of latch circuit 2530, by the $Q_0$, $Q_1$, $Q_2$, and $Q_3$ outputs of latch circuit 2532, and by the $Q_0$, $Q_1$, and $Q_2$ outputs of latch circuit 2534. The current inputs for the $2^1$, $2^2$, and $2^3$ outputs of binary counter sub-unit 2302, and for the $2^0$, $2^1$, and $2^3$ outputs of binary counter sub-unit 2309 are provided by the remaining respective seven leads of 8-lead cable 2406. The inputs corresponding to the $2^0$, $2^1$, and $2^2$ outputs of binary counter sub-unit 2306 are provided by the respective three leads of three-lead cable 2308.

The 10 outputs for comparator circuits 2550 are provided over ten respective leads 2548(b) through (k) of an eleven wire cable 2548 including lead 2548(a). A "1" on any of leads 2548(a) through (k) represents coincidence between the respective bits of the current count of line memory address register 2314 and the count previously stored in latch memory 2528. When the signals on all of leads 2548 are "1", this indicates that the current address matches the stored reference address.

To determine the latter condition, the individual leads of cable 2548 are provided as information inputs to a 14-input AND circuit 2516 previously mentioned. The control inputs for AND circuit 2516 are provided over leads 2552 and 2554 by the TAPE RUN and TAPE DELAY COMPLETED signals, from tape control logic unit 604, and over lead 2556 by the RECORD ACTUATE signal from mode select logic unit 602. When the tape is running, when the system is in the RECORD mode, and when the 25 millisecond tape start-up delay is completed, a match of the current address and the prestored reference address produces a "1" at the output of AND circuit 2516 over line 2514 indicating that the transfer of the entire contents of line memory 204 has been completed. As previously described, the RECORD CYCLE COMPLETED signal is provided to tape control logic unit 604 (see FIG. 21) and initiates reset of the tape run flip-flop 2166, thereby stopping the tape, and initiating the line memory erase sequence as described above.

Character Identification and Search Logic

Figures 27, 29:
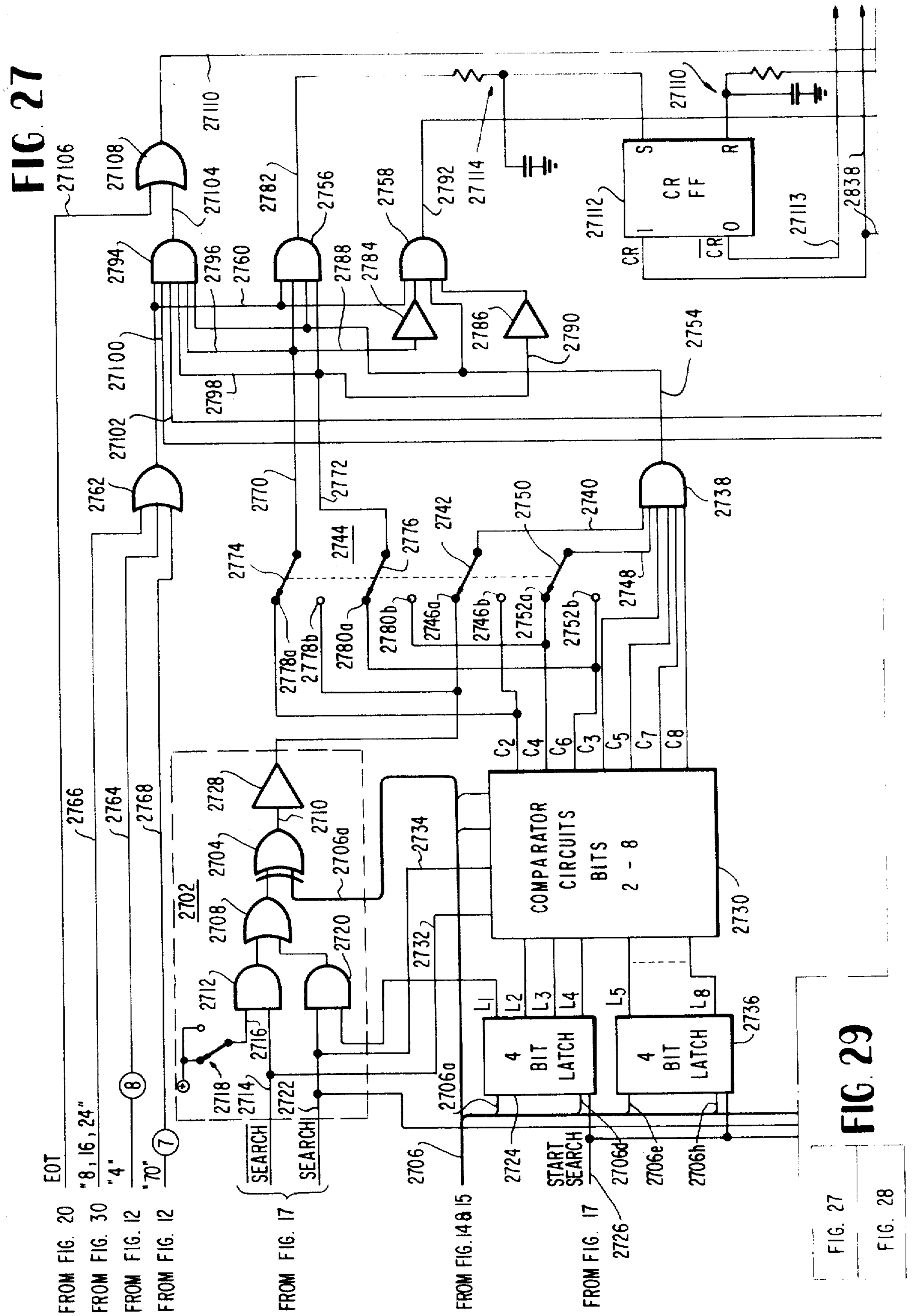
FIGS. 27 – 28, arranged as shown in FIG. 29, illustrate the details of the character identification and search logic.
Figure 28:
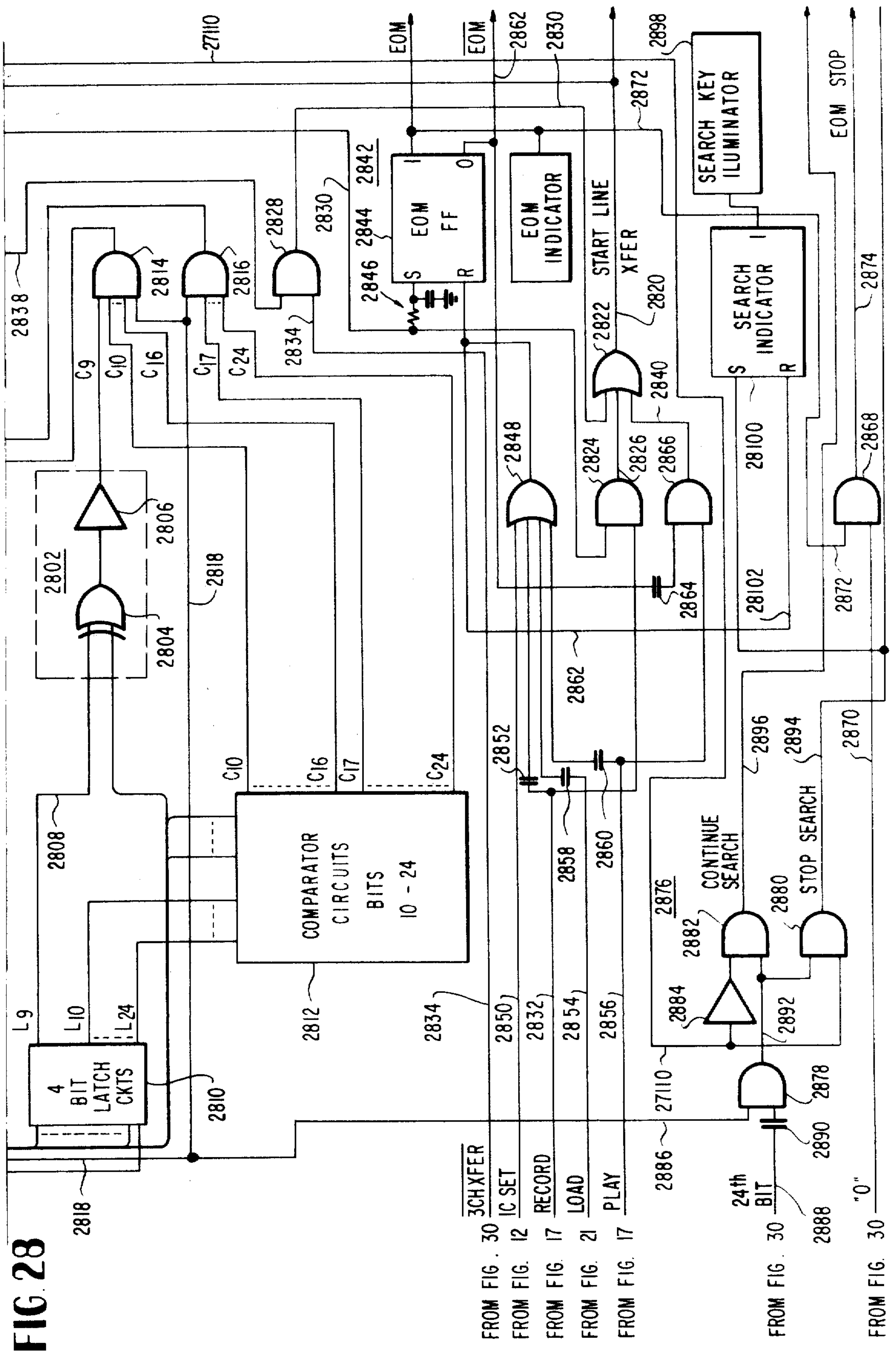

FIGS. 27 and 28, arranged as shown in FIG. 29, illustrate character identification and search logic unit 560. The purpose of this portion of the system is to detect either the "CARRIER RETURN" or "END OF MESSAGE" code word in the first 8 bit positions of shift register 504, and also to detect a 3-character sequence in the shift register representing a message address or identifier code by which a particular recorded message can be recognized and located.

Character identification and search logic unit 560 operates by comparing information in the shift register on a bit-by-bit basis with pre-established reference information. Coincidence of all bits indicates that the character or characters in question have been identified. For character identification, i.e. "CARRIER RETURN" or "END OF MESSAGE" a pre-stored reference code is employed. For search operation, the reference identifier code is established by typing the desired three-character code on printer 102, and the resulting information in the shift register is stored in a temporary memory circuit.

The current input to the shift register for the comparison is provided by the normal course of system operation for the character recognition function, i.e. each character which passes through the shift register is inspected.

For the search, however, only the first three characters in a line need be inspected since an identifier code appears only in that location. A special sequence of operations is thus provided wherein a line is transferred to line memory 204, and its first three characters are placed in the shift register under control of the three-character transfer logic unit 612. The search operation is then performed. If the required characters are located, the search stops, otherwise a new line is transferred to the line memory and the process is repeated until the search is successful.

For the character identification functions, advantage is taken of the fact that the code words (both in ASCII and EIA formats) for CARRIER RETURN and END OF MESSAGE differ in only two bit positions. Thus, common comparison circuitry is employed for six of the eight bits. Further, because the character identification operation does not take place, i.e. is not needed, during the search operation and vice versa, common comparison circuitry is employed for the character recognition functions and for the recognition functions associated with the first character for the three-character search.

Amplifying on the foregoing, reference to Table ONE above shows that the code words for CARRIER RETURN ("C.R.") and END OF MESSAGE ("EOM") in the EIA format are "10110111" and "11110011" respectively, assuming even parity. For the ASCII format, the corresponding code words are "10110001" and "00100001" also assuming even parity. [The last bit ("1") is the "stop" bit in the EIA code format.]

Comparing the four code words, it may be seen that bits 3,5,7 and 8 are common to "CR" and "EOM" for both EIA and ASCII, i.e. for the former, bits 3,5,7 and 8 are "1011" and for the latter they are "1001". Further, for EIA, bits 1 and 4 (11) are common, and for ASCII, bits 2 and 6 (00) are common. Thus, if the six common bits in each case (1, 3, 4, 5, 7 and 8 for EIA, 2, 3, 5, 6, 7, and 8 for ASCII) are compared with the respective reference bits, full coincidence indicates that either C.R. or EOM has been recognized.

For the other two bits (bits 2 and 6 for EIA and bits 1 and 4 for ASCII) if the reference values are chosen to correspond to one of the code words, e.g. "C.R.," coincidence of these bits, together with the six-bit coincidence indicates recognition of the C.R. code word. Conversely, if neither of the two bits match the reference bits, but the other six bits do match, this indicates recognition of the EOM code word.

For the search operation, eight bit coincidence between the current character code and the reference code is required, irrespective of format. So that the above-mentioned six-bit comparison circuity may be employed for both character detection and search, a separate circuit is employed to test for coincidence of the two bits not included in the six bit test.

The circuitry for accomplishing these functions is comprised of a first bit comparator 1402 including an EXCLUSIVE OR circuit 2704 having a first input connected to one lead 2706(a) of a 24 wire cable 2706. The 24 individual wires are connected respectively to the 24 bit position outputs of shift register 504, wire 2706(a) being connected to the first bit position. This provides the bit No. 1 input for comparison with the pre-established reference value for the first bit. The reference input to EXCLUSIVE OR circuit 2704 is provided by an OR gate 2708 over lead 2710. A first input to OR gate 2708, representing the reference value of the first bit of the character identification code, is provided by the output of an AND gate 2712 which receives as a control input over lead 2714, the $\overline{\text{SEARCH}}$ signal from mode select logic unit 602. This signal is "1" when the system is not operating in the search mode, whereby AND gate 2712 provides the reference value for the first bit only when a three-character search is not in progress.

The value of the first bit reference information is established by a signal appearing on lead 2716 connected to a moving contact of a two-position switch 2718. The position of switch 2718 is determined by whether the system is operating in the EIA or ASCII format, and the stationary contacts are labelled "EIA" and "ASCII" accordingly. For convenient operation, the moving contact of switch 2718 is mechanically coupled to the EIA – ASCII selection switch 1716 (see FIG. 17,) however, a separate switch or electronic gating responsive to the "EIA" and "ASCII" format signals generated by switch 1716 may also be employed.

The EIA and ASCII contacts of switch 2718 are adapted to be connected either to the positive power supply or to ground, the particular connection being determined by whether the first bit of the "C.R." code is a "1" or "0" in the respective EIA or ASCII formats. As explained above, the first bit of the "C.R." code words is "1" for both EIA and ASCII. Thus, both the EIA and ASCII contacts are connected to the power supply denoting that the first reference bit is always "1."

The reference input for operation in the search mode is provided by a second input to OR gate 2708 from a further AND gate 2720. The latter receives as a control input the "SEARCH" signal over lead 2722 from mode select logic unit 602. This signal is "1" only when a three-character search is actually in pgoress, i.e. after Search Key 312 has been released, as explained in connection with FIG. 17 whereby AND gate 2720 provides the reference value for the first bit only during a search.

The signal input for AND gate 2720, representing the first bit of the three-character search code is provided over lead 2722 by a first output $L_1$ of a four-bit latch circuit 2724. Latch circuit 2724 is preferably identical in construction to latch circuit 2530 described above in connection with FIG. 25. Four signal inputs are provided over leads 2706(a) – (d) by the outputs of the respective 1st – 4th bit positions of shift register 504. The four outputs are denoted $L_1$ – $L_4$.

The clock input for latch circuit 2724 is provided by the START SEARCH signal from mode select logic unit 602 on lead 2726. Since the start search signal is "1" for a brief interval after entry of the 3rd search address character, the latch circuit stores the value of the information in the first four bit positions of the shift register at that time.

The output of OR gate 2708 is compared with the actual value of the signal in the first bit position of shift register 504 by EXCLUSIVE OR circuit 2704. As previously explained in connection with FIGS. 7(d) and 25, the EXCLUSIVE OR circuit produces a "1" output only if the two inputs are different, and a "0" output if the inputs are the same. An inverter 2728 coupled to the output of EXCLUSIVE OR circuit 2704 thus produces a $C_1$ signal of "1" when the first bit of the character code word in bit positions 1 14 8 of the shift register matches the reference signal stored either in latch circuit 2724, or in switch 2718 depending on whether or not the system is operating in the "SEARCH" mode.

Bit coincidence signals $C_2$ through $C_8$ for shift register bit positions 2 through 8 are generated by seven additional comparator circuits identical to comparator circuit 2702. For ease of illustration, these are shown as a single block 2730 having control inputs provided over leads 2732 and 2734 respectively, by the SEARCH and $\overline{\text{SEARCH}}$ signals from mode select logic unit 602, and information inputs provided over leads 2706(b) through (h) of 24-wire cable 2706 connected to the shift register outputs for bit positions 2 through 8, respectively.

The individual comparator circuits each include a 2-position switch like switch 2718 (and mechanically coupled to it for convenient operation) to establish the character identification reference values for the "CARRIER RETURN" code word. As explained above, these are "0110111" for EIA, and "0110001" for ASCII. The reference values for the SEARCH operation are provided by the $L_2$ through $L_4$ outputs of latch circuit 2724 for bits 2 through 4, and by the $L_5$ – $L_8$ of another latch circuit 2736 identical to latch circuit 2724. Latch circuit 2736 has its inputs coupled by leads 2706(e) – (h) to the shift register outputs for bit positions 5 through 8, and its clock input coupled to the "START SEARCH" signal on lead 2706.

As previously pointed out, the 3rd, 5th, 7th and 8th bits of the "CARRIER RETURN" code word for the EIA and ASCII formats match the corresponding bits in the "EOM" code words for the respective formats. Also, for the EIA format, bits 1 and 4 are the same in the two code words as are bits 2 and 6 in the ASCII format. Thus, for the EIA format, if coincidence signals $C_1$, $C_3$, $C_4$, $C_5$, $C_7$, and $C_8$ are all "1" the "CARRIER RETURN" or the "EOM" code words may be present in shift register bit positions 1 through 8. Similarly for the ASCII format, if coincidence signals $C_2$, $C_3$, and $C_5$ through $C_8$ are all "1,"then the "CARRIER RETURN" or "EOM" code word may be present.

To determine the existence of the aforestated conditions, there is provided a 6 input AND gate 2738 which receives as four of its inputs, the $C_3$, $C_5$, $C_7$, and $C_8$ outputs of comparator circuits 2730, and either the $C_1$ and $C_4$ signals for the EIA format, or the $C_2$ and $C_6$ signals for ASCII. The $C_1$ or $C_2$ input is provided over lead 2740 by a moving contact 2742 of a two-position switch 2744, mechanically coupled to switch segment 2718, previously described. Two fixed contacts, 2746*a* and 2746*b* are connected respectively to comparator circuits 2702 and 2703 to provide the $C_1$ or $C_2$ signals, depending on the position of contact 2742.

Similarly, the $C_4$ or $C_6$ input is provided on lead 2748 by a moving contact 2750 of switch segment 2744, the associated fixed contacts 2752*a* and 2752*b* being connected respectively to the $C_4$ and $C_6$ outputs of comparator circuit 2730.

A "1" output of AND gate 2738 on lead 2754 indicates that the six bits which are common to the "CARRIER RETURN" and "EOM" code words are present in the respective ones of the first 8 bit positions of shift register 504, i.e. bit positions 1,3,4,5,7 and 8 for EIA, and bit positions 2,3, and 5 through 8 for ASCII.

To determine which, if either of the "CARRIER RETURN" or "EOM" code words is actually present in the shift register, the non-common bits 2 and 6 for EIA, and 1 and 4 for ASCII are tested for coincidence. This is accomplished by a pair of AND gates 2756 and 2758, each of which receives the 6 bit coincidence signal over lead 2754 from AND gate 2738 and also a control input over lead 2760 from the output of an OR gate 2762. One input to OR gate 2762is provided over leads 2764 by the No. 8 output of sequence control logic unit 606, a pulse corresponding to the 4th count of each cycle of 88 pulse counting chain 1202(see FIG. 12,) The second input is provided over lead 2766 by the "8, 16, 24" signal from three character transfer logic unit 612, a group of three pulses at the end of each 8-bit portion of the 24 bit (3 character) transfer sequence.

A third input for OR gate 2762 is provided by the No. 7 output of sequence control logic unit over lead 2768. This corresponds to the 70th count of the operating cycle of counter 1202 In effect the No. 8 signal tests for character coincidence at the beginning of an 8-bit transfer sequence while the No. 7 signal tests at the end of an 8-bit transfer sequence. These are used for parallel and serial operation respectively and are redundant otherwise. The "8, 16, 24" signal tests for character coincidence after each part of the three character transfer sequence has been completed. At all of these times, but only at such times is a complete character present in the first eight bit positions of the shift register.

AND gate 2756 receives inputs over leads 2770 and 2772 from a pair of moving contacts 2774 and 2776 of switch 2744. Fixed contacts 2778*a* and 2778*b* associated with moving contact 2774 are connected to $C_2$ and $C_1$ signals, respectively. Fixed contacts 2780*a* and 2780*b* associated with moving contact 2776 are connected respectively to the $C_6$ and $C_4$ signals.

This if the 6 bit coincidence signal on lead 2754 is "1", and "1's" are present on leads 2770 and 2772, the all 8 bits match the stored reference for the "CARRIER RETURN" code word. At the beginning and end of each 8-bit transfer sequence, and at the 8th, 16th, and 24th counts of each 24th bit transfer sequence, AND gate 2756 is activated, and produces a "1" on lead 2782 if all eight bits match, indicating that the CARRIER RETURN code word has been detached.

Referring to AND gte 2758, the third and fourth inputs are provided by the outputs of a pair of inverters 2784 and 2786. Inverter 2784 is connected by leads 2788 and 2770 to moving contact 2774 of switch 2744 Inverter 2786 is connected over leads 2790 and leads 2770 to moving contact 2776 of switch 2744. Since the outputs of inverters 2784 and 2786 are "1" only when the respective coincidence signals are "0" the two inputs to AND gate 2758 are "1" only if neither of the two bits in question match the reference values for the "CARRIER RETURN" code word. Under these circumstances, if the 6 bit coincidence signal on lead 2754 is "1" the character then in the first 8 bit positions of the shift register is known to be the "EOM" code word-.Again,at the beginning and end of the 8th bit transfer sequence or at the counts of 8, 16, or 24 of the 24-bit transfer sequence, AND gate 2758 is actuated and produces a "1" output on lead 2792 if the common 6 bits match, and if neither of the remaining two bits match, indicating that the "EOM" code word has been detected.

Since AND gate 2738 operates during the search mode, as well as when a search is not in progress, the 6-bit comparison signal appearing on lead 2754 also indicates that 6 of the 8 bits contained in the first eight bit positions of shift register 504 match the stored reference values for the search operation. To utilize this signal in testing for eight bit search coincidence, bit coincidence signals for the two omitted bits, viz. bits 1 and 4 for the ASCII format, and bits 2 and 6 for the EIA format are also required.From inspection of FIG. 27, it may be seen that whatever the position of switch 2744, the two of the four coincidence signals $C_1$, $C_2$, $C_4$ and $C_6$ not provided on moving contacts 2742 and 2750 are provided on contacts 2774, and 2776. Specifically, with switch 2744 in the position shown, contact 2742 provides the $C_1$ signal, contact 2750 provides the $C_4$ signal, contact 2774 provides the $C_2$ signal, and contact 2776 provides the $C_6$ signal. For the other switch position contact 2742 provides the $C_2$ signal, contact2750 provides the $C_6$ signal, contact 2774 provides the $C_1$ signal, and contact 2776 provides the $C_4$ signal.

Thus, if the signals on contacts 2774 and 2776, and the 6 bit coincidence signal on lead 2754 are all "1,"then all of coincidence signals $C_1$ – $C_8$ must be "1."This condition is determined by use of an AND gate 2794 which receives as inputs, the 6 bit coincidence signal on lead 2754, and the signal outputs of switch contacts 2774 and 2776 over leads 2796 and 2798. Additional inputs comprise a gating signal provided over lead 2760 from the output of OR gate 2762 previously described, and two other inputs provided over leads 27100 and 27102 indicating coincidence between the two characters contained in shift register bits positions 9 through 24 and the corresponding bits of the search reference characters.

To develop identification signals for the 2nd and 3rd characters contained in shift register bit positions 9 through 24, 16 additional comparator circuits are provided, one of which is shown in detail at 2802. The circuit is generally similar to comparator circuit 2702 described above, but it provides bit comparison capability only for the search operation.

Comparison circuit 2802 simply comprises an EXCLUSIVE OR circuit 2804, the output of which is connected to an inverter 2806. A first input to EXCLUSIVE OR circuit 2804 is provided over lead 2706(i) from the 9th bit position output of shift register 504. The reference input is provided over lead 2808 by one output of a four-bit latch circuit identical to 4-bit latch circuits 2724 and 2736. For convenient illustration, the latch circuit providing the 9th bit reference signal $L_9$, and reference signals $L_{10}$ through $L_{12}$ for bits 20 through 12, is grouped with three other identical latch circuits providing the reference signals $L_{13}$ through $L_{24}$ for the respective 13th through 24th shift register bit in a single unit designated 2810. The latter receives information inputs through respective ones of the wires in 24-wire cable 2706 from the shift register. A control input is provided over lead 2726, by the "START SEARCH" signal from mode select logic unit 602. Whenever the contents of the 9th bit position of the shift register matches the $L_9$ signal, the output of EXCLUSIVE OR circuit 2804 is "0" and the $C_9$ output of inverter 2806 is "1."

The coincidence signals $C_{10}$ through $C_{24}$ for the respective shift register bit positions 10 through 24 are provided by a series of 15 comparator circuits identical to comparator circuit 2802 just described. For convenience, these circuits are grouped in a block designated 2812 which receives the shift register outputs for the 10th through the 24th positions over leads 1406(j)–(x) and reference signals for bits 10 through 24 from the respective $L_{10}$ through $L_{24}$ outputs of latch circuits 2810. Comparator circuits 2812 operate identically to circuit 2802 to provide coincidence signals $C_{10}$ through $C_{20}$ which are "1" if the respective shift register contents match the respective reference signals.

The $C_9$ through $C_{16}$ coincidence signals are connected as the information inputs to an AND gate 2814 while coincidence signals $C_{17}$ through $C_{24}$ are connected as the information inputs to a second AND gate 2816 The control inputs for AND gates 2814 and 2816 are provided in common over lead 2818 by the SEARCH signal from mode select logic unit 550. Thus, whenever the system is operating in the search mode, and coincidence signals $C_9$ through $C_{16}$ are all "1" the signal on lead 1478 is also 37 1." Similarly, during search, if coincidence signals $C_{17}$ through $C_{24}$ are all "1," the output of AND gate 14106 over lead 1480 is also "1."These signals, indicating bit-by-bit coincidence between the 2nd and 3rd characters in the shift register and the stored search reference characters are provided as inputs to AND gate 1472 as previously mentioned. Thus, after the 24-bit transfer sequence, if all of the information inputs to AND gate 2794 are "1" this indicates that all three characters in the shift register match the reference characters whereby the search has been successfully completed. This is indicated by a "1" output of AND gate 2794 on lead 27104, and serves to halt the search operation as hereinafter amplified.

Also, as will be appreciated, if an entire cassette has been played through and the search has not been successful, further continuation of the search operation is futile and must be halted. For this purpose, the EOT signal from tape drive unit 142 (se FIGS. 5 and 20) is provided over lead 27106 as one input to an OR gate 27108, the other input to which is provided by the signal on lead 27104. The output of OR gate 27108, on lead 27110 is thus an indication of the state of the search operation. This signal is "1" if the search is successfully completed, or if further search is futile, and is "0" if the search should continue.

The "CARR. RET.," "EOM" and "SEARCH COINCIDENCE" signals appearing on leads 2782, 2792 and 27110, respectively, are employed to generate the signals by which operation of the system is to be controlled when the "CARR. RET." or "EOM"characters are detected, or during the search operation.

The principal purpose of detecting the "EOM" code word is to halt the playback operation after a message has been completed. During record, no particular function is attributed the "EOM" character, but this character must be stored on tape for later use during playback. As a practical matter, the "EOM" character code may replace or supplement the "CARR. RET." code word at the end of a message, but to assure uniformity of format, it is preferred that the system be operated such that upon completion of a message, the carrier return key is depressed,thereby storing the last line of the message, after which the end of message key 316 (see FIG. 3) is depressed. As explained below, this has the effect of storing the "EOM" character as the sole contents of another line on the tape.

As described above generation and storage of the "EOM"code word is accomplished under control of the end of message key 316 which produces the pattern of "1's" and "0's" the eight bit "EOM"code word, along with the ENTER EOM signal. The eight bits are stored in the shift register in the same manner as other parallel inputs, while the ENTER EOM signal actuates the parallel data entry operation.

From the standpoint of system operation during record, whenever the "EOM" character is detected the same sequence of operations must take place as in the case of detection of "CARR. RET." code word. As will be recalled, these functions are initiated by the START LINE TRANSFER signal (see FIG. 21) which turns on tape run flip-flop 2166 through the operation of tape start delay single shot 2142 and OR gates 2144 and 2148.

As shown in FIG. 28, the START LINE TRANSFER signal is provided over lead 2820 by an OR gate 2822. The latter receives as inputs the output of an AND gate 2824 over lead 2826 representing detection of the EOM character, and the output of an AND gate 2828 over lead 2830 representing detection of the CARR. RET. character.

AND gate 2824 receives as its inputs the RECORD signal over lead 2832 from mode select logic unit 602, and the EOM signal over lead 2792.Thus, whenever the "EOM" code word is detected and the system is recording, the START LINE TRANSFER signal on lead 2820 is "1."

AND gate 2828 receives as its inputs, the $\overline{3\ CH.\ XFER}$ signal from three character transfer logic unit 612 over lead 2834, and the "one" output of a set-reset carrier return flip-flop 27112 over lead 2838. The carrier return flip-flop receives its set input over lead 2788 from the carrier return AND gate 2756 through an RC delay circuit 27114. The reset input is provided by the START LINE TRANSFER signal on lead 2820 through an RC delay circuit 27116. Thus if the CARR. RET. code word is detected, flip-flow 27112 is set. If the three-character transfer operation is not in progress, or has been completed as hereinafter explained, AND gate 2828 operates to generate the START LINE TRANSFER signal. The latter, in turn, resets flip-flop 27112 after a short delay and the AND gate 2828 is again inhibited.

A 3rd input to OR gate 2822 over lead 2840 provides for restart of the line transfer operation after the "EOM" code word is detected during playback. As will be recalled, the EOM signal on lead 2792 is provided on lead 1750 through OR gate 1744 to reset playback flip-flop 1738. Thus, detection of the "EOM" code word causes the playback operation to be interrupted. Merely resetting the playback flip-flop is not sufficient to restart the playback cycle since it is the START LINE TRANSFER signal on lead 2820 which is provided over lead 2150 to trigger the tape start delay single shot 2142.

To accomplish the foregoing, an additional logic circuit generally denoted 2842 is provided, the purpose of which is to "remember" that the "EOM" code word has been recognized. The circuitry comprises a set-reset end of message flip-flop 2844 having its set input provided by the EOM signal on lead 2792 through an R-C relay circuit 2846 and its reset input provided by the output of four-input OR gate 2848. The latter receives as one input, the IC SET signal from sequence control logic unit 606 over lead 2850, thereby assuring that end of message flip-flop 2844 is in its reset condition when power is turned on.

A second input to OR gate 2848 is provided by the RECORD signal on lead 2832, AC coupled through capacitor 2852 from mode select logic unit 602.

The 3rd and 4th inputs to OR gate 2848 are provided over leads 2854, by the LOAD signal from tape control logic unit 604, and over lead 2856 by the PLAY signal from mode select logic unit 602. As explained below, the playback operation is stopped in response to detection of the "EOM" code word by resetting playback flip-flop 1738 (see FIG. 17.) When either the load key 304 (see FIGS. 3 and 21) or playback start key 308 (see FIGS. 3 and 17) is next depressed, signalling that the playback operation is to be restarted, the signal on lead 2854 or 2856 becomes "1," and is AC coupled through respective capacitors 2858 and 2860 and OR gate 2848 to reset the end of message flip-flop 2844.

The "one" output of end of message flip-flop 2844 is provided to end of message indicator 322 (see FIG. 3) providing the operator with a visual indication that the end of message character has been identified.

The zero output of end of message flip-flop 2844 on lead 2862 is AC coupled by capacitor 2864 to one input of an AND gate 2866, the other input to which is provided by the PLAY signal from mode select logic unit 602 over lead 2860. As will be recalled, one of the reset inputs for end of message flip-flop 2844 from OR gate 2846 is also provided by the PLAY signal. Since reset of flip-flop 2844 causes the ZERO output on lead 2862 to become "1," a pulse is provided through capacitor 2856 to AND gate 2866. If the PLAY signal is also "1" at that time, i.e. if it is the PLAY signal which caused end of message flip-flop 2844 to be reset, the output of AND gate 2866 on lead 2840 will be "1," and a START LINE TRANSFER signal is generated on lead 2820 by OR gate 2822.

On the other hand, if end of message flip-flop 2844 is reset by a signal other than the PLAY signal, the output of AND gate 2866 remains "0." It may therefore be seen that the START LINE TRANSFER signal is "1" when the "CARR. RET." code word is sensed, when the "EOM" is sensed during record operation or, when playback operation, interrupted by detection of the "EOM" character is resumed.

The EOM character is sensed when it is in the first character position of shift register 504. However, this character must be transmitted in remote playback operation to advise the remote station that a message has been completed. Playback operation must continue, therefore until the EOM code word is transmitted out of the shift register by serial output circuit 950 previously described. To permit playback operation to continue, there is provided a logic circuit including an AND gate 2868 which has as a first input a "0 count" signal from three character transfer logic unit 612 over lead 2870, indicating that the shift register is, in fact, empty. A second input for AND gate 2868 is provided over lead 2872 by the "one" output of EOM flip-flop 2844, and is "1" after detection of the EOM character. Thus, when the shift register is empty after detection of EOM, the EOM code word has been transferred out, and playback may cease. AND gate 2868 is then activated and the EOM STOP signal is generated on lead 2874. This signal operates to reset playback flip-flop 1738 as previously described.

The remaining logic circuitry shown in FIG. 28 serves to generate the CONTINUE SEARCH and STOP SEARCH signals for use elsewhere in the system. The circuitry, generally denoted at 2876 comprises three AND gates 2878, 2880 and 2882, and an inverter 2884. The inputs to AND gate 2878 are provided over leads 2722 and 2886 by the SEARCH signal from mode select logic unit 602, and by the 24TH COUNT signal over lead 2888 from 3-character transfer logic unit 612, AC coupled through capacitor 2890.

The output of AND gate 2878 is provided over lead 2892 as the control input to both AND gates 2880 and 2882. The information inputs to AND gates 2880 and 2882 are provided by the SEARCH COINCIDENCE signal over lead 27110 by the output of OR gate 27108. This signal is coupled directly to AND gate 2880 and to AND gate 2882 through an inverter 2892. Thus, when the 24th COUNT signal is "1" (denoting the end of a 3-character transfer sequence as explained below) and the system is operating in the search mode, the output of AND gate 2878 is "1" and AND gates 2880 and 2882 are conditioned. Then, if the SEARCH COINCIDENCE signal on lead 27110 is "1" the search operation is completed and the STOP SEARCH signal is generated on lead 2894.

On the other hand, if the SEARCH COINCIDENCE signal on lead 27110 is "0" at that time, then the output of inverter 2892 is "1" and AND gate 2882 is actuated to produce a "1" value for the CONTINUE SEARCH signal on lead 2896.

Completion of a search operation is indicated by illumination of an indicator 2898 contained in search key 312. Indicator 2898 is operated by a set reset search indicator flip-flop 28100 which receives as its set input over lead 2894, the STOP SEARCH signal. The reset input is provided over lead 28102 by the output of OR gate 2848. Thus search key illuminator 2898 operates when the search stops, and is extinguished whenever any new operation is initiated, as indicated by a "1" output of OR gate 2848.

Figure 30:
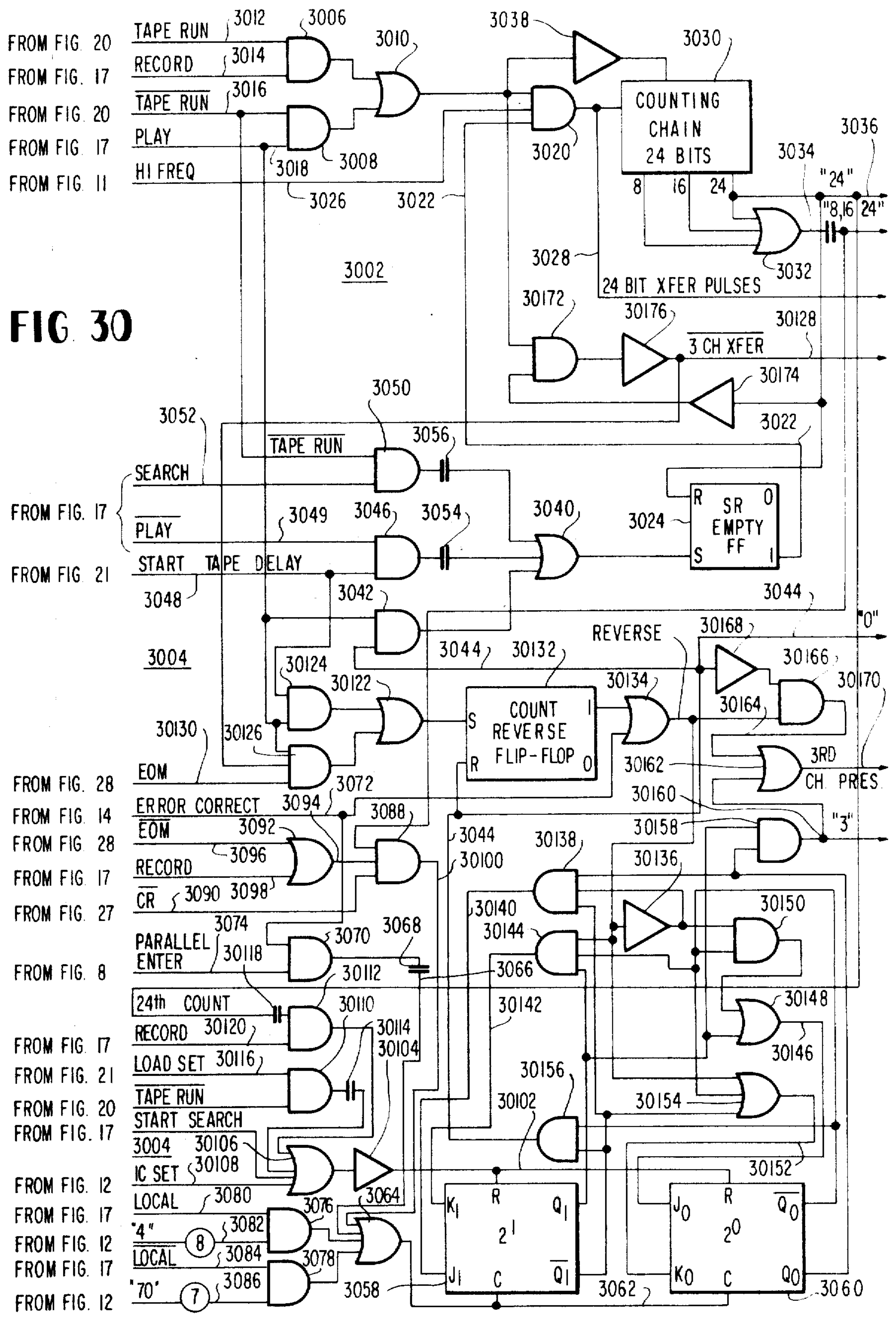
FIG. 30 shows the construction of the three character transfer logic.

Three Character Transfer Logic (FIG. 30)

As illustrated in FIG. 30, three character transfer logic unit 612 comprises a 24 pulse counting circuit generally denoted 3002 and an up-down counter generally denoted 3004. The former is constructed to count up to 24 whenever it is activated, and to maintain the "24 count" until reset, while the latter is designed to count up from "0" to "3" or to count down from "3" to "0," and thereafter to hold the "3" or "0" count until the circuit is externally reset or until the count direction is changed.

The 24 pulse countering circuit 3002 is comprised of a pair of input AND gates 3006 and 3008, the outputs of which are connected as inputs to an OR gate 3010. The inputs to AND gate 3006 are provided over lead 3012 by the "$\overline{\text{TAPE RUN}}$" signal from tape control logic unit 604 and over lead 3014 by the "RECORD" signal from mode select logic unit 602. The inputs for AND gate 3008 are provided by the TAPE RUN signal from tape control logic unit 604 over lead 3016 and by the PLAY signal from mode select logic unit 602 over lead 3018. Thus, when the tape is running and the system is recording, or if the tape is not running and the system is playing back, the output of OR gate 3010 is "1."

The latter provides a conditioning input to an AND gate 3020. Another conditioning input for AND gate 3020 is provided over lead 3022 by the ONE output of a set-reset shift register empty flip-flop 3024 hereinafter described. The signal input for AND gate 3020 is provided over lead 3026 by the "HI. FREQ." output of divider chain 610. When the aforementioned conditioning signals are all "1," AND gate 3020 passes the "HI. FREQ." pulses, and produces the 24 BIT-TRANSFER pulses on lead 3028 for use elsewhere in the system. Lead 3028 also is connected to the input of a dividing chain 3030. The latter is constructed in any suitable fashion, e.g., of commercially available binary counter sub-units to provide a count capacity of more than 24. Counting chain 3030 is constructed to provide pulse outputs indicating the 8th, 16th, and 24th counts for use elsewhere. These are collected by an OR gate 3032, and are AC coupled to lead 3034; also the "24th count" signal is separately provided over lead 3036.

A reset input for counting chain 3030 is provided by the output of OR gate 3010 through an inverter 3038. When the output of OR gate 3010 is "0," inverter 3038 provides a "1" which resets counting chain 3030 to the "0" count. The counting chain remains in the "0" state until advance pulses are again provided by AND gate 3020.

When the output of OR gate 3010 goes to "1," the reset signal is removed from counting chain 3030, and the latter advances 24 counts in response to the first 24 "HI. FREQ." pulses on lead 3028. After 24 pulses, the "24 count" output of the counting chain on lead 3036 goes to "1" which resets shift register empty flip-flop 3024, causing the signal on lead 3022 to go to "0." This cuts off AND gate 3020 and prevents passage of further "HI. FREQ." pulses to lead 3028. Thus, each time it is activated, 24 pulse counting circuit 3030 provides a burst of 24 pulses at either 8448 Hz or 7040 Hz, depending on the operating format.

The set input for shift register empty flip-flop 3024 is provided by the ouptut of an OR gate 3040. A first input to OR gate 3040 is provided by an AND gate 3042 which receives as inputs the PLAY signal on lead 3018 and the "0" Count" output of updown counter 3004 over lead 3044, as hereinafter more fully described.

A second input is provided by an AND gate 3046 which receives as inputs, the $\overline{\text{PLAY}}$ signal on lead 3014, and the START TAPE DELAY signal from tape control logic unit 604 over lead 3048. A third input is provided by an AND gate 3050 which receives as its inputs, the $\overline{\text{TAPE RUN}}$ signal on lead 3016, and the SEARCH signal from mode select logic unit 602 over lead 3052. The inputs provided by AND gates 3046 and 3050 are AC coupled to OR gate 3040 by capacitors 3054 and 3056 respectively.

Up-down counter 3004 is comprised of a pair of J-K flip-flops 3058 and 3060 and associated logic circuitry for establishing the count direction, the upper and lower count limits, and for setting the counter into "0" and "3" states as required.

The clock inputs for flip-flops 3050 and 3060 are provided in common over lead 3062 by the output of an OR gate 3064. The latter receives four inputs. A first input is provided over lead 3066, AC coupled by capacitor 3068 to the output of an AND gate 3070. AND gate 3070 receives as inputs, the ERROR CORRECT signal over lead 3072, and the PARALLEL ENTER signal over lead 3074. Second and third inputs are provided by a pair of AND gates 3076 and 3078. AND gate 3076 receives as inputs, the LOCAL signal from mode select logic unit 603 over lead 3080 and the No. 8 output of sequence control logic unit 554 on lead 3082, the latter constituting a pulse corresponding to the 4th count of each 88 pulse count sequence of counting chain 1202 (see FIG. 12.) The inputs to AND gate 3078 are provided by the $\overline{\text{LOCAL}}$ signal from mode select logic unit 602 over lead 3084 and by the No. 7 output of sequence control logic unit 606 over lead 3086, the latter corresponding to the 70th count of each 88 count sequence.

The fourth input for OR gate 3064 is provided by an AND gate 3088 which receives as control inputs, the $\overline{\text{CR}}$ signal over lead 3090 from the "zero" output of the carrier return flip-flop 27112 (see FIG. 27,) and the output of an OR gate 3092 over lead 3094. OR gate 3092 receives as its inputs, the $\overline{\text{EOM}}$ signal from character identification and search logic unit 560 over lead 3096 and the RECORD signal from mode select logic unit 602 over lead 3098.

The signal input for AND gate 3090 is provided by the "8, 16, 24" pulse output of OR gate 3032. Thus, if the carrier return flip-flop is not set, and the end of message flip-flop is not set, or the system is recording, the 8th, 16th and 24th pulses of each 24 bit transfer sequence will advance counter 3004 as a result of the pulses provided by AND gate 3088 over lead 30100.

The reset inputs for flip-flops 3058 and 3060 are provided in common over lead 30102 through an inverter 30104 connected to the output of an OR gate 30106. The latter receives as its inputs, the IC SET signal over lead 30108 from sequence control logic unit 606, and the output of a pair of AND gates 30110 and 30112, the former being AC coupled through capacitor 30114. AND gate 30110 receives as inputs, the LOAD signal on lead 30116, and the $\overline{\text{TAPE RUN}}$ signal on lead 3016. The inputs to AND gate 30112 are provided over lead 3036 by the 24TH COUNT signal from counter 3030, AC coupled through capacitor 30118, and by the RECORD signal over lead 30120.

The logic circuitry for controlling the output states of flip-flops 3058 and 3060 in response to successive clock pulses includes an OR gate 30122. This receives a first input from an AND gate 30124 which receives as its inputs, the START TAPE DELAY signal on lead 3048, and the PLAY signal on lead 3018.

A second input for OR gate 30122 is provided by an AND gate 30126. This receives as inputs, the PLAY signal on lead 3018, the $\overline{\text{3 CH. XFER}}$ signal on lead 30128, hereafter described, and the EOM signal on lead 30130 from end of message flip-flop 2844. The output of OR gate 30122 is connected to the set input of a set-reset count reverse flip-flop 30132, the "ONE" output of which is connected as an input to an OR gate 30134. The second input to OR gate 30134 is provided by the ERROR CORRECT signal over lead 3072. The output of OR gate 30134 provides a REVERSE COUNT DIRECTION signal which is "1" whenever the count state represented by JK flip-flops 3058 and 3060 is to be reduced in response to the next clock pulse.

Input signals for the J and K terminals of flip-flops 3058 and 3060 are provided by an AND-OR logic circuit which receives as its inputs, the Q and $\overline{Q}$ outputs of the two flip-flops, the REVERSE COUNT DIRECTION output of OR gate 30134 (designated "R" below for convenience) and its complement (designated "$\overline{R}$") produced by an inverter 30136.

The input for flip-flop 3058, denoted $J_1$, is provided by an AND gate 30138 over lead 30140. The inputs to AND gate 30138 are provided by the Q output of flip-flop 3060, by the $\overline{R}$ output of inverter 30136 and by the $\overline{Q}$ output of flip-flop 3058. Designating the inputs and outputs of flip-flop 3058 and 3060 respectively by the subscripts "1" and "0" (corresponding to the power of two represented by that flip-flop) the output of AND gate 30138, represents the logical equation:

$$J_1 = Q_0 \cdot \overline{Q}_1 \cdot \overline{R}$$

Using the foregoing notation, the $K_1$ input for flip-flop 3058 is provided over lead 30142 by an AND gate 30144 which receives as its inputs, the "R" output of OR gate 1594, the $Q_1$ output of flip-flop 3058, and the $\overline{Q}$ output of flip-flop 3060. Thus, the signal on lead 30142 represents the logical equation:

$$K_1 = R \cdot \overline{Q}_0 \cdot Q_1$$

The $J_0$ input for flip-flop 3060 is provided over lead 30146 by the output of an OR gate 30148. The latter receives as inputs, the $Q_1$ output of flip-flop 3058, and the output of an AND gate 30150, which in turn receives as its inputs, the $\overline{R}$ output of inverter 30136 and the $\overline{Q}_0$ output of flip-flop 3060. Thus, the $J_0$ output of OR gate 30148 represents the logical function $$J_0 = Q_1 + \overline{R} \cdot Q_0$$

Finally, the $K_0$ input for flip-flop 3060 is provided over lead 30152 by the output of an OR gate 30154 having as its inputs the "R" output of OR gate 30134 the $\overline{Q}_0$ output of flip-flop 3060 and the $\overline{Q}_1$ output of flip-flop 3058 Thus, the $K_0$ signal represents the logical function:

$$K_0 = R + \overline{Q}_0 + \overline{Q}_1$$

From inspection of equations (1) through (4) above, and from the operating characteristics of the J-K flip-flop as set forth in connection with FIG. 7(f) it may be seen that with count reverse flip-flop 30132 in the reset condition, each successive clock pulse flip-flops 3058 and 3060 changes the output states such that the binary count represented thereby advances up to the count of "3" and remains at that count notwithstanding the arrival of further clock inputs.

When count reverse flip-flop 30132 is set by a "1" output from AND gate 30124, successive clock pulses decrease the output count represented by flip-flops 3058 and 3060 from "3" to "0," at which count the circuit remains until count reverse flip-flop 30132 is reset.

The latter operation is actually accomplished at the times that counter 304 reaches its "0" count state. This condition is represented by the output of an AND gate 30156 having its inputs provided by the $\overline{Q}_1$ and $\overline{Q}_0$ outputs of flip-flops 3058 and 3060 respectively and provides the "0" count signal previously mentioned on lead 3044. The latter is coupled directly to the reset input of count reverse flip-flop 30132 whereby successive clock pulses thereafter advance the count state of flip-flops 3058 and 3060 from "0" to "3," at which count the flip-flops remain, as noted above.

A signal representing the "3" count state of up-down counter 3004 is provided by an AND gate 30158 which receives as inputs, the $Q_1$ and $Q_0$ outputs of flip-flops 3058 and 3060 respectively. The output of AND gate 30158 is also provided over lead 30160 as one input to an OR gate 30162, another input to which is provided over lead 30164 by the output of an AND gate 30166. The inputs to AND gate 30166 are provided through an inverter 30168 by the "0" count signal on lead 3044 and by the REVERSE COUNT DIRECTION signal output of OR gate 3014. Thus, whenever the state of up-down counter 3004 is not "0" (as indicated by "1" output of inverter 30168) and if the up-down counter is not counting down or if counter 3004 is at the count of "3," then a "1" output is provided by OR gate 30162 on lead 30170 constituting the 3RD CHARACTER PRESENT signal for use elsewhere in the system.

The final function of the circuitry shown in FIG. 30 is to generate the $\overline{\text{THREE CHARACTER TRANSFER}}$ signal on lead 30128 indicating that a 24 bit transfer sequence is not in progress. For this purpose, there is provided and AND gate 30172 which receives as its inputs, the output of OR gate 3010 and the output of an inverter 30174, the latter having its input provided by the "24TH COUNT" output of counting chain 3030 on lead 3036. The output of AND gate 30172 is provided through a further inverter 30174 to provide a signal which is "0" when counting chain 3030 is in operation, the latter being true during the three-character transfer operation. The output of inverter 30174 provides an inhibit signal for AND gate 846 to prevent the transfer of serial information to the shift register during a three-character transfer operation for remote record operation, as previously explained. Also, the $\overline{\text{3 CH. XFER}}$ signal inhibits advance of counter 3004 when a short line consiting of one, two, or three characters is being played back, as amplified below in describing system operation.

OPERATION

Operation of the magnetic tape memory system described above may best be understood from the following description of each of the functional modes in which the system is capable of operating.

Record-Local Operation

When the system is to be operated in the Local-Record mode, record-playback select key 314 is placed in the "record" position, and remote-local select key 318 is placed in the "local" position. With power applied, the IC SET signal produced by initial condition start circuit 1208 resets up-down counter 3004 to the "0" state through OR gate 30106 and inverter 30104, resets line memory advance register 2314 to the "0" state through OR gate 2414, resets cycle flip-flop 1128 through AND gate 1140, resets tape run flip-flop 2166 through OR gate 2174, and clears shift register subunits 1404 and 1502-1510 through inverter 1410.

With record-play selector key 314 in the "record" position, record flip-flop 1726 is set whereby $\overline{\text{RECORD}}$ signal on leads 1728 is "1," and the RECORD signal on lead 1730 is "0." With local-remote select key 318 in the "local" position, the LOCAL signal on lead 1794 is "1," and the $\overline{\text{LOCAL}}$ signal on lead 1796 is "0."

For local operation as herein described, input information is provided by manual operation of the input-/output printer 102 to produce a sequence of 6-bit character code words in the EIA format. The 6-bit signal is processed by parity bit generator 802 to produce a 7-bit signal on leads 804(a) through (g). Since the RECORD and LOCAL signals on leads 840 and 834 are both "1," a "1" level on lead 836 indicating depression of a printer key, (and the presence of a 6-bit character code on leads 512), AND gate 828 operates to produce the PARALLEL ENTER signal on lead 814.

The PARALLEL ENTER signal is provided over lead 1210 to set cycle flip-flop 1128 through OR gate 1144 which activates AND gate 1126 to advance counting chain 1202 in response to the LO FREQ signal on lead 1118. As previously explained this signal is at 880 Hz or 1056 Hz, depending on whether the system is operating in the EIA or ASCII format, and is provided directly by the output of divide by 8-circuit 1116. Selection of EIA or ASCII operation depends on the position of switch 1716, and is evidenced by the presence of a "1" level on lead 1109 for EIA operation or a "1" signal on lead 1110 for ASCII operation.

Referring back to FIG. 8, the outputs of parity bit generator 802 are provided directly to AND gates 808(a) through (g) and to AND gates 822(a) through (h) through EIA to ASCII code converter 806. For EIA operation, the signal on lead 812 is "1" and the PARALLEL ENTER signal actuates AND gates 808 to couple the parity bit generator output directly to the inputs of OR gates 818(a) through (h). (AND gate 808(h) which receives no signal input provides a "1" — the stop bit for the EIA format.)

For ASCII operation, the signal on lead 824 is "1," and the output of EIA to ASCII code converter 806 is provided through AND gates 822(a) through 822(h) to OR gates 818(a) through (h). The latter provide the shift register parallel inputs on leads 514(a) – (h).

Referring to FIG. 14, leads 514(a) – (d) are connected to AND gates 1438, 1452, 1516, and 1518 associated with shift register sub-unit 1404, while leads 514(e) – (h) [see FIG. 15] are connected to corresponding AND gates (not shown) contained in error correction logic sub-unit 1534 associated with shift register sub-unit 1502. With error correction key 310 released, the ERROR CORRECT signal on lead 1428 is "0" and the output of inverter 1448 on lead 1446 is "1." This actuates AND gates 1438, 1452, etc. to apply the 8-bit character code (7 information bits plus parity bit for ASCII, or 6 information bits plus parity bit plus stop bit for EIA) to the parallel inputs for the eight bit positions of the shift register in shift register sub-units 1404 and 1502.

At the same time, the PARALLEL ENTER signal on lead 1418 is provided through OR gate 1426 and inverter 1422 over lead 1420 to the P.E. inputs of shift register sub-units 1404 and 1502 and through OR gate 506, lead 528 and OR gates 1417 and 1511 to the $C_P$ inputs to enter the incoming character into the shift register. At the end of the PARALLEL ENTER pulse, the character inserted appears at the Q outputs of shift register sub-units 1404 and 1502.

To test for the CAR. RET. and EOM code words the shift register outputs are provided over lead 2706(a) to bit "1" comparator circuit 2702, and over leads 2706(b) through 2706(h) to comparator circuits 2730 for bit positions "2" through "8" (see FIG. 27.) With the system not operating in the search mode, the SEARCH and $\overline{\text{SEARCH}}$ signals on leads 2722 and 2714 are "0" and "1" respectively. And gate 2712 therefore operates and the reference signal for bit "1" comparator 2702 is provided through OR gate 2708 by switch 2718 which is in the EIA or ASCII position depending on the desired operating format.

Switch 2744 is positioned as shown for EIA operation to connect the $C_1$ and $C_4$ coincidence signals to AND gate 2738 whereby its output is "1" if coincidence signals $C_1$, $C_3$, $C_4$, $C_5$, $C_7$, and $C_8$ are all "1" indicating that the bits in the 1st, 3rd, 4th, 5th, 7th and 8th bit positions of the shift register match the corresponding reference bits. As mentioned, the PARALLEL ENTER signal, by which entry of the incoming character into the shift register is effected, also starts the operating cycle of counting chain 1202. At the 4th count, before the shift operation begins, AND gates 2756 and 2758 are activated through OR gate 2762 and lead 2760. Then if coincidence signals $C_2$ and $C_6$ are both "1," AND gate 2756 operates, indicating that the character just inserted in the shift register is CARR. RET. If both signals are "0," the outputs of inverters 2784 and 2786 are "1." AND gate 2758 operates, indicating that the character just inserted is EOM. For ASCII operation, switch 2744 is reversed so that the $C_2$ and $C_6$ signals are provIded to AND gate 2738, the $C_1$ and $C_4$ signals are provided to AND gates 2756 and 2758 (the latter through inverters 2784 and 2786.) Operation is otherwise unchanged, with a "1" output from AND gate 2756 indicating CARR. RET., and a "1" output from AND gate 2758 indicating EOM.

If neither CARR.RET. nor EOM is detected, the signals on leads 2782 and 2792 are both "0," and the eight bit transfer sequence continues. In that case, the 12th, 20th, 28th, 36th, 44th, 52nd, 60th, and 68th pulses in the cycle of counting chain 1202, provided by the No. 2 output of sequence control logic unit 606 (see FIG. 12) are coupled through lead 1414, OR gate 506, lead 528 and OR gates 1417 and 1511 to advance shift register sub-units 1404 and 1502 – 1510 by eight counts. This transfers the incoming character from the 1st through the 8th bit positions of the shift register to the 9th through the 16th bit positions of the shift register.

The eight bits shifted out from the 24th bit position of shift register sub-unit 1510 are provided over lead 516, AND gate 902, lead 518, OR gate 2510, AND gate 2508 and lead 2410 to the input of RAM sub-units 2402 etc. AND gate 902 is conditioned by the "1" level of the RECORD signal on lead 904, while AND gate 2508 is conditioned by the "1" level of the $\overline{\text{ERASE}}$ signal on lead 2512, the latter produced by erase flip-flop 2416 which is in the reset condition at this time.

As previously mentioned, line memory address register 2314 and up-down counter 3004 are both reset at the beginning of operation. Referring to FIG. 30, with counter 3004 reset, the 4th count of the operating cycle of counting chain 1202 provided through AND gate 3076 and OR gate 3064 advances counter 3004 to "1." Since the output of AND gate 30158 is "1" only when counter 3004 is in the "3" state, the signal on leads 30160 and 2360 is therefore "0" and AND gate 2364 is inactivated. Consequently the No. 2 output of sequence control logic unit 606 provided to AND gate 2364 is blocked. All other inputs to OR gate 2318 are also "0" at this time and thus no signals are provided either to advance line memory address register 2314, or to operate read-write control circuit 23102. As a result, the line memory is not conditioned to receive data from the shift register. This is advantageous since before entry of the character in question, the shift register was empty, and the line memory is thus prevented from recording the "0's" being shifted out of the shift register from the 17th through the 24th bit positions.

At the 70th count of the cycle of counting chain 1202, a "1" appears at the No. 7 output of sequence control logic unit 606. This is provided through AND gate 1140 and OR gate 1142 (the former being conditioned by the "1" level of the RECORD signal on lead 1158 to reset cycle flip-flop 1128. This inhibits AND gate 1126 and resets counting chain 1202 to zero to complete the 8 bit transfer sequence. The system then remains at rest awaiting the appearance of the next character.

When the next character is entered through printer 102, the above described sequence of operations is repeated. Again, at the 4th count of the cycle of counting chain 1202, AND gates 2756 and 2758 in character identification and search logic unit 560 are activated to test for the presence of the CARR. RET. or EOM code words, and if neither is present, the 8-bit transfer sequence is repeated. Up-down counter 3004 is advanced to the "2" state by the 4th count of the operating cycle of counter 1202 through lead 3082, AND gate 3076, OR gate 3046 and lead 3062, but AND gate 30158 still does not operate, and again, the data shifted out of the 17th through 24th bit positions of the shift register are not stored in the line memory.

At the end of the second 8-bit transfer sequence, the first character inserted is in bit positions 17 – 24 of the shift register, and the second character is in bit positions 9 – 16. The next shift operation will therefore advance out of the 24th bit position, the first bit of the first character, which, of course, must be stored in the line memory.

Thus, when the 3rd character generated by printer 102 is received, the 4th count of the resulting eight-bit transfer sequence advances up-down counter 3004 to the count of "3." Then, if the CARR. RET. or EOM code words are not detected, AND gate 30158 operates and provides a "1" on lead 2360 to activate AND gate 2364. This, in turn, passes the 8 pulses comprising the No. 2 output of sequence control 'ogic unit 606 through OR gate 2318 to advance line memory address register 2314 by eight counts in synchronism with the incoming data provided from the shift register over lead 518.

Neither of AND gates 2428 nor 2430 is activated since the tape is not running and the system is not in either load or play operation, so the outputs of OR gate 2426 and AND gate 2464 are both "0" and the output of inverter 2466 is "1." The latter conditions AND gate 2394 so that upon each pulse output from OR gate 1318, read-write control circuit 23102 is actuated to produce a "1" output from AND gate 2394 after a short delay produced by the RC input circuit comprised of resistor 23104 and capacitor 23106. The resulting signal on lead 2462 is provided through OR gate 2460 on lead 2408 to actuate RAM sub-units 2402, 2404 and 2502–2506 for write operation. The write actuation pulse for a given memory site appears slightly before the trailing edge of the advance pulse which then advances line memory address register 2314 by one count prior to the next write operation.

Successive advance pulses for up-down counter 3004 resulting from further eight-bit transfer sequences have no effect, and thus the operation described above for the third incoming character continues for each successive incoming character as long as the CARR. RET. or EOM code word is not detected.

Indication of completion of a block of data, i.e. a line of print is signified by the CARR. RET. as previously explained. Thus, at the 4th count of the cycle of counter 1202 for which CARR. RET. is sensed, the output of AND gate 2756 on lead 2782 becomes "1." This sets carrier return flip-flop 27112 through delay circuit 27114. Since the three character transfer sequence is not in progress, the signal on lead 2834 is "1," and AND gate 2828 operates and provides a "1" on lead 2830. OR gate 2822 then produces a "1" output on lead 2820 which is provided over lead 2150, OR gate 2148, and OR gate 2144 to set tape start delay single shot 2142, which sets tape run flip-flop 2166. Also, START TAPE DELAY signal on lead 2158 goes to "1." With tape run flip-flop 2166 set, the TAPE RUN signal on lead 2168 is "1" and the $\overline{\text{TAPE RUN}}$ signal on lead 2170 is "0." The TAPE RUN signal actuates AND gate 2032 and OR gate 2046 to operate forward solenoid driver amplifier 2002, and the tape speed begins to build up.

Referring to FIG. 30, with the system in record, the $\overline{\text{PLAY}}$ and the RECORD signals are both "1." Also, before the tape begins to run, the TAPE RUN and START TAPE DELAY signals are "0" so AND gates 3006 and 3046 (as well as AND gates 3008, 3042, and 3050 which have no function during record) are inhibited. The output of OR gate 3010 is therefore "0" and the reset signal for counter 3030, provided by inverter 3038, is "1." Counter 3030 is therefore a count of "0."

When the tape starts to run, the TAPE RUN signal on lead 3012 becomes "1," and AND gate 3006 is activated to provide a signal through OR gate 3010 to AND gate 3020. At the same time, the START TAPE DELAY signal goes to "1," AND gate 3046 operates and a pulse is provided through capacitor 3054 and OR gate 3040 to set shift register empty flip-flop 3024. The resulting "1" signal on lead 3022 activates AND gate 3020 which is already conditioned by OR gate 3010, to pass the HI FREQ pulses on lead 3026 to start the operation of counting chain 3030. The output of AND gate 3020 on lead 3028 provides the 24 bit transfer pulses which continue to appear at 8448 Hz for EIA or at 7040 Hz for ASCII until AND late 3028 is deactivated by the 24th count output of counting chain 3030 which resets shift register empty flip-flop 3024.

The 24 bit transfer pulses are provided through lead 1416 and OR gate 506 (see FIG. 14) to advance shift register sub-units 1404 and 1502–1510 a total of 24 counts, thereby transferring out all of the information contained in the shift register and leaving the same empty. At the same time, the 24-bit transfer pulses are provided through lead 2352 to AND gate 2356, previously conditioned by "1's" on leads 2358 and 2360. With AND gate 2356 actuated, the 24 bit burst is provided through lead 2354 and OR gate 2318 to advance the line memory address register 2314, and to actuate the read-write circuit for the line memory to record the 24 bits being transferred out of the shift register. With the tape running, the $\overline{\text{TAPE RUN}}$ signal on lead 2366 is "0" which inhibits AND gate 2364. This blocks passage to OR gate 2318 of the No. 2 output of sequence control logic unit 606, and prevents response of register 2314 to the 8 bit transfer sequence then in progress.

When the counting cycle for counting chain 3030 is completed, the 24TH COUNT signal on lead 3036 and 2522 is "1." With the RECORD signal appearing on lead 2380 also "1," AND gate 2520 is actuated and a "1" signal leVel appears on 'eads 2524 and 2526. This accomplishes three results. First, it actuates line memory address latch circuits 2528 to store the count contained in line memory address register 2314; this corresponds to the number of bits contained in the line memory at the completion of the line being recorded. Secondly, after a short delay introduced by RC circuit 2454, a reset signal is provided through lead 2526, delay circuit 2454, OR gate 2414 and lead 2322 to reset line memory address register 2314 to its zero condition. Finally, with the system in "record," AND gate 30112 is activated, and provides a pulse through OR gate 30106 and inverter 30104 to reset counter 3004 In preparation for the next record cycle.

After the 25 millisecond delay introduced by tape start delay single shot 2142, the TAPE DELAY COMPLETED signal on lead 2160 goes to "1" and is provided over lead 2398 as a conditioning input to AND gate 2376. Since the system is in "record," and the tape is running, the signals on leads 2380 and 2382 are both "1" and AND gate 2376 is actuated to produce a "1" output on lead 2374.

This signal provides the TIMING TRACK IN signal for recording on the timing track of the tape, and is also provided through OR gate 2318 to advance line memory address register 2314 at a rate corresponding to the HI. FREQ. signal on lead 2378 (either 8448 Hz or 7040 Hz).

At the same time, with the TAPE DELAY COMPLETED signal on lead 2398 at the "1" level, and AND gate 2428 and OR gate 2426 operated by the TAPE RUN and RECORD signals, AND gate 2464 operates and provides a "0" output from inverter 2466 to inhibit the operation of AND gate 2394. Erase flip-flop 2416 is still reset as explained below, and its output on lead 2440 is still "0." The output of OR gate 2460 on lead 2408 is therefore "0" conditioning RAM sub-units 2402,2406 and 2502–2506 for read operation. Accordingly, as address register 2314 is cycled under control of the high frequency pulse train on lead 2324, data is read out of each memory position of the line register in succession over lead 2412 and is provided through buffer amplifier 2334 and lead 504 to the data track recording circuit 538 (see FIG. 18) and is stored on the tape. At the same time, the TIMING TRACK IN signals are provided over lead 2374 and 1814 to timing track record circuit 546 and are recorded in the timing track on the tape in synchronism with the data pulses.

When the tape begins to run, the two inputs to AND gate 2428 are "1" and a "1" output is provided from OR gate 2426 to set the erase ready flip-flop 2418. This provides a conditioning signal for AND gate 2388 over lead 2420, which is also conditioned by the RECORD signal on lead 2380. However, with the tape running, the $\overline{\text{TAPE RUN}}$ signal on lead 2390 is "0" and AND gate 238 is inhibited.

As the tape runs, and address register 2314 advances, transferring information from the line memory to the tape, address comparator circuits 2538 and 2550 compare the current count in register 2314 with that stored in latch circuits 2528. When bit for bit match is obtained, the coincidence signals on leads 2548 (a) through 2548(k) are all "1" indicating that line memory address register 2314 has again reached the count which it had reached when the latch circuits were set, i.e. when the last character in the line, namely CARR. RET., was stored in the line register. Since this character is now stored on the tape, all of the information in the line register has been transferred to the tape and the record cycle has been completed. This is indicated by a "1" level for the RECORD CYCLE COMPLETED signal output of AND gate 2516 which is conditioned by "1" levels of the TAPE DELAY COMPLETED, RECORD and TAPE RUN signals on leads 2554, 2556, and 2552 respectively, and by the outputs of comparator circuits 2538 and 2550.

When the RECORD CYCLE COMPLETED signal on lead 2514 is provided over lead 2028 to AND gate 2022, the latter is conditioned by "1" levels of the TAPE DELAY COMPLETED, TAPE RUN, and RECORD signals on leads 2160, 2168 and 2026 respectively, and thus operates to provide a "1" output on lead 2024. This is coupled through OR gate 2174 and lead 2172 to reset tape run flip-flop 2166, and the TAPE RUN signal on lead 2168 goes to "0." As a result, AND gate 2032 is inhibited, which turns off forward solenoid driver amplifier 2002, stopping the tape. At the same time AND gate 3006 is inhibited and the output of OR gate 3010 goes to "0," resetting counting chain 3030.

Further, the $\overline{\text{TAPE RUN}}$ signal on lead 2330 completes the conditioning for AND gate 2388 which allows the clock signals on lead 2389 (84480 Hz) to pass through OR gate 2386 and over lead 2436 to set erase flip-flop 2416. This produces a "1" on lead 2442 which is coupled through capacitor 2446, OR gate 2414 and lead 2322 to reset line memory address register 2314 to zero condition. Also, the output of earase flip-flop 2416 is connected simultaneously to the inputs of all inverters 2458(a) through (e) and to OR gate 2460 to select all five RAM sub-units and to provide a "1" on lead 2408 to place all of the RAM sub-units in the WRITE mode. The "zero" output of erase flip-flop 2416 on lead 2512 now goes to "0," inhibiting AND gate 2508 and placing 0's at all of the inputs of the RAM sub-units.

The output of OR gate 2386 is provided over lead 2384 and OR gate 2318 to advance line memory address register 2314 at the clock rate. Since all of the RAM sub-units are selected, and actuated for writing, the "0" input on lead 2410, has the effect of simultaneously writing 0's in the corresponding memory site of each of the RAM sub-units as address register 2314 is cycled.

When counter sub-units 2302 and 2304 of address register 2314 have completed one cycle, all of the memory positions of the RAM sub-units will have been erased. At the next count, a "1" appears at the $2^0$ position of counter sub-unit 2306. This is provided over lead 2308(a) and lead 2518 to the reset input of erase flip-flop 2416 and through AND gate 2438 (previously conditioned by the "1" signal on lead 2440) to reset erase ready flip-flop 2418. Reset of erase flip-flop 2416 removes the "0" level from lead 2512 and prepares RAM sub-units 2402,2404, and 2502–2506 for the next data storage operation, and also provides a pulse over lead 2444 through capacitor 2448, OR gate 2414 and lead 2322 again to reset line memory address register 2314 to "0." resetting erase ready flip-flop 2418 removes the conditioning signal from lead 2388 and prevents further clock signals from being applied through OR gate 2318 to advance address register 2314. Thus, the entire cycle of transfer of incoming information in parallel into the shift register, then serially into the line memory, and serially into the tape memory, followed by erasure of the line memory in preparation for the next line has been completed.

Recording a Short Line

As a variation of the foregoing, the case of a "short line" i.e. a line containing only the CARR. RET. (or EOM) code word, or on character followed by CARR. RET. may be considered. For such a line, when the CARR. RET. or EOM code word is sensed, no character will be present in the 17th through 24th bit positions of the shift register. Specifically, for a line containing only the CARR. RET. or EOM code word, the shift register will contain, e.g. only "CARR. RET. - - ." Similarly, if the line contains only the character "A" followed by CARR. RET., the contents of the shift register at the time the carrier return code word is sensed is "CARR. RET. - A - ."

As previously explained, sensing CARR.RET. or EOM for record operation immediately initiates the line transfer operation which begins by transfer of the total contents of the shift register into the line memory. However, because the third (and perhaps the second) character position of the shift register is empty, it is preferable to prevent transfer of the empty characters to the line memory in precisely the same manner as in the case of the normal eight bit transfer sequences for the first two characters entered.

This is accomplished by providing the output of AND gate 30158, which is "1" only if up-down counter 3004 is at the count of "3," as a control input to AND gate 2356 which controls advance of line memory address register 2314 through OR gate 2318 for record operation. Thus, if a line consists only of CARR. RET. or EOM, counter 3004 has advanced only to a count of "1" when the CARR.RET. or EOM code word is sensed. Similarly, for a line containing a single character plus CARR. RET., up-down counter 3004 will have advanced only to a count of "2" when CARR. RET. is sensed. In both cases, AND gate 2356 is deactivated.

Recognition of the carrier return code word initiates the line transfer sequence in a manner previously described, and in particular, initates the 24 bit transfer sequence produced by AND gate 3020 and counting chain 3030 in response to the START TAPE DELAY signal on lead 3048. As the 24 bit transfer sequence proceeds, the 8th, 16th, and 24th counts are provided through OR gate 3032, lead 3034, AND gate 3088, lead 30100, OR gate 3064, and lead 3062 to advance up-down counter 3004. For a line containing only CARR. RET. or EOM, the 8th count advances the up-down counter to "2" and the 16th count advances the counter to "3." This activates AND gate 30158, and permits operation of line memory address register 2314 for the remaining eight counts of the 24 bit transfer sequence thereby permitting entry of the CARR.RET. or EOM code word in the line memory.

Similarly, for a line consisting of one character plus CARR. RET., up-down counter 3004 is at the count of "2" when the 24 bit transfer sequence begins. The 8th count advances counter 3004 to a count of "3" thereby activating AND gate 30158 and permitting the remaining 16 counts of the 24 bit transfer sequence to actuate the line memory. In this way, both the additional character and the CARR. RET. code words are entered in the line memory.

Error Correction Operation

Error correction is closely related to Local Record operation, and is employed when the operator has made an error in generating information by means of the printer. The system is therefore operating in the Record mode with the various conditions As previously described.

Assume for example that the last character printed by the operator was "A" but should have been "E." Assume also that the second to last character was "D" and is correct. The characters A and D are therefore contained in bit positions 9 through 24 of the shift register, having been transferred there by the previous 8 bit transfer sequence. Bit positions 1 – 8 contain "0's" so the total contents of the shift register is "(empty) – A – D."

To delete the "A," the operator depresses Error Correction Key 310 (see FIG. 14) which provides a "1" level on lead 1428, and a "0" level on lead 1446 at the output of inverter 1448. The "1" signal on lead 1428 actuates AND gates 1440, 1442, 1520, and 1522, along with corresponding AND gates (not shown) in the error correction logic circuitry 1534 for bits 5 through 8, bit 9 AND gate 1536, and the corresponding AND gates (not shown) in the error correction logic circuitry 1542 for bits 10 – 23. The "0" level on lead 1446 inhibits AND gates 1438, 1452, 1516 and 1518 as well as the corresponding AND gates (not shown) in error correction logic circuitry 1534.

The effect of the foregoing is to block the data being provided over leads 514(a) through (h) from input-output logic circuitry 502 (see FIG. 8) and to connect the output of each shift register bit position to the input terminal of the preceding bit position for bit positions 2 through 23, and connect the ERROR CORRECT signal itself through inverter 1544 to the input terminal for the 24th bit position, thereby placing a "0" at that terminal. The output terminal for the 1st bit position has no effect during error correction operation.

The ERROR CORRECT signal also conditions the P.E. inputs of shift register stages 1404 and 1502 through 1510 over lead 1428, AND gate 1513, inverter 1515, and diode 1517, the latter connecting inverter 1515 to lead 1420.

ERROR CORRECT signal is provided over lead 3072 to OR gate 30134 to condition up-down counter 1504 for reverse operation, and to AND gate 3070 which is conditioned, but does not operate until a key on the printer is depressed.

While maintaining error correct key 310 depressed, the operator strikes any one of the letter or number keys 128 on printer keyboard 126 (see FIG. 1). This initiates the parity bit generation, and code conversion operations as previously described, but has no effect on the shift register since input AND gates 1438, 1452, etc. are inhibited. However, striking a key causes the KEY ACTUATE signal on lead 836 to go to a "1" level which is coupled through capacitor 838 to AND gate 828. This produces the PARALLEL ENTER signal on lead 814, which is coupled over lead 1210 through OR gate 1144 to set cycle flip-flop 1128 and to actuate counting chain 1202.

At the same time, the PARALLEL ENTER signal is provided over lead 3074 to operate AND gate 3070, previously conditioned by the ERROR CORRECT signal on lead 3072. The "1" output of AND gate 3070 is coupled through capacitor 3068, lead 3066, OR gate 3064 and 3062 to the "C" input of counter flip-flops 3058 and 3060. Since counter reverse OR gate 30134 is also activated by the ERROR CORRECT signal, the count of up-down counter 3004 is reduced — in this case, from "3" to "2."

The sequence of pulses at the No. 2 output of sequence control logic unit 606 (see FIGS. 6,11 and 12) is provided over lead 1414, OR gate 506, and lead 528 (see FIG. 14) to effect an 8-bit backward shift of data in the shift register as previously described. The result therefore is transfer of the data previously in shift register bit positions 9 through 16 into bit positions 1 through 8, placement of data previously in bit positions 17 through 24 in bit positions 9 through 16, and placement of 0's in bit positions 17 through 24. The shift register therefore now contains "A-D-(empty)."

As the 8 bit transfer sequence proceeds, the 4th pulse count output of counting chain 1200 is provided over lead 3082, AND gate 3076, OR gate 3064, and lead 3062 to the clock input of up-down counter 3004. Since the ERROR CORRECT signal on lead 3072 conditions counter 3004 for reverse operation through OR gate 30134, the advance pulse on lead 3062 reduces the count state of up-down counter 3004 from its previous count of "2" to a count of "1." This reflects the fact that the shift register contains only one correct character, namely "D, " in bit positions 9 - 16.

The ERROR CORRECT signal is also provided on on lead 2370 to inhibit AND gate 2364, thereby preventing operation of the line memory during the error correction operation.

Having transferred the unwanted character "A" to bit positions 1 - 8, the operator then releases error correct key 310 and types the correct character "E." This character is entered in parallel into the bit positions 1 - 8 as previously explained whereby the shift register now contains "E - D - (empty)".

Entry of the correct character initiates a normal 8 transfer sequence as described above. At the 4th count, up-down counter 3004 is advanced. Since the ERROR CORRECT signal is no longer present, counter 3004 counts up from "1" to "2." Also, at that time the test for CARR. RET. or EOM takes place. Since the latter is not successful, the eight bit transfer sequence proceeds to advance the character "E" from bit positions 1 through 8 to bit positions 9 through 16, and to advance the character "D" from bit positions 9 - 16 to bit positions 17 - 24. The shift register contents at this time is therefore "(empty)-E-D." The 0's previously contained in bit positions 17 through 24 are transferred out to the line memory, but because the count state of up-down counter 3004 is only "2" at this time, transfer of data into the line memory (under control of AND gate 2364 and OR gate 2418 as previously described) is inhibited.

When the next character is entered, the 4th pulse count of the resulting 8 bit transfer sequence advances counter 3004 to "3" again conditioning the line memory to accent data from the shift register as previously described.

Correction of two characters is similar to that described above. Thus, if it is desired to delete both the "A" and the "D" and to substitute "E" and "C," after deleting the "A," error correct key 310 is held depressed, and another one of keys 128 is struck. This shifts the "D" to bit positions 1 - 8 and reduces the count of up-down counter 3004 to "0". After the resulting 8 bit transfer sequence, the shift register contains "D-(empty) - (empty)."

Insertion of the character now proceeds as described above. The "C" is inserted in bit positions 1 - 8 to replace the "D", counter 3004 is advanced to "1," and the "C" is shifted to bit positions 9 - 16.

When the "E" is inserted, up-down counter is again advanced (to "2") and the shift operation proceeds, so that the shift register then contains "(empty) - E - C." The next character returns counter 3004 to "3" and the normal transfer of data to the line memory resumes.

Assume now that CARR. RET. rather than "E" is to be typed, whereby the last character in the line is to be the "C." When the CARR. RET. is entered, the up-down counter is at "1," but shifts to "2" at the 4th count of the shift sequence. At the same time, AND gate 2756 operates and sets flip-flop 27112 through delay 27114. The $\overline{\text{3 CH. XFER}}$ signal on leads 30128 and 2834 is still "1" since the three-character transfer operation has not begun. AND gates 2828 and 2824, and OR gate 2822 therefore operate and the START LINE TRANSFER signal is generated. This starts the tape, resets flip-flop 27112 through delay 27110, and initiates the 24 bit transfer sequence as previously described. Again, however, the third character position of the shift register is empty — as in the case of the short line, so that portion of the 24 bit transfer sequence required to advance the "C" from bit positions 9 - 16 to positions 17 - 24 can not be permitted to actuate the line memory.

As before, this is accomplished by advancing counter 3004 by the "8, 16, 24" signal, and inhibiting line memory advance unless the count of "3" is present at the input of AND gate 2356.

As will be appreciated, after the 8th count of the 24 bit transfer sequence the character "C" is in bit positions 17 through 24 of the shift register. The 8th count therefore returns counter 3004 to "3," and the remaining characters in the shift register, i.e. "C" and CARR. RET. are entered in the line memory.

In the event that both of characters "A" and "D" are to be deleted and the CARR. RET. code word inserted instead, operation is identical to that described above for the "short line" consisting only of CARR. RET. As previously explained, after the second error correction operation (by which the character "D" is transferred to bit positions 1 through 8 of the shift register and shift register bit positions 9 through 24 are left empty, up-down counter 3004 is at a count of "0." Then, if the carrier return code word is typed, it is entered in shift register bit positions 1 through 8 to replace the character "D" and up-down counter 3004 is advanced to a count of "1" at the time that CARR. RET. is sensed. The START LINE TRANSFER signal is generated as before, initiating the 24 bit transfer sequence. As the latter proceeds, the carrier return code word is shifted on through the shift register. After eight pulses, the CARR. RET. code word is in bit positions 9 through 16 and up-down counter 1504 is advanced to the count of "2." After 16 counts, the carrier return code word is in bit positions 17 through 24 and the up-down counter is advanced to a count of "3." This reactivates AND gates 30150 and 2356 whereby the remaining eight pulses of the 24 bit transfer sequence actuate the line memory to permit entry therein of the carrier return code word.

Line Erase Operation

The error correction functions provided include means for deleting the entire line being entered. In order to accomplish this, the operator depresses both error correct key 310 and line erase key 311 simultaneously. (See FIG. 14.) With the error correct key depressed, the $\overline{\text{ERROR CORRECT}}$ signal on lead 1446 becomes "0." This is provided over lead 2034 to inhibit AND gate 2032, and to prevent forward solenoid driver amplifier 2002 from operating. Also, the $\overline{\text{ERROR CORRECT}}$ signal is provided over lead 1712 to inhibit AND gate 1709, maintaining a "0" output on lead 1710 to hold data record control flip-flop 1702 in its reset condition.

When line erase key 311 is depressed, the LINE ERASE signal on lead 1401 becomes "1," and is provided over lead 2156 as an input to OR gate 2148. This has precisely the same effect as the appearance of a START LINE TRANSFER signal on lead 2150 caused by recognition of CARR. RET. or EOM code word, and thus the line memory transfer sequence previously described for transfer of a line of information to the tape is initiated.

The line transfer sequence proceeds as previously described except for the fact that the record control flip-flops 1702 and 1808 and AND gate 2032 are inhibited by the "0" value of the $\overline{\text{ERROR CORRECT}}$ signal thereby preventing the record circuits from operating and preventing the tape from running. Consequently, the line of data is transferred out of the line memory but is not received by the tape and thus is effectively deleted.

Remote Record Operation

System operation for the Remote Record mode is essentially the same as for the Local Record mode except that information is received serially rather than in parallel from the external source. Also, because an incoming character is transferred into the shift register one bit at a time, the entire character is not present in the first 8 bit positions of the shift register until the 8 bit transfer sequence has been completed. Therefore, rather than inspecting the incoming character to determine whether it is CARR. RET. or EOM at the beginning of the 8 bit transfer sequence i.e. at the 4the count of the operating cycle of counting chain 1202, the test is made at the end of the operating cycle at the 70th count.

To establish remote record operation, the operator places record-playback select key 314 in the record position as before, and places remote-local select key 318 in the remote position. The latter operation produces a "0" output on lead 1794 and a "1" output on lead 1796 for the LOCAL and $\overline{\text{LOCAL}}$ signals, respectively.

Serial information is provided over lead 510 to signal shaper 844 (see FIG. 8.) The first bit of an incoming character provides the SERIAL START signal on lead 852. This corresponds to the PARALLEL ENTER signal for Local Record operation, and is provided over lead 1160 as an input to AND gate 1138. Since the $\overline{\text{LOCAL}}$ and RECORD signals on leads 1150 and 1158 are both "1," AND gate 1138 produces a "1" output. This is coupled through OR gate 1144 to set cycle flip-flop 1128, which initiates operation of counting chain 1202.

Since the three character transfer sequence is not in progress, the output of inverter 30176 is "1," and is provided over lead 850 to condition AND gate 846. Also, the "1" values of the $\overline{\text{LOCAL}}$ and RECORD signals on lead 840 and 848 condition AND gate 846, which therefore provides the output of signal shaper 844 — i.e. the serial input data through lead 854, OR gate 856 and lead 511 to the serial input of shift register sub-unit 1404(a) (see FIG. 14.)

With the operation of counting chain 1202 initiated, the eight pulses constituting the No. 2 output of sequence control logic unit 606 are provided through lead 1414, OR gate 506 and lead 528 to advance the shift register eight times in the manner previously described for the parallel input operation. Since the shift pulses are synchronized with the incoming data, the 8 bit transfer sequence enters the incoming code word in the first eight bit positions.

At the 70th count of the operating cycle counting chain 1202, the No. 7 output of sequence control logic unit 606 becomes "1." This serves three purposes. First, it is provided through lead 1204, AND gate 1140 and OR gate 1142 to reset cycle flip-flop 1128 which returns counting chain 927 to its rest condition. Secondly, with the system in the remote mode, the No. 7 output of sequence control logic unit 606 is provided on lead 3086 and actuate AND gate 3078, and OR gate 3064 to provide a "1" on lead 3062 to advance up-down counter 3004. Also, the No. 7 output of sequence control logic unit 606 is provided over lead 2768 through OR gate 2762 to actuate AND gates 2756 and 2758, thereby testing the character just shifted into the first 8 bit positions of the shift register to determine whether it is CARR. RET. or EOM, as previously explained.

If the word tested is either CARR. RET. or EOM, the line transfer sequence is initiated. If the incoming character is not CARR. RET. or EOM, the sequence of operations set forth above continues with successive characters being transferred serially into the first 8 bit positions of the shift register and then on into the line memory until a CARR. RET. or EOM character is detected.

Load Operation

Any time a pre-recorded tape cassette is inserted into the machine for playback it is necessary to load the first block of data from the tape into the line memory before playback can begin.

For this operation, the operator inserts the tape into the machine, and places record-playback key 314 in the playback position. This resets record flip-flop 1726 and provides a "1" output on lead 1730 for the $\overline{\text{RECORD}}$ signal. Playback flip-flop 1738 is still reset at this time (either as a result of a previous operation, or due to the IC SET signal if the system has just been turned on) so the $\overline{\text{PLAY}}$ and PLAY signals on leads 1742 and 1740 are "1" and "0" respectively.

Also, load switch flip-flop 2106 is reset through normally closed contacts 2104 of load switch 304 so the $\overline{\text{LOAD}}$ signal on lead 2114 is "1." This sets load operation flip-flop 2116 so its output on lead 2122 is also "1," whereby AND gate 2120 is conditioned. The latter does not operate, however, because the LOAD signal on lead 2112 is "0."

The operator then depresses load key 304 (see FIG. 21) connecting the $\overline{\text{RECORD}}$ signal on leads 1730 and 2110 through switch contacts 2108 to set load switch flip-flop 2106. This produces a "1" output on lead 2112 and a "0" output on lead 2114 for the LOAD and $\overline{\text{LOAD}}$ signals, respectively.

The LOAD signal on lead 2112 is provided through capacitor 2146 and OR gate 2144 to set tape start delay single shot 2142. This sets tape run flip-flop 2166 and the TAPE RUN and $\overline{\text{TAPE RUN}}$ signals on leads 2168 and 2170 become "1" respectively. The TAPE RUN signal on leads 2168 and 2030 actuates AND gate 1280 and OR gate 2046 and turns on forward solenoid driver amplifier 2002 thereby starting the operation of the tape.

When the LOAD signal on lead 2112 goes to "1" and gate 2120 operates and the output of inverter 2126 goes to "0," inhibiting AND gate 2128. Thus, even when the tape start delay single shot 1256 times out after 25 milliseconds, and the "zero" output on lead 2160 returns to "1," AND gate 2128 does not operate, thereby preventing tape run flip-flop 2166 from being reset at the end of the 25 millisecond delay period if data has not yet been encountered on the tape.

When the first timing pulse of the initial data block is played back the TIMING TRACK OUT signal on lead 2118 goes to "1." This reset load operation flip-flop 2116, and its output on lead 2122 goes to "0" inhibit AND gate 2120. The output of inverter 2126 then returns to "1," whereby AND gate 2128 is again conditioned.

However, the first pulse of the TIMING TRACK OUT signal on lead 2118 also sets timing pulse single shot 2138 through OR gate 2119 so its output on lead 2140 goes to "0." Thus, even though the input to AND gate 2128 from inverter 2126 has returned to "1," its input on lead 2140 is not "0" and the AND gate remains inhibited. This condition continues as long as timing pulses continue to be received at less than 5 millisecond intervals to keep single shot 2138 in operation. In this way, the tape is permitted to run until the entire first line of information on the tape has been transferred to the line memory as hereinafter described.

The LOAD signal on lead 2112 is also provided through lead 2432, and OR gate 2422 as an input to AND gate 2430. For a brief interval prior to actuation of tape run flip-flop 2166 as previously explained, the $\overline{\text{TAPE RUN}}$ signal on lead 2390 is still "1." AND gate 2430 is therefore actuated, and a signal is provided through OR gate 2426 to set erase ready flip-flop 2418, and to condition AND gate 2464.

The output of OR gate 2422 also is provided over lead 2424 to condition AND gate 2392. Since the "one" output of erase ready flip-flop 2418 over lead 2420 and the TAPE RUN signal on lead 2378 are both "1" at this time, AND gate 2392 operates to pass the 84480 Hz signals on lead 2389 through OR gate 2386, to leads 2384 and 2436, the latter serving to set erase flip-flop 2416.

Setting erase flip-flop 2416 provides a "1" on lead 2442 which is coupled through capacitor 2446, OR gate 2414, and lead 2322 to reset line memory address register 2314 to its "0" condition.

Also, the output of erase flip-flop 2416 is provided over lead 2440 in common to inverters 2458(a) through (e) which simultaneously selects all of the RAM sub-units for operation, and also through OR gate 246 and lead 2408. The latter simultaneously places all of the RAM sub-units in the "write" condition.

The output of OR gate 2386 is also provided through lead 2384, OR gate 2318 and lead 2324 to advance line memory address register 2314 in the manner previously described to effect erasure of the line memory. The latter proceeds in the manner described for record operation. Since the erase operation requires only about 3 milliseconds, it is completed long before the end of the 25 millisecond tape start delay.

When erasure is complete as indicated by a "1" on lead 2518, erase and erase ready flip-flops 2416 and 2418 are both reset. The resulting "1" level on lead 2444 resets line memory address register 2314, and the "1" on lead 2512 reconditions AND gate 2508 for operation in response to signals from OR gate 2510.

Similarly the "0" signal on lead 2440 returns the outputs of inverters 2458(a) – (e) to "1," permitting individual selection of the RAM sub-units, and frees OR gate 2460 for operation in response to read-write control circuit 23102. The latter is conditioned for write operation by the "1" output of inverter 2466 resulting from the fact that AND gate 2464 is inhibited by the "0" input from OR gate 2426.

Reset of erase ready flip-flop 2418 also inhibits AND gate 2392, thereby preventing the 84480 Hz clock signals from advancing line memory address register 2314.

The previously recorded timing track signals detected by timing track playback circuit 548, are provided through lead 2372, and OR gate 2318 to advance line memory address register 2314, and to actuate read-write control circuit 23102. AND gate 2394 is conditioned by the "1" level of the signal on lead 2396, whereby a series of pulses of "1" level are coupled through OR gate 2460 and lead 2408 to actuate the RAM sub-units 2402, 2404, and 2502–2506 in the write mode.

With erase flip-flop 2416 reset, the $\overline{\text{ERASE}}$ signal appearing on lead 2512 is "1" whereby AND gate 2508 is conditioned. Also with record-playback key 314 in the playback position, the $\overline{\text{RECORD}}$ signal on lead 1730 is "1," which actuates AND gates 1834 and 1856 in data and timing track playback circuits 542 and 548 (see FIG. 18) to provide data signals on lead 544 and timing signals on lead 1858. The latter signals are coupled through lead 2370 and OR gate 2318 as previously mentioned to advance the line memory address register 2314. The data signals appearing on lead 544 are provided through OR gate 2510 and conditioned AND gate 2508 to the data input of the RAM sub-units over lead 2410. Thus, under control of the pulses being read from the timing track, the data pulses are stored in sequence in the memory sites of the line memory, with the line memory address register 2314 advancing from one count state to the next in response to the timing track signals.

As mentioned above, the timing track signals on lead 1858 are connected through lead 2118 to timing pulse sensor single shot 2138. As long as timing pulses are provided at intervals of less than 5.0 milliseconds, single shot 2138 remains triggered, and its output on lead 2140 is "0." If no timing pulses appear on lead 2118 for 5 milliseconds, (indicating that the block of data read from the tape has been completed) single shot 2138 returns to its rest condition and the signal on lead 2140 goes to "1." This actuates AND gate 2128 which provides a "1" output through OR gate 2174 and lead 2172 to reset tape run flip-flop 2166. The TAPE RUN signal on lead 1268 now goes to "0" inhibiting AND gate 2032 and turning off forward solenoid driver amplifier 2002.

Also, at this time the $\overline{\text{TAPE RUN}}$ signal goes to "1." With load indicator flip-flop 2130 set the LOAD SET signal on lead 30116 is also "1." AND gate 30110 operates and a pulse is provided through capacitor 30114, OR gate 30106, inverter 30104 and lead 30102 to reset up-down counter 3004 to "0."

As previously explained in connection with FIGS. 20 and 21, as soon as pulses are encountered in the timing track and are provided on lead 2118 load operation flip-flop 2116 is reset and load key 304 may be released. If this is done, load switch flip-flop 2106 is immediately reset and the LOAD signal appearing on lead 2112 returns to "0." This causes the output of OR gate 2422 on lead 2424 also to return to "0," inhibiting AND gate 2392. Since the latter has already been inhibited by reset of erase ready flip-flop 2418 after about the first 3 milliseconds of the load operation, system operation is unaffected by the condition of the load key at this time. Since the tape is running, the output of AND gate 2430 is "0" in any event, so the erase ready flip-flop remains reset. Also AND gate 2464 does not affect operation during erase since the input to OR gate 2460 over lead 2440 overrides the read-write circuit. After erase, the output of AND gate 2464 is "0" due to the "0" input of AND gate 2430 and OR gate 2426 so inverter 2466 provides a "1" output to condition AND gate 2394 for write operation — independent of the state of OR gate 2422 and load key 304.

However when the tape stops, the $\overline{\text{TAPE RUN}}$ signal on lead 2390 returns to "1." If load key 304 has been released, AND gate 2430 is inhibited, and its output remains "0." However, if the load key is still depressed, AND gate 2430 operates, erase ready flip-flop 2418 is again set, and its output on lead 2420 goes to "1." This conditions AND gate 2392, but with the tape not running the TAPE RUN signal on lead 2382 is still "0" so AND gate 2392 does not operate. It therefore is of no concern whether or not load key 304 remains depressed after the first timing pulse is read out.

Local Playback Operation

After the load operation the line memory contains the first block of data on the tape, but the shift register is still empty. To initiate playback of the first line, the operator releases load key 304 if this had not already been done. Record-playback select key 314 remains in the playback position, and remote-local select key 318 is placed in the local position. The $\overline{\text{RECORD}}$ signal on lead 1730 and the LOCAL signal on lead 1794 are "1," and the $\overline{\text{LOCAL}}$ signal on lead 1796 is "0."

Playback key 308 is then depressed, which couples the $\overline{\text{RECORD}}$ signal on lead 1830 thorugh switch contacts 1732, lead 1734, and OR gate 1736 to set playback flip-flop 1738. As a result, the PLAY signal on lead 1740 goes to "1" and the $\overline{\text{PLAY}}$ signal on lead 1742 goes to "0."

The PLAY signal is coupled over lead 2132 through capacitor 2134 to reset load indicator flip-flop 1244. This extinguishes load key illuminator 2136. Also, the PLAY signal is coupled over lead 2434, OR gate 2422, and lead 2424 as an input to AND gate 2430, previously conditioned by the "1" value of the $\overline{\text{TAPE RUN}}$ signal on lead 2390. AND gate 2430 then operates through OR gate 2426 to set erase ready flip-flop 2418 and to activate AND gate 2464 which was previously conditioned by the "1" value of the TAPE DELAY COMPLETED signal provided by tape start single shot 2142 on leads 2160 and 2398, indicating completion of the 25 milliseconds delay period.

With AND gate 2464 actuated, the output of inverter 2466 on lead 2396 is "0," inhibiting AND gate 2394 and providing a "0" signal on lead 2408 to select the read mode for RAM sub-units 2402,2404 and 2502–2506.

The PLAY signal appearing on lead 2434 also actuates AND gate 2452, which was previously conditioned by the $\overline{\text{TAPE RUN}}$ signal on lead 2390. The "1" output of AND gate 2452 is coupled through capacitor 2450, OR gate 2414 and lead 2322 to reset line memory address register 2314 to its "0" condition.

Concurrently, the PLAY signal on lead 1722 is provided over lead 3018 activate AND gate 3008, previously conditioned by the "1" level of the $\overline{\text{TAPE RUN}}$ signal on lead 3016, and to activate AND gate 3042, previously conditioned over lead 3044 by the "1" output of AND gate 30156, indicating that up-down counter 3004 is reset. Operation of AND gate 3042 sets shift register empty flip-flop 3024 which provides a "1" signal on lead 3022 to actuate AND gate 3020.

The latter passes the high frequency pulses appearing on lead 3026 to lead 3028. Counting chain 3030 thus advances through its operating sequence until shift register empty flip-flop 3024 is reset after 24 counts. This causes the signal and lead 3022 to return to "0" inhibiting AND gate 3020, and preventing further pulses from appearing on lead 3028.

The 24 bit-transfer pulses on lead 3028 are provided through leads 2352 and 2350 to operate AND gate 2346, which is conditioned by the "1" level of the PLAY signal on lead 2348. AND gate 2346 therefore operates to provide the 24 bit transfer pulses through lead 2344, OR gate 2318 and lead 2316 to advance line memory address register 2314 by 24 counts. RAM subunits 2402,2404 and 2502-2506 are conditioned for read operation by the "0" signal on lead 2408, nd line memory address register 2314 activates the line memory to read out the contents of the first 24 memory sites. This data is provided thorugh lead 2412, buffer amplifier 2334 and lead 520 to AND gate 856. The latter is conditioned by the PLAY and $\overline{\text{TAPE RUN}}$ signals on leads 860 and 862 and the data provided by the line memory output is therefore coupled thorugh OR gate 856, and lead 511 to the werial input terminal of shift register sub-unit 1404(a) (see FIG. 14). Concurrently, the 24 bit transfer pulses activate the shift register through lead 1416, OR gate 506 and lead 528 to accept the incoming data from the line memory over lead 511. In this way the data stored in the first 24 memory sites of the line memory are transferred to the shift register.

As each character is entered into the shift register, it is inspected by character identification and search logic unit 560 to determine whether it is CAR. RET. or EOM. Such inspection occurs at the 8th, 16th and 24th counts of the 24-bit transfer sequence, for which pulses are provided by the output of OR gate 3032 over leads 3034, and 2766, OR gate 2762, and lead 2760 to actuate AND gates 2756 and 2758.

For the case of the CARR. RET. code word, several possibilities exist. For example, as will be recalled, for a "start line" the CARR. RET. code word can be the only character in the line, or the line can contain one or two characters in addition to CARR. RET.

Assume first that the only character in the line being transferred is CARR. RET. Thus, at the 8th count of the 24 bit transfer sequence, AND gate 2756 is actuated and provides a "1" signal on lead 2782 to set carrier return flip-flop 27112, and the CR and $\overline{CR}$ output signals go to "1" and "0" respectively.

Before carrier return flip-flop 27112 was set, the $\overline{CR}$ signal was "1," which signal is provided over lead 3090 together with the $\overline{EOM}$ signal through OR gate 3092 to condition AND gate 3088. Thus, the 8th pulse of the operating cycle of counting chain 3030 provided by the output of OR gate 3032 over lead 3032 activates AND gate 3088 to provide a pulse through lead 30100, OR gate 3064 and lead 3062 to advance up-down counter 3004 from its "0" condition to a count of "1."

The 9th through 16th pulses in the 24 bit transfer sequence advance the bits of the CARR. RET. code word into bit positions 9 through 16 of the shift register while the 17th through the 24th pulses advance it to the 17th through 24th bit positions of the shift register. Since CARR. RET. is the only character in the line in question, the sixteen bit position not containing the eight bits of the CARR. RET. code word contain "0's." To achieve a uniform output format, these "0" bits are suppressed and are not provided to the printer 102 or coupler 116.

For this reason counter 3004 is arranged to reflect the fact that the shift register contains only one character. Thus, when the 16th and 24th pulses of the three-character transfer sequence are provided by the output of OR gate 3032 over lead 3034 to AND gate 3088, carrier return flip-flop 27112 has been set, and the $\overline{CR}$ output on leads 27113 and 3090 is "0." This inhibits AND gate 3088 and prevents up-down counter 3004 from advancing.

Consequently, at the end of the 3 character transfer sequence, the CARR. RET. code word is located in the last character position of the shift register and up-down counter 3004 is in the "1" state, indicating the presence of a single character in the shift register. At this time, the entire line has been transferred to the shift register in preparation for transfer to printer 102 in the manner hereinafter described. Also, the system must now prepare a new line for entry in the line memory. Thus, after the 24th pulse of the three character transfer operation, the $\overline{3\ CH\ XFER}$ signal at the output of inverter 30176 becomes "1," and is provided over lead 30128 and 2834 to operate AND gate 2828 conditioned by the CR signal from flip-flop 27112. The output of AND gate 2828 is provided over lead 2830 to OR gate 2822 to generate the START LINE TRANSFER signal on lead 2820.

Essentially similar operation takes place if the block of data contained in line memory is a "short line" containing the CARR. RET. code word plus one additional code word. Under these circumstances, the first 8 pulses of the 24 bit transfer sequence advances the first character code word into shift register bit positions 1 through 8. The 8th pulse actuates AND gate 2756 as before, but since the character in question is not CARR. RET., the AND gate is not actuated. The $\overline{CR}$ output of carrier return flip-flop 27112 on leads 27113 and 3090 remains "1," conditioning AND gate 3088 which responds to the 8th count of the 24 bit transfer sequence provided over lead 3034 to advance up-down counter 3004 from a count of "0" to a count of "1."

The next 8 pulses of the 24 bit transfer sequence advances the first character into bit positions 9 through 16 and advances the CARR. RET. code word into bit positions 1 through 8. The 16th pulse actuates AND gate 2756, and the CARR. RET. code word is recognized. This produces a "1" on lead 2782 to set carrier return flip-flop 27112 through delay 27110. Due to the delay the $\overline{CR}$ signal on leads 27113 and 3090 remains "1" for sufficient time to permit the 16th count pulse to pass through AND gate 3088 and to advance up-down counter 3004 from the count of "1" to the count of "2."

The three character transfer sequence continues with the remaining pulses i.e. the 17th through 24th pulses advancing the first character into the 17th through 24th bit positions of the shift register, and advancing the CARR. RET. character into the 9th through 16th bit positions. With carrier return flip-flop 27112 set, the $\overline{CR}$ signal on leads 27113 and 3090 in "0" so AND gate 3088 is inhibited. Therefore, the 24th pulse of the 24th bit transfer sequence provided over lead 3034 does not advance up-down counter 3004 whereby the same remains at the count of "2" indicating the presence of only two characters in the shift register.

After the 24th pulse, the $\overline{3CH.\ XFER}$ signal goes to "1," and is provided over leads 30128 and 2834 to actuate AND gate 2828, previously conditioned when flip-flop 27112 was set. This generates the START LINE TRANSFER signal on lead 2820 as previously described.

Similar operation also occurs for a "short line" containing two characters in addition to CARR. RET. For such a line, all three characters are contained in the shift register at the 24th count, at which time flip-flop 27112 is set. Before that, the $\overline{CR}$ signal was "1," so all of the 8th, 16th and 24th pulses of the 3 character transfer sequence passed through AND gate 3088 to advance up-down counter 3004. The latter thus reaches the count of "3" at the end of the 24 bit transfer sequence. At that time, however, carrier return flip-flop 27112 is set and the CR signal on lead 2838 goes to "1". Also, the $\overline{3\ CH.\ XFER}$ signal goes to "1", and AND gate 2828 operates to produce the START LINE TRANSFER signal on lead 2820.

For a normal line, CARR. RET. is not one of the characters entered into the shift register by the 3 character transfer sequence.

For such a line, as the three character transfer sequence proceeds, each incoming character is unsuccessfully tested by character identification and search logic unit 560 at the count of 8, 16 and 24, and a "1" output is not produced by AND gate 2756 on lead 2782. Carrier return flip-flop 27112 is therefore not set, and the $\overline{CR}$ signal provided over leads 27113 and 3090 remains "1" to condition AND gate 3088. Consequently the 8th, 16th and 24th pulses of the 24 bit transfer sequence each advance up-down counter 3004 in turn from the count of "0" to "1" to "2," and finally, to "3," respectively, indicating that the shift register contains three characters, as in the case of a three character "short line."

After the three-character transfer sequence has been completed, the system is ready to begin transferring information out to printer 102. Note, however, that while the $\overline{3\ CH\ XFER}$ signal on lead 2834 is now "1", carrier return flip-flop 27112 is not set and the CR signal on lead 2838 is "0." This inhibits AND gate 2828 and the START LINE TRANSFER signal is not generated.

The number of characters actually transferred to the printer depends on the number of characters in the shift register. As will be recalled, for a line consisting solely of CARR. RET., the count of up-down counter 3004 at the end of the 3 character transfer sequence was "1.". Similarly, for lines containing one and two characters in addition to the carrier return character, up-down counter 3004 had reached counts of "2" and "3" respectively. Likewise, for a normal line in which CARR. RET. is not one of the first three characters, the count of up-down counter 3004 is also "3" at this time.

As will be recalled, when up-down counter 3004 contains a count of "3," or if the counter is counting down and has not reached "0" the 3RD CHAR. PRES. signal at the output of OR gate 30162 is "1." This is true for a normal line and for a short line having CARR. RET. as the third character since the required count of "3" is present. For a short line having CARR. RET. as its first or second character, however, up-down counter 3004 does not reach the count of "3" but nevertheless the 3RD CHAR. PRES. signal is "1" because the reverse count operation was initiated by the START TAPE DELAY signal provided through lead 2150, OR gate 2148, and leads 2158, and 3048 when the START LINE TRANSFER signal was generated.

The "1" value of the 3RD CHAR. PRES. signal on lead 30170 is provided over lead 934 to operate AND gate 870. The latter is conditioned by "1" values of the LOCAL and $\overline{SEARCH}$ signals on leads 834 and 948, by the "1" value of the No. 6 output of sequence control logic unit 606 on lead 936 (indicating that counting chain 1202 is reset), and by the PRINTER READY signal from flip-flop 874 indicating that printer 102 is ready to receive data.

AND gate 870 is therefore activated to provide the START PRINT signal on lead 868. This signal serves two functions. First, it conditions AND gates 864(a) through (f), 916(a) through (f), and 938(a) through (f). The second function accomplished by the START PRINT signal is to initiate the 8 bit transfer sequence generated by counting chain 1202 to advance the shift register. For this purpose, the START PRINT signal is provided over leads 852 and 1212 and OR gate 1144, to set cycle flip-flop 1128. This activates AND gate 1126 and starts operating cycle of counting chain 1202.

As will be recalled, the outputs of shift register bit positions 17 – 24 are provided as inputs to parity check circuit 928 and to code converter 912 which provides inputs to AND gates 916(a) – (f) Also, the outputs of bit positions 17 – 22 are connected directly to AND gates 864(a) – (f). Parity check circuit 928 operates continuously to provide a "1" output on lead 930 if proper parity is not maintained. However, the parity check is meaningful only when a charater is actually present in the 17th – 24th shift register bit positions and not during a character transfer operation. Thus, unless AND gate 932 is conditioned by the 3RD CH. PRES. signal and the No. 6 output of sequence control logic unit 606, the output of the parity check circuit is not utilized.

Assuming that no parity error is detected, AND gate 932 remains inhibited, even though conditioned by the 3RD CHARACTER PRESENT signal on lead 930, and the No. 6 output of sequence control logic unit 606 provided over lead 936. The output of inverter 910 on lead 908 is therefore "1" and provides a further conditioning signal for AND gates 864(a) through (f) and 916(a) through (f).

Operation of AND gates 864 or 916 depends on the format being employed. If the data contained in the shift register is in the EIA format, the EIA function select switch 1716 is placed in the EIA position, and the EIA signal on lead 812 is "1" while the ASCII signal on lead 918 is "0." This conditions AND gates 846(a) through (f) and inhibits AND gates 916(a) through (f).

Conversely, if the information contained in the shift register is in the ASCII format and is to be provided to printer 102 in the EIA format, switch 1716 is placed in the ASCII position, and the signal on lead 918 is "1" while the signal on lead 812 is "0." This conditions AND gates 916(a) through (f) and inhibits AND gates 864(a) through (f).

As will be understood in the former case, the contents of shift register bit positions 17 through 24 is provided to printer 102, directly through AND gates 864(a) through (f) and OR gates 920(a) through (f). In the latter case, data is provided to the printer by way of code converter 912 through AND gates 916(a) through (f) and OR gates 920(a) through (f).

In the event that a parity error is detected, AND gate 932 is activated, and provides a "1" output on lead 940 and a "0" output on lead 908. The former activates AND gates 938(a) through (f) while the latter inhibits all of AND gates 864(a) through (f) and 916(a) through (f). Thus, instead of the character contained in the shift register, the substitute character generated by AND gates 938(a) through (f) is provided to the printer.

As the operating cycle of counter 1202 begins, the No. 6 output of sequence control logic unit 606 goes to "0," inhibiting the START PRINT signal. This inhibits AND gates 864, 916 and 938 so the printer does not receive data during the shift cycle.

At the 4th count of the operating cycle of counting chain 1202 the No. 8 output of sequence control logic unit 606 is provided through lead 3082, AND gate 3076, OR gate 3064, and lead 3062 to advance counting chain 3004. In the event that the counting chain is already at the count of "3," the advance pulse has no effect. However, it will be recalled that if one of the first three characters was CARR. RET., the line transfer sequence was initiated and count reverse flip-flop 30132 was set by the START TAPE DELAY signal provided over leads 2158 and 3048 through AND gate 30124. In that case, the pulse provided over lead 3062 reduces the count of up-down counter. In this connection, it will be understood that if CARR. RET. was the 3rd character in the line, the state of up-down counter 3004 is reduced from "3" to "2." Correspondingly, if CARR. RET. was the 2nd character in the line, the state of the up-down counter was reduced from "2" to "1" and if CARR. RET. was the only character in the line, the state of counter 3004 is reduced from "1" to "0."

Following operation of counter 3004, the operating cycle of counting chain 1202 continues. As a result, the 8 pulses constituting the No. 2 output of sequence control logic unit 606 are provided through lead 1414, OR gate 506, and lead 528 to advance the shift register, and over lead 2368 to AND gate 2364. Unless CARR. RET. was one off the three characters entered into the shift register during the 3 character transfer sequence, the state of up-down counter is "3" at this time, and the signal on lead 2360 is "1." AND gate 2364 is therefore activated to provide the 8 bit-transfer pulses through lead 2362, OR gate 2318, and lead 2316 to advance line memory address register 2314 by eight counts, thereby to transfer the next character into the first 8 bit positions of the shift register.

In contrast, however, if carrier return was one of the three characters transferred into the shift register, the state of counter 3004 is not "3" and AND gate 2364 is not activated. Since nothing further is contained in the line memory, the only operation required for the No. 2 output of sequence control logic unit 606 is to advance the shift register. Consequently, advance of line memory address register 2314 and operation of the line memory are unnecessary.

The eight bit transfer sequence ends at the 68th count of the operating cycle of counting chain 1202. At this time, a new character has been transferred into the output position of the shift register, i.e. bit positions 17 through 24 and is processed by ASCII to EIA converter 912 and parity check circuit 928 as previously described in preparation for transfer to printer 102. AND gates 864, 916, and 938 do not operate at this time, however, because the No. 6 output of sequence control logic unit 606 (corresponding to the "0" count of counting chain 1202) is still "0."

At the 70th count of the operating cycle of counting chain 1202, character identification and search logic unit 560 is again activated to test the character newly transferred into the shift register from the line memory to determine whether it is CARR. RET. Thus, AND gate 2756 is conditioned by the No. 7 output of sequence control logic unit provided through lead 2768, OR gate 2762 and lead 2760. If the newly entered character is CARRIER RETURN, a "1" is provided on lead 2782 to set carrier return flip-flop 27112. This actuates AND gate 2828, which was conditioned by the $\overline{\text{3 CH XFER}}$ signal on lead 2834 to provide a "1" level on lead 2830. This generates the START LINE TRANSFER signal on lead 2820 as previously explained. If the incoming character is not CARR. RET., the signal on lead 2782 remains "0."

Following the test for carrier return, cycle flip-flop 1128 is reset by the No. 4 output of sequence control logic unit 606 at either the 72nd count in the operating cycle of counting chain 1202 for EIA operation, or at the 88th count for ASCII operation. In either case, resetting cycle flip-flop 1128 returns counting chain 1202 to its "zero" condition and provides a "1" at the No. 6 output of the sequence control logic unit to reactivate AND gate 870 and to generate a new START PRINT signal on lead 868.

Operation in the manner just described continues as long as a character is present in the third bit position of the shift register. If CARR. RET. was one of the three characters transferred into the shift register by the 3 character transfer sequence, up-down counter 3004 immediately begins to reduce its count and reaches "0" after the 1st, 2nd, or 3rd 8-character transfer sequence depending on whether CARR. RET. was the 1st, 2nd, or 3rd character entered into the shift register. If CARR. RET. was not one of the first three characters, up-down counter 3004 does not begin to count down until CARR. RET. has been detected. A character thus remains in the 3rd character position of the shift register for three additional cycles while the three remaining characters in the shift register, including the carrier return are tranferred to the printer.

When the state of up-down counter 3004 reaches "0," a "1" signal is provided on lead 3044 at the output of AND gate 30156. This resets count reverse flip-flop 30132, preparing the up-down counter to be advanced during the next three character transfer sequence. Also, the signal on lead 3044 is provided to activate AND gate 3042, previously conditioned by the PLAY signal on lead 3018 which provides a signal through OR gate 3040 to set shift register empty flip-flop 3024. This provides a "1" signal on lead 3022 to condition AND gate 3020. However, since the tape has been started by the START LINE XFER signal, the $\overline{\text{TAPE RUN}}$ signal on lead 3016 is "0" and AND gate 3008 is inhibited, which in turn inhibits AND gate 3020 and prevents the 24 bit transfer sequence from commencing.

Thus, it may be seen that even though the tape is running, information is still being transferred out of the shift register to printer 102 although transfer of information from a line memory to the shift register is inhibited by the "0" value of the $\overline{\text{TAPE RUN}}$ signal provided over lead 862 to AND gate 858.

Considering now the effect on the tape memory and the line memory in response to generation to the START LINE TRANSFER signal by AND gate 2822, operation is essentially similar to that which occurs in response to depression of load key 304. Specifically, the "1" value of the START LINE TRANSFER signal provided over leads 2820 and 2150 actuates OR gates 2148 and 2144 to trigger tape start delay single shot 2142, the "one" output of which sets tape run flip-flop 2166. With the tape run flip-flop set, the TAPE RUN and $\overline{\text{TAPE RUN}}$ signals on leads 2168 and 2170 become "1" and "0" respectively. The TAPE RUN signal actuates AND gate 2032 which turns on forward solenoid driver amplifier 2002 and starts the operation of the tape. The other output of tape start delay single shot 2142 on lead 2160 goes to "0" when the single shot is triggered and remains "0" for a period of 25 milliseconds. During this time, AND gate 2128 is inhibited. At the end of the 25 milliseconds delay, the signal on lead 2160 returns to "1" reconditioning AND gate 2128.

As previously explained, when the tape stops at the end of a line transfer sequence, the operation of timing pulse sensor single shot 2138 assures that after the tape again starts, timing pulses will be encountered by timing track playback circuit 548 within the 25 millisecond delay period of tape start delay single shot 2142. Thus, before the latter returns to its rest state, single shot 2138 will have been triggered by the first timing pulse of the next data block and the output signal on lead 2140 goes to "0." This assures that AND gate 2128 remains inhibited even after single shot 2142 returns to its rest condition for as long as timing pulses continue to be played back within 5 millisecond intervals (and for a period of 5 milliseconds after the last timing pulse.) Thus, no reset signal is provided over lead 2172 by OR gate 2174 and tape run flip-flop 2166 remains set to permit the next block of data to be played back from the tape.

When tape run flip-flop 2166 is set, the "1" level of the TAPE RUN signal provided over leads 2168 and 2382 actuates AND gate 2392, previously conditioned by the output of erase ready flip-flop 2418 on lead 2420, and by the PLAY signal provided over lead 2434, OR gate 2422, and lead 2424. Operation of AND gate 2392 causes the 84480 Hz clock signals provided on lead 2389 to pass through OR gate 2386 to set erase flip-flop 2416, thereby initiating the previously described erase sequence.

When the erase sequence is completed, an entire block of data is transferred from the tape to the line memory, the data transfer operation continuing until the tape run flip-flop is reset 5 milliseconds after the last timing pulse. In contrast to the load operation, however, with playback flip-flop set, the PLAY signal on lead 3018 is "1." Thus, when the tape stops, the "1" level of the $\overline{\text{TAPE RUN}}$ signal on lead 3016 activates AND gate 308 which in turn activates AND gate 3020 through OR gate 3010 to start immediately the 24 bit transfer cycle.

Operation then proceeds in the manner previously described with all of the information in a line being transferred out to printer 102 through the shift register, after which a new line is tranferred from the tape memory to the line memory and the process is repeated. The process continues unchaged until the EOM code word is encountered.

As will be recalled, the EOM code word always follows a CARR. RET. code word, i.e. it is the only character in the last line of a message. Thus, if the EOM code word is present, it will be the only character in the line memory and will be the first character transferred into the shift register during the 3 character transfer sequence. Thus, at the 8th count in the 3 character transfer sequence, AND gate 2758 is activated and provides a "1" on lead 2792 to set EOM flip-flop 2844 through delay 2846.

The $\overline{\text{EOM}}$ signal on lead 2862 then goes to "0" and is provided over lead 3096 through OR gate 3092 to inhibit AND gate 3088. However, during the delay the EOM signal is still "1" and the 8th count of the operating cycle of counting chain 3030 activates AND gate 3088 and counter 3004 advances to the count of "1."

The remaining 16 counts of the three character transfer sequence advance the EOM code word to shift register bit positions 17 – 24 but with AND gate 3088 inhibited counter 3009 does not advance, but remains at the count of "1."

At the end of the three-character transfer operation, the $\overline{\text{3 CH. XFER}}$ signal becomes "1." This is provided over lead 30128 to activate AND gate 30126, previously conditioned by the PLAY and EOM signals on leads 3018 and 30130 to set count reverse flip-flop 30132 through OR gate 30122.

This generates the 3RD CH. PRES. signal on lead 30170 which initiates the START PRINT signal as previously described. The EOM signal is provided to the printer but normally there is no provision to print out this character so the printer does not operate.

However, counter 3004 is advanced at the 4th count of the operating cycle and thus reaches the "0" count. The signal on lead 3044 then goes to "1" and is provided over lead 2870 to operate AND gate 2868. This was previously conditioned by the EOM signal on lead 2872 and generates the EOM STOP signal on lead 2874. This is provided over lead 1750 to reset playback flip-flop 1738.

This causes the PLAY and $\overline{\text{PLAY}}$ signals on leads 1740 and 1742 to become "0" and "1" respectively. The "0" value of the PLAY signal on lead 3018 inhibits AND gate 3008, which in turn inhibits AND gate 3020 and also resets counting chain 3030 through inverter 3038.

The "0" value of the PLAY signal on lead 860 also cuts off AND gate 858 blocking the transfer of further information from the line memory to the shift register. Also, the "0" value of the PLAY signal over lead 2348 inhibits AND gate 2346 thereby blocking the advance pulses for line memory address register 2314.

The system therefore comes to rest awaiting further actuation.

The system is reactuated for further playback operation by depression of playback start key 308 which again sets playback flip-flop 1738 and provides a "1" level for the PLAY signal on lead 1742. The latter is provided over lead 2856 through capacitor 2860 and OR gate 2848 to reset EOM flip-flop 2844, the zero output of which on lead 2862 then goes to "1." This signal is provided by OR gate 3092 to condition AND gate 3088, and also through capacitor 2864 to actuate AND gate 2866 which was previously conditioned by the PLAY signal on lead 2856, to provide a "1" output on lead 2840 to actuate OR gate 2822. As previously explained, this generates the START LINE TRANSFER signal on lead 2820, which is coupled through lead 2150, and OR gate 2148 to generate the START TAPE DELAY signal. Also as explained, this initiates the entire playback cycle including line memory erasure, transfer of a line of information from the tape to the line memory, and transfer through the shift register to an external utilization device.

REMOTE PLAY OPERATION

Remote play operation is essentially similar to local play operation except that information is provided to the output utilization device on a serial, i.e. bit by bit, basis from the 24th bit position of the shift register rather than in parallel, i.e. simultaneously from the 17th through the 24th bit positions. The portions of the playback operating cycle up to and including the 3 character transfer sequence are identical in local and remote playback operation. In other words, up to a time that the first three characters in a new line (or the entire line for a "short line") are transferred into the shift register, the operating sequences described above in connection with local playback operation apply to remote playback operation as well.

At the end of the 3 character transfer sequence, a character is present in the 3rd character position of the shift register as indicated by the "1" level of the signal on lead 30170. This signal is provided to AND gate 1136, which is conditioned by the PLAY signal on lead 1148, by the $\overline{\text{LOCAL}}$ signal on lead 1150 by the No. 6 output of sequence control logic unit 606 on lead 1152, and by the $\overline{\text{LOAD}}$ signal on lead 1154. Assuming that the external utilization device is prepared to accept data as indicated by a "1" level of the COUPLER READY signal on lead 1156, AND gate 1136 operates to set cycle flip-flop 1128 through OR gate 1144. This actuates AND gate 1126 and initiates the operating cycle of counting chain 1202.

Before counting chain 1202 begins to operate, start pulse flip-flop 954 is set by the "1" level of the No. 6 output of sequence control logic unit 606 on lead 956. The signal on lead 953 is therefore "0," inhibiting AND gate 952 and providing a "0" signal on lead 960 for the K input of line flip-flop 962.

The first triggering signal for the line flip-flop is provided by the first pulse of the No. 1 output of sequence control logic unit 606, i.e. corresponding to the 4th count of the operating cycle of counting chain 1202. With the signal on lead 960 at the "0" level at that time, the $\overline{Q}$ output of line flip-flop 962 is "0" thereby generating the "space" corresponding to the start pulse of the transmission codes shown in FIGS. 4(a) through 4(c).

At the 6th count of the operating cycle of counting chain 1202, the No. 5 output of sequence control logic unit 606 becomes "1." This signal is provided over lead 958 to reset start pulse flip-flop 954 providing a "1" level on lead 953 to condition AND gate 952. With the PLAY signal on lead 860 at "1," AND gate 952 operates to provide a "1" or a "0" depending on the value of the signal on lead 516 at the output of the 24th bit position of the shift register.

As explained above, the No. 1 and No. 2 outputs of sequence control logic unit 606 are identical but for the addition to the No. 1 output of a pulse at the 4th count of the operating cycle of counting chain 1202. Thus, after the 4th pulse, line flip-flop 962 is triggered in synchronism with the advance of the shift register.

However, it will also be recalled that for line flip-flop 962 the value of the K input at the beginning of the clock pulse appears at the $\overline{Q}$ output at the end of the clock pulse while for the shift register stages the value of the output of one stage at the time of the advance is stored in and appears at the output of the succeeding stage at the end of the advance pulse. Thus, while the shift register and line flip-flop 962 are operated synchronously, the output of the shift register remains static sufficiently long for line flip-flop 962 to switch to the value determined by the shift register contents before the shift.

The above described procedure continues for all of the 8 pulses constituting the No. 2 output of sequence control logic unit 606 whereby an entire character is transferred through line flip-flop 962.

The 8th bit of a character code word in the EIA format is the "stop" bit. This is generated by resetting line flip-flop 962 to produce a value of "1" for the $\overline{Q}$ output at the 68th count of the operating cycle of counting chain 1202. The reset signal is provided by the No. 3 output of sequence control logic unit 606 over lead 974 OR gate 970, and inverter 968. Cycle flip-flop 1128 and counting chain 1202 are then reset at the 72nd count of the counting chain operating cycle by the No. 4 output of sequence control logic unit provided over lead 1146 through AND gate 1134 and OR gate 1142. At that time, counting chain 1202 returns to its reset condition and the No. 6 output is provided over lead 1152 to reactivate AND gate 1136 and commence the next operating cycle by setting cycle flip-flop 1128.

For ASCII operation, however, it will be recalled that the 8th bit is a parity bit which must be followed by two stop bits to complete the transmission character code word. Thus during ASCII operation, with a "1" signal on lead 1228, and a "0" signal on lead 1226, AND gate 1218 is inhibited and AND gate 1220 is activated to provide the 76th count of the operating cycle of counting chain 1202 as the No. 3 output of the sequence control logic unit 606. Line flip-flop 962 is therefore not reset until the 76th count, rather than at the 68th count.

Similarly, the "0" level of the signal on lead 1226 inhibits AND gate 1222 while the "1" level of the signal on lead 1226 activates AND gate 1224 to provide the 88th count of the operating cycle of counting chain 1202 as the No. 4 output of sequence control logic unit 606. For ASCII operation, therefore, cycle flip-flop 1128 is not reset until the 88th count, at which time counting chain 1202 is returned to "0" and reactivates cycle flip-flop 1128 through AND gate 1136 and OR gate 1144. Since line flip-flop 962 remains reset from the 76th count of an operating cycle of counting chain 1202 until it is next triggered by the 4th count of the next operating cycle the $\overline{Q}$ output of the line flip-flop remains high during this entire interval, thereby generating the two stop bits.

As in the case of local playback operation, when a carrier return code word is detected, up-down counter 3004 begins to count down. When the latter reaches "0" the 3RD CH. PRES. signal generated by OR gate 30102 becomes "0" and is provided over leads 30170, and 1135 to inhibit the operation of AND gate 1136, thereby preventing a transfer of any further data over lead 526 until a new line of information has been stored in the line memory, and first three characters thereof inserted in the shift register.

SEARCH OPERATION

The search operation is actually a combination of various features of the above described record and playback operation in that the system operates in a quasi-record mode while the search identification characters are entered in the system and then operates in a playback mode while the tape is being scanned to locate the search identification characters. As will be recalled, a line may commence with three identification characters such as three numbers, three letters, or a combination of numbers and letters by which that line or a group of lines can be identified.

In order to locate such identifier codes, the operator types the three characters by means of the printer while holding the search key depressed. The search key is then released and the search operation commences.

Specifically, to commence the search operation, the operator places record playback select key 314 in the playback position and depresses search key 312. This sets search flip-flop 1772 and provides "1" levels on leads 1774 and 1776.

The operator then actuates the printer to type the three desired search identifier characters. With the LOCAL and SEARCH KEY signals on leads 834 and 842 both "1," AND gate 828 is actuated to generate the PARALLEL ENTER signal on lead 814 to operate sequence control logic unit 606 and to enter the three characters being printed into the shift register in the manner previously described for the local record operation. The operation of line memory 204 is of no particular concern at this time.

As each of the three search reference characters are entered in the shift register, up-down counter 3004 is advanced by the 4th count of each cycle of counting chain 1202. Counter 3004 starts at a "0" count since one of the inputs to OR gate 30106 will always be "1" before a search operation, or else a play sequence will have been completed during which counter 3003 counts down as the EOM character is shifted out of the shift register. The signal on leads 30160 and 1782 is therefore "0" until the 3 search address character advances counter 3004 at the 4th count of its input shift cycle. At that time, AND gate 1780 which was conditioned by the SEARCH signal on lead 1776 operates to produce the START SEARCH signal on lead 1787 through capacitor 1786. This signal is provided over lead 1143 to reset cycle flip-flop 1128 thereby preventing further advance of shift register 504, and over lead 2726 to actuate latch circuits 2724, 2736, and 2810 to store the 24 bits contained in the shift register as the search reference character code.

Also, the "1" level of the SEARCH signal on lead 2722 actuates AND gate 2720, and the corresponding AND gates in compartor circuits 2730 as well as AND gates 2814 and 2816 while the zero value of the $\overline{\text{SEARCH}}$ signal on lead 2714 inhibits AND gate 2712 and the corresponding AND gates in comparator circuits 2730. This conditions character identification and search logic unit 560 for search operation, and suppresses the "CARRIER RETURN" and "EOM" code word recognition functions.

The "1" level of the START SEARCH signal is also provided over lead 2154 to actuate OR gate 2148, and over lead 1784 to set playback flip-flop 1738 through OR gate 1736.

Actuation of OR gate 1259, by the START SEARCH signal sets tape start delay single shot 2142 through OR gate 2144. Operation of tape start delay single shot 2142, in turn, sets tape run flip-flop 2170 and initates a tape to line memory data transfer sequence in normal fashion.

The START SEARCH signal is also coupled through OR gate 30106, inverter 30104 and lead 30102 to provide a reset pulse for up-down counter 3004, whereby a "1" output is provided by AND gate 30156 over lead 3044 to condition AND gate 3042. The START SEARCH signal sets playback flip-flop 1738, so the PLAY signal on lead 3018 becomes "1" and AND gate 3042 operates to set shift register empty flip-flop 3024 through OR gate 3040. This provides a "1" signal on lead 3022 to condition AND gate 3020. The latter, however, remains inoperative since the $\overline{\text{TAPE RUN}}$ signal on lead 3016 is "0" whereby AND gate 3008 and OR gate 3010 are inhibited.

The tape continues to run and the operation of transferring data from the tape to the line memory continues in a manner previously described until timing pulse sensor single shot 2138 times out and resets tape run flip-flop 2166. At that time, the $\overline{\text{TAPE RUN}}$ signal on lead 3016 goes to "1" and actuates AND gate 3008. This in turn actuates AND gate 3020 through OR gate 3010 and initiates the 24 bit transfer sequence of counting chain 3030.

The 24 bit transfer pulses provided over lead 3028 operates both shift register 502 through lead 1416, OR gate 506 and lead 528 as well as line memory 204 through leads 2352, 2350, AND gate 2346, lead 2344, OR gate 2318 and lead 2316. Also, the 8th, 16th and 24th pulses of the operating cycle of counting chain 3030 are provided through OR gate 3032, and lead 3034 to AND gate 3088 which is conditioned by the $\overline{\text{EOM}}$ and $\overline{\text{CR}}$ signals on leads 3094 and 3090. AND gate 3088 therefore operates to provide advance pulses for up-down counter 3004 through lead 30100, OR gate 3064 and lead 3062. Thus, at the end of the 24 bit transfer sequence up-down counter 3004 is at the count of "3" and the first three characters in the line then contained in line memory 204 have been transferred into the shift register.

Also at the 24th count of the operating cycle of counting chain 3030, AND gate 2794 is conditioned by the output of OR gate 2762 to test for coincidence between the three reference characters stored in latch circuits 2724, 2736, and 2810 and the three characters just transferred into the shift register. If such coincidence is detected, AND gate 2794 operates, and provides a "1" signal through lead 27104, OR gate 27108, and lead 27110 to search control logic circuit 2876.

At the 24th count of the cycle of counting chain 3030, AND gate 2878 operates to provide an enabling signal over lead 2892 for AND gates 2880 and 2882.

If the SEARCH COINCIDENCE signal on lead 27110 is "0", the output of inverter 2884 is "1" so that AND gate 2882 operates to generate a "1" value for the CONTINUE SEARCH signal on lead 2896. This signal is provided through lead 2152 to actuate OR gate 2148 to generate the START TAPE DELAY signal on lead 2158, and to set tape start delay single shot 2142 through OR gate 2144. Operation of tape start delay single shot 2142 sets tape run flip-flop 2166 and reinitiates the tape to line memory data transfer sequence.

Thus, if coincidence between the first three characters in the line and the stored reference characters is not achieved, it is known that the line in question is not being searched for and the system then proceeds to erase that line from the line memory, to load in the next line from the tape, and to shift its first three characters into the shift register for comparison with the stored reference characters.

As long as search coincidence is not achieved, the foregoing operation continues with the system examining one line at a time. When search coincidence is achieved or if end of tape sensor 2010 operates to provide a signal on leads 2014 and 2824, OR gate 27108 operates, and "1" signal level appears on lead 27110. When the actuating signal on lead 2892 is present, AND gate 2880 operates to generate the STOP SEARCH signal on lead 2894.

The latter is provided through lead 1752 and OR gate 1744 to reset playback flip-flop 1738 and search flip-flop 1772 returning the PLAY and SEARCH signals on leads 1740 and 1776 to "0" and the $\overline{\text{PLAY}}$ and $\overline{\text{SEARCH}}$ signals on leads 1742 and 1778 to "1".

Also, the "1" signal at the output of AND gate 2880 on lead 2894 sets search indicator flip-flop 28100 which in turn operates search key illuminator 2898 to indicate completion of the search operation. As will be appreciated, if completion of the search operation results from reaching the end of the tape, both search key illuminator 2898 and end of tape indicator 326 (see FIG. 3) will be illuminated advising the operator that the search was unsuccessful.

Assuming that the search is successfully completed, the normal procedure is for the operator to initiate playback of the message in question. This is accomplished simply by depressing playback start key 308 which again sets playback flip-flop 1738 producing a "1" value for the PLAY signal on lead 1740. This resets search indicator flip-flop 28100 and search key illuminator 2898 over lead 2856, capacitor 2860, OR gate 2848, and lead 28102.

At the end of the search operation up-down counter 1504 remainded at the "3" count. Thus, when playback flip-flop 1738 is again set, sequence control logic unit 606 again operates. At that time, also, the 3RD CHARACTER PRESENT signal on lead 30170 is "1" and transfer of data either to a local or a remote utilization device proceeds in the manner previously described.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An on-line transmission and reception terminal system for serially handling data in the form of multi-bit character code words from a data source, comprising:

input-output means including means connected to said data source for converting a character code word from said data souce to a character code word having a fixed number of bits per character and a preselected bit code, a line of characters having a predetermined number of characters;

an intermediate memory connected to said character code word converting means for storing lines of characters in code word form;

means for serially reading out code words in said character code word converting means a bit at a time from said input-output means to said intermediate memory;

a principal memory including a tape medium;

means for driving said tape at a constant speed responsively to the read-out of a line of characters either from said intermediate memory to said principal memory or from said principal memory to said intermediate memory;

means for activating said tape drive means and for serially reading out code words corresponding to a line of characters stored in said intermediate memory to one track of said tape memory, the bits representing the characters being serially read out onto one track of said tape as it is moving such that character code words are stored on one track in serial fashion a bit at a time;

means for activating said tape drive means and for serially reading out code words corresponding to a line of characters from said tape to said intermediate memory one bit at a time;

means for serially reading out said intermediate memory to said input-output means a bit at a time;

a data utilization device; and, means for reading out said input-output means to said data utilization device.

2. The system as defined in claim 1 wherein said line of data comprises a block of data, said intermediate memory means storing a block of data comprising a plurality of character code words; said principal memory storing a plurality of data blocks; and wherein said readout means include control logic means for establishing a recording operation sequence comprising entry of data from said data source through said input-output means, accumulation of a block of data in said intermediate memory with said block of data being defined by a particular terminal character, and transfer of said data block to said principal memory; said control logic means including first means coupling said input-output means to said intermediate memory for effecting transfer of data from said input-output means to said intermediate memory, second means coupling said intermediate memory to said principal memory for effecting data transfer in serial bit form from said intermediate memory to said principal memory, first control means coupled to said first transfer means for actuating said first transfer means in response to incoming data from said data source, means coupled to said intermediate memory for sensing said terminal character in said incoming data, and second control means coupled to said second tranfer means and responsive to said sensing means for actuating said second transfer means to transfer the block of data accumulated in said intermediate memory to said principal memory.

3. A system as defined in claim 2 wherein said input-output means includes first means for receiving data from said data source in parallel form with all of the bits defining a character code word appearing simultaneously; second means for receiving data from an data source in serial form with each of the bits defining a character code word appearing in sequence; wherein said first transfer means is operative to provide data to said intermediate memory one bit at a time; and wherein said second transfer means is operative to provide data to said principal memory one bit at a time.

4. A system as defined in claim 2 wherein said input-output means includes multiple bit storage means connected to said data source and said intermediate memory, said storage responsive to the bits of an externally generated character code word to generate an additional bit, the value of which is a function of the parity of the incoming code.

5. A system as defined in claim 2 further including a keyboard and keyboard responsive error correction means coupled to said input-output means to delete an undesired character being entered and to substitute another character therefor.

6. A system as defined in claim 2 wherein said sensing means comprises means for storing a reference code word representing said terminal character, means connected to said reference storage means and said input-output means to compare an incoming character code word with said reference code word, and means for generating a coincidence signal when said incoming character code word matches a reference code word.

7. A system as defined in claim 6 wherein said sensing means includes means for providing a second coincidence signal in response to recognition of a second predetermined character; and wherein said second control means is responsive to either said first or second coincidence signal to actuate said second transfer means.

8. A system as defined in claim 2 wherein said input-output means includes means for temporarily storing incoming data from said data source; and means responsive to an incoming character code word to transfer a previously received character code word from said input-output storage means to said intermediate memory.

9. A system as defined in claim 8 wherein said control logic means includes means responsive to the arrival of said terminal character in said input-output means to actuate said first transfer means to transfer the data stored in said input-output means together with said terminal character to said intermediate memory, and means for thereafter actuating said second transfer means to transfer the entire block of data to said principal memory.

10. A system as defined in claim 2 wherein said intermediate memory includes a plurality of separate memory sites for storing the individual bits comprising a data block; and wherein said second transfer means comprises means to actuate each of said memory sites in sequence to transfer the contents thereof to said principal memory, means responsive to the actuating of each memory site to generate a timing pulse and means for storing said timing pulse in said principal memory together with the associated data bit.

11. A system as defined in claim 2 wherein said input-output device includes means for temporarily storing character code words received from said data source, means for receiving each bit of an incoming character code word in sequence and for entering said bits in said temporary storage means, further means for receiving all of the bits of an incoming character code word simultaneously and for storing said bits in said temporary storage means, means responsive to incoming data for transferring data previously stored in said temporary storage means to said intermediate memory one bit at a time; wherein said sensing means includes means for storing a reference code word representing said terminal character, means for inspecting each incoming character code word and for generating a coincidence signal when said incoming code word matches said reference code word, means responsive to said coincidence signal for transferring all data contained in said temporary storage means together with said terminal character to said intermediate memory and for thereafter actuating said second transfer means; wherein said intermediate memory comprises a plurality of individual memory sites for storing the individual bits of an incoming data block; and wherein said second transfer means comprises means for actuating each of said memory sites in turn to transfer the contents thereof to said principal memory one bit at a time; means for generating a timing pulse in coincidence with the activation of each memory site, and means for storing said timing pulse in said principal memory together with the associated bit.

12. A system as defined in claim 11 wherein said input-output means further includes means responsive to the bits of an incoming character code word to generate an additional bit, the value of which is a function of a parity of the incoming code word, and means for entering said additional bit in said temporary storage means together with the associated incoming code word.

13. A system as defined in claim 12 further including a keyboard and keyboard responsive error correction means coupled to said input output means for deleting a character code word from said temporary storage means and for inserting therefor a desired code word.

14. The system as defined in claim 1 wherein said line of data comprises a block of data, wherein said intermediate memory means stores a block of data comprising a plurality of character code words; said principal memory storing a plurality of data blocks; and wherein said readout means include control logic means for establishing a playback operation sequence comprising entry of a block of data in said intermediate memory from said principal memory, and transfer of said block of data to said utilization device through said input-output means; said control logic means including first means coupling said intermediate memory to said input-output means for effecting transfer of data from said intermediate memory to said input-output means, second means coupling said input-output means to said external utilization device for effecting data transfer from said input-output means to said external utilization device, third means coupling said principal memory to said intermediate memory for transferring data from said principal memory in serial bit form to said intermediate memory, first and second control means coupled to said first and second transfer means for actuating said first and second transfer means to provide data to said utilization device, and third control means coupled to said third transfer means and responsive to transfer of said block of data to said utilization device for actuating said third transfer means to enter another block of data into said intermediate memory from said principal memory.

15. A system as defined in claim 14 wherein said second transfer means includes first means for providing data to said utilization device in parallel form with all of the bits defining a character code word appearing simultaneously; second means for providing data to said utilization device in serial form with each of the bits defining a character code word appearing in sequence; wherein said first transfer means is operative to provide data to said input-output means one bit at a time; and wherein said third transfer means is operative to provide data to said intermediate memory one bit at a time.

16. A system as defined in claim 14 wherein said input-output means includes means responsive to the bits of an outgoing character code word to test for an error in said code word, and means responsive to detection of an error for preventing said erroneous code word from being provided to said utilization device.

17. A system as defined in claim 16 further including means responsive to detection of an erroneous code word to suppress said erroneous code word, and to substitute another code word therefor.

18. A system as defined in claim 14 wherein a data block is defined by a particular terminal character, and wherein said third control means comprises means for storing a reference code word representing said terminal character, means connected to said reference storage means and said input-output means to compare an outgoing character code word with said reference code word, means for generating a coincidence signal when said outgoing character code word matches a reference code word, and means responsive to said coincidence signal to actuate said third transfer means.

19. A system as defined in claim 18 wherein a group of data blocks comprising a message is identified by a second particular terminal character, and wherein said third control means includes means for providing a second coincidence signal in response to recognition of said second particular character; and wherein said control logic means is responsive to said second coincidence signal to prevent said third transfer means from being actuated.

20. A system as defined in claim 14 wherein said input-output means includes means for temporarily storing character code words provided by said intermediate memory, means to initiate transfer of a previously stored character code word to said utilization device, and means responsive to transfer of a character code word from said temporary storage means to enter another code word into said input-output means from said intermediate memory.

21. A system as defined in claim 20 wherein a data block is defined by a particular terminal character; wherein said third control means includes means for sensing the presence of said terminal character in said temporary storage means for operating said second transfer means to transfer out the data stored in said temporary storage means, and for concurrently operating said third transfer means to load a block of data from said principal memory into said intermediate memory, and means for thereafter actuating said first transfer means to transfer data from said intermediate memory to load said temporary storage means.

22. A system as defined in claim 14 wherein said principal memory contains a plurality of control pulses, each data bit being associated with one of said control pulses; wherein said intermediate memory includes a plurality of separate memory sites for storing the bits comprising a data block wherein said control logic means includes means to operate said principal memory to generate data pulses and the associated control pulses; and wherein said third transfer means comprises means responsive to actuation thereof to operate said principal memory, and means responsive to said control pulses to actuate said memory sites in sequence to transfer the data pulses associated with said control pulses to respective memory sites of said intermediate memory.

23. A system as defined in claim 14 wherein aid input-output device includes means for temporarily storing a character code word received from said intermediate memory, means coupling said storage means to said date source for extracting each of the bits of a character code word in sequence for provision to said utilization device, further means for extracting all of the bits of a character code word simultaneously for provision to a utilization device, and means responsive to extraction of a character code word from said temporary storage means for entering another character code word therein from said intermediate memory; wherein a block of data is defined by a particular terminal character; wherein said third control means includes means for storing a reference code word representing said terminal character, means for inspecting each character code word in said temporary storage means and for generating a coincidence signal when said inspected code word matches said reference code word, means responsive to said coincidence signal for transferring out all data remaining in said temporary storage means, and for concurrently actuating said third transfer means to load a new block of data into said intermediate memory, and means responsive to completion of the loading of said intermediate memory to actuate said second transfer means to reload said temporary storage means.

24. A system as defined in claim 23 wherein said input-output means further includes means coupled to said temporary storage means to detect the existence of an error in a character to be transferred to a utilization device, and means responsive to detection of an error for preventing transfer of the erroneous code word.

25. A system as defined in claim 24 further including means responsive to detection of an error for suppressing the erroneous code word and for substituting therefor a desired code word.

26. The system as defined in claim 1 wherein said input-output means includes a memory system for storage and retrieval of data in a plurality of different formats, said data being defined by multibit character code words, including information bits and other bits with the number of information bits and other bits per code word, and the actual code word representing a given character varying with the particular format being employed, said memory system comprising: an input-output unit for handling character code words in any acceptable format, including means to receive data from said data source during record operation and means to provide data to said utilization device during playback operation; memory means coupled to said input-output unit for receiving data from said input-output unit during record operation and for providing data to said input-output unit during playback operation; data format selecting means coupled to said input-output unit; mode selecting means coupled to said input-output unit and to said memory means for establishing record and playback operating modes for said memory system; said input-output unit further comprising means for establishing a predetermined number of bits to be stored for each character code word, independent of the data format, said number equaling or exceeding the number of information bits per code word in any acceptable code format, means responsive to said format selecting means, and to an incoming code word having a total number of bits less than said predetermined number to generate one or more additional bits of predetermined value, means for associating said additional bits with said incoming code word for storage in said memory means, and means responsive to said format selecting means and to an incoming code word having a total number of bits exceeding said predetermined number for suppressing one or more of said other bits before storage in said memory means whereby the number of bits stored per code word is always equal to said predetermined number.

27. A system as defined in claim 26 wherein said other bits comprise at least one initial bit and at least one terminal bit, of predetermined value, and wherein said input-output unit includes means responsive to said format selecting means and to a code word provided by said memory means to generate the required initial and terminal bits in accordance with the selected data format.

28. A system as defined in claim 26 wherein said input-output unit includes means responsive to a code word provided by said memory means to suppress all bits of said code word except said information bits and means for coupling said information bits to said utilization device.

29. A system as defined in claim 26 wherein at least one of said information bits is an error checking bit, and wherein said input-output unit includes means responsive to an incoming code word not including said error checking bit for generating an error checking bit, and for associating said error checking bit with said code word before storage in said memory means.

30. A system as defined in claim 29 wherein said input-output means includes means responsive to a code word provided by said memory means and including said error checking bit for suppressing said error checking bit before provision to said utilization device.

31. A system as defined in claim 30 wherein said input-output units includes means responsive to said error checking bit for determining the existence of an error in the associated code word, and means responsive to an error for preventing transmission of said erroneous code word to said utilization device.

32. A system as defined in claim 31 further including means responsive to said error checking means for substituting a predetermined code word for said erroneous code word and for providing said predetermined code word to said utilization device.

33. A system as defined in claim 26 including means responsive to said format selecting means and to an incoming code word for transforming said incoming code word from one format to another.

34. A system as defined in claim 26 further including means responsive to said format selecting means and to a code word provided by said memory means for converting the information bits thereof from one format to another.

35. The system as defined in claim 1 wherein said input-output means includes means for storing at least one code word, first coupling means for connecting said storage means to said data source, and second coupling means for connecting said storage means to said data utilization device; wherein a line of data comprises a block of data, said intermediate memory means storing a block of data comprising a number of character code words substantially exceeding the storage capacity of said input-output means; said means for serially reading out said input-output means to said intermediate memory and said means for serially reading out said intermediate memory to said input-output means including first means coupling said input-output means to said intermediate memory for transferring data one bit at a time between said input-output means and said intermediate memory; said principal memory tape medium including a two track tape, said two-track tape comprising data storage means having a memory medium; said means for serially reading out said intermediate memory to said principal memory and said means for serially reading out said principal memory to said intermediate memory including second means coupling said intermediate memory to said principal memory medium for transferring information one bit at a time between said intermediate memory and said principal memory medium; and further including logic means coupled to said first and second serial transfer means for controlling the information transfer operations for said system.

36. A system as defined in claim 112 further including a reference clock for generating a primary timing signal, means for generating a first pulse train at a frequency less than the clock frequency; wherein said first coupling means includes means for receiving data one bit at a time at a bit rate which is nominally a submultiple of the frequency of said first pulse train; and wherein said logic means includes counter means responsive to said first pulse train and to an actuating signal to generate a series of pulses at said sub-multiple frequency with the first pulse in predetermined time relation to said activating signal, sensing means responsive to an incoming data pulse to generate said activating signal, and means responsive to said series of pulses for operating said input-output storage means to store each incoming data bit.

37. A system as defined in claim 36 further including control means responsive to said series of pulses for operating said first transfer means to transfer previously stored data bits from said input-output storage means to said intermediate memory.

38. A system as defined in claim 37 including means for generating a second pulse train at a frequency substantially exceeding the frequency of said first pulse train, means responsive to the accumulation of an entire block of data in said intermediate memory for generating a data block transfer initiation signal, means in said logic means responsive to said data block transfer initiation signal and to said second pulse train for operating said intermediate memory to transfer data one bit at a time to the principal memory at a bit rate equal to the frequency of said second pulse train, 39. A system as defined in claim 38 including means responsive to said data block transfer initiation signal for generating a second series of pulses, the number of pulses in said second series being equal to the bit storage capacity of said input-output storage means, means for coupling said second group of pulses to said control means to actuate said input-output storage means to transfer all data therein to said intermediate memory and means responsive to completion of said second series of pulses for initiating transfer of said block of data to said principal memory from said intermediate memory.

40. A system as defined in claim 39 including means responsive to said data block transfer initiation signal for determining the number of bits comprising the data block, and means responsive to transfer of said number of bits to said principal memory for terminating transfer of data from said intermediate memory to said principal memory.

41. A system as defined in claim 40 further including means responsive to completion of transfer of said data block to said principal memory for clearing said intermediate memory in preparation for storage of another data block.

42. A system as defined in claim 36 wherein each character code word commences with a predetermined non-information bearing bit; wherein said sensing means is responsive to said non-information bearing bit to activate said counter to advance in response to the pulses of said first pulse train, said counter including means to provide a first output pulse at a predetermined count corresponding to the nominal center of the bit period of the first information bearing bit of the incoming character code word, and means for providing further counter output pulses at a succession of counts corresponding to the nominal centers of the bit periods for the other information bearing bits of said incoming character code word, means for collecting said pulses to form an electrical signal, and means for deactivating and resetting said counter when a predetermined maximum count is reached.

43. A system as defined in claim 42 wherein the frequency of said first pulse train is at least four times the nominal bit rate.

44. A system as defined in claim 42 wherein the frequency of said first pulse train is eight times the nominal bit rate.

45. A system as defined in claim 35 including a reference clock for generating primary reference timing signal, means connected to said clock for generating a pulse train at a frequency less than the clock frequency; wherein said second coupling means includes means for transmitting data one bit at a time at a bit rate which is nominally a sub-multiple of the frequency of said pulse train; wherein said logic means includes counter means responsive to said pulse train to generate a series of pulses at said sub-multiple frequency, means for actuating said intermediate memory, said input-output means and said second coupling means in response to said series of pulses to transfer a character code word from said intermediate memory to said input-output storage means,and for concurrently transmitting a previously stored character code word to said utilization device at said sub-multiple frequency.

46. A system as defined in claim 45 wherein said counter includes means for generating an additional pulse preceding said series of pulses by an interval equal to the interval between pulses at said data bit rate, means responsive to said additional pulse for generating an initial bit for transmission as part of said code word, and means for preventing actuation of said second coupling means by said series of pulses until after termination of said additional pulse.

47. A system as defined in claim 46 further including means responsive to said master clock to generate a second pulse train at a frequency substantially higher than the frequency of said first pulse train, means responsive to said second pulse train for generating a series of timing pulses, means for storing said timing pulses together with the bits of an associated data block in said principal memory, means for activating said data storage means to retrieve said timing pulses, means responsive to said retrieved timing pulses for activating said intermediate memory to transfer a data block from the principal memory to the intermediate memory, means responsive to said second pulse train for generating a second series of pulses comprising a number of pulses equal to the bit storage capacity of said input-output storage means, means responsive to said second series of pulses, and to transfer of an entire block of data from said principal memory to said intermediate memory to activate said intermediate memory and said input-output means for transferring from said intermediate memory to said input-output means a number of bits equal to the number of pulses in said second series of pulses.

48. A system as defined in claim 47 further including means for preventing operation of said counter means during data transfer under control of said second series of pulses.

49. A system as defined in claim 26 wherein said memory medium comprises a magnetic recording tape; wherein said tape driving means includes tape transport means and drive means for said transport means; wherein said second transfer means includes first and second recording circuits for recording first and second information tracks; and wherein said logic means includes means for generating a data transfer pulse train, means to initiate a data record operation sequence comprising means for activating said transport drive means for continuous operation, means for operating said intermediate memory in response to said data transfer pulse train to transfer data to said first record circuit in bit-by-bit synchronism with said data transfer pulses, and means for coupling said data transfer pulse train to said second recording circuit to store a track of timing pulses on said tape with the timing pulses in synchronism with the bits of said data track.

50. A system as defined in claim 49 further including means for deactivating said transport drive means, said intermediate memory and said second recording circuit after a predetermined number of pulses corresponding to the number of bits to be recorded.

51. A system as defined in claim 49 wherein said deactivating means comprises means for storing an indication of the total number of bits comprising a data block, means providing a running count of the number of bits transferred to said first recording circuit, means providing an indication when the number of bits transferred to said first recording circuit equals the prestored number of bits comprising said data block, and means responsive to said indication for terminating said data record sequence.

52. A system as defined in claim 49 including means responsive to activation of said transport drive means to delay the actuation of said intermediate memory in response to said data transfer pulse train and said second recording circuit for a predetermined interval to allow said transport to reach its normal operating speed.

53. A system as defined in claim 52 wherein said logic means includes means responsive to said data transfer pulse train and to activation of said transport drive means for generating a series of pulses including a number of pulses equal to the bit storage capacity of said input-output storage means, and means for operating said input-output storage means and said intermediate memory to transfer all data stored in said input-output storage means to said intermediate memory during said predetermined delay interval.

54. A system as defined in claim 49 wherein said first and second recording circuits include means for converting a binary code input to a non-return-to-zero for recording.

55. A system as defined in claim 49 wherein said second transfer means includes first and second playback circuits associated with the first and second information tracks of a tape serving as the principal memory medium, and wherein said logic means includes means to initiate a data playback sequence comprising means for actuating said transport drive means for continuous operation, means for connecting said first playback circuit to said intermediate memory, means connected to said second playback circuit and responsive to timing pulses in said timing track for activating said intermediate memory to store the data bit associated with each timing pulse, means responsive to playback of an entire data block for deactivating said transport drive means and said intermediate memory.

56. A system as defined in claim 55 wherein said deactivating means comprises means for stopping said transport drive means after a predetermined interval if timing pulses are not detected by said second playback circuit.

57. A system as defined in claim 56 including means responsive to actuation of said transport drive means to delay activation of said intermediate memory for a predetermined tape start-up interval to allow said transport to reach its normal operating speed, and means for inhibiting operation of said deactivating means during said start-up delay interval.

58. A system as defined in claim 57 wherein said logic means includes means connected to said second playback circuit and responsive to an externally generated command to override said deactivation means until a timing pulse has been played back from said timing track through said second playback circuit.

59. A system as defined in claim 55 including means responsive to actuation of said transport drive means to delay activation of said intermediate memory for a predetermined tape start-up interval to allow said transport to reach its normal operating speed.

60. A system as defined in claim 55 including means responsive to initiation of said data playback sequence for activating said input-output storage means and said second coupling means to transfer any data contained in said input-output storage means to said utilization device during said data playback operation.

61. A system as defined in claim 55 including means responsive to said data transfer pulse train and to deactivation of said transport drive means for generating a series of pulses having a number of pulses equal to the bit capacity of said input-output storage means, and means for activating said intermediate memory and said input-output storage means to enter the initial bits of said data block into said input-output storage means, one bit for each pulse in said series of pulses.

62. A system as defined in claim 61 further including means responsive to entry of said initial bits of said data block in said input-output storage means for activating said intermediate memory and said input-output means to enter the remaining bits of said data block into said input-output storage means on a bit-by-bit basis and to transfer previously entered bits to said utilization device through said first coupling means.

63. A memory system as defined in claim 35 wherein said second transfer means is adapted to retrieve data from a magnetic tape serving as said principal memory medium, said tape having recorded thereon a first track of data pulses and a second track of timing pulses synchronized with said data pulses, groups of said pulses being separated by blank portions of said tape to define individual blocks of data; wherein said second transfer means includes separate playback circuits for said data and timing tracks; wherein said tape drive means includes magnetic tape transport means and transport drive means; and wherein said logic means includes means for establishing a playback operating sequence comprising means for activating said transport drive means, means responsive to activation of said transport drive means for coupling said data track playback circuit to said intermediate memory, control means responsive to timing pulses played back by said timing track playback circuit to activate said intermediate memory to store a data pulse associated with each timing pulse, and cycle termination means responsive to playback of an entire data block for deactivating said transport drive means and preventing further storage of data in said intermediate memory.

64. A system as defined in claim 63 wherein said cycle termination means comprises means to sense the beginning of an unrecorded portion on a tape and to turn off said transport drive means in response thereto, and means for decoupling said data track playback circuit from said intermediate memory and said timing track playback circuit from said intermediate memory control means when said transport drive is not activated.

65. A system as defined in claim 63 wherein said cycle termination means comprises timing means connected to said timing track playback circuit for generating a cycle termination signal when timing pulses are not played back within a predetermined interval and means responsive to said cycle termination signal to deactivate said transport drive means and to decouple said data track playback circuit from said intermediate memory and said timing track playback circuit from said intermediate memory control means.

66. A system as defined in claim 63 including means responsive to actuation of said transport drive means to prevent operation of said intermediate memory and said cycle termination means for a predetermined start-up delay period to allow said transport to reach its normal operating speed.

67. A system as defined in claim 66 wherein said logic means includes means for establishing a load operation sequence comprising means responsive to an external load command to activate said transport drive means and to deactivate said cycle termination means, and means responsive to the start of playback of information by said second transfer means to reactivate said cycle termination means.

68. A system as defined in claim 67 wherein said means responsive to the start of playback of a data block comprises means for generating a first signal in response to said external load command, means responsive to the first timing track pulse of a data block for generating a second signal, and means responsive to said first signal for deactivating said cycle termination means and responsive to said second signal for reactivating said cycle termination means.

69. A system as defined in claim 63 wherein said logic means includes first sequence control means responsive to entry of a complete data block in said intermediate memory from said principal memory to load an initial portion of said data block into said input-output storage means and second sequence control means responsive to entry of said initial portion of said data block in said input-output storage means to load the remaining bits of said data block into said input-output storage means on a bit-by-bit basis and to transfer prestored bits to said utilization device through said first coupling means.

70. A system as defined in claim 69 wherein said first sequence control means includes means for generating a group of actuating pulses for said intermediate memory and said input-output means, said group having a number of pulses equal to the bit capacity of said input-output storage means.

71. A system as defined in claim 69 wherein said second sequence control means includes means for generating a further group of actuating pulses for said intermediate memory and said input-output means, said further group having a number of pulses equal to the number of bits stored in said input-output storage means per character code word, and means responsive to generation of said further group of pulses for conditioning said second sequence control means to generate another group of pulses.

72. A system as defined in claim 69 wherein said second sequence control means includes means for generating an additional pulse prior in time to the first of the pulses of said second group of actuating pulses, said first coupling means being responsive to said additional pulse to transfer all of the bits of a character code word previously stored in said input-output storage means to said utilization device, said input-output means thereafter being responsive to said second group of actuating pulses to enter all of the bits of another character code word from said intermediate memory to said input-output storage.

73. A system as defined in claim 35 wherein said first coupling means comprises means for receiving said multi-bit character code words in serial form at a nominal bit rate, wherein said logic means includes means for generating a pulse train at a frequency which is a high multiple of said nominal bit rate, dividing means responsive to said pulse train to generate a second pulse train at a frequency equal to said nominal bit rate, means responsive to the first bit of an incoming character code word to generate an activating signal for said dividing means, said dividing means being operative to generate the first pulse of said second pulse train after a predetermined number of pulses of said first pulse train following said activating signal, and for generating succeeding pulses of said second pulse train at a frequencey equal to said nominal bit rate, means for activating said input-output storage means in response to said second pulse train to store incoming data bits in synchronism with the pulses of said second pulse train, and means for deactivating said dividing means after a predetermined number of pulses of said second pulse train have been generated.

74. A system as defined in claim 73 wherein said first coupling means includes means for receiving said multi-bit code word in parallel form, wherein said logic means includes means responsive to appearance of a character code word in parallel form in said first coupling means to generate said activating signal for said dividing means and also to generate a parallel data entry control signal, means responsive to said parallel data entry control signal to enter the bits of said incoming code word simultaneously into said input-output storage means, said input-output storage means thereafter being responsive to said second pulse train to transfer data stored therein into said intermediate memory on a bit-by-bit basis.

75. A system as defined in claim 74 wherein said input-output storage means has a capacity for storing at least two code words, and is operative in response to said parallel data entry control signal to enter the bits of an incoming code word in a first storage location, and is further responsive to said second pulse train to transfer a code word in said first storage location to said second storage location.

76. A system as defined in claim 35 wherein said tape drive means includes transport means for receiving a magnetic tape as said memory medium, and drive means for said tape transport, said drive means including means for operating said transport in a forward direction, means for operating said transport in a reverse direction, means cooperating with said transport for sensing the beginning of a tape, and means cooperating with said transport for sensing the end of a tape; and wherein said logic means includes means for actuating said forward drive means during data transfer between said principal memory and said intermediate memory, and means responsive to the sensing of the end of a tape for deactivating said forward drive means.

77. A system as defined in claim 76 wherein said logic means includes means responsive to an external rewind command to operate said reverse drive means, and means responsive to the sensing with the beginning of a tape for deactivating said reverse drive means.

78. A system as defined in claim 77 wherein said logic means includes means for establishing a tape erase operation sequence comprising means responsive to an external tape erase command to operate said forward drive means, means responsive to sensing of the end of the tape and to said tape erase command to deactivate said forward drive means and to activate said reverse drive means, means in second data transfer means responsive to said tape erase command to erase the tape, and means responsive to the sensing of the beginning of the tape and said tape erase command to terminate said erase operation sequence.

79. A system as defined in claim 76 further including means responsive to an external tape erase command for operating said tape drive means to erase all information stored on a tape being carried by said transport.

80. A system as defined in claim 79 wherein said logic means includes means responsive to an external error correction command to delete a character code word from said input-output storage means.

81. A system as defined in claim 76 wherein said transport means includes means for receiving a magnetic tape cassette.

82. A system as defined in claim 35 wherein said logic means includes means responsive to an external error correction command for deleting the contents of said intermediate memory.

83. A system as defined in claim 35 wherein said input-output means further includes means coupled to said storage means to detect the existence of an error in a character to be transferred to a utilization device, and means responsive to detection of an error for preventing transfer of the erroneous code word.

84. A system as defined in claim 83 further including means responsive to detection of an error for suppressing the erroneous code word and for substituting therefor a desired code word.

85. A system as defined in claim 35 wherein said input-output means includes a shift register having a first group of stages defining a first character position and a second group of stages defining a second character position each character position having capacity for storage of one character code word; means responsive to an incoming character code word from an external data source for operating said shift register and said intermediate memory to enter said incoming code word into the first character position of said shift register through said first coupling means and to transfer a previously entered code word from said second character position one bit at a time to said intermediate memory through said first transfer means; said shift register second character position being connected to said second coupling means and said shift register first character position being connected to said first transfer means; and means in said logic means for activating said first transfer means and said second coupling means for transferring a code word previously entered in said shift register to said coupling means; and for transferring another code word from said intermediate memory to said shift register.

86. A system as defined in claim 35 wherein said input-output means includes a shift register having a first group of stages defining a first character position and a second group of stages defining a second character position, each character position having capacity for storage of one character code word; and means responsive to an incoming character code word from an external data source for operating said shift register and said intermediate memory to enter said incoming code word into the first character position of said shift register and to transfer a previously entered code word from said second character position one bit at a time to said intermediate memory.

87. A system as defined in claim 86 wherein said first coupling means includes means for connecting the bits of an incoming character code word simultaneously to respective stages of said first character position and wherein said logic means includes means for entering said code word into said first character position and for thereafter advancing said shift register a sufficient number of times to transfer said code word from said first character position prior to entry of another character code word.

88. A system as defined in claim 86 wherein said input-output means includes means responsive to the bits of an incoming code word to generate an additional bit, the value of which is a function of the parity of the incoming code word, and means for entering said additional bit in one of the bit positions of said first character position, together with the associated code word.

89. A system as defined in claim 86 wherein said first coupling means includes means for accepting information from said external source in serial form, one bit at a time, and wherein said logic means includes means for entering each bit into the first stage of said shift register and means responsive to the first bit of an incoming character code word for advancing said shift register in synchronism with said incoming bit a sufficient number of times to enter said entire character into respective bit positions of said first character position.

90. A memory system as defined in claim 86 including means for providing an indication when a complete character is present in the stages of said second character position, and means for inhibiting transfer of data from said shift register to said intermeidate memory when said indication is not present.

91. A system as defined in claim 35 wherein said input-output means includes a shift register having a first group of stages defining a first character position and a second group of stages defining a second character position, each character position having capacity for storage of one character code word; means responsive to an incoming character code word from an external data source for operating said shift register and said intermediate memory to enter said incoming code word into the first character position of said shift register and to transfer a previously entered code word from said second character position one bit at a time to said intermediate memory; and means responsive to the accumulation in said intermediate memory of an entire block of data for transferring said block of data one bit at a time to said principal memory.

92. A system as defined in claim 35 wherein said input-output means includes a shift register having a first group of stages defining a first character position and a second group of stages defining a second character position, each character position having capacity for storage of one character code word; means in said logic means responsive to an incoming character code word from an external data source for operating said shift register and said intermediate memory to enter said incoming code word into the first character position of said shift register and to transfer a previously entered code word from said second character position one bit at a time to said intermediate memory; means responsive to the accumulation in said intermediate memory of an entire block of data for transferring said block of data one bit at a time to said principal memory; means for transferring an entire block of data from said principal memory to said intermediate memory, means for transferring data from said intermediate memory to the first character position of said shift register one bit at a time; said second coupling means being operative to receive data from the second character position of said shift register, means responsive to entry of a character code word into said shift register for transferring a previously entered code word to said second coupling means; and means responsive to the transfer of an entire block of data from said intermediate memory to said second coupling means for transferring another block of data from said principal memory to said intermediate memory.

93. A system as defined in claim 35 wherein said first and second coupling means comprise means for receiving and transmitting multi-bit character code words in serial form at more than one nominal bit rate, wherein said logic means includes means for generating a pulse train at a frequency which is a high multiple of said nominal bit rate, means for selecting the nominal bit rate at which data is to be transmitted or received, dividing means responsive to said pulse train to generate a second pulse train at a frequency equal to said nominal bit rate; record control means including means for activating said first coupling means; means responsive to an incoming character code word to generate an activating signal for said dividing means, said dividing means being operative to generate the first pulse of said second pulse train after a predetermined number of pulses of said first pulse train following said activating signal, and for generating succeeding pulses of said second pulse train at a frequency equal to said nominal bit rate, means for activating said input-output storage means in response to said second pulse train to store incoming data bits in synchronism with the pulses of said second pulse train, and means for deactivating said dividing means after a predetermine number of pulses of said second pulse train have been generated; playback control means including means for activating said second coupling means, means responsive to a signal from a data utilization device for generating an activating signal for said dividing means, and means responsive to said second pulse train to transfer data from said intermediate memory to said input-output storage means and from said input-output storage means to said second coupling means.

94. A system as defined in claim 35 wherein said intermediate memory comprises a random access memory having a plurality of individually accessible memory sites, said random access memory being operable in storage and retrieval operating modes, and means for selectably activating said individual memory sites for storage or retrieval operation.

95. A system as defined in claim 35 wherein said intermediate memory comprises a plurality of the individually accessible memory sites, said intermediate memory being being operable in information storage and retrieval modes, means to address individual ones of said memory sites in a predetermined sequence; wherein siad logic means includes means to advance said addressing means, means to operate said intermediate memory in said information storage mode to enter information in successively addressed memory sites on a bit-by-bit basis; means for selectively activating and deactivating said first and second transfer means to enter data in said intermediate memory from said input-output means or said principal memory respectively; means to operate said intermediate memory in said information retrieval mode, and means for activating said first and second transfer means to accept data from said intermediate memory, and to transfer the same to said input-output means or said principal memory, respectively, on a bit-by-bit basis.

96. A system as defined in claim 95 wherein said addressing means comprises counting means, means for advancing said counting means, means responsive to the state of said counting means for actuating an individual one of the memory sites of said intermediate memory, means for resetting said counting means to a rest state; wherein said means to operate said intermediate memory in said retrieval mode comprises means to reset said counting means, and thereafter to advance said counting means through at least a portion of its counting cycle to read out the contents of said intermediate memory, means responsive to completion of transfer of an entire data block to reset said counting means.

97. A system as defined in claim 96 wherein said logic means further includes means responsive to initiation of said retrieval mode of operation for temporarily storing the count state of said counting means representing the number of characters comprising a data block, means for comparing the count state of said counting means with said stored count states as said counter is advanced, and means responsive to coincidence between the count state of said counting means and said stored count state for deactivating and resetting said counting means.

98. A system as defined in claim 35 wherein said logic means includes means for establishing a data acceptance rate compatible with the data rate of an external data source, means for operating said input-output means and said intermediate memory at said data rate in synchoronism with incoming data to accumulate said incoming data in said intermediate memory, means responsive to accumulation of an entire data block in said intermediate memory to activate said intermediate memory and said principal memory at an internal data transfer rate substantially exceeding said data acceptance rate to transfer said accumulated data block to said principal memory, and means for inhibiting operation of said intermediate memory at said data acceptance rate while said data block is being transferred to said principal memory.

99. A system as defined in claim 96 further including means to permit accumulation of new incoming data in said input-output storage means while a previous data block is being transferred to said principal memory, said internal data transfer rate being sufficiently high in relation to said data acceptance rate to permit transfer of an entire data block to said principal memory while data is accumulated in said input-output storage means at said data acceptance rate.

100. A system as defined in claim 35 wherein said logic means includes means for establishing an external data transfer rate compatible with the data rate of an external data utilization device, means for establishing an internal data transfer rate substantially exceeding said external data transfer rate, means for operating said intermediate memory and said principal memory at said internal data transfer rate to enter an entire block of data from said principal memory into said intermediate memory, means for operating said intermediate memory and said input-output device at said external data transfer rate to transfer said data block to said utilization device, means responsive to transfer of said entire data block from said intermediate memory for operating the principal memory and said intermediate memory at said internal data transfer rate to enter a new data block into said intermediate memory, means for operating said input-output device at said external data transfer rate while said new data block is being entered into said principal memory, and means for inhibiting operation of said intermediate memory at said external data transfer rate while said new data block is being entered.

101. A system as defined in claim 100 further including means for determining the presence or absence of data in said input-output storage means, and means responsive to entry of a new data block in said intermediate memory and to the absence of data in said input-output storage means for operating said intermediate memory and said input-output storage means at said internal data transfer rate for a sufficient time to load an initial portion of said new data block into input-output storage means, said internal data transfer rate being sufficiently high in relation to said external data transfer rate that entry of said new data block in said intermediate memory and loading of the initial portion of said new data block into said input-output storage means occasions essentially no interruption of data transfer to said utilization device.

102. A system as defined in claim 35 wherein each data block is identified by a recognition code comprising at least one initial character; and wherein said logic means includes means for establishing a search mode of operation for locating a particular one of the data blocks based on its particular recognition code.

103. A system as defined in claim 102 wherein said means for establishing said search mode of operation comprises reference character storage means, means for entering into said reference character storage means the recognition code of the data block to be identified, means for entering an entire data block into said intermediate memory from said principal memory; means for transferring an initial portion of said block of data from said intermediate memory to said input-output storage means, means for comparing the contents of said input-output storage means with said stored recognition code, means responsive to a match between said recognition code and the contents of said input-output storage means to terminate said search operation, and means responsive to failure of the contents of said input-output storage means to match said recognition code to initiate transfer of another block of data from said principal memory to said intermediate memory, and to repeat the comparison process.

* * * * *

PO-1050
(5/69)

UNITED STATES PATENT OFFICE
CERTIFICATE OF CORRECTION

Patent No. 3,774,156 Dated November 20 1973

Inventor(s) Joseph P. Marsalka and Charles F. Spademan

It is certified that error appears in the above-identified patent and that said Letters Patent are hereby corrected as shown below:

Col. 1, line 56 "a" should read --as--.
Col 5, line 65 "nd" should read --and--.
Col 8, line 4, "is" should read --be--.
Col. 9, line 41, "sucy" should read --such--
Col. 10 line 37 "operationg and" should read --operation on--.
Col. 17, line 24 "only" should read --once--.
Col. 18. line 22 "in" should read --to--; line 67, reading in the line beginning "U", --A-- should appear in the seventh column, and in the eighth column "A" should be deleted.
Col. 19 line 26 "Ref. 3" should read --REF 3--.
Col. 20, line 64. "format" should read --code format--.
Col 21, line 60, "additiong" should read --addition--.
Col. 22, line 38, "501" should read --502--.
Col. 22, line 46, "memorY" should read --memory--; line 61, "oF" should read --of--; line 64, "type" should read --tape--.
Col. 23, line 35-36, "processIng" should read --processing--.
Col. 24, line 7, "oF" should read --of--.
Col. 26, lines 11 and 40, "gate 822(a)" should read --gates 822(a)--.
Col. 27, line 30, "gat" should read --gate--.
Col 28, line 38, "812" should read --912--.
Col. 29, line 16, "and gate" should read --AND gate--; line 32, "the resetting" should read --by resetting--; line 40, "latter" should read --later--; lines 47 and 55, "gate 938" should read --gates 938--; line 49, "input" should read --inputs--; line 67, "9's" should read --0's--.
Col 31, line 4, "an" should read --and--.
Col. 33, line 32, "sequence" should read --sequences--.

PO-1050
(5/69)

UNITED STATES PATENT OFFICE
CERTIFICATE OF CORRECTION

Patent No. 3,774,156 Dated November 20, 1973

Inventor(s) Joseph P Marsalka and Charles F. Spademan

It is certified that error appears in the above-identified patent and that said Letters Patent are hereby corrected as shown below:

Col. 34, lines 63 and 64, the heading should appear in capital letters

Col. 36, line 44, "1442" should read --1422--; line 58, "correction" should read --correct--.

Col. 37, line 55, "unit 502" should read --logic unit 502--.

Col. 39, line 20, "Fruther" should read --Further--; line 26, "th" should read --the--.

Col. 41, line 17, "reset" should read --rest--; line 48, "upn" should read --upon--.

Col. 43, line 54, "outut" should read --output--.

Col. 49, line 65, "block" should read --data block--.

Col. 50, line 21, "2166" should read --2116--.

Col. 52, line 60, "fed" should read --stored--

Col 55, line 60, "operatint" should read --operating--.

Col. 57, line 45, "2340" should read --2430--.

Col. 64, line 29, "1 14 8" should read -- 1 - 8 --

Col. 65, line 14, "2703" should read --2730--; line 56, "receives" should read --also receives--.

Col. 66, line 4, "detached" should read --detected--; line 5, "gte" should read --gate--.

Col. 67, line 10, "bits 20" should read --bits 10--; line 29, "24th" should read --24th bit--; line 45, "37 1." should read -- 1. --; line 65, "se" should read --see--.

Col. 68, line 65, "flip-flow" should read --flip-flop--.

Col. 69, line 23, "relay" should read --delay--.

Col. 70, last line should be deleted, and should appear as heading in capital letters as line 1 of Col. 71.

Col. 71, line 15, "TAPE RUN" should read --TAPE RUN--; line 18, "TAPE RUN" should read --TAPE RUN--; last line, " "0" Count" " should read --"0 Count"--.

PO-1050
(5/69)

UNITED STATES PATENT OFFICE
CERTIFICATE OF CORRECTION

Patent No. 3,774,156 Dated November 20, 1973

Inventor(s) Joseph P. Marsalka and Charles F. Spademan

It is certified that error appears in the above-identified patent and that said Letters Patent are hereby corrected as shown below:

Col. 72, line 19, "3050" should read --3058--; line 29, "603" should read --602--.

Col. 74, line 2, "pulse" should read --pulse to--; line 33, "3014" should read --30134--.

Col. 77, line 66, "'ogic" should read --logic--.

Col. 79, line 2, "late" should read --gate--; line 27, "leVel" should read --level--; line 27, "'eads" should read --leads--; line 40, "In" should read --in--.

Col. 80, line 5, "lead" should read --leads--; line 15, "238" should read --2388--; line 66, "is" should read --is also--.

Col. 81, line 21, "resetting" should read --Resetting--; line 33, "on" should read --one--

Col. 82, line 31, "As" should read --as--.

Col. 83, line 26, "3062" should read --lead 3062--; line 64, "8" should read --8 bit--.

Col. 84, line 17, "accent" should read --accept--; line 28, "character" should read --correct character--

Col. 86,line 1, "4the" should read --4th--.

Col. 87, line 29, "1" should read --"1" and "0"--; line 45, "reset" should read --resets--; line 47, "inhibit" should read --to inhibit--.

Col. 90, line 62, "nd" should read --and--.

Col. 91, line 2, "werial" should read --serial--; line 43, "position" should read --positions--.

Col. 94, line 29, "846(a)" should read --864(a)--.

Col 95, line 19, "off" should read --of--.

Col. 101, line 30, "compartor" should read --comparator--; line 45, "initates" should read --initiates--.

Col 102, line 4, "operates" should read --operate--.

PO-1050
(5/69)

UNITED STATES PATENT OFFICE
CERTIFICATE OF CORRECTION

Patent No. 3,774,156 Dated November 20, 1973

Inventor(s) Joseph P. Marsalka and Charles F. Spademan

It is certified that error appears in the above-identified patent and that said Letters Patent are hereby corrected as shown below:

Col. 103, line 15, "remainded" should read -- remained -- .
Col. 104, line 51, (claim 4), before the period, insert -- word, and means for entering said incoming code word together with said additional bit in said storage means -- .

Col. 107, line 46 (Claim 23), "aid" should read --said--.
Col. 109, line 16 (Claim 31), "units" should read --unit--; line 65 (claim 36), "claim 112" should read --claim 35--.
Col. 117, line 50 (Claim 90), "intermeidate" should read --intermediate--.
Col. 119, line 10 (Claim 95), "siad" should read --said--.

Signed and sealed this 29th day of October 1974.

SEAL)
ttest:

IcCOY M. GIBSON JR.
ttesting Officer

C. MARSHALL DANN
Commissioner of Patents